(12) United States Patent
Klassen et al.

(10) Patent No.: US 9,755,463 B2
(45) Date of Patent: *Sep. 5, 2017

(54) ELECTRIC MACHINE

(71) Applicant: Genesis Robotics LLP, Langley (CA)

(72) Inventors: James Brent Klassen, Langley (CA); Stephen Smith Chamberlain, Langley (GB)

(73) Assignee: Genesis Robotics LLP (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,961

(22) Filed: Aug. 11, 2016

(65) Prior Publication Data

US 2017/0047792 A1 Feb. 16, 2017

Related U.S. Application Data

(60) Provisional application No. 62/203,903, filed on Aug. 11, 2015, provisional application No. 62/209,333, (Continued)

(51) Int. Cl.
*H02K 1/16* (2006.01)
*H02K 1/27* (2006.01)
(Continued)

(52) U.S. Cl.
CPC ............. *H02K 1/20* (2013.01); *B25J 9/12* (2013.01); *H02K 1/02* (2013.01); *H02K 1/06* (2013.01);
(Continued)

(58) Field of Classification Search
CPC .... H02K 2213/03; H02K 1/27; H02K 1/2793; H02K 1/16
See application file for complete search history.

(56) References Cited

U.S. PATENT DOCUMENTS 2,665,243 A 1/1954 Hain et al.
3,383,534 A 5/1968 Ebbs
(Continued)

FOREIGN PATENT DOCUMENTS

CA 2 187 096 A1 10/1995
CN 203827088 U 9/2014
(Continued)

OTHER PUBLICATIONS

Hendershot, Recent Advances in Electric Machine Design and Operation, IEEE Miami Section Energy Systems Research Laboratory, Florida International University, Mar. 22, 3013, 41 pages.
(Continued)

*Primary Examiner* — Burton Mullins
(74) *Attorney, Agent, or Firm* — Eric L. Sophir; Dentons US LLP

(57) ABSTRACT

An electric machine comprise a first carrier having an array of electromagnetic elements and a second carrier having electromagnetic elements defining magnetic poles, the second carrier being arranged to move relative to the first carrier. An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height that provides a benefit in terms of force or torque per weight per excitation level.

28 Claims, 95 Drawing Sheets

Related U.S. Application Data filed on Aug. 24, 2015, provisional application No. 62/292,860, filed on Feb. 8, 2016, provisional application No. 62/322,217, filed on Apr. 13, 2016, provisional application No. 62/363,202, filed on Jul. 15, 2016.

(51) Int. Cl.

| | | |
|---|---|---|
| *H02K 1/20* | (2006.01) | |
| *H02K 16/04* | (2006.01) | |
| *H02K 5/16* | (2006.01) | |
| *H02K 1/14* | (2006.01) | |
| *B25J 9/12* | (2006.01) | |
| *H02K 1/02* | (2006.01) | |
| *H02K 1/06* | (2006.01) | |
| *H02K 3/04* | (2006.01) | |
| *H02K 5/04* | (2006.01) | |
| *H02K 9/00* | (2006.01) | |
| *H02K 21/24* | (2006.01) | |
| *H02K 15/04* | (2006.01) | |
| *H02K 7/08* | (2006.01) | |
| *H02K 9/02* | (2006.01) | |
| *H02K 3/12* | (2006.01) | |
| *H02K 41/03* | (2006.01) | |

(52) U.S. Cl.
CPC ............. *H02K 1/14* (2013.01); *H02K 1/16* (2013.01); *H02K 1/274* (2013.01); *H02K 1/2793* (2013.01); *H02K 3/04* (2013.01); *H02K 3/12* (2013.01); *H02K 5/04* (2013.01); *H02K 5/16* (2013.01); *H02K 7/08* (2013.01); *H02K 9/005* (2013.01); *H02K 9/02* (2013.01); *H02K 15/04* (2013.01); *H02K 16/04* (2013.01); *H02K 21/24* (2013.01); *H02K 41/031* (2013.01); *H02K 2213/03* (2013.01)

(56) References Cited

U.S. PATENT DOCUMENTS

| | | | |
|---|---|---|---|
| 4,245,870 A | 1/1981 | Punshon et al. | |
| 4,310,390 A | 1/1982 | Bradley et al. | |
| 4,319,152 A | 3/1982 | van Gils | |
| 4,398,112 A | 8/1983 | van Gils | |
| 4,501,980 A | 2/1985 | Welburn | |
| 4,568,862 A | 2/1986 | Tassinario | |
| 4,716,327 A | 12/1987 | Stone | |
| 5,004,944 A | 4/1991 | Fisher | |
| 5,010,267 A | 4/1991 | Lipo et al. | |
| 5,010,268 A | 4/1991 | Dijken | |
| 5,091,609 A | 2/1992 | Sawada et al. | |
| 5,128,575 A | 7/1992 | Heidelberg et al. | |
| 5,144,183 A | 9/1992 | Farrenkopf | |
| 5,212,419 A | 5/1993 | Fisher et al. | |
| 5,252,880 A | 10/1993 | Kazmierczak et al. | |
| 5,334,899 A | 8/1994 | Skybyk | |
| 5,616,977 A | 4/1997 | Hill | |
| 5,625,241 A | 4/1997 | Ewing et al. | |
| 5,642,009 A * | 6/1997 | McCleer | H02K 21/12 310/156.35 |
| 5,642,013 A | 6/1997 | Wavre | |
| 5,646,467 A | 7/1997 | Floresta et al. | |
| 5,744,888 A | 4/1998 | Zajc et al. | |
| 5,834,864 A | 11/1998 | Hesterman et al. | |
| 5,942,830 A | 8/1999 | Hill | |
| 5,955,808 A | 9/1999 | Hill | |
| 5,982,074 A | 11/1999 | Smith et al. | |
| 6,006,792 A | 12/1999 | Krumm et al. | |
| 6,081,059 A | 6/2000 | Hsu | |
| 6,239,516 B1 | 5/2001 | Floresta et al. | |
| 6,242,831 B1 | 6/2001 | Khan | |
| 6,261,437 B1 | 7/2001 | Hernnaes et al. | |
| 6,313,556 B1 | 11/2001 | Dombrovski et al. | |
| 6,348,751 B1 | 2/2002 | Jermakian et al. | |
| 6,376,961 B2 | 4/2002 | Murakami et al. | |
| 6,417,587 B1 | 7/2002 | Komatsu et al. | |
| 6,664,704 B2 | 12/2003 | Calley | |
| 6,833,647 B2 | 12/2004 | Saint-Michel et al. | |
| 6,933,643 B1 | 8/2005 | Heine et al. | |
| 6,936,948 B2 | 8/2005 | Bell et al. | |
| 6,975,057 B2 | 12/2005 | Gauthier et al. | |
| 6,995,494 B2 | 2/2006 | Haugan et al. | |
| 7,109,625 B1 | 9/2006 | Jore et al. | |
| 7,141,905 B2 | 11/2006 | Vollmer | |
| 7,190,101 B2 * | 3/2007 | Hirzel | H02K 3/12 310/180 |
| 7,215,056 B2 | 5/2007 | Dressel | |
| 7,385,329 B2 | 6/2008 | Hill | |
| 7,425,772 B2 | 9/2008 | Novo Vidal | |
| 7,548,003 B2 | 6/2009 | Nickel-Jetter et al. | |
| 7,586,217 B1 | 9/2009 | Smith et al. | |
| 7,646,124 B2 | 1/2010 | Himmelmann et al. | |
| 7,675,213 B2 * | 3/2010 | Tenhunen | H02K 1/12 310/51 |
| 7,687,962 B2 | 3/2010 | Imai et al. | |
| 7,741,750 B1 | 6/2010 | Tang | |
| 7,800,471 B2 | 9/2010 | Fullerton et al. | |
| 7,816,822 B2 | 10/2010 | Nashiki | |
| 7,836,788 B2 | 11/2010 | Kamon et al. | |
| 7,851,965 B2 | 12/2010 | Calley et al. | |
| 7,868,508 B2 | 1/2011 | Calley et al. | |
| 7,868,721 B2 | 1/2011 | Fullerton et al. | |
| 7,898,123 B2 | 3/2011 | Usui | |
| 7,911,107 B2 | 3/2011 | Nashiki | |
| 7,923,886 B2 | 4/2011 | Calley et al. | |
| 7,965,011 B2 | 6/2011 | Liao | |
| 8,004,127 B2 | 8/2011 | Potter | |
| 8,053,944 B2 | 11/2011 | Calley et al. | |
| 8,084,879 B2 | 12/2011 | Stiesdal | |
| 8,179,126 B2 | 5/2012 | Li et al. | |
| 8,179,219 B2 | 5/2012 | Fullerton et al. | |
| 8,222,786 B2 | 7/2012 | Calley et al. | |
| 8,242,658 B2 | 8/2012 | Calley et al. | |
| 8,264,113 B2 | 9/2012 | Takemoto et al. | |
| 8,330,317 B2 | 12/2012 | Burch et al. | |
| 8,395,291 B2 | 3/2013 | Calley et al. | |
| 8,405,275 B2 | 3/2013 | Calley et al. | |
| 8,415,848 B2 | 4/2013 | Calley et al. | |
| 8,450,899 B2 | 5/2013 | Umeda et al. | |
| 8,487,497 B2 | 7/2013 | Taniguchi | |
| 8,497,615 B2 | 7/2013 | Kimura et al. | |
| 8,558,426 B2 | 10/2013 | Stiesdal | |
| 8,704,626 B2 | 4/2014 | Fullerton et al. | |
| 8,736,133 B1 | 5/2014 | Smith et al. | |
| 8,749,108 B2 | 6/2014 | Dyer et al. | |
| 8,760,023 B2 | 6/2014 | Calley et al. | |
| 8,836,196 B2 | 9/2014 | Calley et al. | |
| 8,847,454 B2 | 9/2014 | Saito et al. | |
| 8,854,171 B2 | 10/2014 | Janecek | |
| 8,916,999 B2 | 12/2014 | Imai et al. | |
| 8,946,960 B2 | 2/2015 | Camilleri et al. | |
| 8,952,590 B2 | 2/2015 | Calley et al. | |
| 8,987,968 B2 | 3/2015 | Morishita et al. | |
| 9,006,941 B2 | 4/2015 | Zhao | |
| 9,006,951 B2 | 4/2015 | Janecek et al. | |
| 9,054,566 B2 | 6/2015 | Woolmer | |
| 9,071,117 B2 | 6/2015 | Woolmer | |
| 9,111,673 B2 | 8/2015 | Fullerton et al. | |
| 9,126,332 B2 | 9/2015 | Caron L'Ecuyer et al. | |
| 9,154,024 B2 | 10/2015 | Jore et al. | |
| 9,178,399 B2 | 11/2015 | Parviainen | |
| 9,281,735 B2 * | 3/2016 | Gandhi | H02K 41/033 |
| 2003/0111926 A1 | 6/2003 | Decristofaro et al. | |
| 2005/0140227 A1 | 6/2005 | Kuwert | |
| 2006/0238053 A1 | 10/2006 | Kascak et al. | |
| 2007/0278865 A1 | 12/2007 | Matscheko | |
| 2008/0001488 A1 | 1/2008 | Pyrhonen et al. | |
| 2008/0214347 A1 | 9/2008 | Scharfenberg et al. | |
| 2010/0164313 A1 | 7/2010 | Langford et al. | |
| 2010/0183460 A1 | 7/2010 | Qin et al. | |
| 2011/0025146 A1 | 2/2011 | Goodzeit et al. | |

(56) References Cited

U.S. PATENT DOCUMENTS

| | | |
|---|---|---|
| 2011/0033321 A1 | 2/2011 | Mikkelsen et al. |
| 2011/0109099 A1 | 5/2011 | Stiesdal |
| 2011/0285141 A1 | 11/2011 | Groendahl et al. |
| 2011/0309699 A1 | 12/2011 | Woolmer et al. |
| 2012/0001018 A1 | 1/2012 | Gilleran et al. |
| 2012/0267967 A1 | 10/2012 | Trago et al. |
| 2012/0279338 A1 | 11/2012 | Ihrke et al. |
| 2013/0113320 A1 | 5/2013 | Calley et al. |
| 2013/0140920 A1 | 6/2013 | Wei et al. |
| 2013/0147291 A1 | 6/2013 | Woolmer et al. |
| 2013/0187492 A1 | 7/2013 | Woolmer |
| 2013/0249330 A1 | 9/2013 | King et al. |
| 2013/0249342 A1 | 9/2013 | Funk et al. |
| 2013/0342048 A1 | 12/2013 | Hogmark |
| 2014/0035417 A1 | 2/2014 | Nadeau et al. |
| 2014/0054062 A1 | 2/2014 | Yoshida et al. |
| 2014/0197701 A1 | 7/2014 | Hossain et al. |
| 2014/0217944 A1 | 8/2014 | Yang |
| 2014/0299668 A1 | 10/2014 | Fullerton et al. |
| 2014/0333171 A1 | 11/2014 | Lange et al. |
| 2014/0346910 A1 | 11/2014 | Nakano et al. |
| 2015/0048712 A1 | 2/2015 | Janecek et al. |
| 2015/0091403 A1 | 4/2015 | Ueda |
| 2015/0229194 A1 | 8/2015 | Sromin |
| 2015/0244219 A1 | 8/2015 | Woolmer |
| 2015/0270760 A1 | 9/2015 | Kreidler et al. |
| 2015/0308438 A1 | 10/2015 | Janecek |
| 2015/0364956 A1 | 12/2015 | Woolmer et al. |
| 2016/0164394 A1 | 6/2016 | Knaian et al. |

FOREIGN PATENT DOCUMENTS

| | | |
|---|---|---|
| DE | 3320805 A1 | 12/1984 |
| DE | 19954196 A1 | 6/2000 |
| EP | 1920523 A1 | 5/2008 |
| EP | 2765633 A1 | 8/2014 |
| EP | 2 773 023 A1 | 9/2014 |
| EP | 2873551 A2 | 5/2015 |
| EP | 2873601 A1 | 5/2015 |
| EP | 2874277 A2 | 5/2015 |
| EP | 2929763 A1 | 10/2015 |
| EP | 2935754 A1 | 10/2015 |
| JP | 2008113531 A | 5/2008 |
| LV | 14007 B | 11/2009 |
| WO | 88/06375 | 8/1988 |
| WO | 92/10024 A1 | 6/1992 |
| WO | 03/073591 A1 | 4/2003 |
| WO | 2007026047 A1 | 3/2007 |
| WO | 2008135628 A1 | 11/2008 |
| WO | 2012101327 A1 | 8/2012 |
| WO | 2012142230 A2 | 10/2012 |
| WO | 2013/002658 A2 | 1/2013 |
| WO | 2014090516 A1 | 6/2014 |
| WO | 2014100255 A1 | 6/2014 |
| WO | 2014205523 A2 | 12/2014 |
| WO | 2015/019107 A2 | 2/2015 |
| WO | 2015/036779 A2 | 3/2015 |
| WO | 2015/036780 A2 | 3/2015 |
| WO | 2015032704 A1 | 3/2015 |
| WO | 2015032705 A1 | 3/2015 |
| WO | 2015032707 A1 | 3/2015 |
| WO | 2015032708 A2 | 3/2015 |
| WO | 2015032709 A1 | 3/2015 |
| WO | 2015055265 A2 | 4/2015 |
| WO | 2015070938 A1 | 5/2015 |
| WO | 2015070978 A1 | 5/2015 |
| WO | 2015070984 A1 | 5/2015 |
| WO | 2015071012 A1 | 5/2015 |
| WO | 2015071088 A1 | 5/2015 |
| WO | 2015071096 A1 | 5/2015 |
| WO | 2015071121 A1 | 5/2015 |
| WO | 2015071127 A1 | 5/2015 |
| WO | 2015071144 A1 | 5/2015 |
| WO | 2015071186 A1 | 5/2015 |
| WO | 2015071340 A1 | 5/2015 |
| WO | 2015071400 A1 | 5/2015 |
| WO | 2015071468 A2 | 5/2015 |
| WO | 2015071469 A2 | 5/2015 |
| WO | 2015071470 A1 | 5/2015 |
| WO | 2015071576 A1 | 5/2015 |
| WO | 2015072173 A1 | 5/2015 |
| WO | 2015072299 A1 | 5/2015 |
| WO | 2015/089518 A1 | 6/2015 |
| WO | 2015/124922 A1 | 8/2015 |
| WO | 2016203101 A1 | 12/2016 |

OTHER PUBLICATIONS

Angular Contact Ball Bearings, The Timken Company (http://www.timken.com), Jan. 9, 2017, 4 pages.

Axial Flux Motor Design with MagNet 2D/3D, Infolytica Corporation, www.infolytica.com/en/applications/ex0072/ . . . , (accessed Jan. 16, 2017), 2 pages.

Electrical Motor Cogging Explained—What is Meant by Cogging and Why it . . . . , Bright Hub Engineering (http://www.brighthubengineering.com/commercial-electrical-applications . . . ), (accessed Feb. 27, 2016), 5 pages.

Notification of Transmittal of the International Search Report and the Written Opinion of the International Searching Authority in PCT/CA2016/050947, mailed Jan. 12, 2017, 13 pages.

E.A. Yahaya, Single Layer Winding of Three Phase Induction Motor, The International Journal of Engineering and Science (IJES), vol. 2, Issue 4, date of publication May 5, 2013, pp. 8-13, www.theijes.com.

Boglietti et al., Evolution and Modern Approaches for Thermal Analysis of Electrical Machines, IEEE Transactions on Industrial Electronics, vol. 56, No. 3, Mar. 2009, pp. 871-882.

Capponi et al., Recent Advances in Axial-Flux Permanent-Magnet Machine Technology, IEE Transactions on Industry Applications, vol. 48, No. 6, Nov.-Dec. 2012, pp. 2190-2205.

Cavagnino et al., A Comparison Between the Axial Flux and the Radial Flux Structures for PM Synchronous Motors, Dipartimento di Ingegneria Elettrica Industriale, 2001 IEEE, pp. 1611-1618.

Elon Musk: Cooling, not power-to-weight ratio, is the challenge with AC induction motors, Charged Electric Vehicles Magazine, (https://chargedevs.com/newswire/elon-musk-cooling-not-power-to-weigh . . . ), posted Nov. 4, 2014, pp. 1-9.

Chau, Electric Vehicle Machines and Drives: Design, Analysis and Application, 2015 Extracts, Wiley Kindle Edition (May 26, 2015), 9 pages.

Di Gerlando et al., Axial Flux PM Machines With Concentrated Armature Windings: Design Analysis and Test Validation of Wind Energy Generators, IEEE Transactions on Industrial Electronics, vol. 58, No. 9, Sep. 2011, pp. 3795-3805.

Transverse Flux Electric Motor, http//www.danielfourie.net/motor.html, Nov. 7, 2016, 2 pages.

Alan Jack, Advances in Electric Machines: Topology, Materials and Construction, University of Newcastle upon Tyne, Newcastle Drives and Machines Group, ,2011, 52 pages.

Jungreuthmayer et al., A Detailed Heat and Fluid Flow Analysis of an Internal Permanent Magnet Synchronous Machine by Means of Computational Fluid Dynamics, IEEE Transactions on Industrial Electronics, vol. 59, No. 12, Dec. 2012, pp. 4568-4578.

Lipo, Principles of Design, "Choice of Electric Loading", Date not available at this time, pp. 328-329.

Lipo, Principles of Design, "Practicle Considerations Concerning Stator Construction", Date not available at this time, pp. 330-331.

Lipo, Principles of Design, "Practicle Considerations Concerning Stator Construction", Date not available at this time, pp. 334-335.

Cugat et al., Magnetic Micro-Actuators and Systems (MAGMAS), IEEE Transactions of Magnetics, vol. 39, No. 5, Nov. 2003, pp. 3607-3612.

Mahmoudi et al., A Comparison Between the TORUS and AFIR Axial-Flux Permanent-Magnet Machine Using Finite Element Analysis, 2011 IEEE International Electric Machines & Drives Conference (EMDC), pp. 252-247.

Marignetti et al., Design of Axial Flux PM Synchronous Machines Through 3-D Coupled Electromagnetic Thermal and Fluid-Dynami-

(56) References Cited

OTHER PUBLICATIONS cal Finite-Element Analysis, IEEE Transactions on Industrial Electronics, vol. 55, No. 10, Oct. 2008, pp. 3591-3601.
Parviainen, Design of Axial-Flux Permanent-Magnet Low-Speed Machines and Performance Comparison Between Radial-Flux and Axial-Flux Machines, Lappeenranta University of Technology, Lappeenranta, Finland, Apr. 19, 2005, 155 pages.
Gieras 2008 Axial Flux Brushless PM Machines 2nd ed, p. 183.
Hennebeger et al., Development of a New Transverse Flux Motor, 1997, The Institution of Electrical Engineers, IEEE, Savoy Place, London WC2R 0BL, UK, pp. 1-6.
Cheng et al., Advanced Electrical Machines and Machine-Based Systems for Electric and Hybrid Vehicles, Energies 2015, 8, pp. 9541-9564; doi: 10.3390/en8099541.
Myser, A New Type of Motor Made From Gadget Guts, Popular Science, http://www.popsci.com/gadgets/article/2013-06/gardening-circuit, posted Jun. 27, 2013, 3 pages.
Core Outdoor Power, http://coreoutdoorpower.com/technology, 2015, 3 pages.
Custom Coil Manufacturing, http://ccoils.com/Custome-coil-manufacturing.html, 2015, 3 pages.
Del Toro, Basic Electric Machines, Basic Magnetic Theory and Circuits, Electric Machines, Date is not available at this time, 15 pages.
Oleksandr, Study on Permanent Magnet Transverse Flux Machine, A Dissertation Submitted to the Graduate Facility of the Louisiana State University and Agricultural and Mechanical College, May 2012, 149 pages.
Chau, Electric Vehicle Machines and Drives: Design, Analysis and Application, htps://books.google.ca/books?id=O3FXCQAAQBAJ &pg=PA101&1pg . . . , 2015 Extracts, 6 pages.
Manual for EMRAX motors, Owner's manual for the brushless AC synchronous motor EMRAX, ENSTROJ Electric Motor Innovation, www.enstroj.si, Dec. 2014, pp. 1-36.
Key Technology Attributes, http://etmpower.com/technology/, 2016, 3 pages.
Maxon DC Motor, Permanent Magnet DC Motor with Coreless Winding, Maxon Academy, 2010 Maxon Motor AG, Sachseln, Switzerland, www.maxonmotor.com/academy, 34 pages.
Maxon Motor Data and Operating Ranges, How to Interpret the Data of Maxon Motors?, Maxon Academy, 2010, Maxon Motor AG, Sachsein, Switzerland, www.maxonmotor.com/academy, 29 pages.
Galea et al., Torque Density Improvements for High Performance Machines, IEEE, 2013, pp. 1066-1073.
Galea et al., High Performance, Direct Drive Machines for Aerospace Applications, The University of Nottingham, Department of Electrical and Electronic Engineering, Faculty of Engineering, Feb. 2013, 221 pages.
Galea et al., Development of an Aircraft Wheel Actuator for Green Taxiing, IEEE, 2014, pp. 2492-2498.
Gholamian et al., Selecting of Slotted AFPM Motors with High Torque Density for Electric Vehicles, International Journal of Scientific & Engineering Research vol. 2, Issue 6, Jun. 2011, pp. 1-7.
Gogue et al., Theory & Practice of Electromagnetic Design of DC Motors & Actuators, Chapter 7, Motor Design, http://www.consult-g2.com/course/chapter7/chapter.html, 2007, 24 pages.
Green Car Congress, DeltaWing Partners with DHX Electric Machines; Ultra High-Torque Motors for Automotive Applications, Green Car Congress, htp://www.greencarcongress.com/2016/01/20160126-dhx.html, Jan. 26, 2016, 4 pages.
Grundfos Motor Book, www.grundfos.com, 2004, 252 pages.
Hochberg et al., Evaporative Cooling of Actuators for Humanoid Robots, In Proceedings of 8th Workshop on Humanoid Soccer Roberts, 13th Annual IEEE-RAS International Conference on Humanoid Robots (Humanoids), Atlanta, Georgia, 2013, 6 pages.
Jung et al., Unique Axial Flux Motor Design Delivers Superior Torque Density, EET-2008 European Ele-Drive Conference International Advanced Mobility Forum, Geneva, Switzerland, Mar. 11-13, 2008, 6 pages.
Kastinger, Design of a Novel Transverse Flux Machine, Robert Bosch GmbH, Division: Body Electronics, Engineering Advanced Development, Date is not available at this time, 6 pages.
Libert, Design, Optimization and Comparison of Permanent Magnet Motors for a Low-Speed Direct-Driven Mixer, Royal Institute of Technology, Department of Electrical Engineering, Electrical Machines and Power Electronics, Stockholm, 2004, 142 pages.
Ultra-High-Speed Magnetic Bearings, Magnetic Bearings—Celeroton AG, http://www.celeroton.com/en/technology/magnetic-bearings.html (accessed Jul. 2, 2016), 3 pages.
Make Your Own Miniature Electric Hub Moor: Actually Winding the Motor; http://www.instructables.com/id/Make-Your-Own-Miniature-Electric) . . . (accessed Sep. 14, 2015), 6 pages.
High Speed DC Motor—Tips and Tricks, Australian Motor News Index—High Speed DC Motor—Tips and Tricks. http://www.maxonmotor.com.au/maxon/view/news/MEDIARELEASE_. . . . , Sep. 3, 2015, 1 page.
EC-i 40 Ø40 mm, brushless, 70 Watt, Apr. 2015, 1 page.
Maxon EC Motor—An Introduction to Brushless DC Motors, 2012, maxon ag, www.maxonmotor.com/academy, pp. 1-25.
Meier, Theoretical Design of Surface-Mounted Permanent Magnet Motors with Field-Weakening Capability, Permanent Magnet Drives, Kungl Tekniska Hogskolan, Royal Institute of Technology, Department of Electrical Engineering, Electrical Machines and Power Electronics, Stockholm, 2001/2002, 79 pages.
Miniature High-Torque, DC Servomotors and DC Gearmotors, Moog Components Group, www.moog.com/components, Date is not available a this time, pp. 188-192.
Trend Toward Multipole Brushless DC Motors Increases, Media Release, www.maxonmotor.com.au, Jun. 12, 2015, 3 pages.
Bernd Orlik, Transferse Flux Generators—Principle and Operation Behaviour presentation, Universitat Bremen, IALB, Date not available at this time, 20 pages.
Rebecca Desfosse, What Drives CORE's Quiet Gasless Motors, http://www.popularmechanics.com/home/reviews/a9052/what-drives-cores-quiet-gasless-motor, Jun. 5, 2013, 12 pages.
GN Series, Printed Motor Works Limited, Newman Lane, Alton, Hampshire GU34 2QW, UK, Date not available at this time, 3 pages.
Brushed Pancake Motors, http://printedmotorworks.com/brushed-pancake-motors/ . . . , accessed Feb. 2, 2016, 13 pages.
Introducing the JM1S Motor, JOBY Motors, http://www.jobymotors.com/public/views/pages/products.php . . . , accessed Jul. 2, 2016, 2 pages.
Roman Susnik, EMRAX Motors/Generators, http://www.enstroji.si/Electric-products/emrax-motorsgenerators.html, accessed Feb. 18, 2016, 2 pages.
Seo et al., A Study on Brushless DC Motor for High Torque Density, World Academy of Science, Engineering and Technology, International Journal of Mechanical, Aerospace, Industrial, Mechatronic and Manufacturing Engineering vol. 5, No. 10, 2011, pp. 2084-2088.
Höganäs, Compact, Light and Cost-Efficient Solutions, Somaloy® Technology, Oct. 2013, 3 pages.
Staton et al., Solving the More Difficult Aspects of Electric Motor Thermal Analysis, # Moor Design Ltd., 1 Eaton Court, Tetchill, Ellesmere, Shropshire, UK, SY12 9DA, 2013, 9 pages.
Tanaka et al., Study on a High Torque Density Motor for an Electric Traction Vehicle, Paper No. 2009-1-1337, SAE International, Journal Article, http://papers.sae.org/2009-1-1337/ . . . , 1 page.
Valavi et al., Effects of Loading and Slot Harmonic on Radial Magnetic Forces in Low-Speed Permanent Magnet Machine with Concentrated Windings, IEEE Transactions on Magnetics, vol. 51, No. 6, Jun. 2015, 10 pages.
Woolmer, Analysis of the Yokeless and Segmented Armature (YASA) Machine, Oxford University, Engineering Department, Parks Road, Oxford, UK OX1 3PJ, 2007, 7 pages.
Wrobel et al., Design Considerations of a Direct Drive Brushless Machine With Concentrated Windings, IEEE Transactions on Energy Conversion, vol. 23, No. 1, Mar. 2008, pp. 1-8.
Wu et al., A Low-Speed, High-Torque, Direct-Drive Permanent Magnet Generator for Wind Turbines, IEEE, 2000, pp. 147-154.

(56) References Cited

OTHER PUBLICATIONS

Yang et al., Optimal Design and Control of a Torque Motor for Machine Tools, J. Electromagnetic Analysis & Applications, 2009, 1: 220-228.

YASA Motors, YASA-750 Axial Flux Electric Motor, YASA Moors Limited, 154H Abingdon, OX14 4SD UK, ID:22735 Rev 4, Jan. 2016, 2 pages.

Image from Chicago Trade Center (Oct. 6, 2015), Laser Technologies, Inc., 1 page.

Belamine et al., Design of an Axial-Flux Interior Permanent-Magnet Synchronous Motor for Automotive Application: Performance Comparison with Electric Motors Used in EVs and HEVs, IEEE, 2014, 6 pages.

Choi et al., Design and Parametric Analysis of Axial Flux PM Motors with Minimized Cogging Torque, IEEE Transactions on Magnetics, vol. 45, No. 6, Jun. 2009, pp. 2855-2858.

Paulides et al., Eddy-Current Losses in Laminated and Solid Steel Stator Back Iron in a Small Rotary Brushless Permanent-Magnet Actuator, IEEE Transactions on Magnetics, vol. 44, No. 11, Nov. 2008, pp. 4373-4376.

Iron Loss Separation in High-Torque BLDC Motors, Infolytica Corporation, http://www.infolyica.com/en/applications/ex0156/, retrieved Oct. 27, 2015, 2 pages.

Yang, FEA Estimation and Experimental Validation of Solid Rotor and Magnet Eddy Current Loss in Single-Sided Axial Flux Permanent Magnet Machines, Electrical Engineering Theses and Dissertations, Department of Electrical Engineering, Digital Commons@University of Nebraska—Lincoln, Dec. 2013, 98 pages.

Axial Flux Technology, AXCO Motors, http://www.axcomotors.com/axial-flux_technology.html, retrieved Feb. 22, 2017, 5 pages.

Nick Bannon et al., Axial Flux Permanent Magnet Generator, ME 495, University of Washington, 2013, 24 pages.

Gieras et al., "Axial Flux Permanent Magnet Brushless Machines, 2nd ed.", 2008, pp. 34 and 123, and diagram on p. 7.

Yang, "FEA Estimation and Experimental Validation of Solid Rotor and Magnet Eddy Current Loss in Single-Sided AFPM Machines", PhD Thesis, University of Nebraska, (from p. 49-50), 1 page.

Yang et al., "FEA Estimation and Experimental Validation of Solid Rotor and Magnet Eddy Current Loss in Single-sided Axial Flux Permanent Magnet Machines", Faculty Publications from the Department of Electrical and Computer Engineering, University of Nebraska—Lincoln, Energy Conversion Congress and Exposition (ECCE), IEEE 2013, pp. 3202-3209.

Robot Arm Mover 4 User Guide, © Commonplace Robotics GmbH, Nov. 2012, 32 pages.

\* cited by examiner

Fig. 38
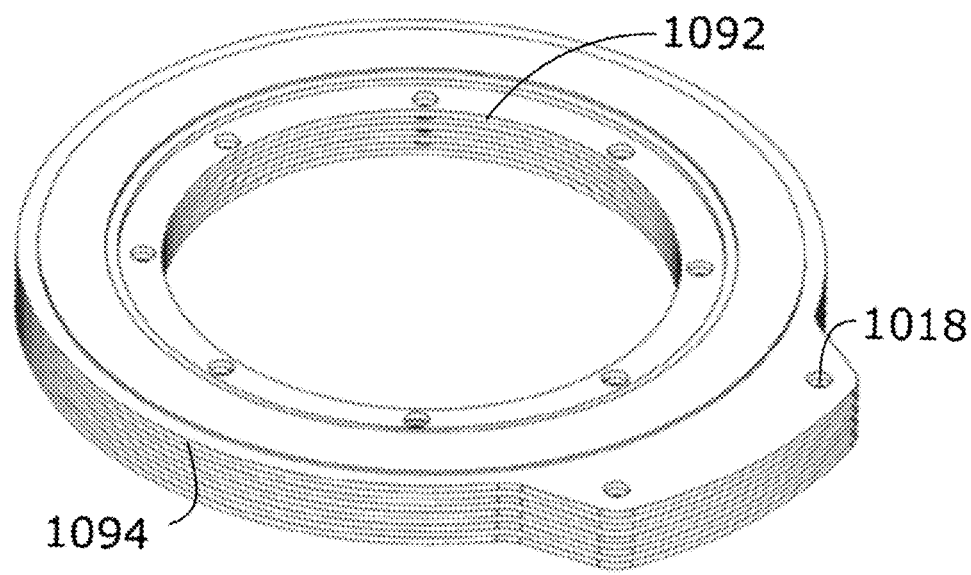
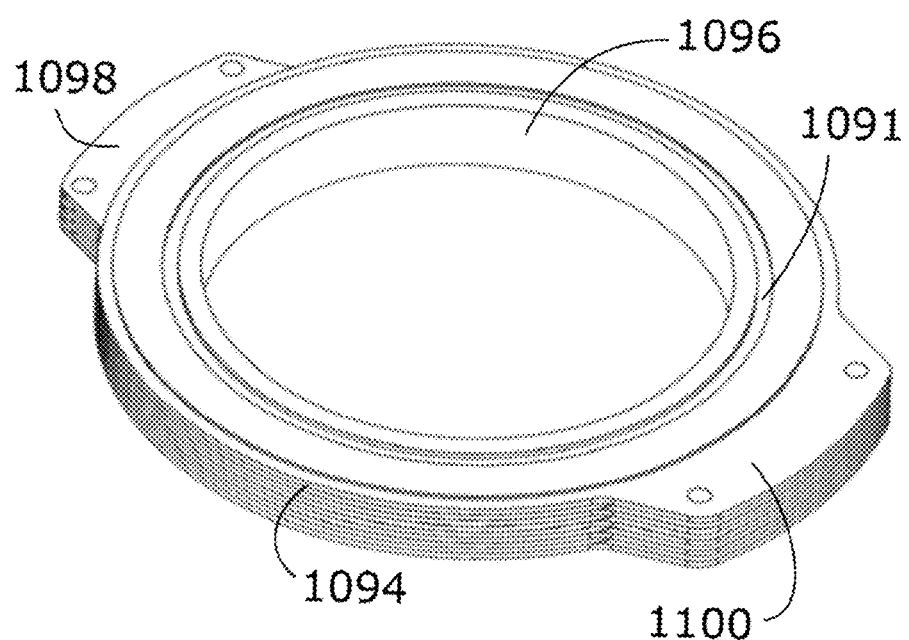
Fig. 39

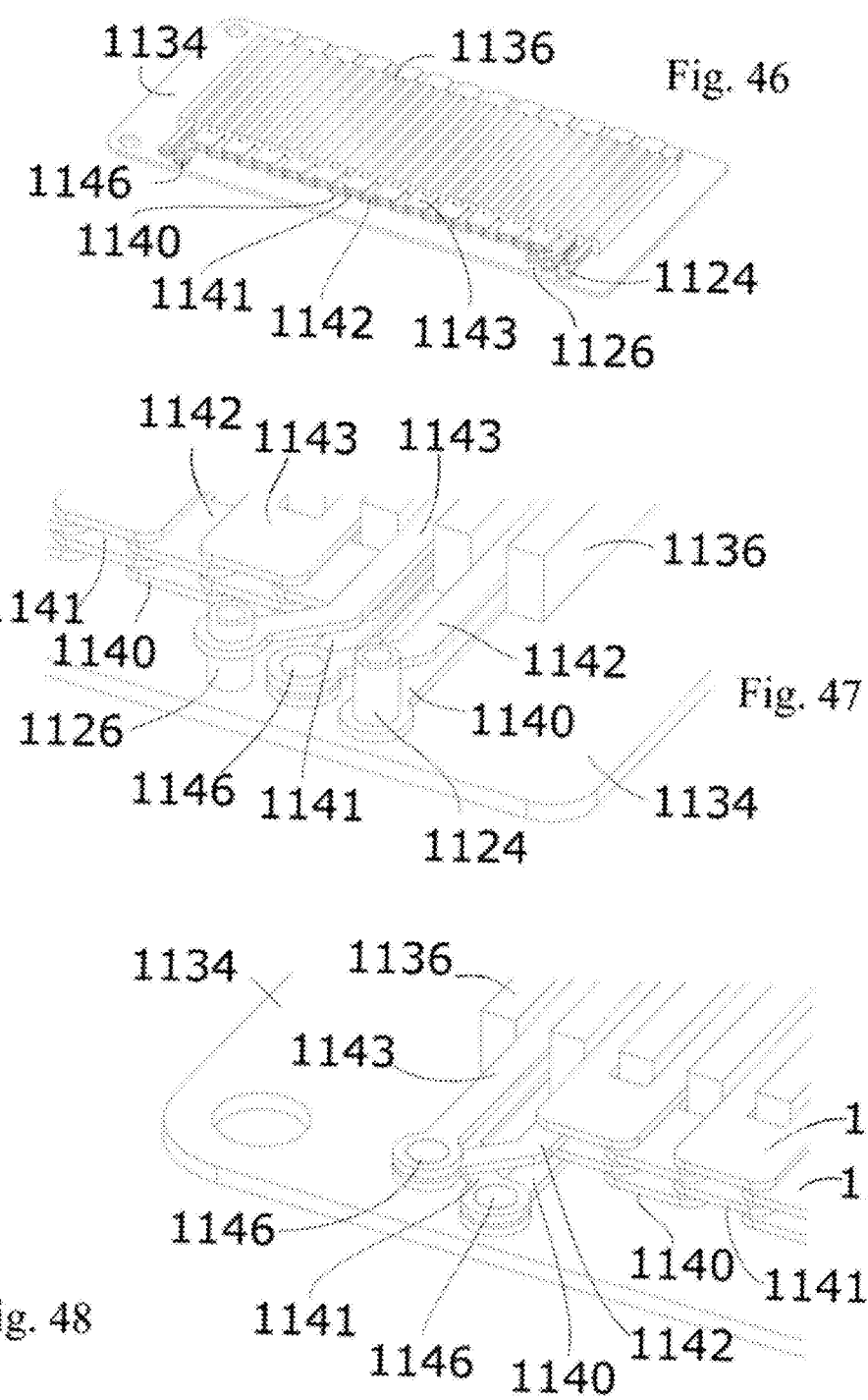

Fig. 56
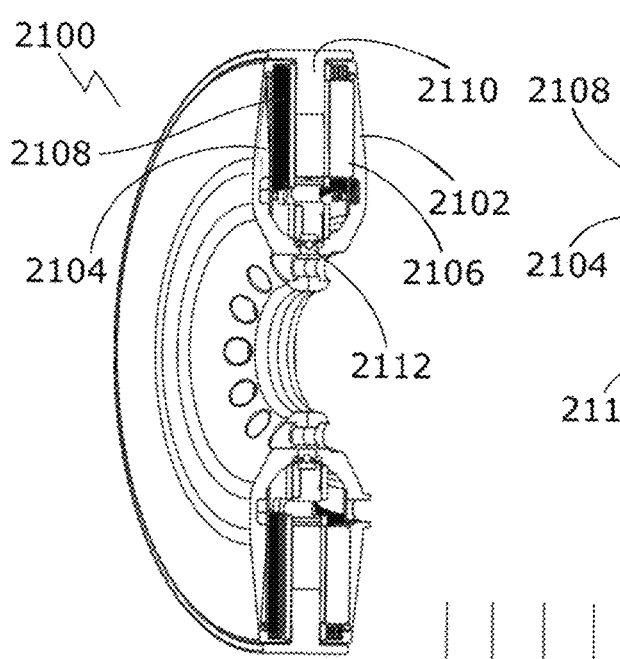
Fig. 57
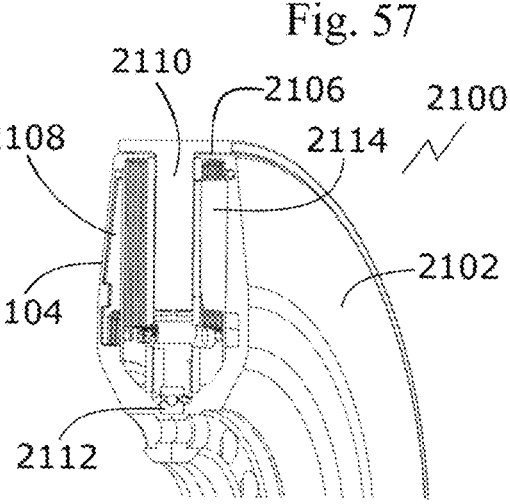
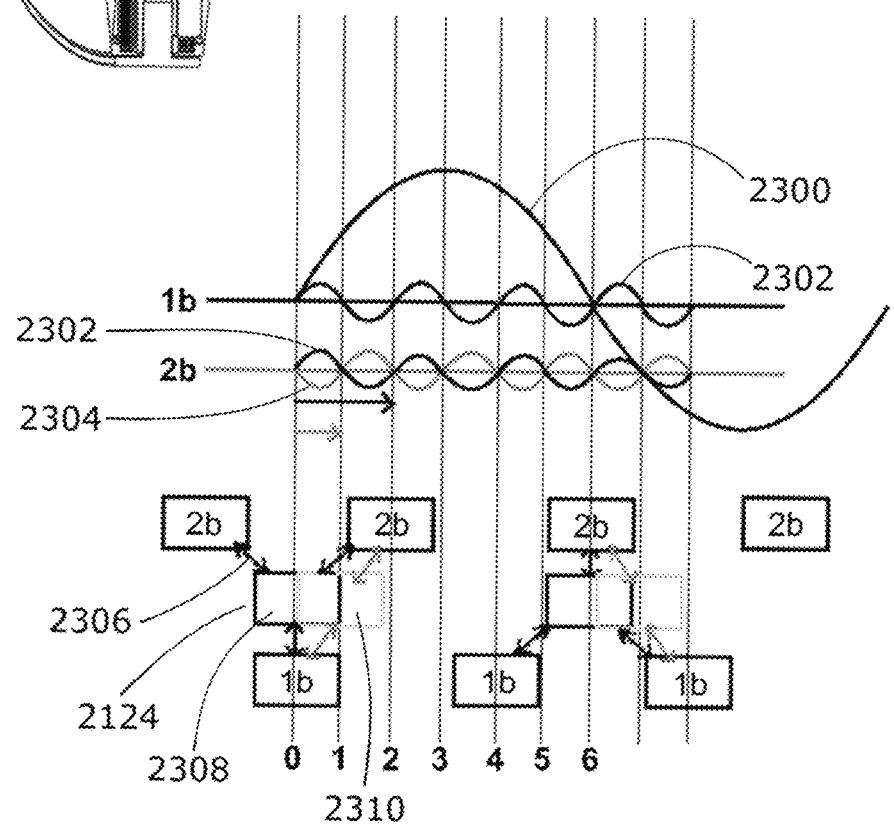
Fig. 58

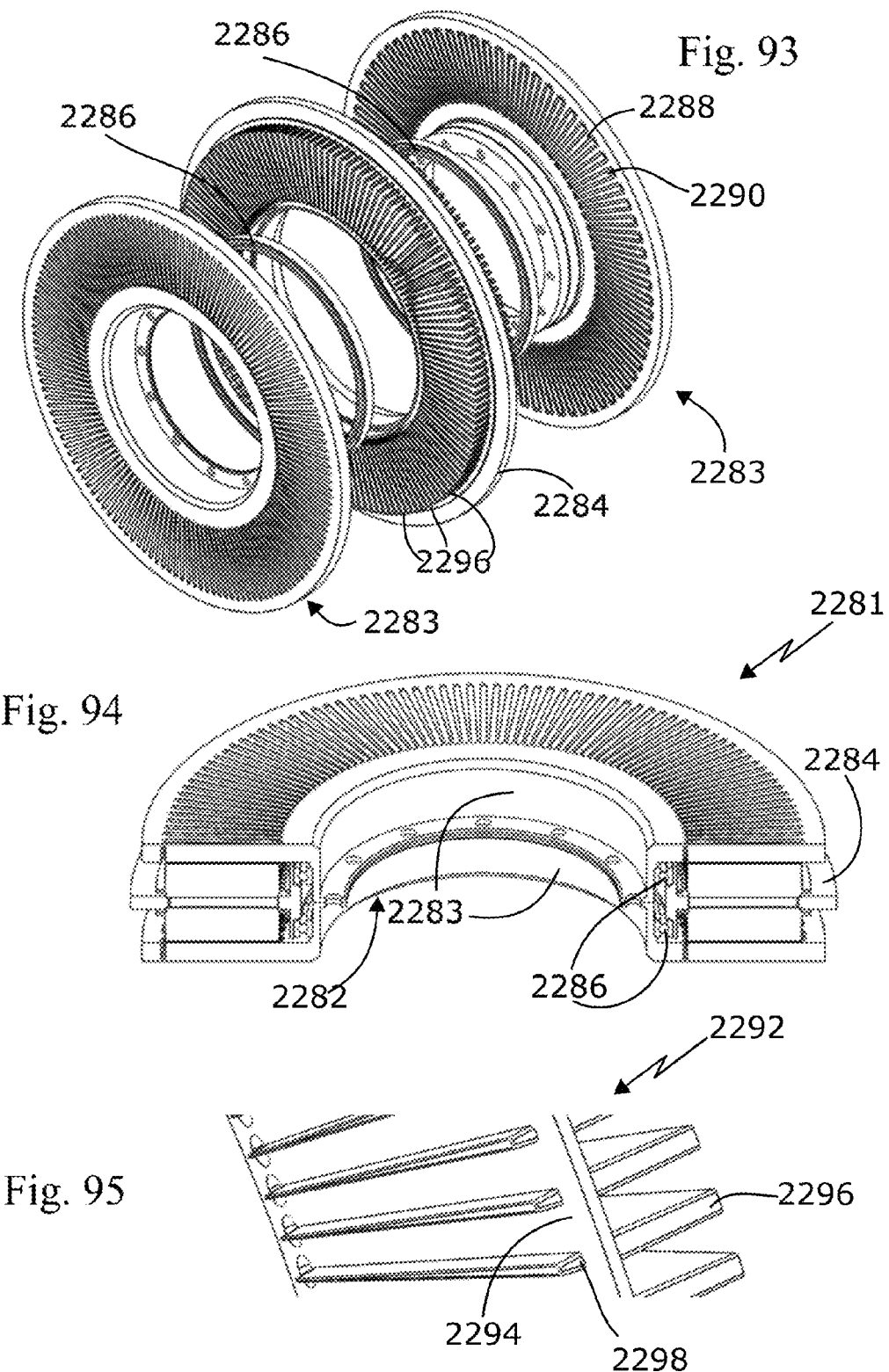

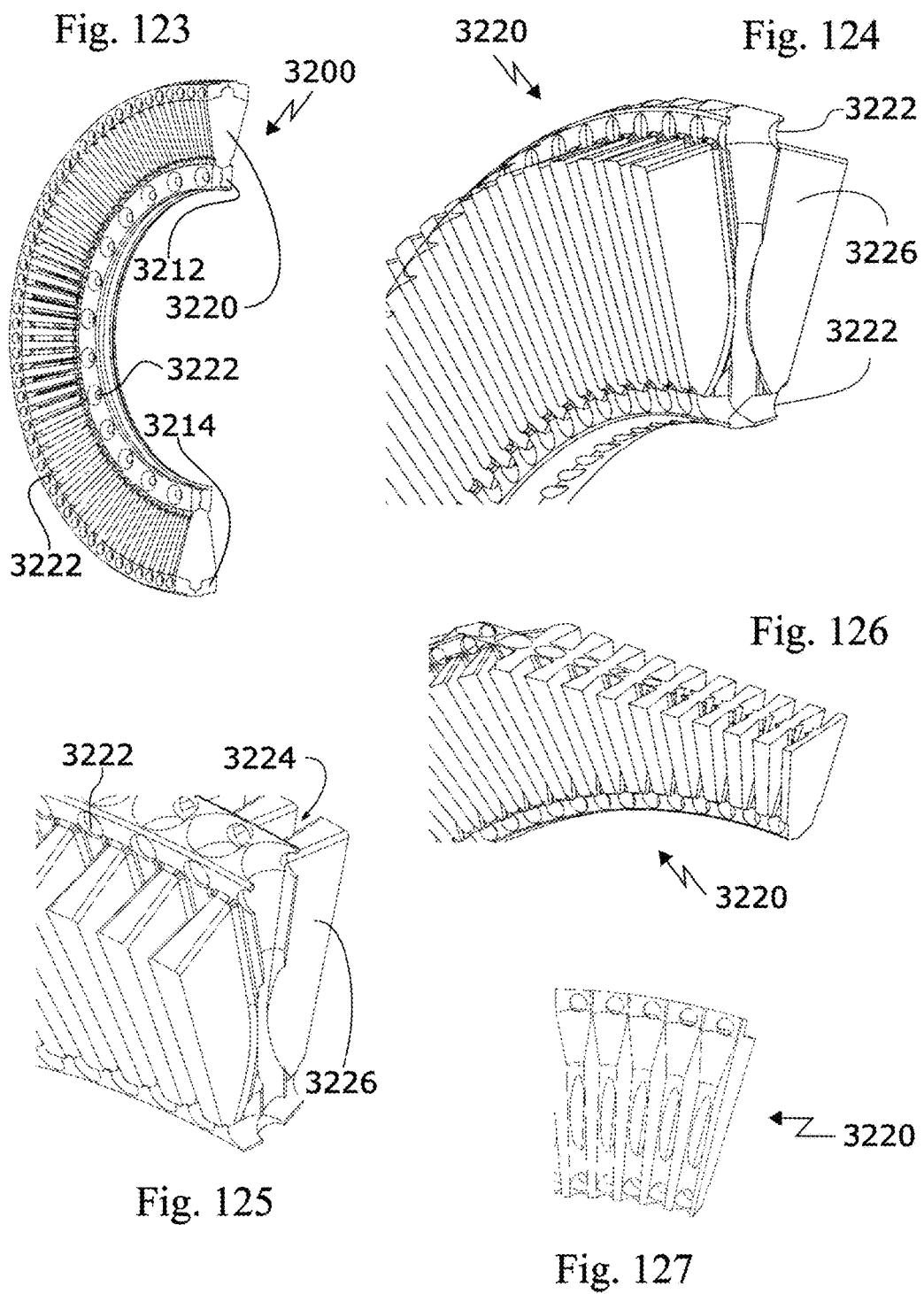

Fig. 136
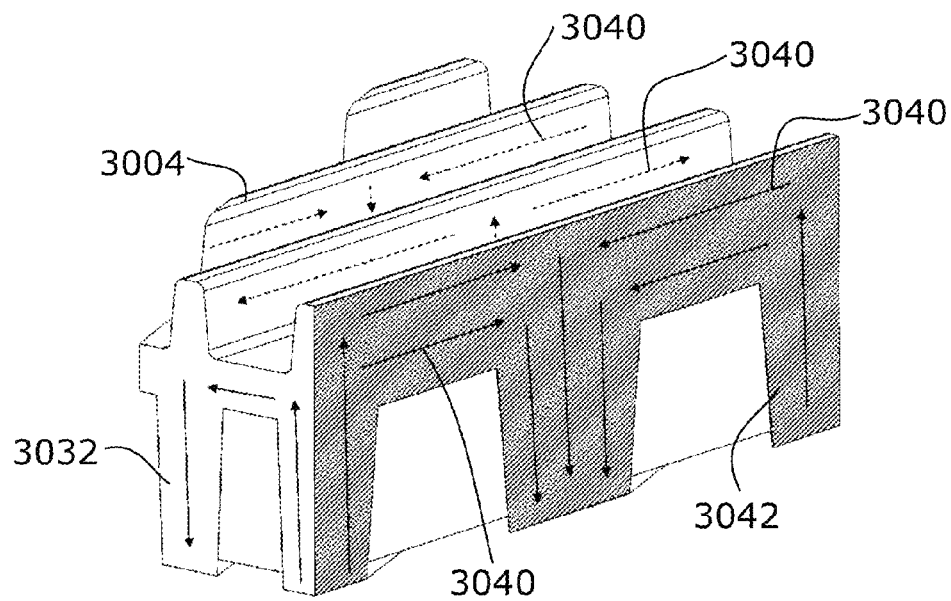
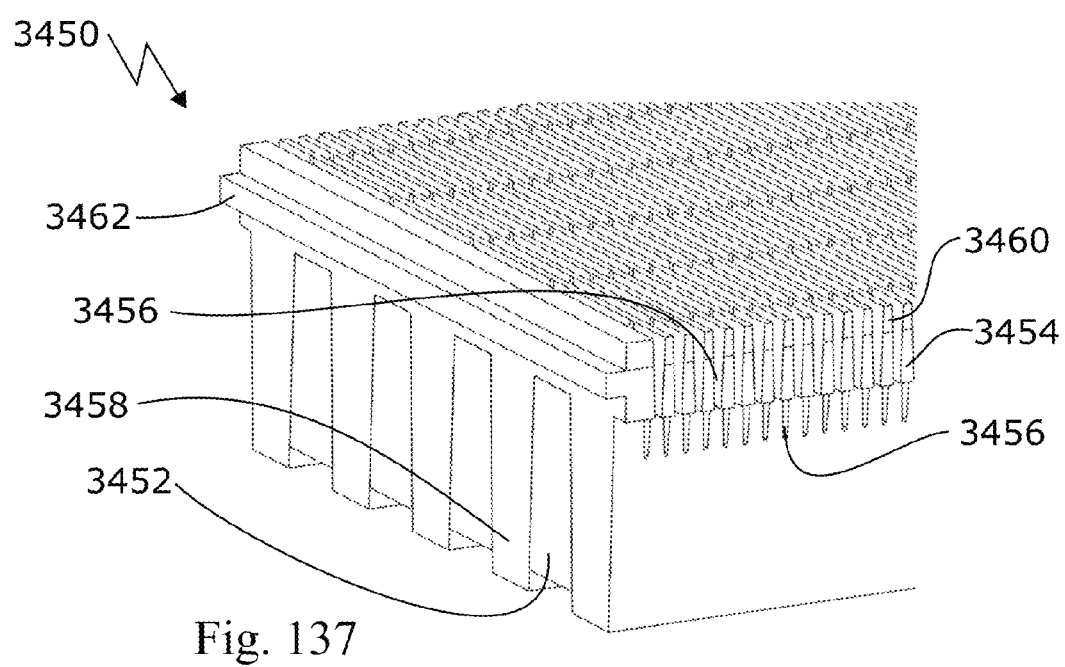
Fig. 137

Fig. 138
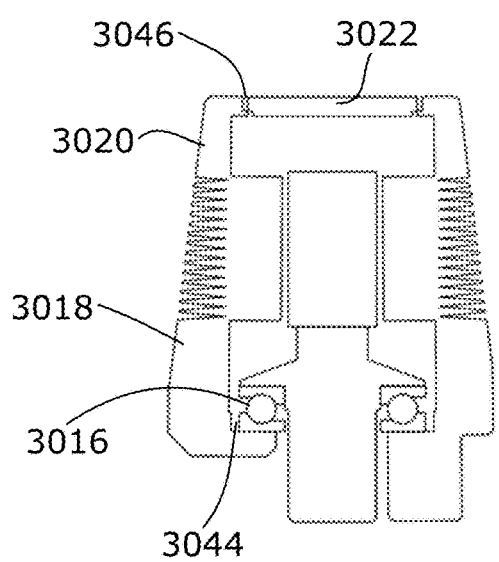
Fig. 139
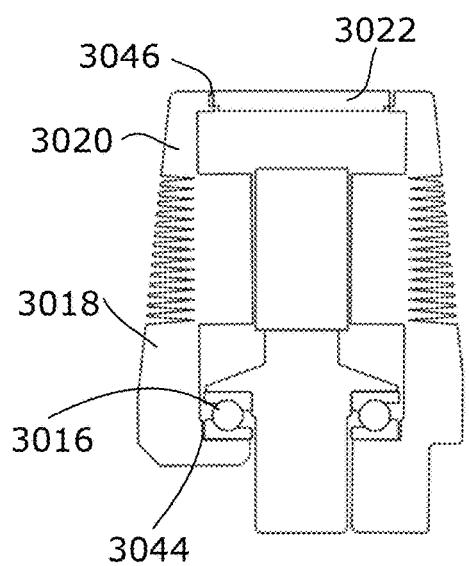
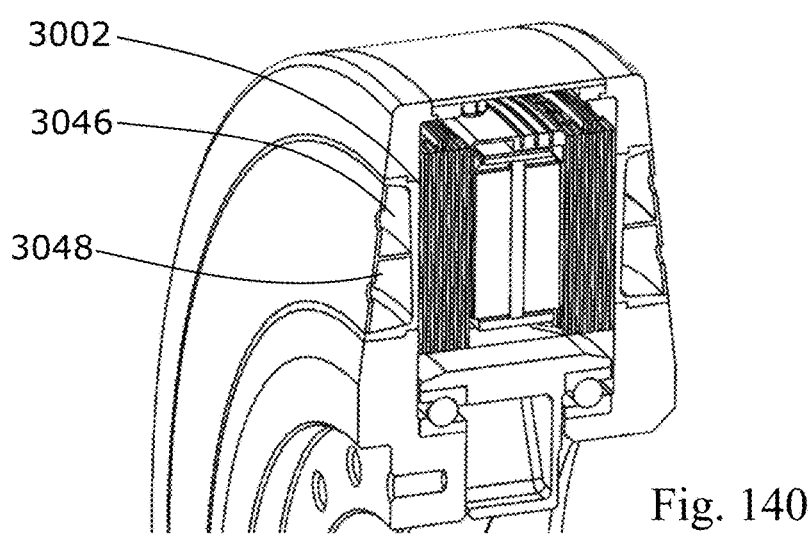
Fig. 140

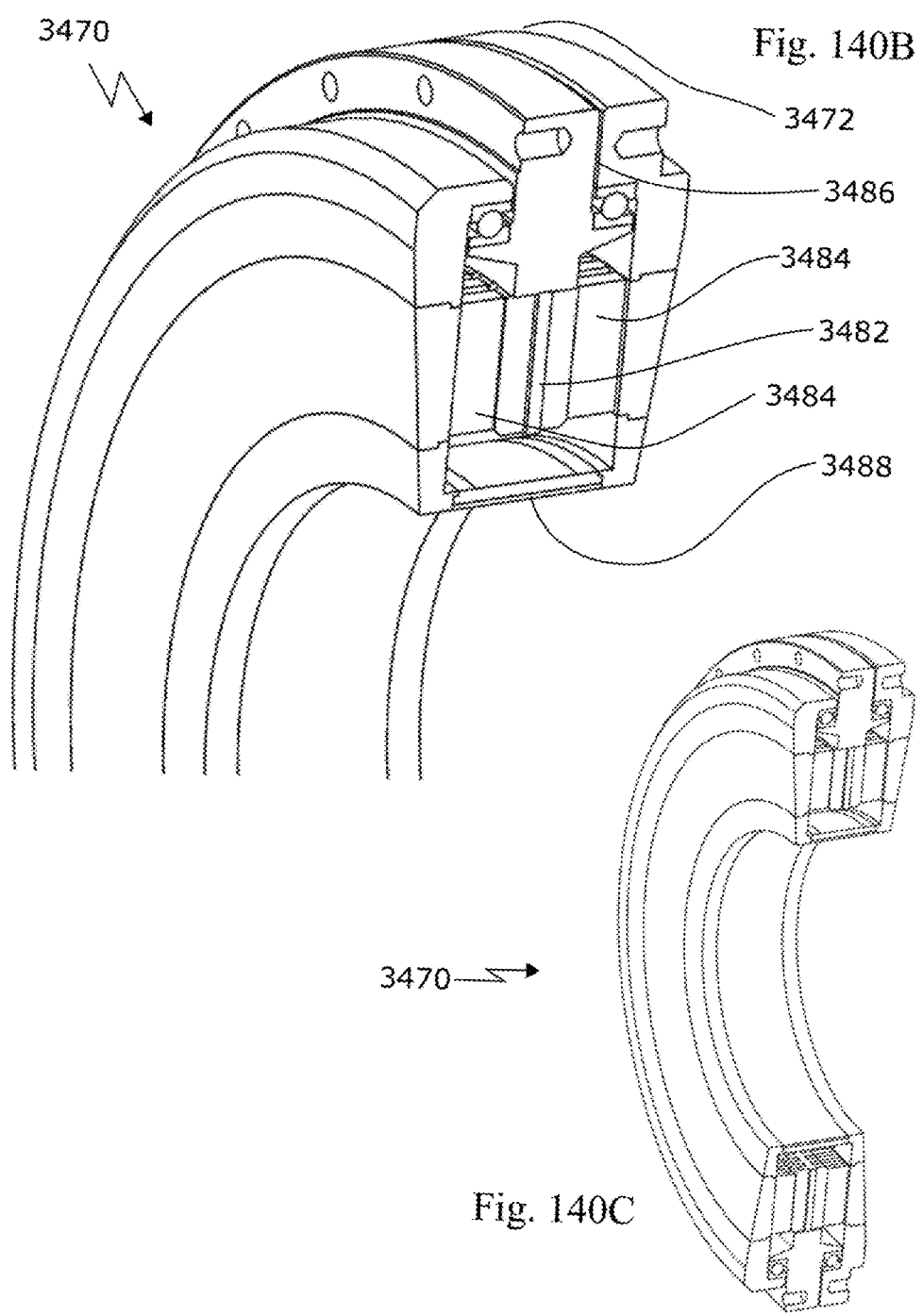

Fig. 144
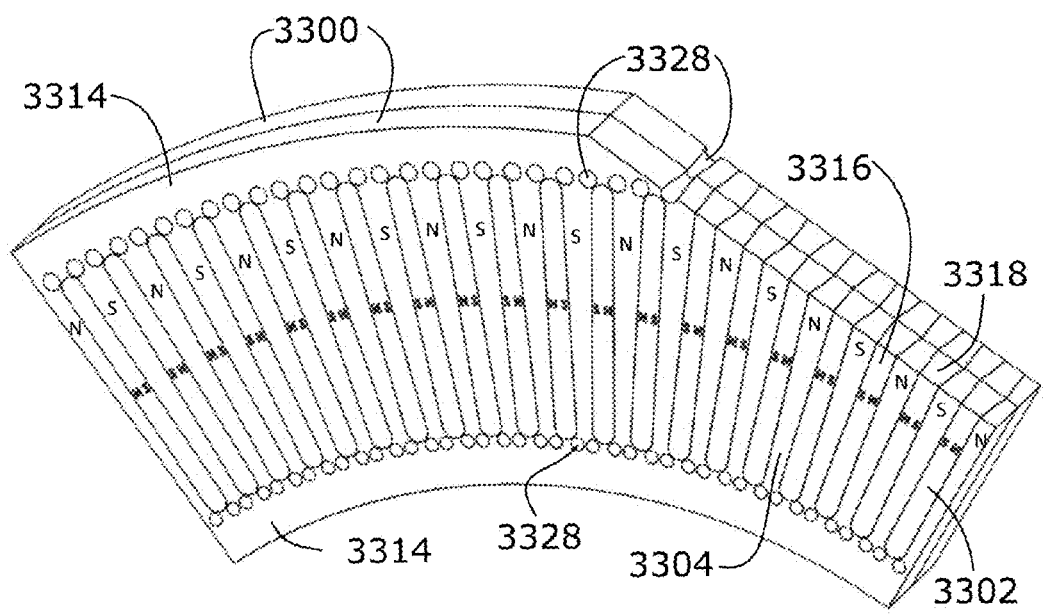
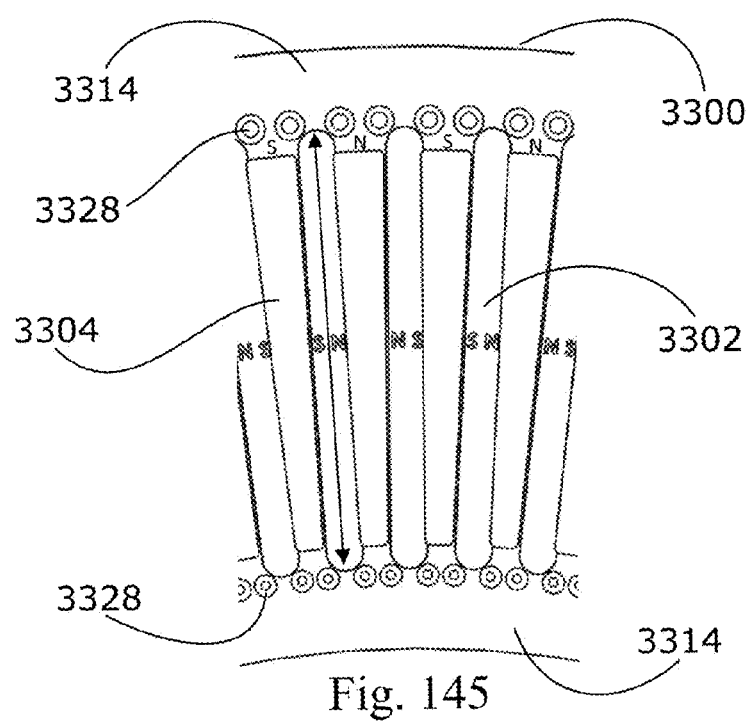
Fig. 145

ELECTRIC MACHINE

CROSS REFERENCE TO RELATED APPLICATIONS

This application is a non-provisional application that claims priority to U.S. Provisional Patent Application No. 62/203,903, entitled "High Power Density Electromagnetic Machine," filed Aug. 11, 2015; U.S. Provisional Patent Application No. 62/209,333, entitled "High Power Density Electromagnetic Machine," filed Aug. 24, 2015; U.S. Provisional Patent Application No. 62/292,860, entitled "High Power Density Electromagnetic Machine," filed Feb. 8, 2016; U.S. Provisional Patent Application No. 62/322,217, entitled "Electric Machine," filed Apr. 13, 2016; and U.S. Provisional Patent Application No. 62/363,202, entitled "Electric Machine," filed Jul. 15, 2016. Each of the applications listed above is incorporated by reference herein in its entirety.

TECHNICAL FIELD

Electric machines.

BACKGROUND

In the design of electric machines, it is known to select structural parameters such as slot number depending on the intended application and desired performance characteristics of the machine. However, not all values of the structural parameters are used in practice. There is room for improved performance of electric machines, particularly in robotics.

Electric machines typically use electrically conductive wire turns wrapped around soft magnetic stator posts (teeth) to generate flux. The manufacturing process for this type of motor construction can be time consuming and expensive. As well, such motors typically have a torque to mass ratio that makes them relatively heavy for mobile actuator applications such as in robotics where the weight of a downstream actuator must be supported and accelerated by an upstream actuator.

SUMMARY

The inventor has proposed an electric machine with a novel range of structural parameters particularly suited for robotics, along with additional novel features of an electric machine. The features for example relate to improved heat dissipation resulting from the structure of electromagnetic elements as well as features that relate to rigidity of the electric machine, conductor design, cooling, rotor design, stator design and operating parameters.

In an embodiment, an electric machine comprises a first carrier having an array of electromagnetic elements and a second carrier having electromagnetic elements defining magnetic poles, the second carrier being arranged to move relative to the first carrier. An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height that provides a benefit in terms of force or torque per weight per excitation level. The electromagnetic elements defining magnetic poles may be permanent magnets.

In various embodiments, there may be included any one or more of the following features: the electric machine may be a radial flux machine, having an airgap diameter, the size of the electric machine being the airgap diameter. The electric machine may be an axial flux machine, having an average airgap diameter, the size of the electric machine being the average airgap diameter. The electric machine may be a linear machine having a direction of translation, the first carrier having a first length in the direction of translation, the second carrier having a second length in the direction of translation, the size of the electric machine being the first length if the first length is shorter or equal to the second length and the second length if the second length is shorter than the first length. The electric conductors may comprise a concentrated winding. The electric conductors may comprise a distributed winding. The first carrier may comprise a stator formed of a unitary piece of magnetically susceptible material, each post comprising a portion of the stator. The stator may comprise a material with no measurable creep below 20,000 psi. The stator may comprise a magnetically susceptible material. The posts may each have a tangential width and the stator may comprise a backiron portion, the backiron portion having a thickness equal to or less than the tangential width of the posts. The second carrier may comprise an annular disk formed of a unitary piece of a material and defining an axis, and having an inner edge and an outer edge, circumferentially spaced second carrier posts extending axially from the annular disk and defining second carrier slots between the second carrier posts, and the annular disk defining holes extending between the inner edge and the outer edge. The electric machine may have an axis defining an axial direction, the second carrier having an inner circumference and an outer circumference, the inner circumference has an inner axial length, the outer circumference has an outer axial length, and the inner axial length may be not equal to the outer axial length. The inner axial length may be less than the outer axial length. The second carrier may have a conical shape. The electric conductors may comprise anodized aluminum conductors. There may be a coolant supply connected to supply cooling fluid to one or both of the first carrier and the second carrier. There may be a power supply connected to supply electrical energy of at least 70 A/mm2 to the electric conductors. The second carrier may comprise magnet slots and the electromagnetic elements of the second carrier may comprise permanent magnets held within the magnet slots by magnetic forces. The electric conductors may form single layers around the posts, measured radially outward from the posts. The airgap may be from 0.001" to 0.010". The airgap may be from 0.005" to 0.010". The electric machine may be mounted on a robotic arm. The components of the robotic arm may form a housing for the electric machine that supports the first carrier and the second carrier. The electric machine may be a transverse flux machine. The electric machine may be a frameless electric machine.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 38 shows electric conductor layers of the stator of FIG. 33.

FIG. 39 shows electric conductor layers of the stator of FIG. 33.

FIG. 46 is a fourth figure of detail showing successive layers of a linear electric machine.

FIG. 47 shows details of connections for connecting layers of a linear electric machine to a multiphase source of electric excitation.

FIG. 48 shows details of connections for connecting layers of a linear electric machine to a multiphase source of electric excitation.

FIG. 56 shows a cross-section of an exemplary actuator assembly with a two-part stator, three phases and a 3:2 stator post:permanent magnet ratio.

FIG. 57 shows a detailed cross-section view of the embodiment from FIG. 56.

FIG. 58 shows the torque plotted as a function of rotor position for a 3:2 ratio or stator posts:permanent magnets, demonstrating the effect of rotating one stator relative to the other.

FIG. 93 shows an exploded view of an exemplary embodiment comprising two rotor halves and two stator halves.

FIG. 94 shows a cross-section view of the embodiment in FIG. 93.

FIG. 95 shows a stator in the embodiment shown in FIG. 93.

FIG. 119 shows a section view of the conductors and spacers before spacer removal with the powder edge coating contacting and adhering the conductors to each and/or to the post sidewalls.

FIG. 120 shows a simplified section of stator with a spacer component being removed.

FIG. 121 shows a method of making anodized conductors;

FIG. 122 shows a further detail of a method of making anodized conductors;

FIG. 123 shows a cross-section of an embodiment of a conical rotor;

FIG. 124 shows a close-up cross-sectional view of the embodiment in FIG. 123;

FIG. 125 shows a close-up cross-sectional view of the embodiment in FIG. 123;

FIG. 126 shows a close-up cross-sectional view of the embodiment in FIG. 123;

FIG. 127 shows a close-up cross-sectional view of the embodiment in FIG. 123;

FIG. 128 is an axial view of an embodiment of an assembled actuator including power and encoder connectors.

FIG. 129 is a section view of the actuator of FIG. 128 showing an internal rotor along a centre plane between two stators.

FIG. 130 is an isometric section view of a stator and housing assembly of the actuator of FIG. 128 with a partial section of layered conductors.

Figure 128:
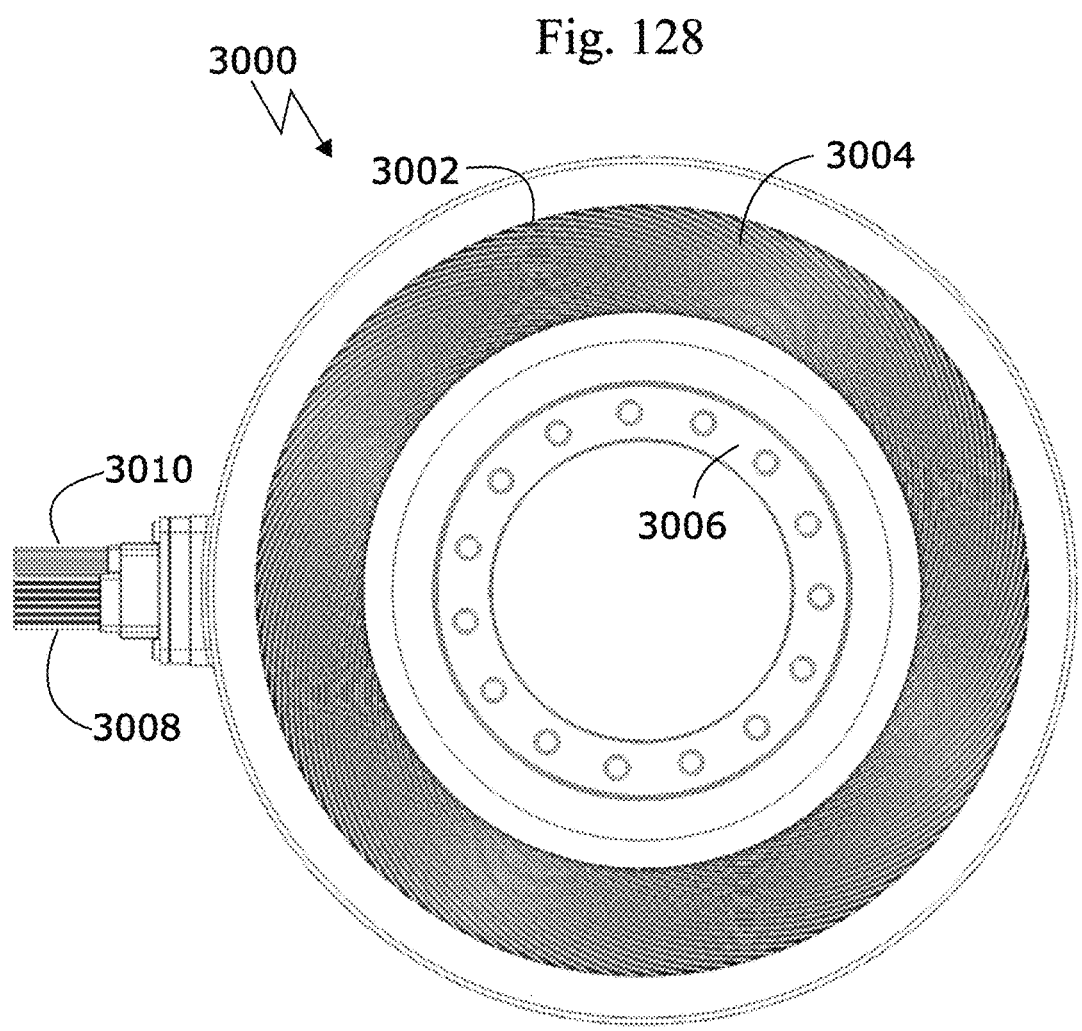
Figure 131:
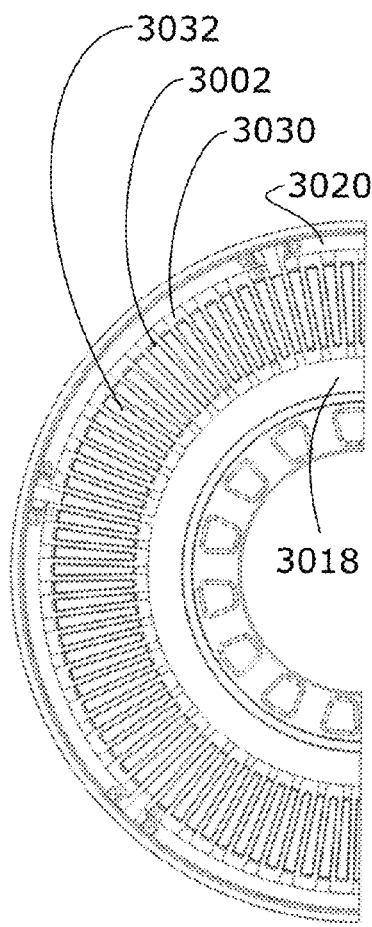

FIG. 131 is an axial view of a stator, inner housing, outer housing, and layered conductors of the actuator or FIG. 128. 132 is an isometric view of rotor components of the embodiment of FIG. 128.

Figure 133:
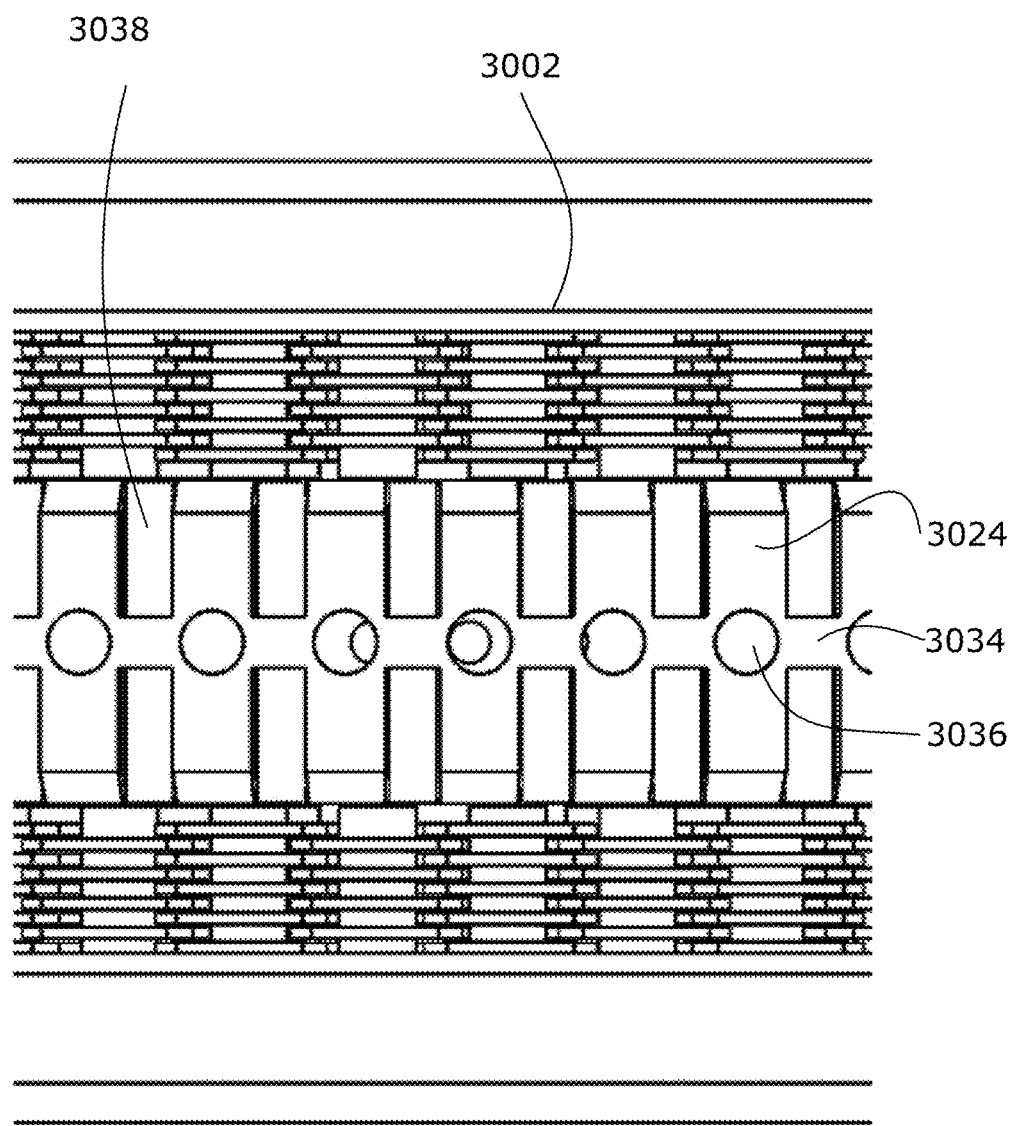

FIG. 133 is a side view of a rotor and stators with an example magnet arrangement in which adjacent magnets are oppositely tangentially polarized.

Figure 134:
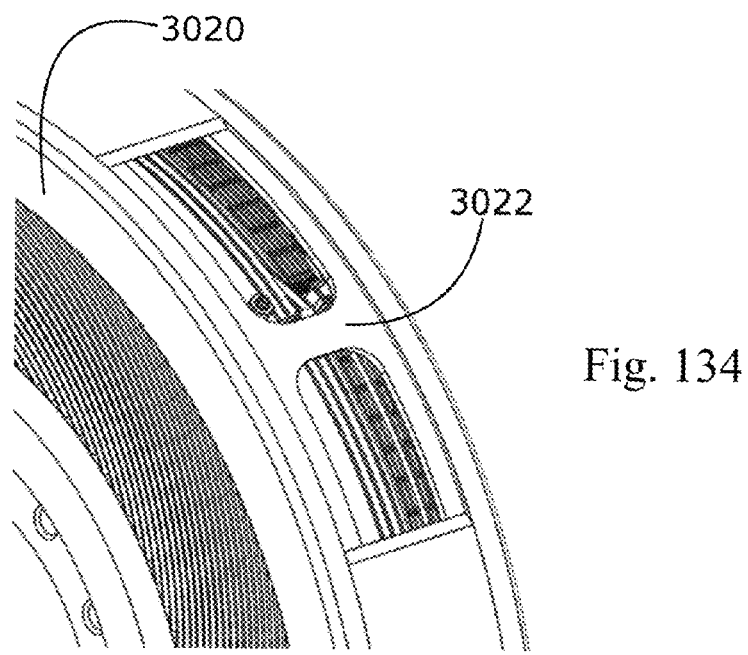

FIG. 134 is a perspective view of an actuator including a separation member to separate two stators.

Figure 135:
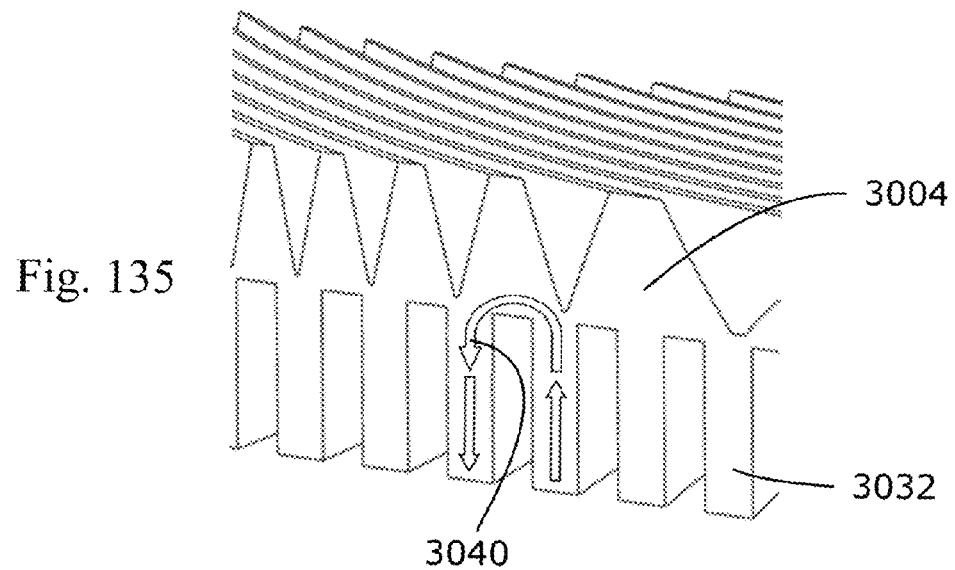

FIG. 135 is another section view of the stator for the actuator of FIG. 128, showing a magnetic flux path through cooling fins.

FIG. 136 is a section view of a stator with cooling fins showing a cross sectional area for flux linkage at a diagonal between posts.

FIG. 137 is a simplified section view of a stator with circumferential cooling fins.

FIG. 138 is a section view of an actuator including a separation member configured to reduce preload on inner bearings.

FIG. 139 is a section view of an actuator including a separation member configured to enhance preload on inner bearings.

FIG. 140 is a cross sectional view of an actuator having sealed cooling channels.

Figure 140A:
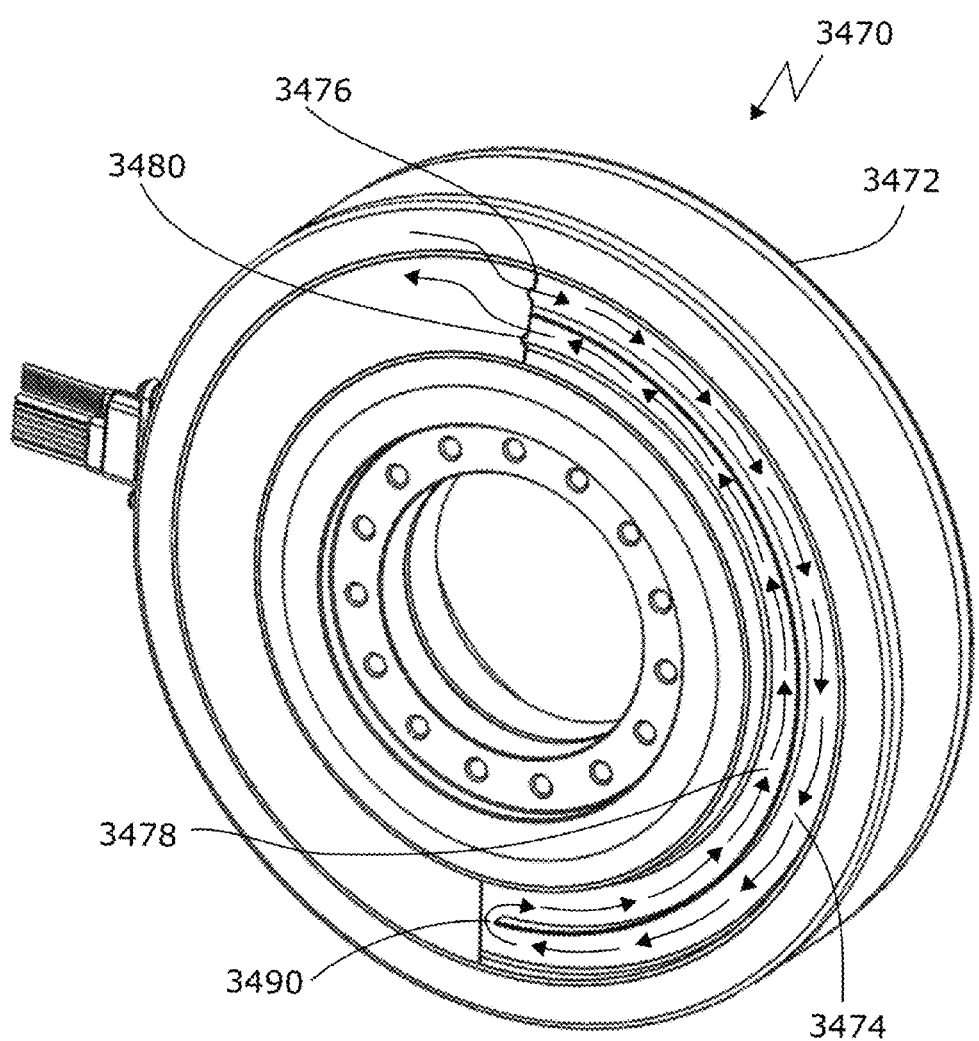

FIG. 140A is a perspective view of an embodiment having semi-circular cooling channels.

FIG. 140B is a cross-section view of an embodiment with two stators and a rotor, with a housing connected by an inner diameter rigid connection.

FIG. 140C is an expanded cross-section view of the embodiment shown in FIG. 140B.

Figure 141:
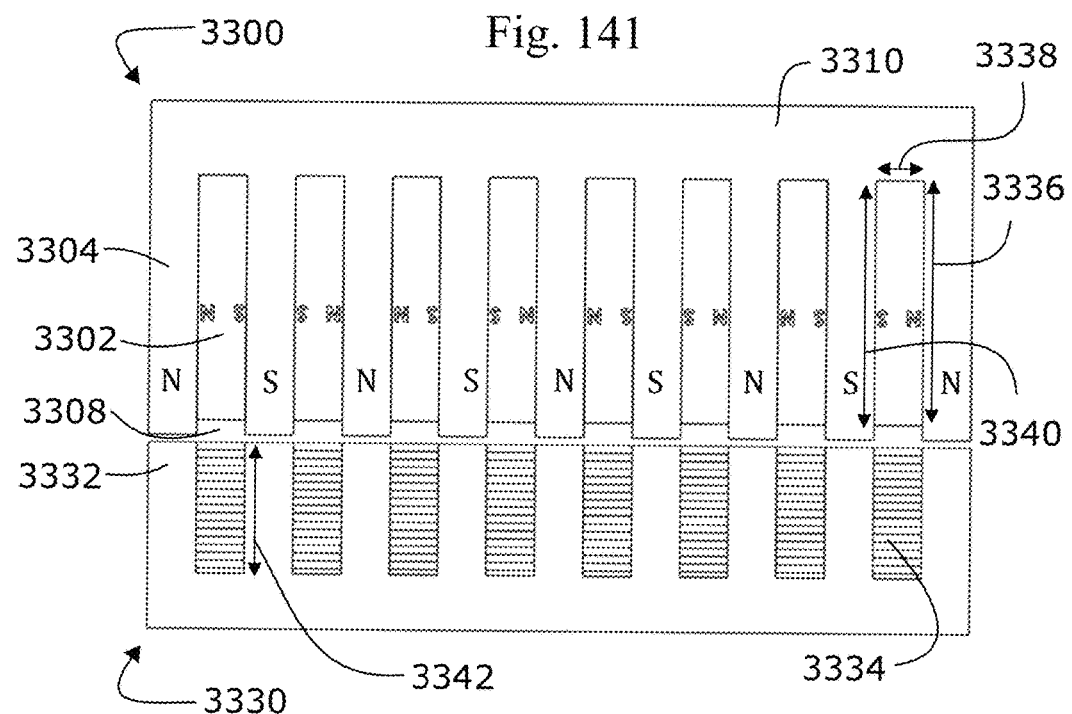

FIG. 141 is a simplified section view of a linear embodiment of a concentrated flux rotor.

Figure 142:
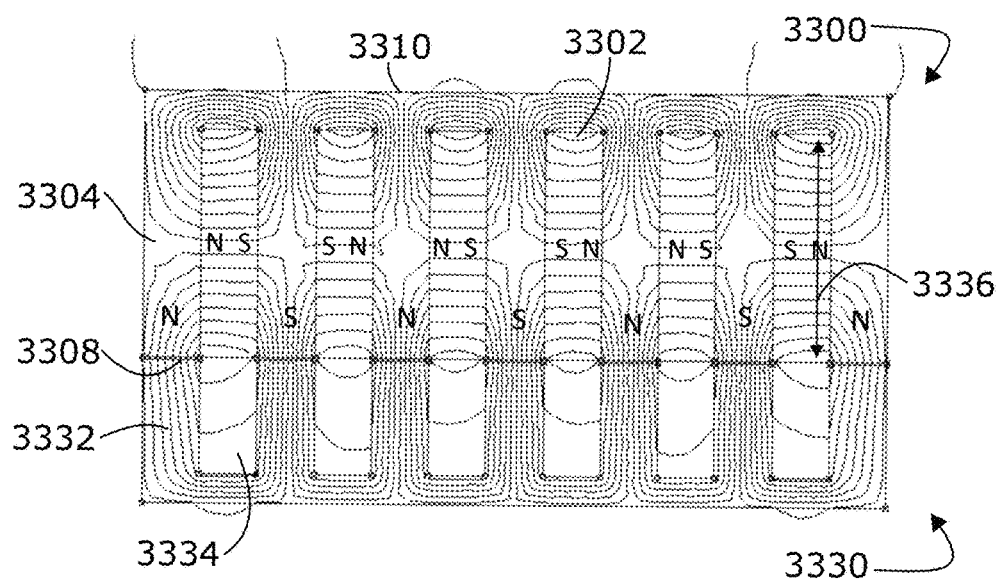

FIG. 142 is a model of a concentrated flux rotor with back iron showing magnetic flux lines.

Figure 143:
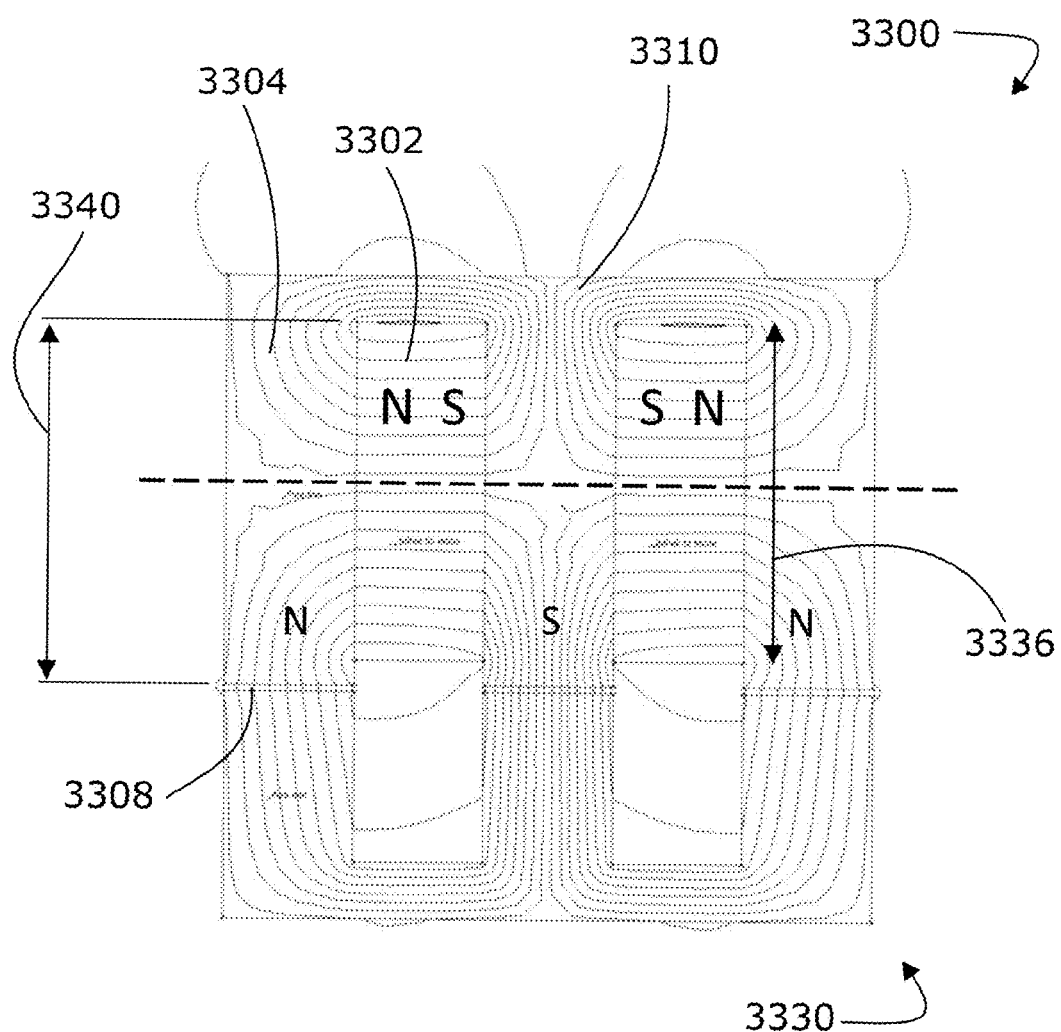

FIG. 143 is a model of a concentrated flux rotor with back iron showing magnetic flux lines, further showing component lengths.

FIG. 144 is a cross-section through a segment of an axial flux concentrated flux rotor with tapered magnets and flux path restrictions.

FIG. 145 is a close-up section view of a portion of an axial flux concentrated flux rotor with extended length magnets.

Figure 146:
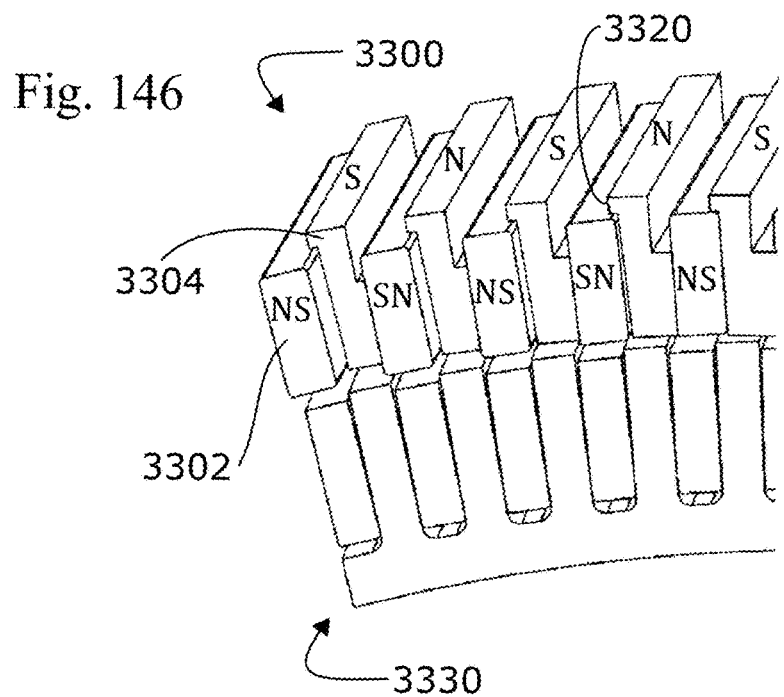

FIG. 146 is a simplified angled cross-section of an embodiment of a radial flux concentrated flux rotor with stator.

Figure 147:
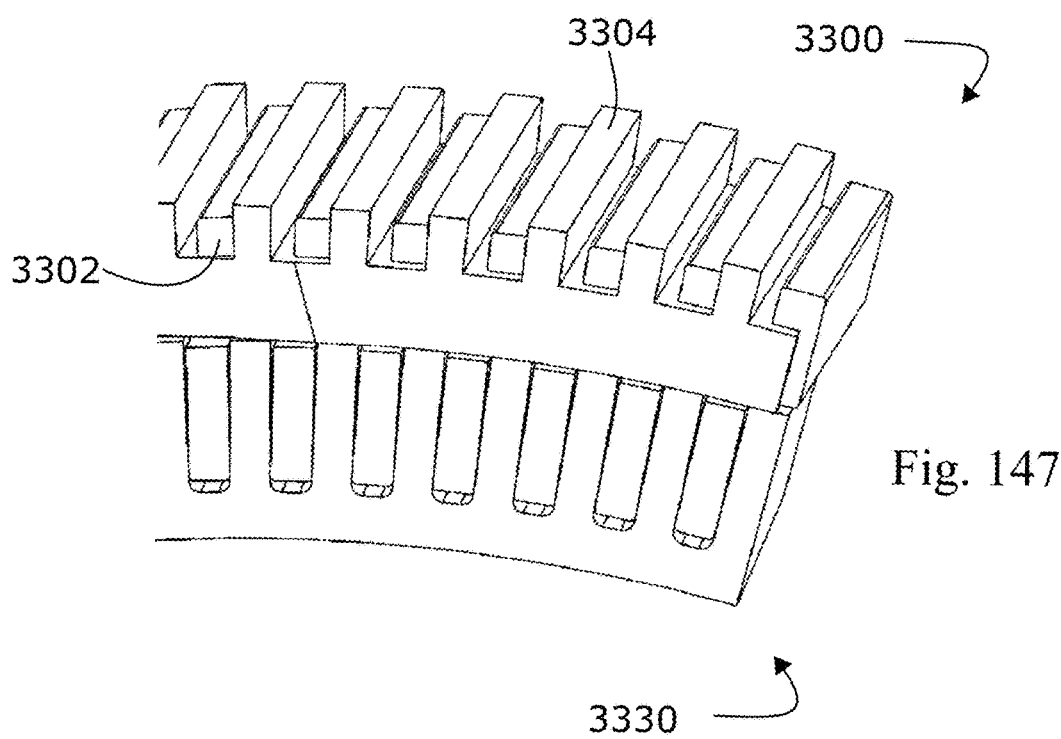

FIG. 147 is a simplified section view of the radial flux concentrated flux rotor and stator shown in FIG. 146.

Figure 148:
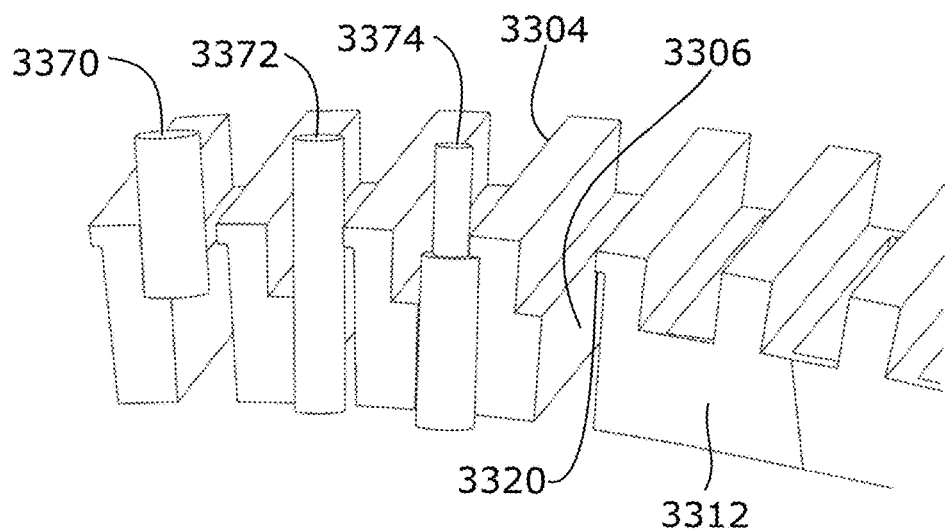

FIG. 148 is a simplified angled cross-section of the concentrated flux rotor shown in FIG. 146, further showing mills.

Figure 149:
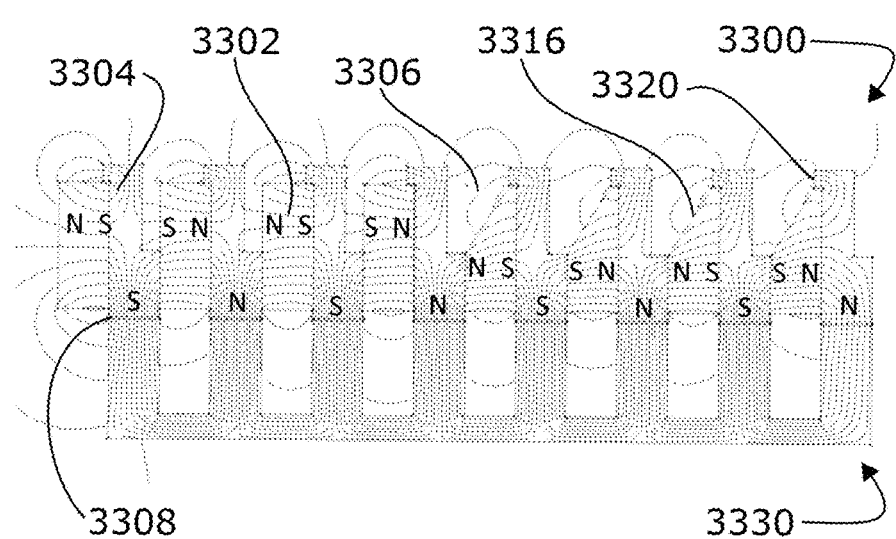

FIG. 149 is a model of a concentrated flux rotor with back iron with variant geometries and showing magnetic flux lines.

Figure 150:
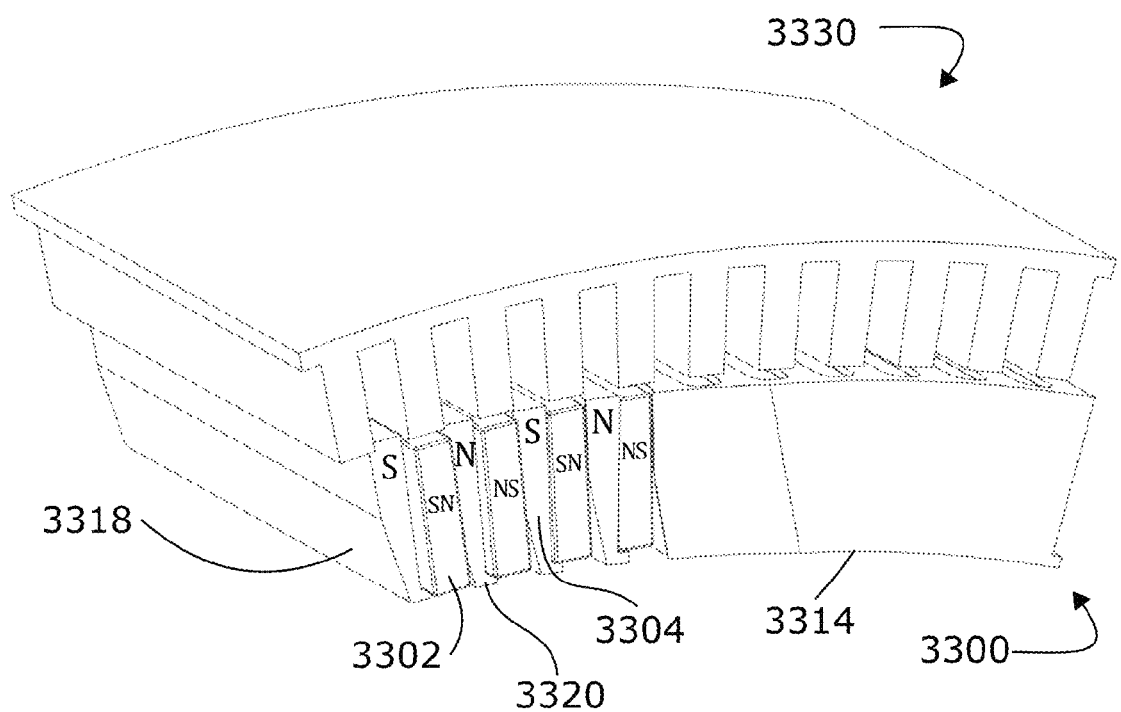

FIG. 150 is a simplified angled cross-section of an embodiment of a radial flux concentrated flux rotor with rotor reliefs and tapered rotor ends.

Figure 151:
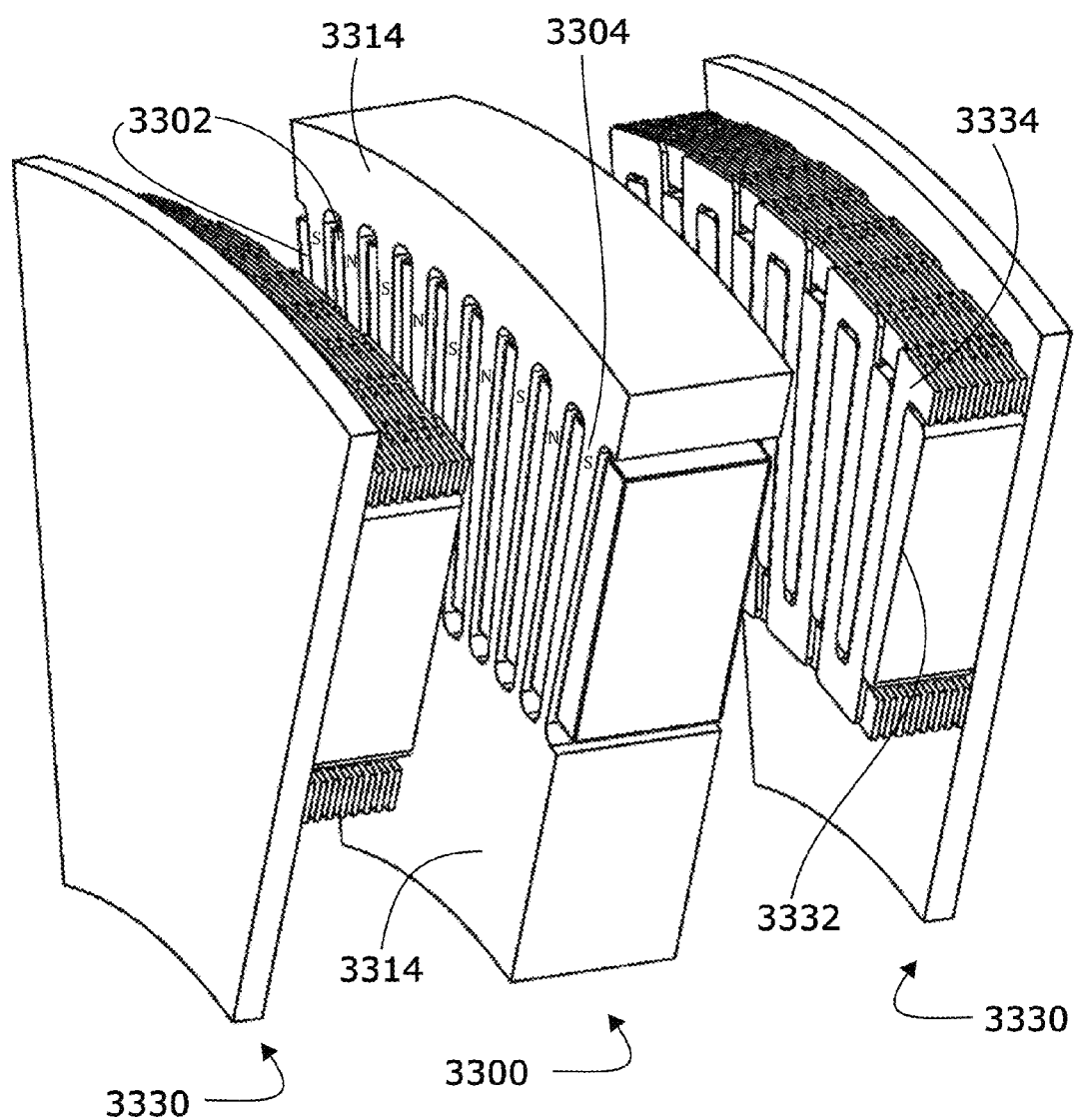

FIG. 151 is a simplified exploded section view of an embodiment of an axial flux stator-rotor-stator configuration of a concentrated flux rotor with end iron.

Figure 152:
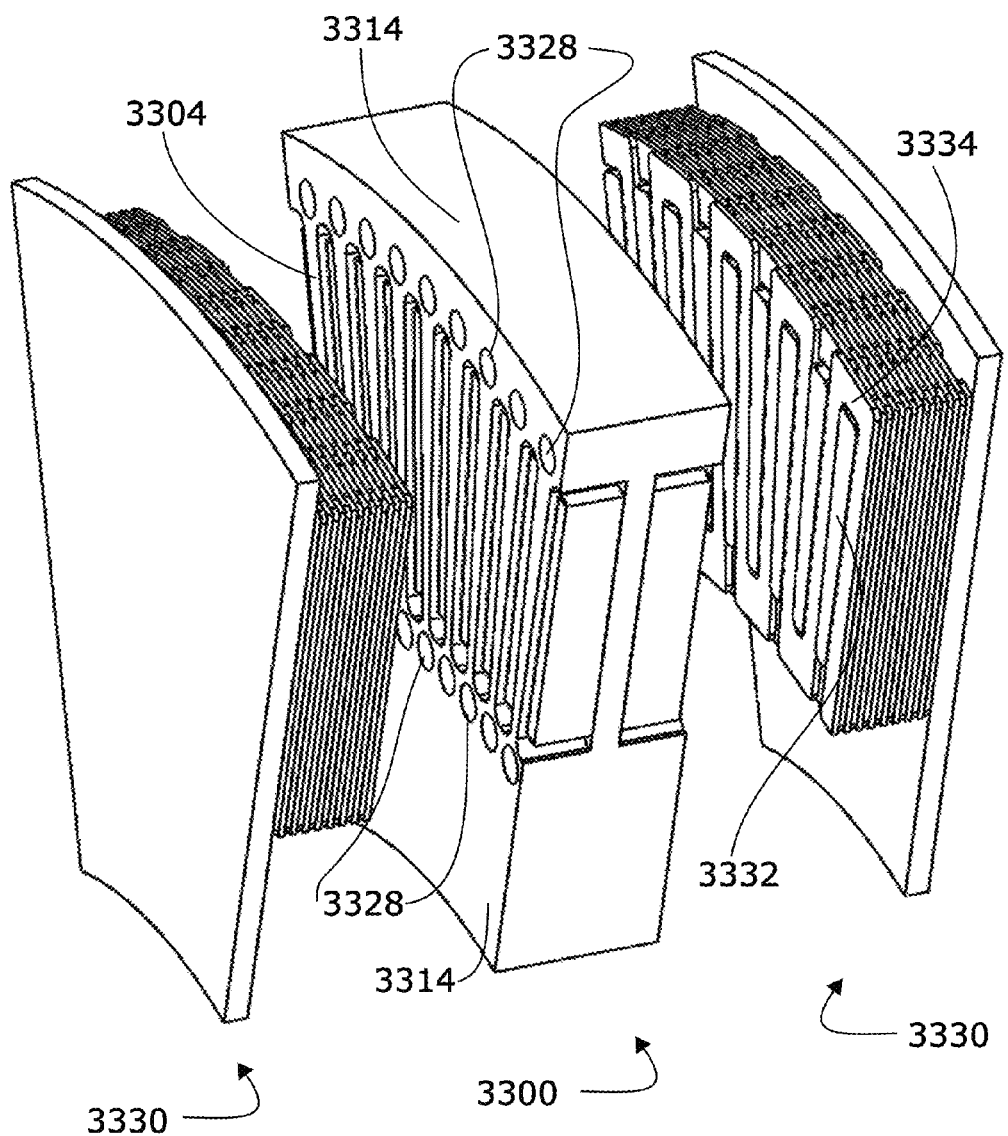

FIG. 152 is a simplified exploded section view of an embodiment of an axial flux stator-rotor-stator configuration of a concentrated flux rotor with back iron, end iron and flux path restrictions.

Figure 153:
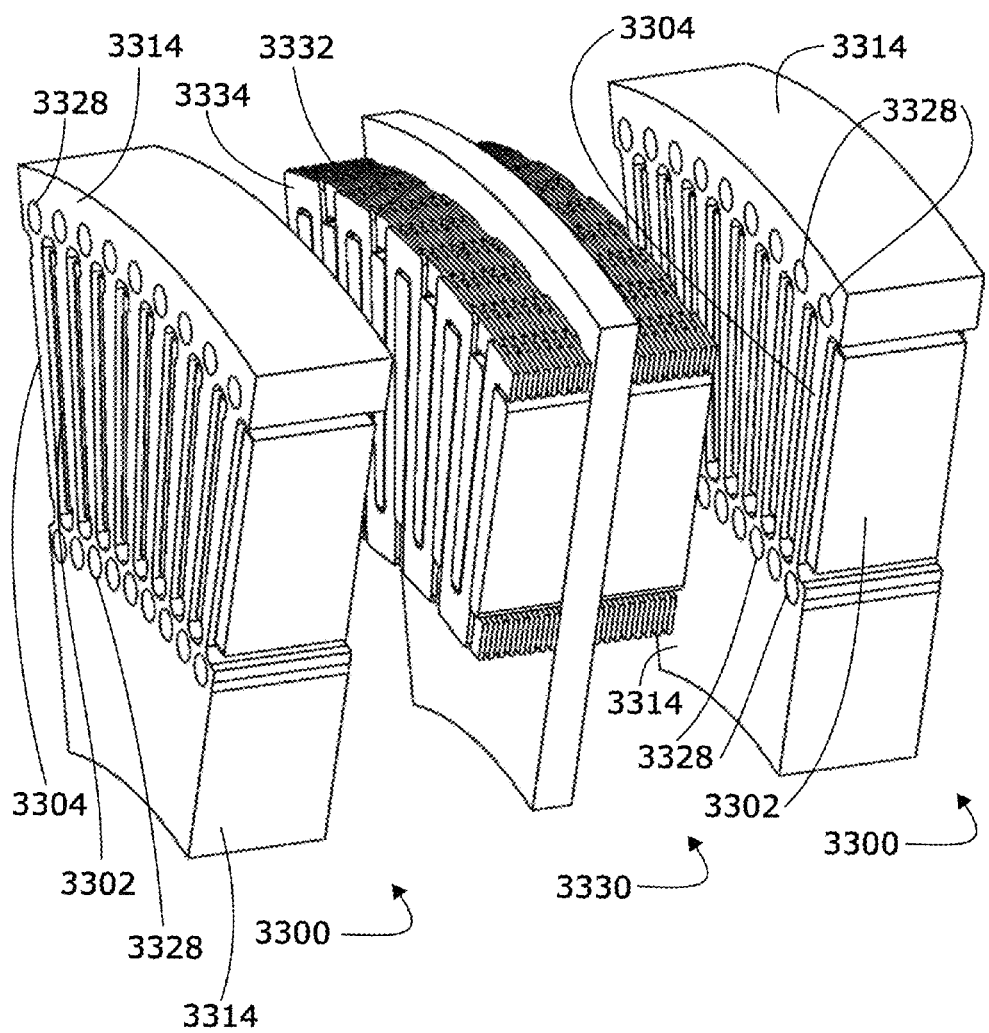

FIG. 153 is a simplified exploded section view of an embodiment of an axial flux rotor-stator-rotor configuration of a concentrated flux rotor with end irons and flux path restrictions.

Figure 154:
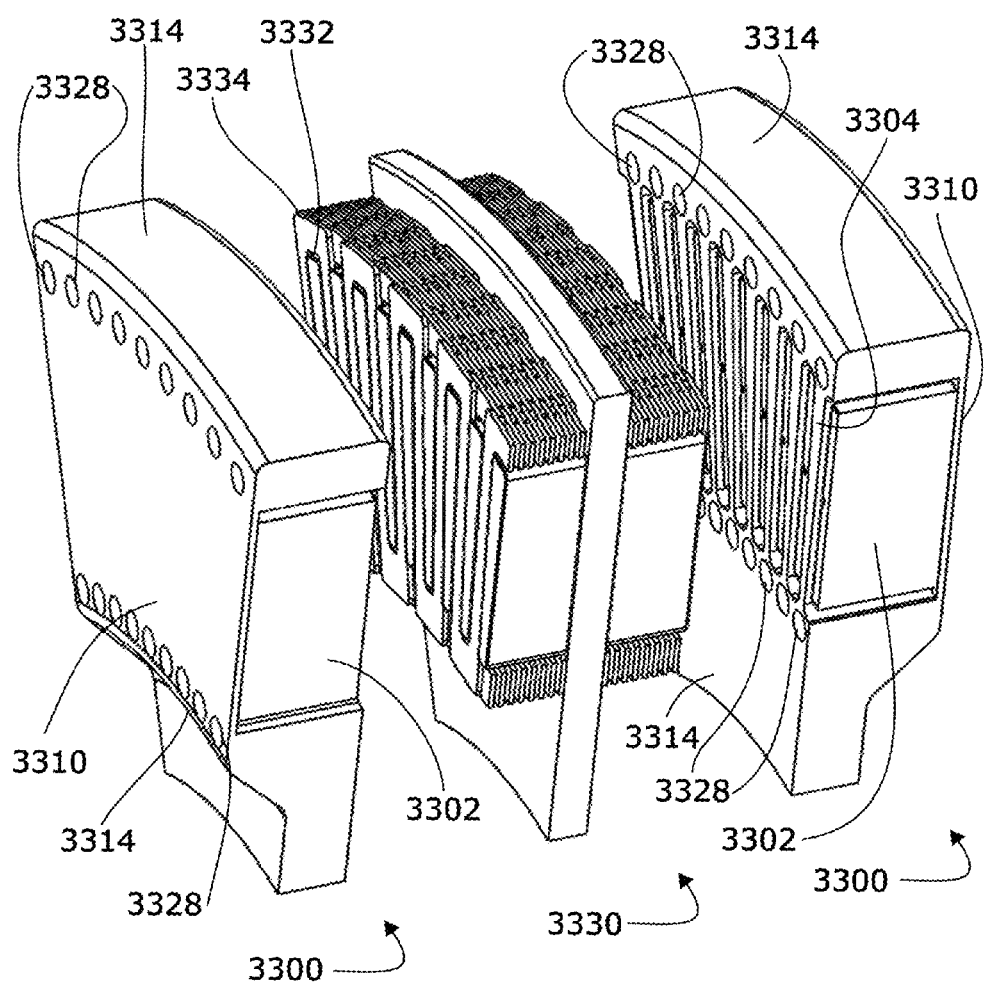

FIG. 154 is a simplified exploded section view of an embodiment of an axial flux rotor-stator-rotor configuration of a concentrated flux rotor with end irons, flux path restrictions and back irons.

Figure 155:
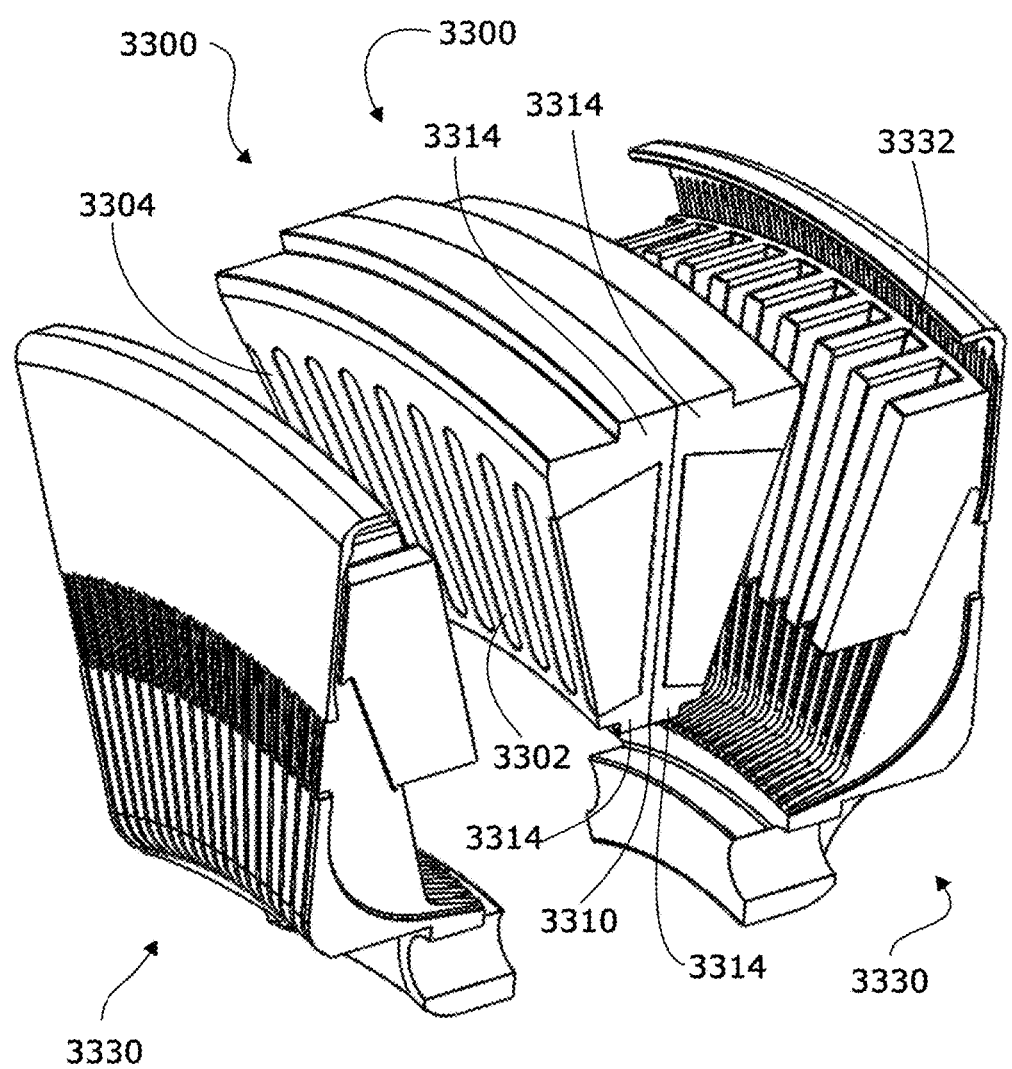

FIG. 155 is a simplified exploded section view of an embodiment of a trapezoidal stator-rotor-stator configuration of a concentrated flux rotor with back irons and end irons.

Figure 156:
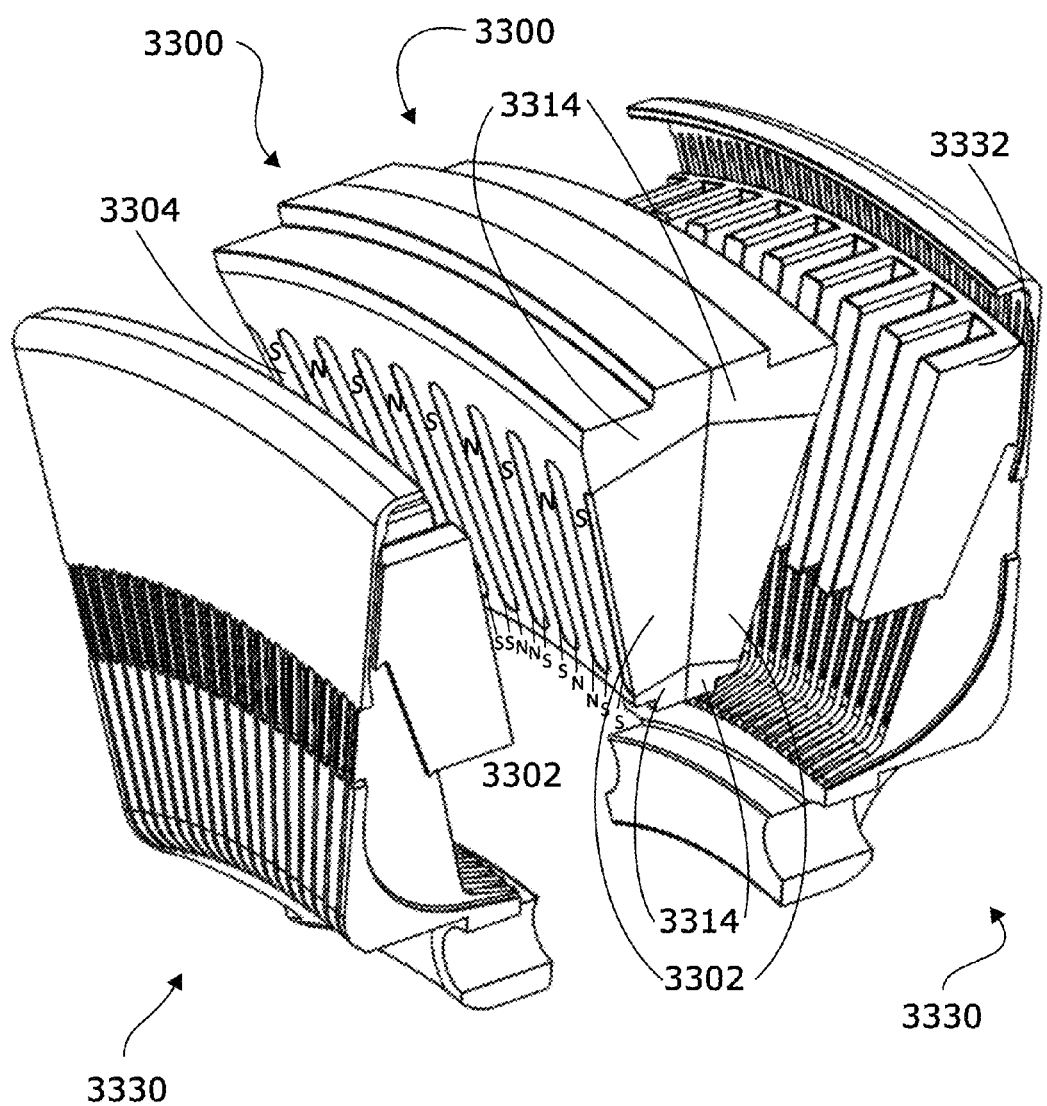

FIG. 156 is simplified exploded section view of the embodiment shown in FIG. 155 without back irons.

Figure 157:
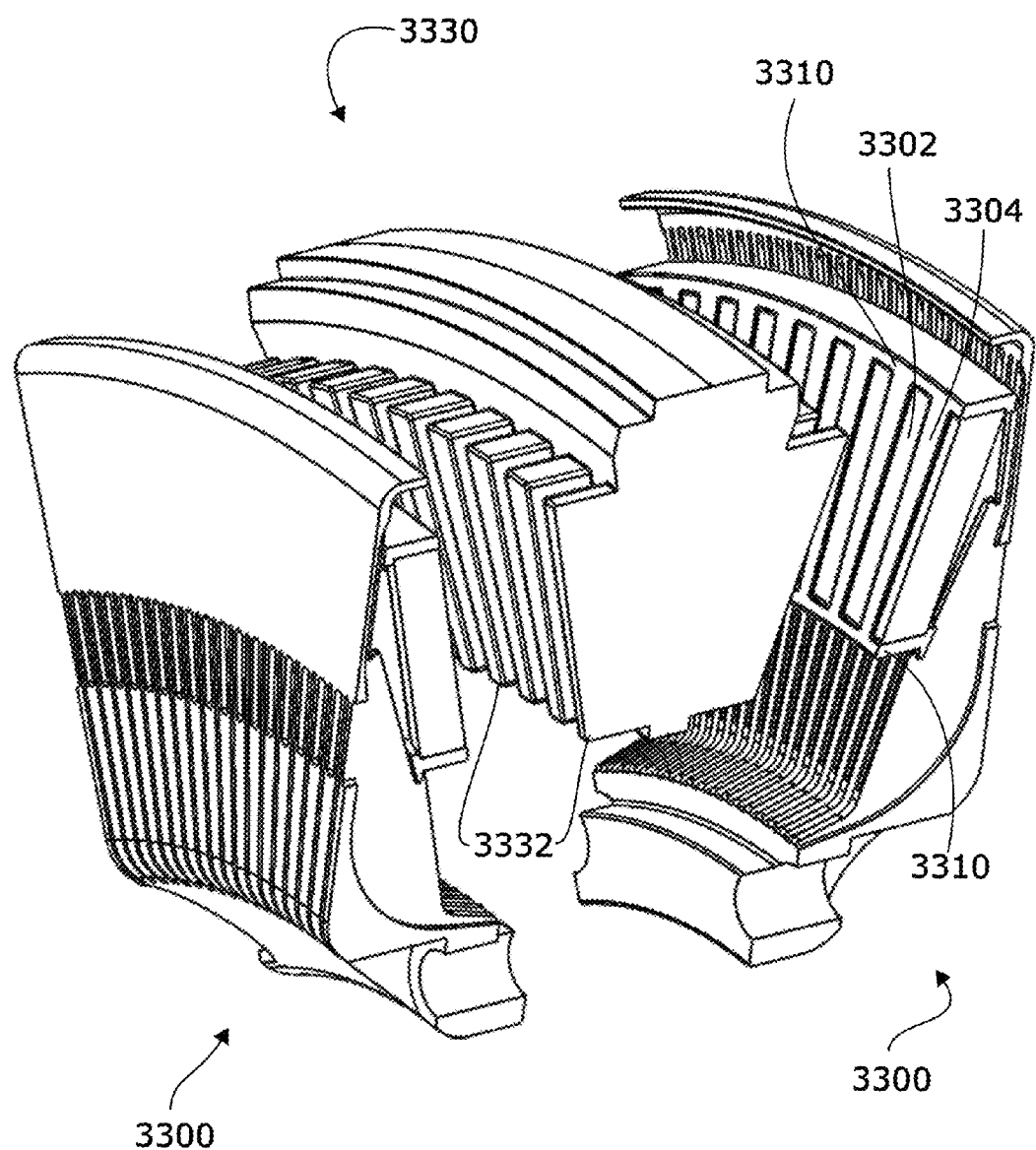

FIG. 157 is a simplified exploded section view of an embodiment of a trapezoidal rotor-stator-rotor configuration of a concentrated flux rotor with end irons.

Figure 158:
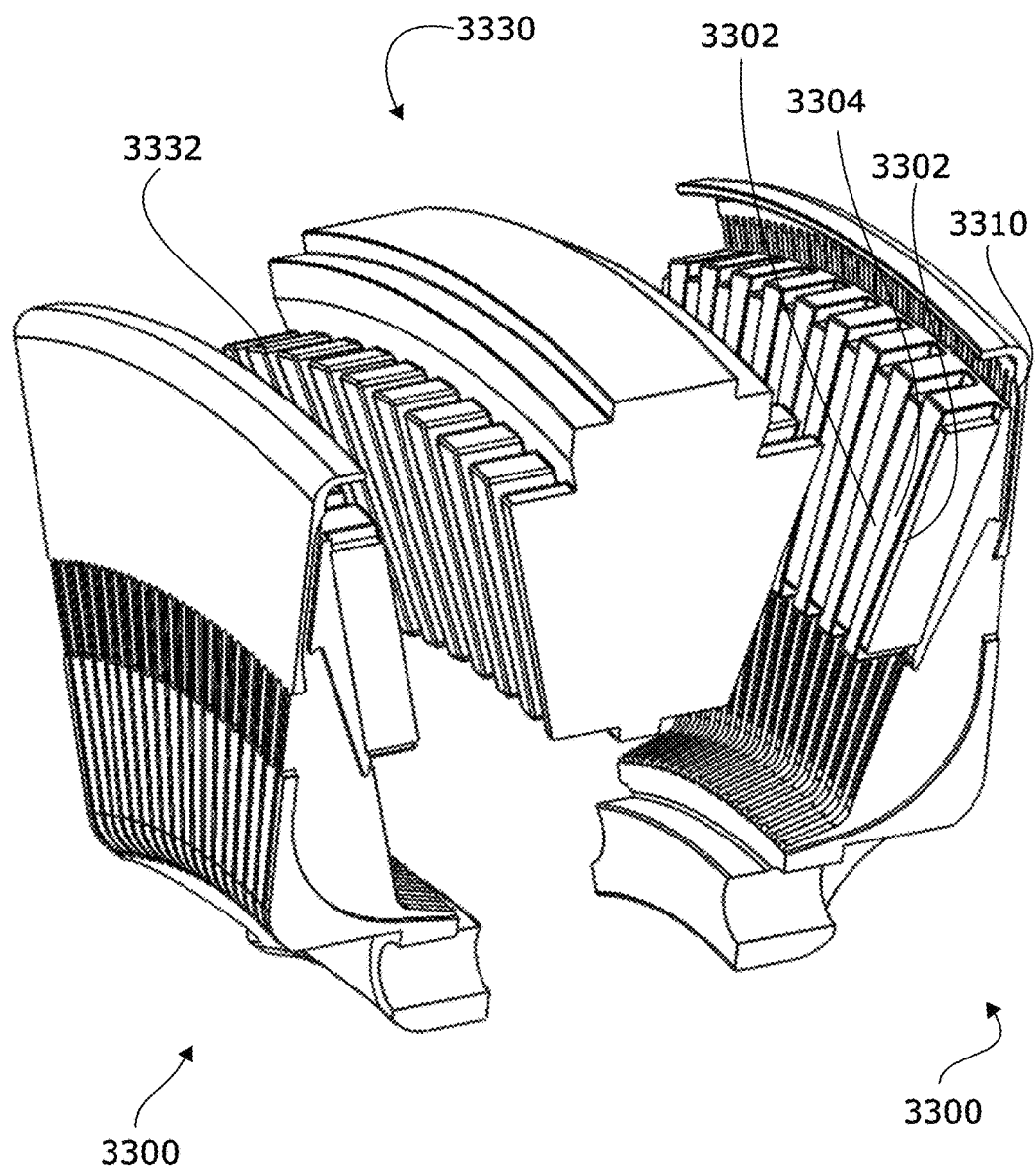

FIG. 158 is a simplified exploded section view of the embodiment shown in FIG. 157 with back irons and without end irons.

Figure 159:
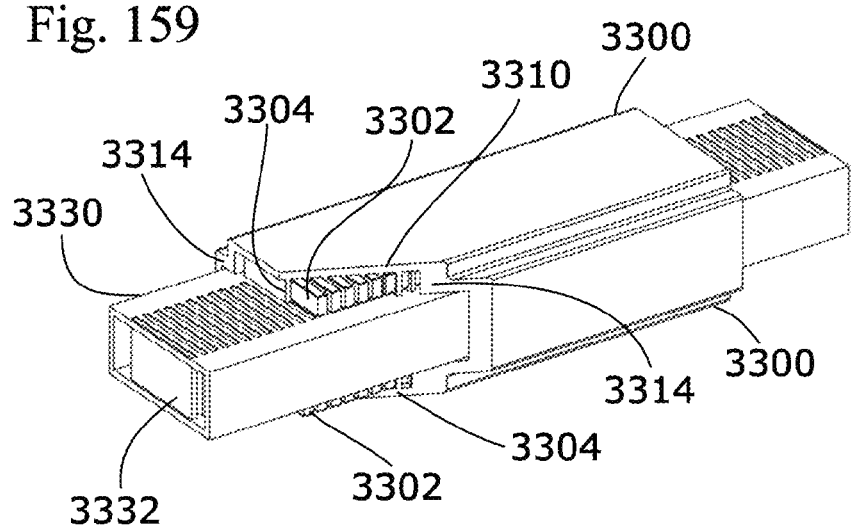

FIG. 159 is a simplified perspective view of an embodiment of a rotor-stator-rotor configuration linear flux machine with back irons and end irons.

Figure 160:
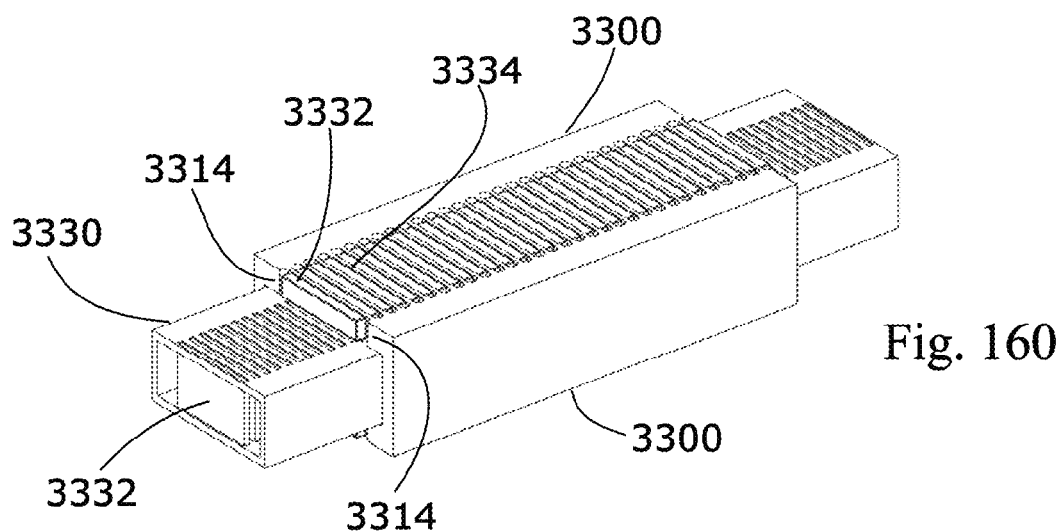

FIG. 160 is a simplified perspective view of the embodiment shown in FIG. 159 without back irons.

Figure 161:
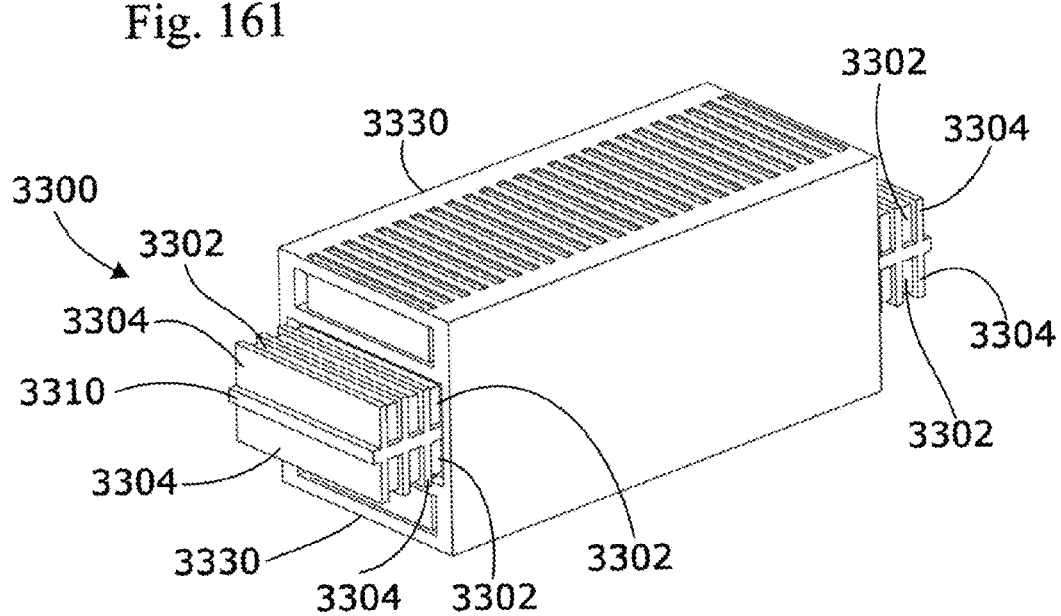

FIG. 161 is a simplified perspective view of an embodiment of a stator-rotor-stator configuration of a linear flux machine with back iron.

Figure 162:
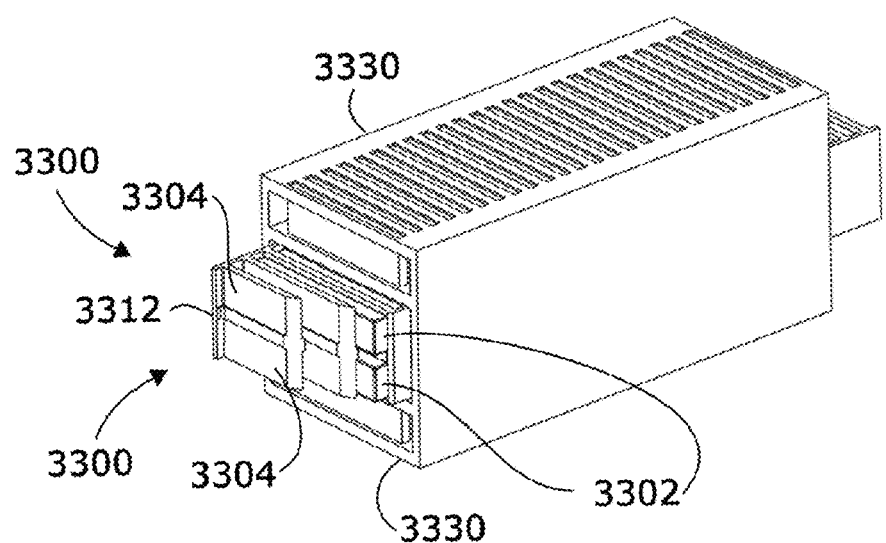

FIG. 162 is a simplified perspective view of an embodiment of a stator-rotor-stator configuration of a linear flux machine with end irons, showing an angled cross-section of the rotor.

Figure 163:
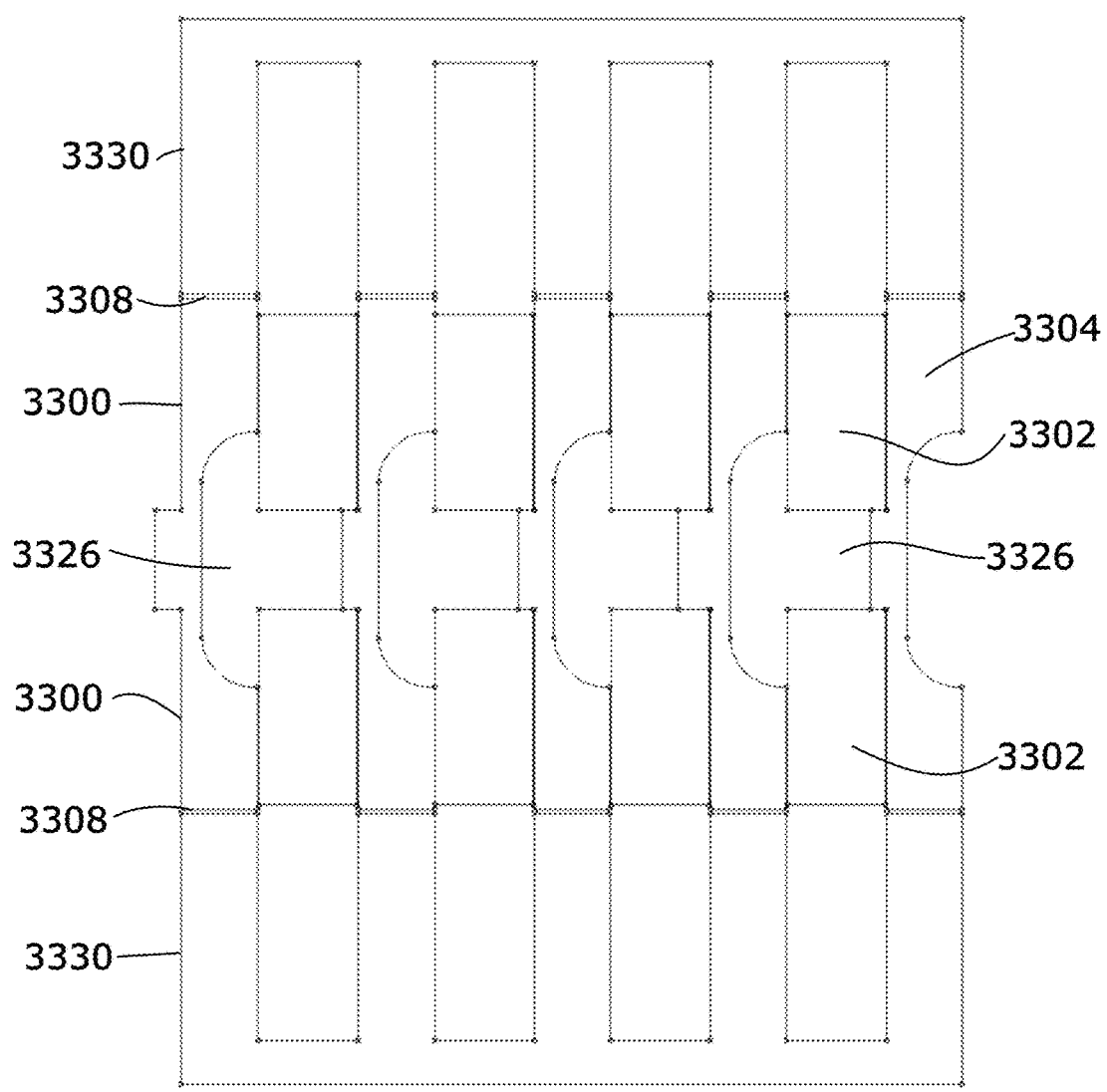

FIG. 163 is a model of an axial motor concentrated flux rotor with interrupted rotor posts.

Figure 164:
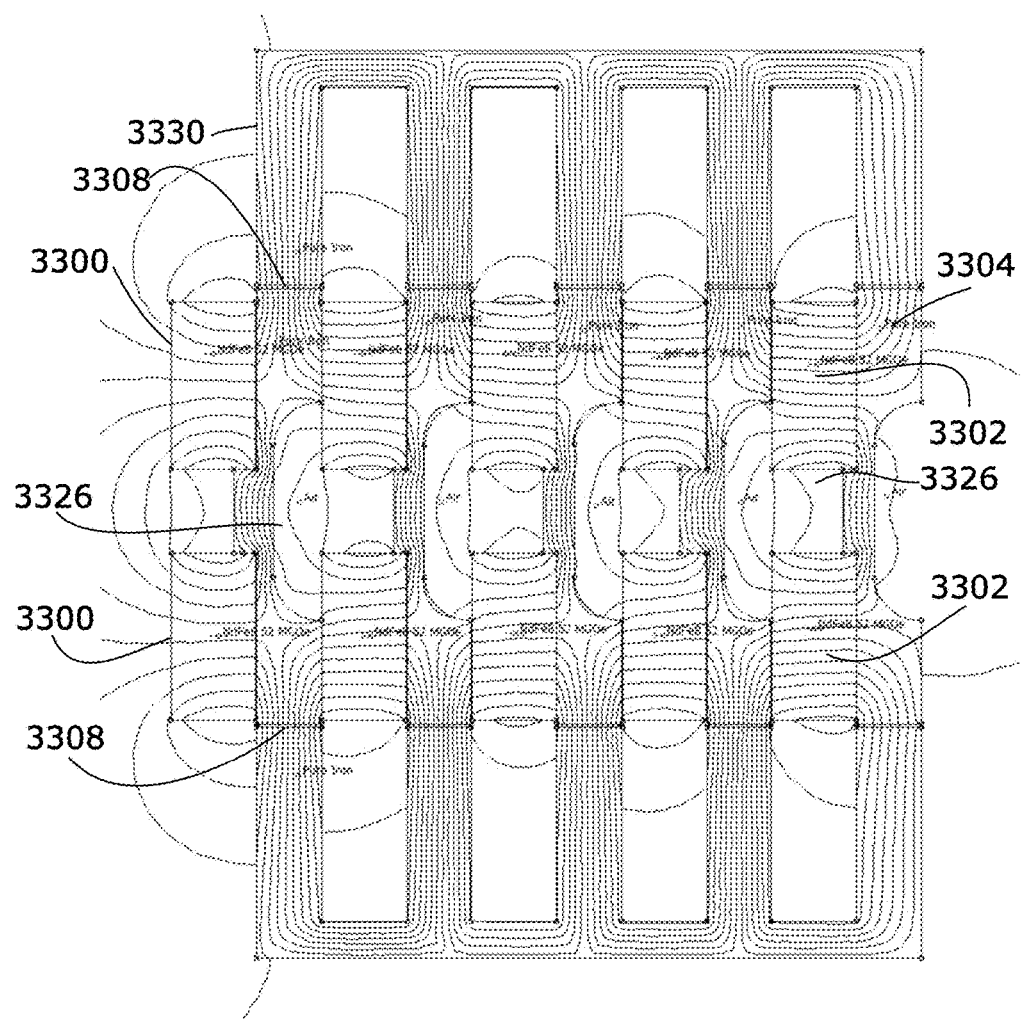

FIG. 164 is the model of an axial motor concentrated flux rotor shown in FIG. 164 with magnetic flux lines shown.

Figure 165:
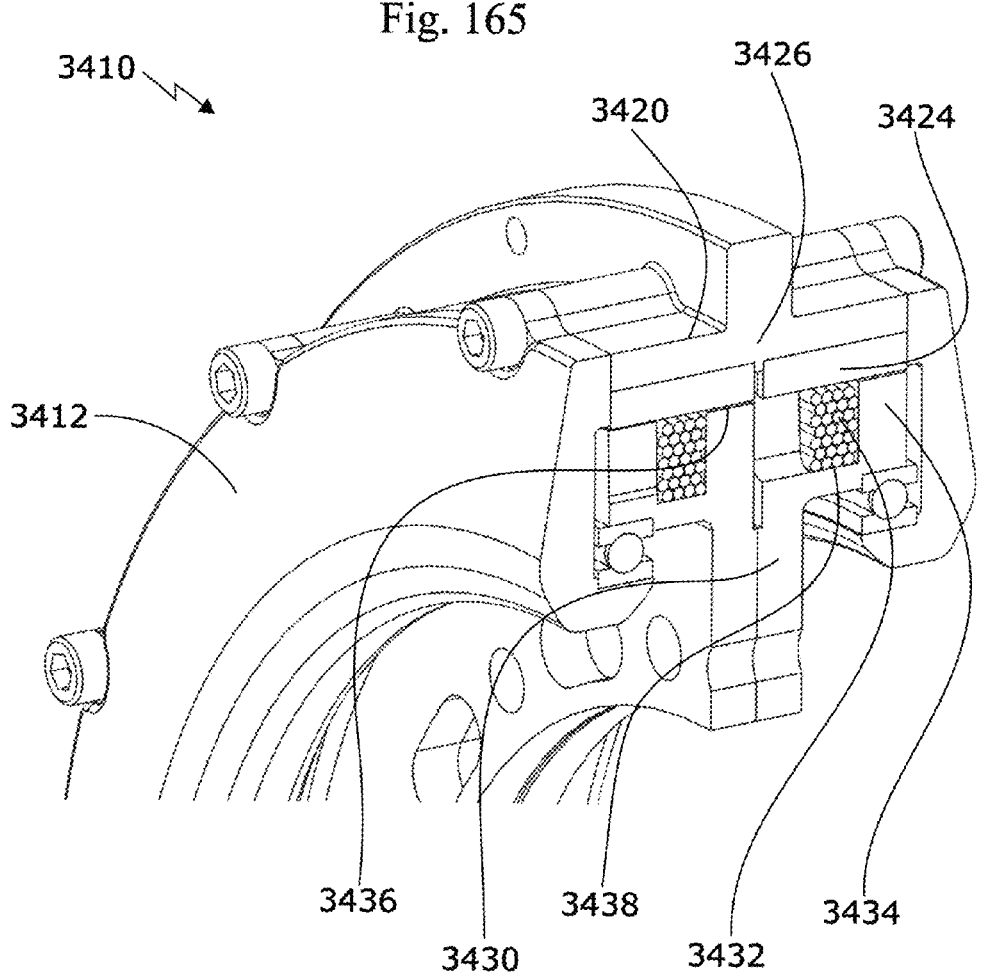

FIG. 165 is a cross-section of an embodiment of a transverse flux machine in which flux links across the air gap in the radial direction.

Figure 166A:
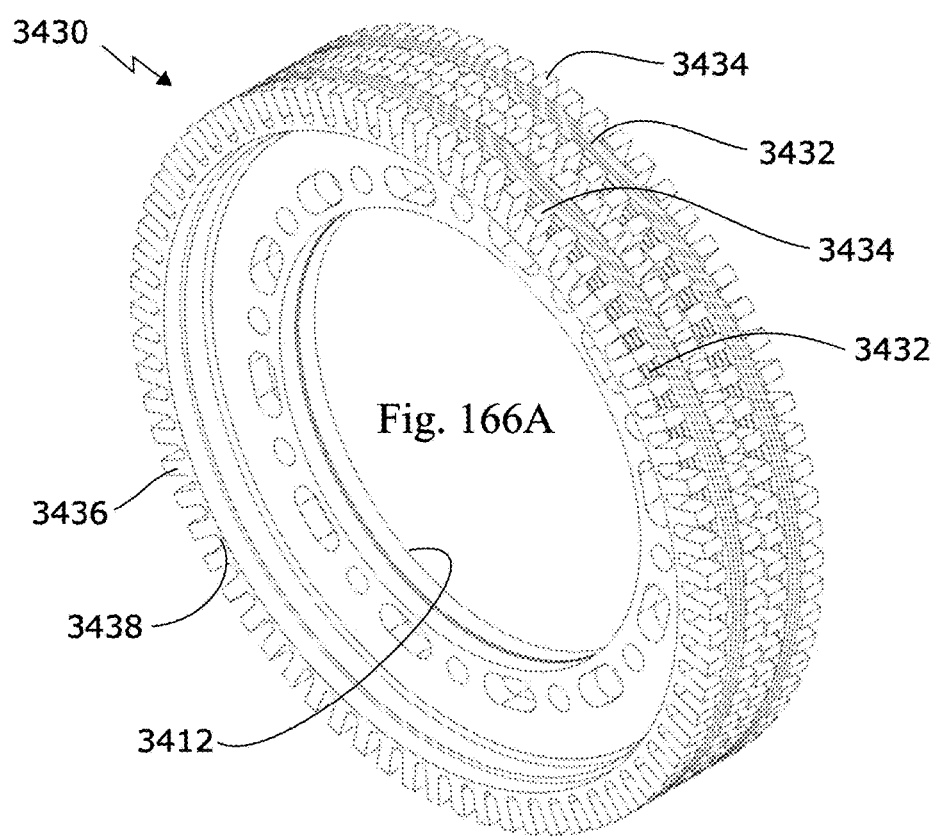

FIG. 166A is a perspective view of the stator of the embodiment of a transverse flux machine shown in FIG. 165.

Figure 166B:
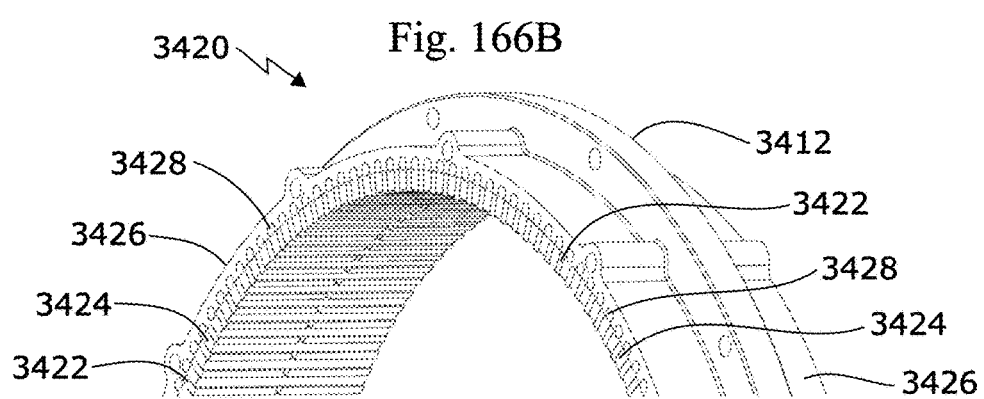

FIG. 166B is a perspective view of an upper portion of the rotor of the embodiment of a transverse flux machine shown in FIG. 165.

Figure 167:
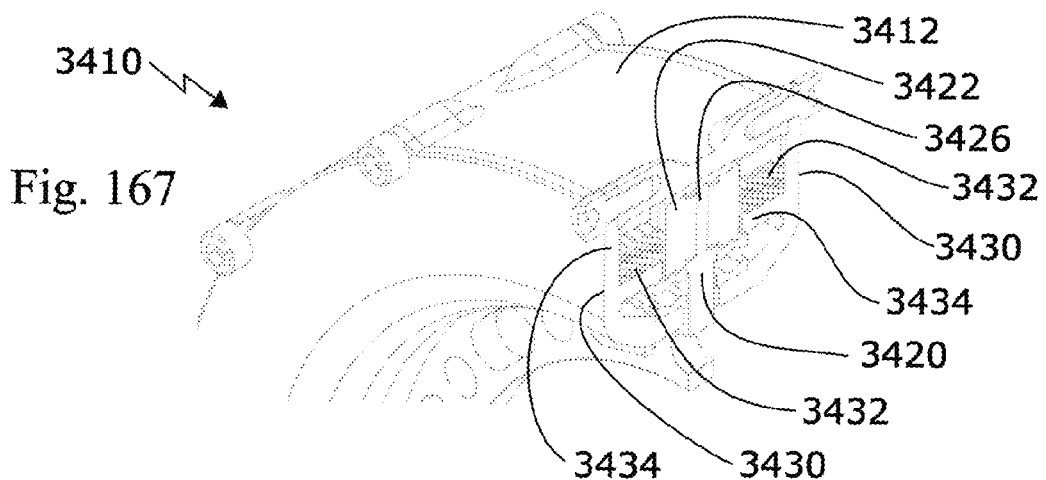

FIG. 167 is a cross-section of an embodiment of a transverse flux machine in which flux links across air gaps in the axial direction.

Figure 168:
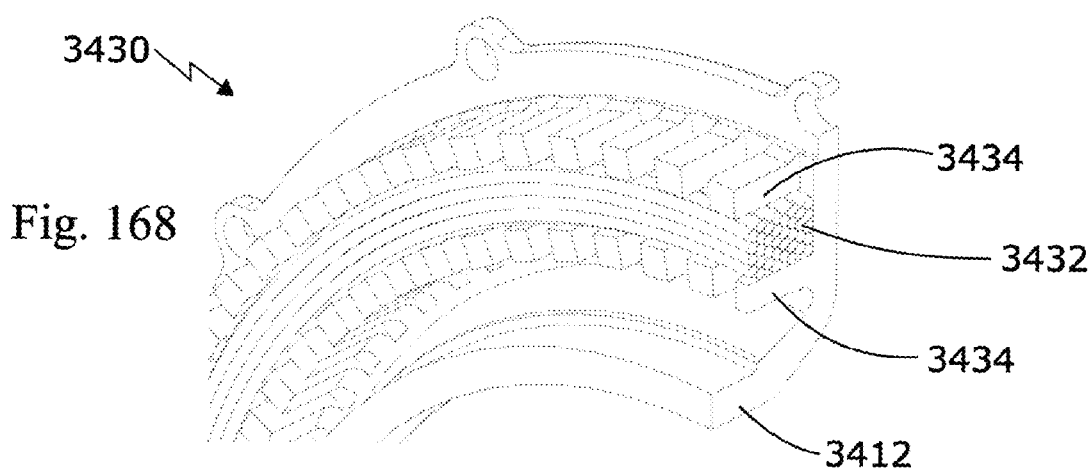

FIG. 168 is a perspective view of a stator section of the embodiment of a transverse flux machine shown in FIG. 167

Figure 169:
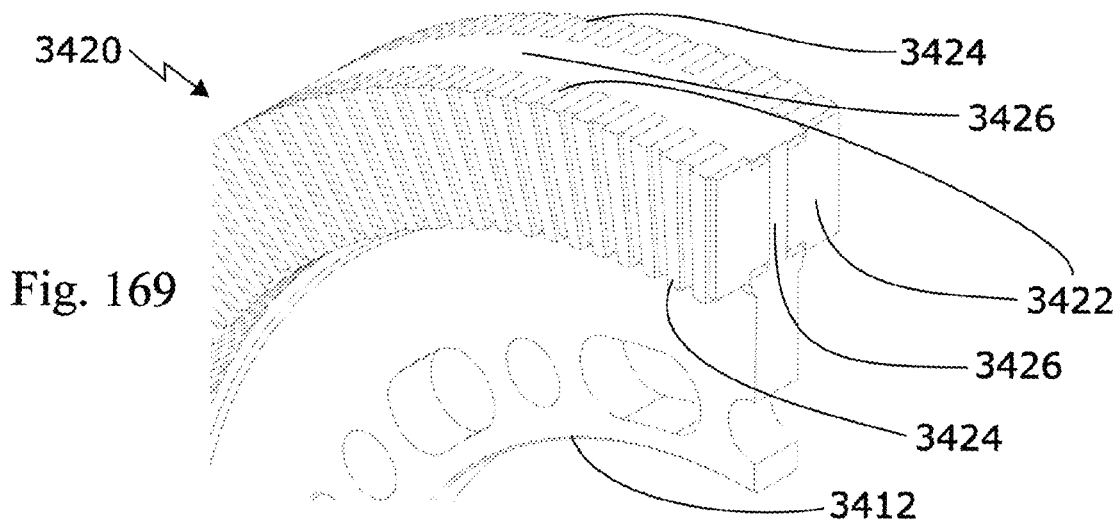

FIG. 169 is a cross-section of an upper portion of the rotor of the embodiment of a transverse flux machine shown in FIG. 168.

Figure 170A:
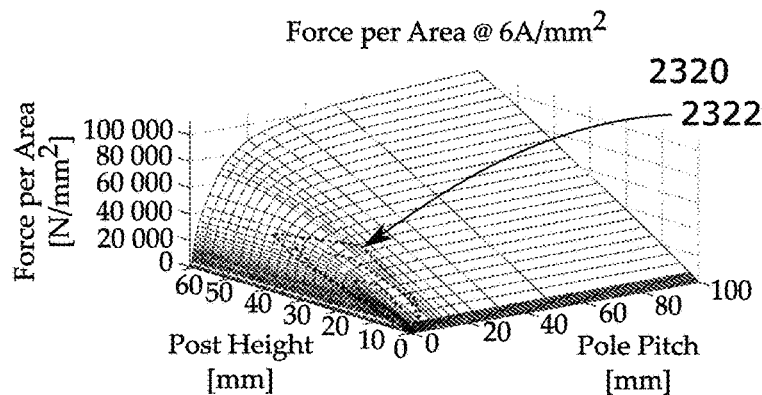

FIG. 170A shows a graph of torque at constant current density for a simulated series of motors differing in slot pitch and post height.

Figure 170B:
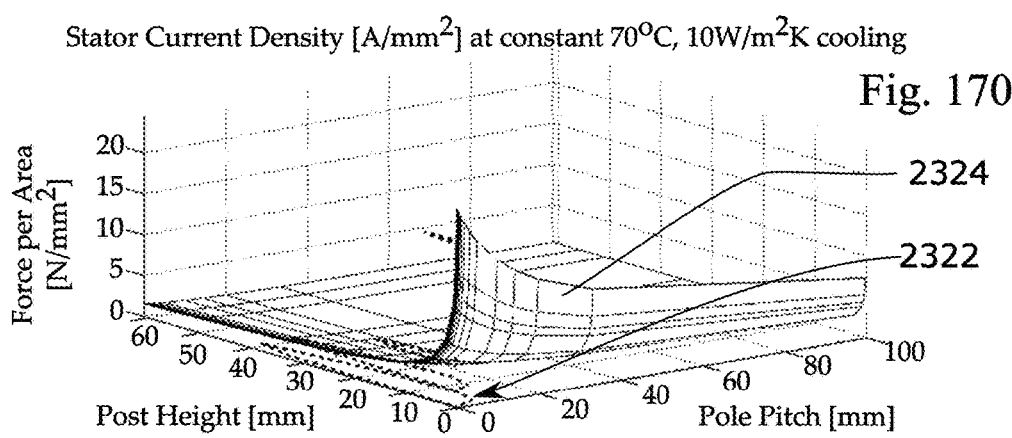

FIG. 170B shows the highest stator current density possible at a given temperature for a simulated series of motors differing in slot pitch and post height.

Figure 170C:
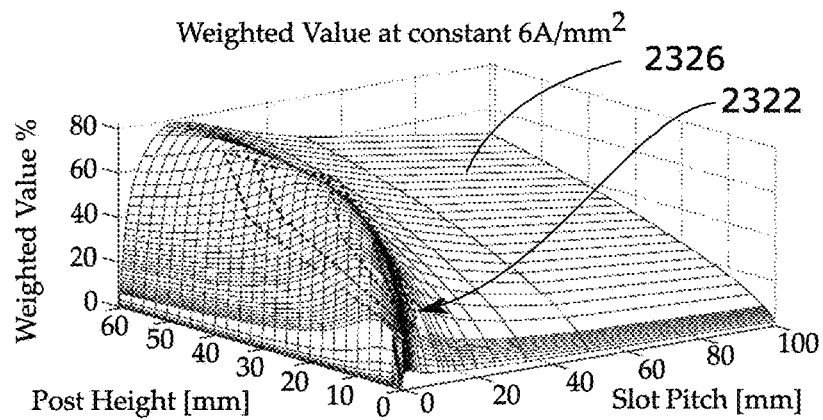

FIG. 170C shows constant temperature torque as a function of slot pitch and post height for a series of electric machines.

Figure 170D:
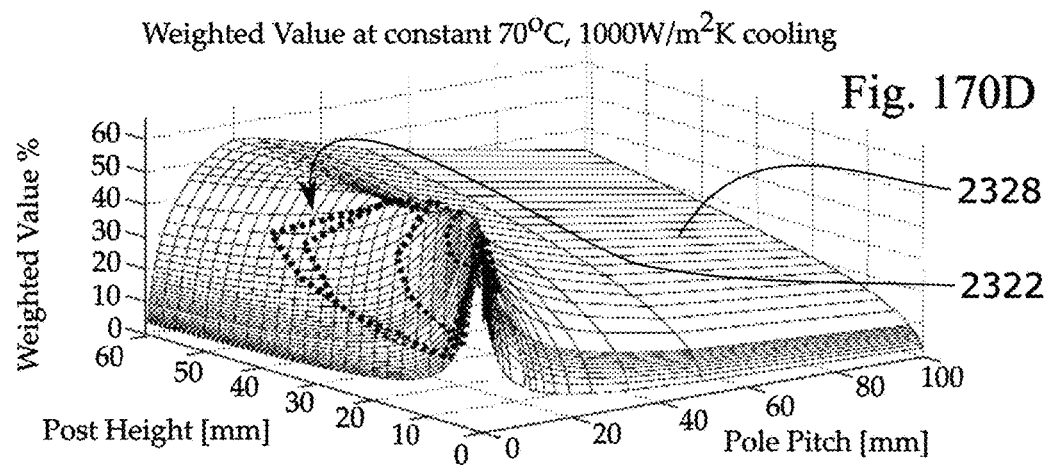

FIG. 170D shows the value of a weighting function for at the highest stator current density possible at a given temperature for a simulated series of motors differing in slot pitch and post height.

Figure 170E:
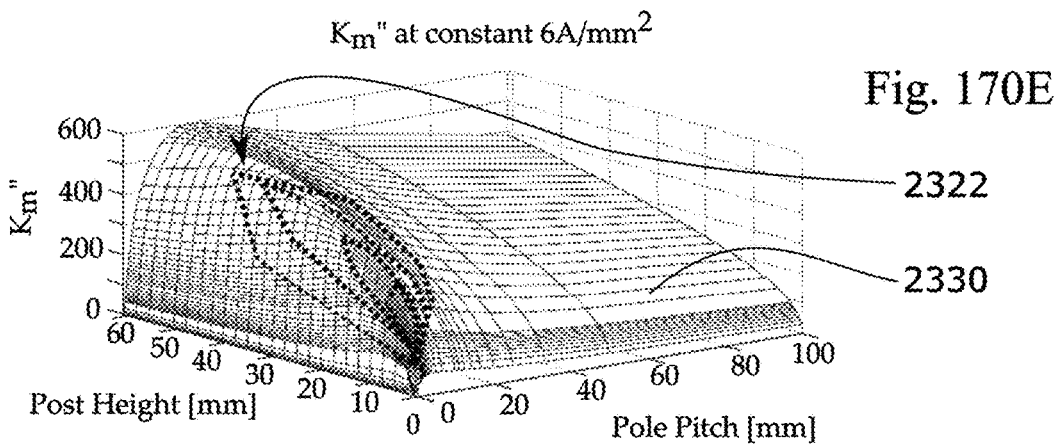

FIG. 170E shows $K_m"$ for a simulated series of motors differing in slot pitch and post height, for a fixed current density.

Figure 170F:
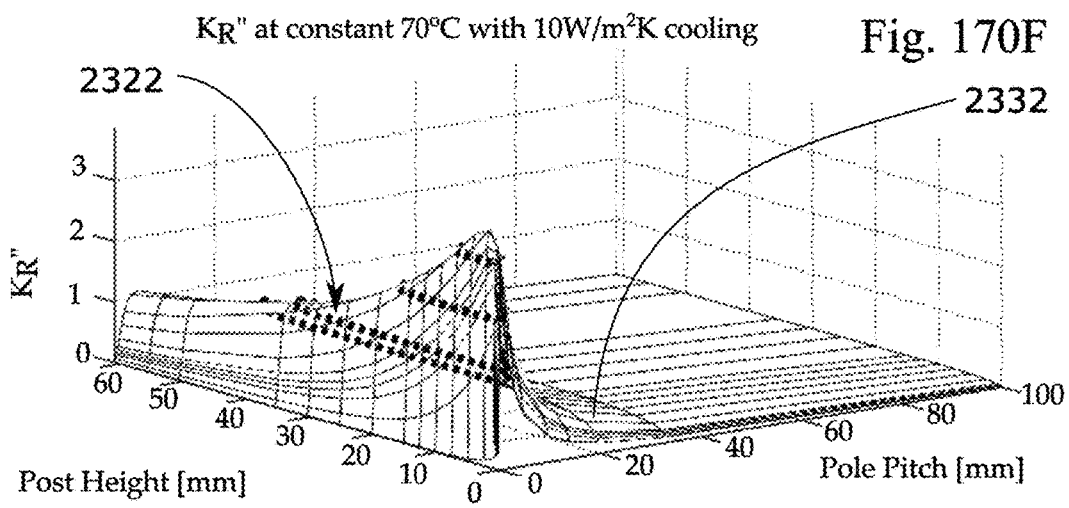

FIG. 170F shows $K_R"$ for a simulated series of motors differing in slot pitch and post height, for a fixed current density.

Figure 171:
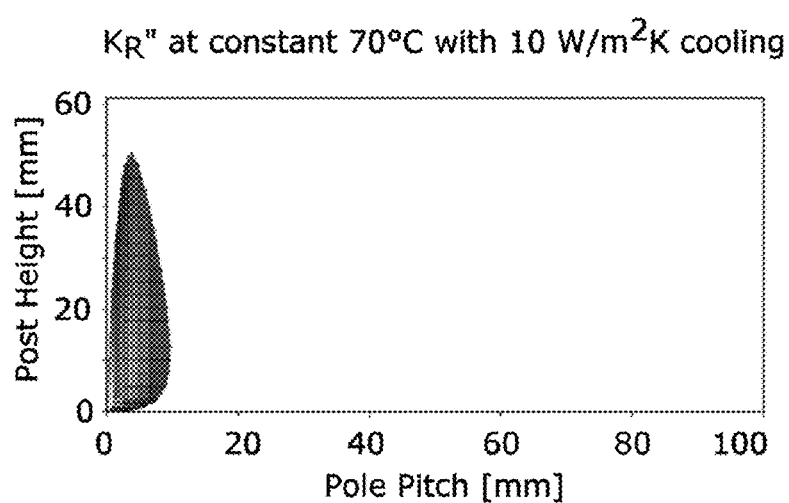
Figure 172:
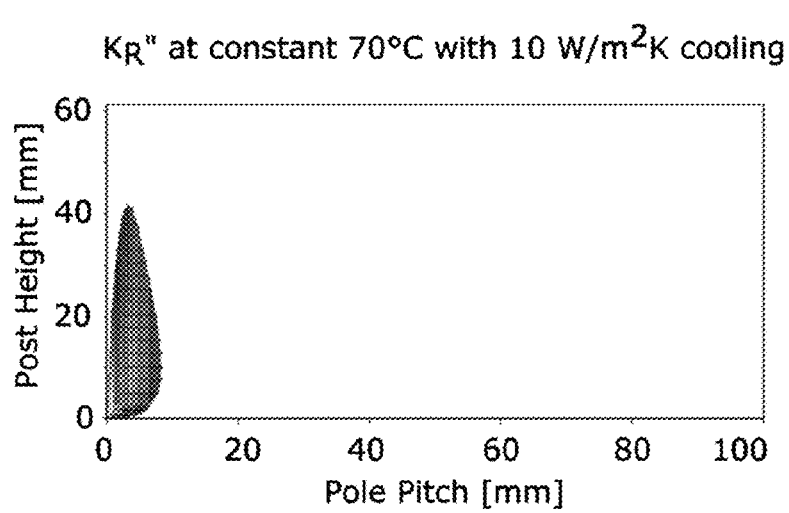
Figure 173:
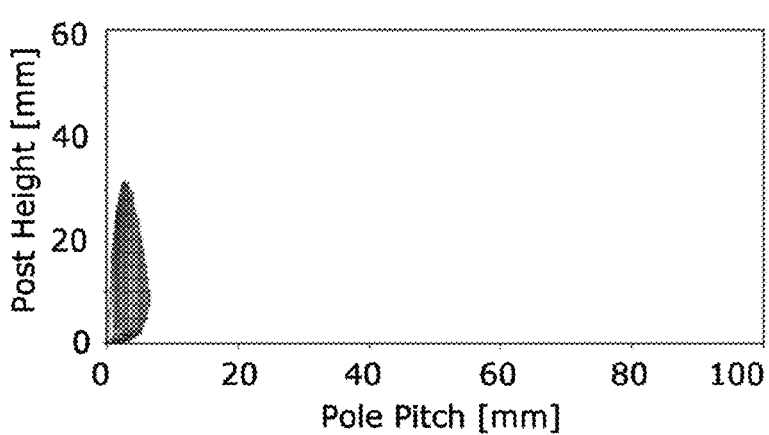
Figure 174:
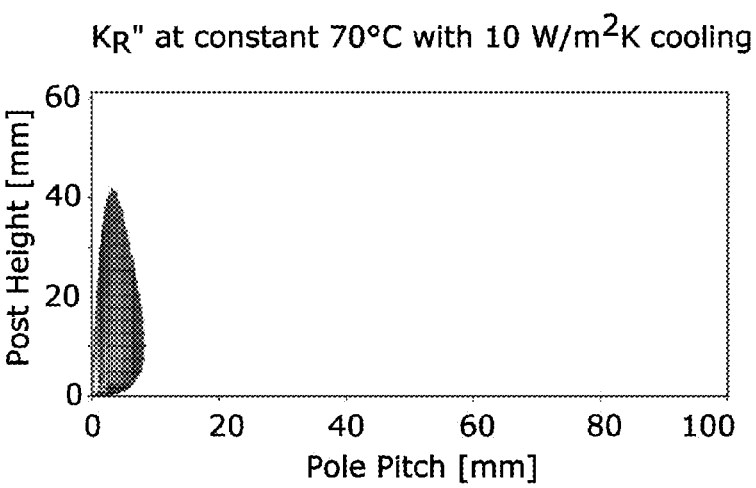
Figure 175:
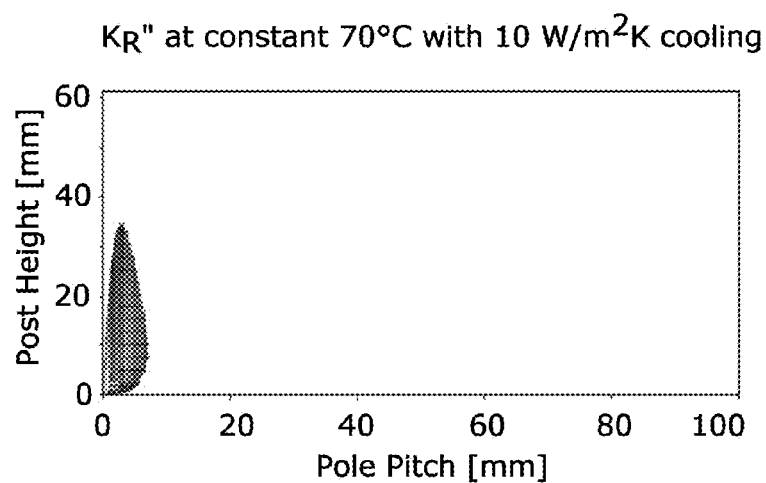
Figure 176:
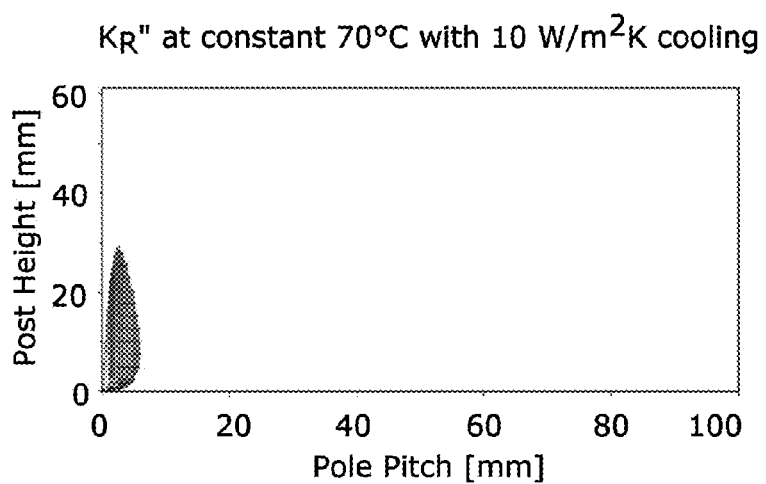
Figure 177:
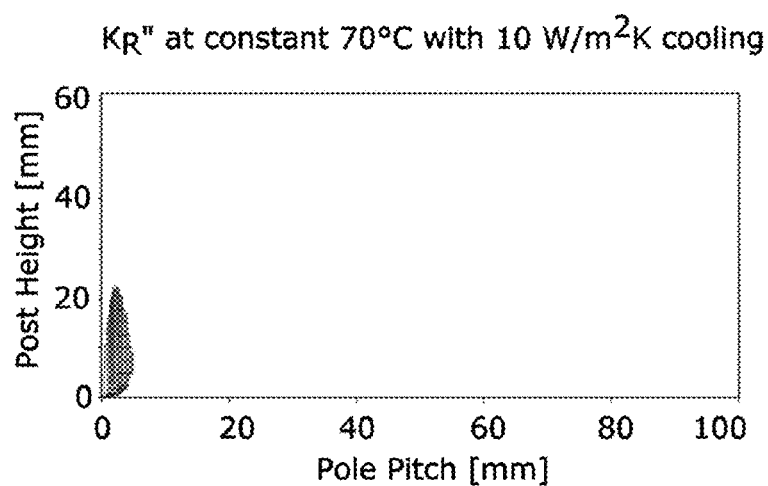
Figure 178:
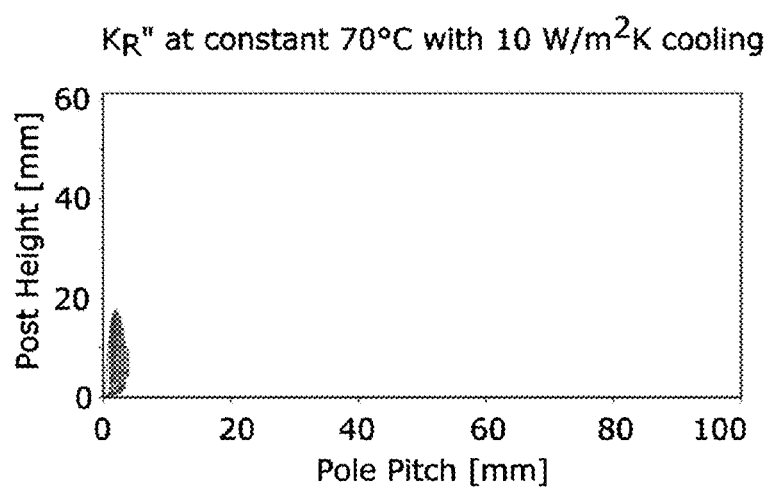
Figure 179:
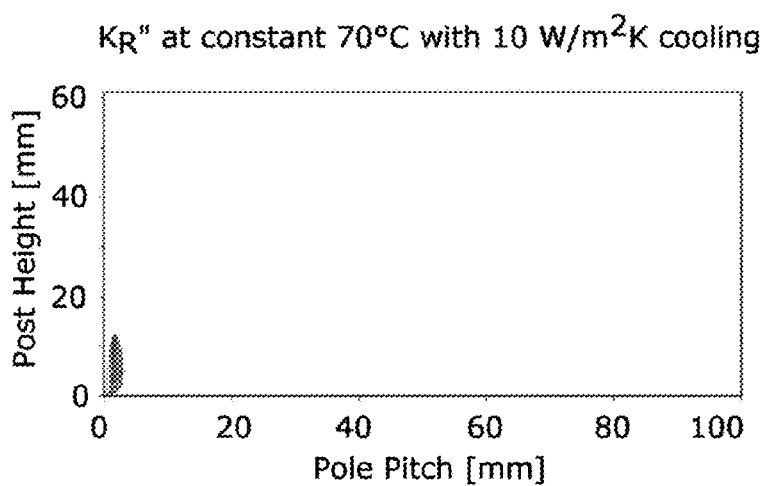
Figure 180:
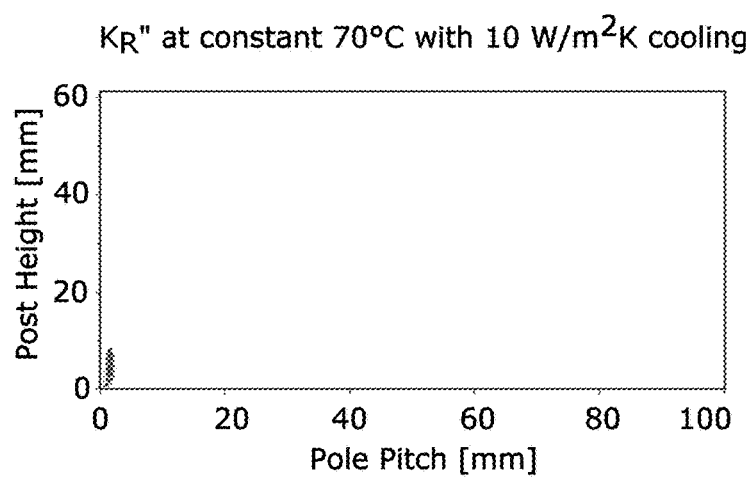
Figure 181:
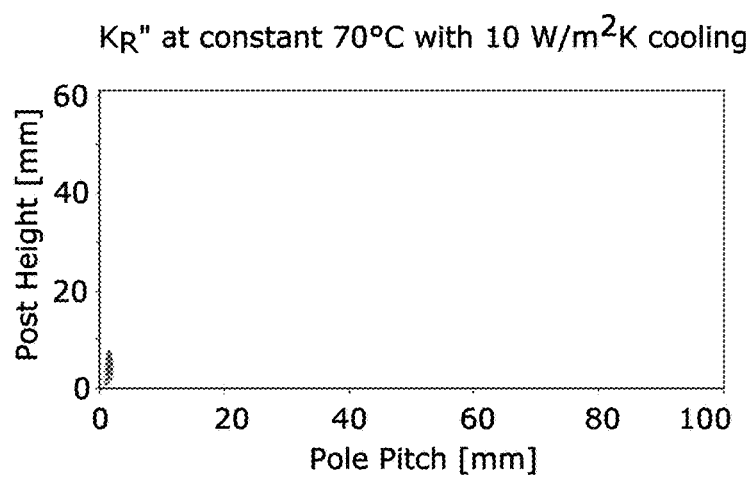
Figure 182:
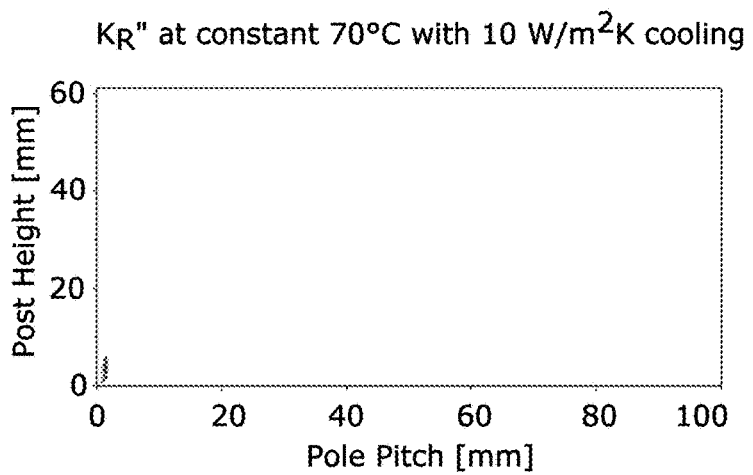
Figure 183:
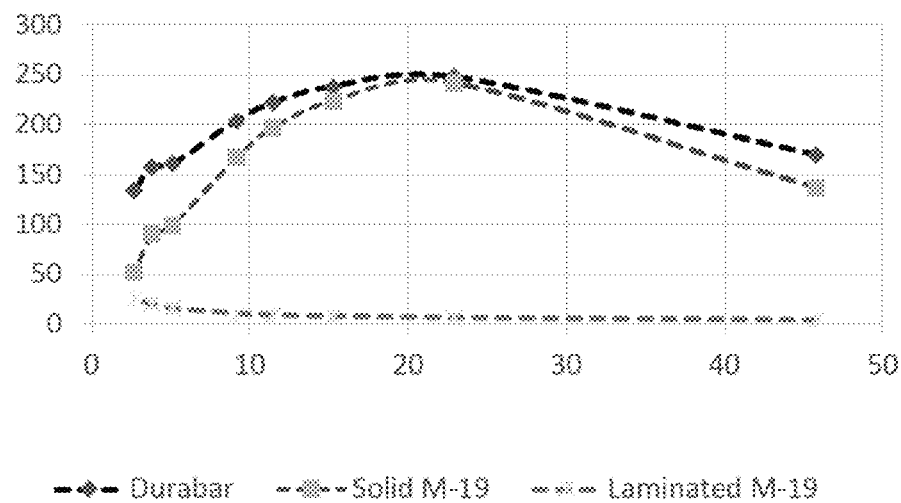

FIG. 171 shows the region of benefit for $K_R"$, with respect to the rest of the geometries in the domain, for a machine with 200 mm size and a boundary line for $K_R">1.3$ FIG. 172 shows the region of benefit for $K_R"$, with respect to the rest of the geometries in the domain, for a machine with 200 mm size and a boundary line for $K_R">1.5$ FIG. 173 shows the region of benefit for $K_R"$, with respect to the rest of the geometries in the domain, for a machine with 200 mm size and a boundary line for $K_R">1.8$ FIG. 174 shows the region of benefit for $K_R"$, with respect to the rest of the geometries in the domain, for a machine with 100 mm size and a boundary line for $K_R">1.5$ FIG. 175 shows the region of benefit for $K_R"$, with respect to the rest of the geometries in the domain, for a machine with 100 mm size and a boundary line for $K_R">1.7$ FIG. 176 shows the region of benefit for $K_R"$, with respect to the rest of the geometries in the domain, for a machine with 100 mm size and a boundary line for $K_R">1.9$ FIG. 177 shows the region of benefit for $K_R"$, with respect to the rest of the geometries in the domain, for a machine with 50 mm size and a boundary line for $K_R">2.2$ FIG. 178 shows the region of benefit for $K_R"$, with respect to the rest of the geometries in the domain, for a machine with 50 mm size and a boundary line for $K_R">2.5$ FIG. 179 shows the region of benefit for $K_R"$, with respect to the rest of the geometries in the domain, for a machine with 50 mm size and a boundary line for $K_R">2.9$ FIG. 180 shows the region of benefit for $K_R"$, with respect to the rest of the geometries in the domain, for a machine with 25 mm size and a boundary line for $K_R">3.3$ FIG. 181 shows the region of benefit for $K_R"$, with respect to the rest of the geometries in the domain, for a machine with 25 mm size and a boundary line for $K_R">3.4$ FIG. 182 shows the region of benefit for $K_R"$, with respect to the rest of the geometries in the domain, for a machine with 25 mm size and a boundary line for $K_R">3.6$ FIG. 183 is a graph showing the sum of the eddy current and hysteresis losses for a motor series across a range of slot pitches at a rotor speed of 200 rpm with no current applied.

Figure 184:
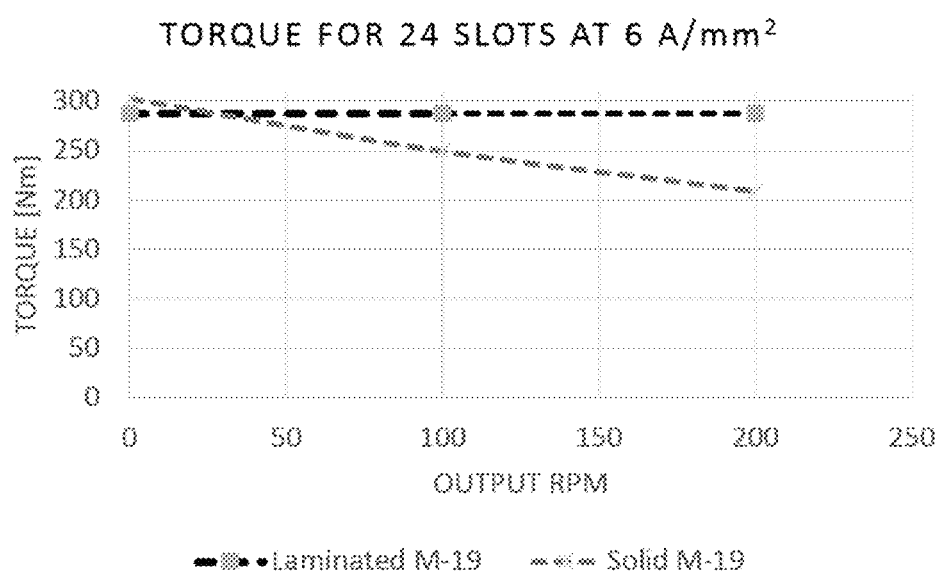

FIG. 184 is a graph showing torque for 24 slot laminated M-19 and solid M-19 stators with an applied current density of 6 A/mm2.

Figure 185:
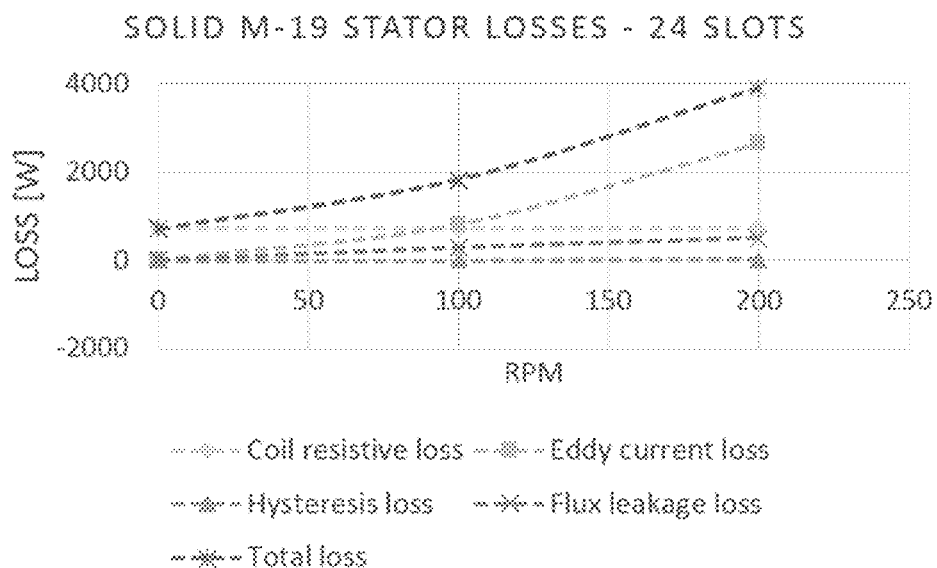
Figure 186:
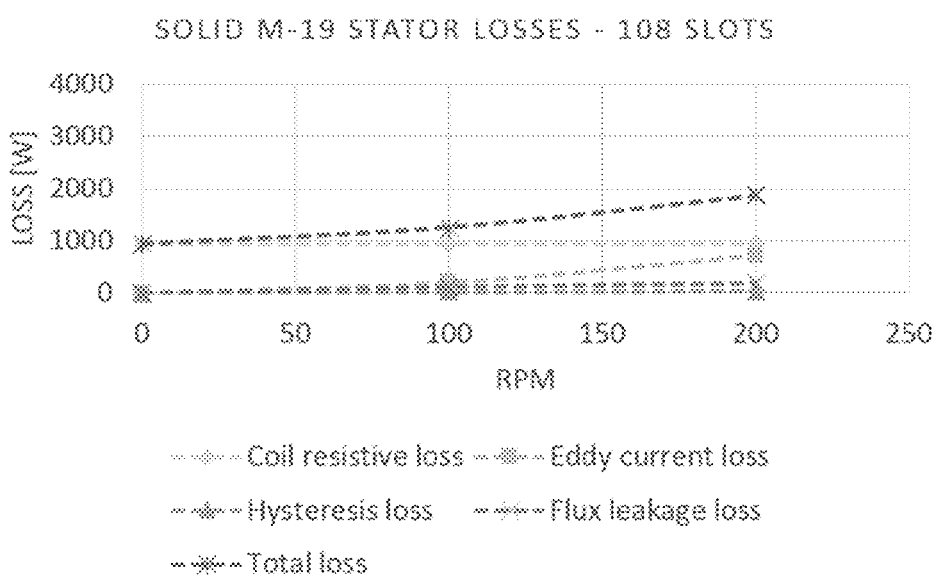

FIG. 185 is a graph showing individual and total stator losses for a 24 slot solid M-19 stator;

FIG. 186 is a graph showing individual and total stator losses for a 108 slot solid M-19 stator.

Figure 187:
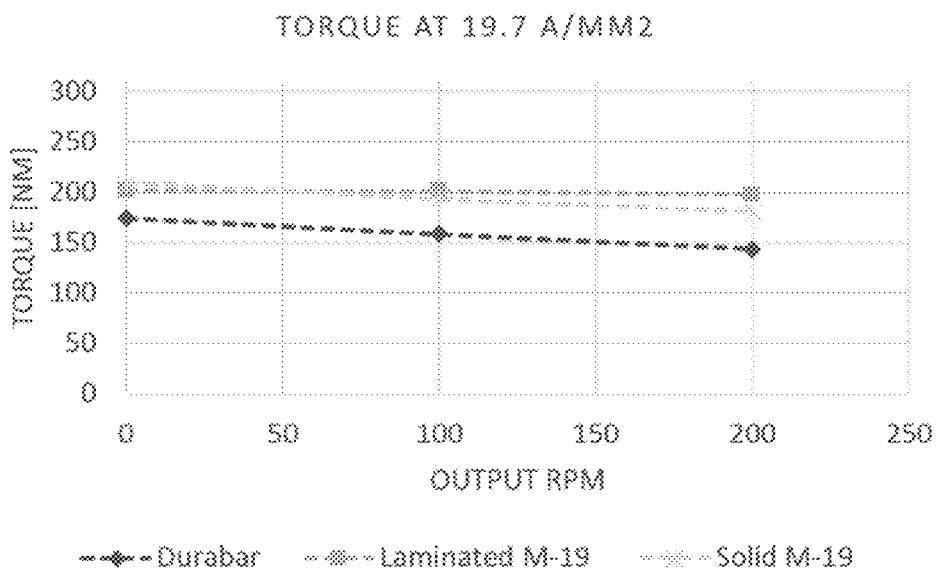

FIG. 187 is a graph showing torque for a 108-slot durabar, laminated M-19 and solid M-19 stators with an applied current density of 19.7 A/mm2.

Figure 188:
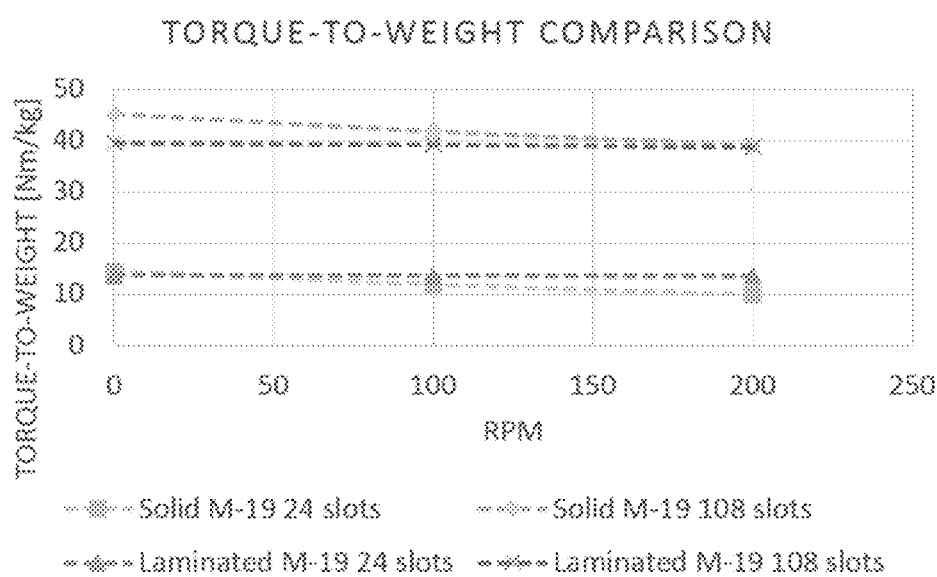

FIG. 188 is a graph showing a torque-to-weight comparison for various motors in a simulation in which very strong NdFeB N52 permanent magnets were used in the rotor.

Figure 189:
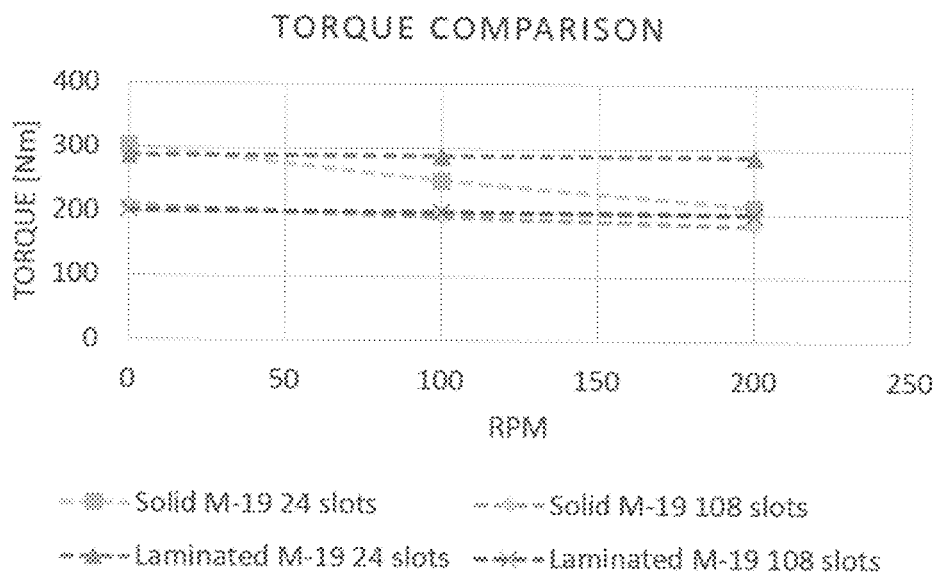

FIG. 189 is a graph showing a torque comparison for various motors.

Figure 190:
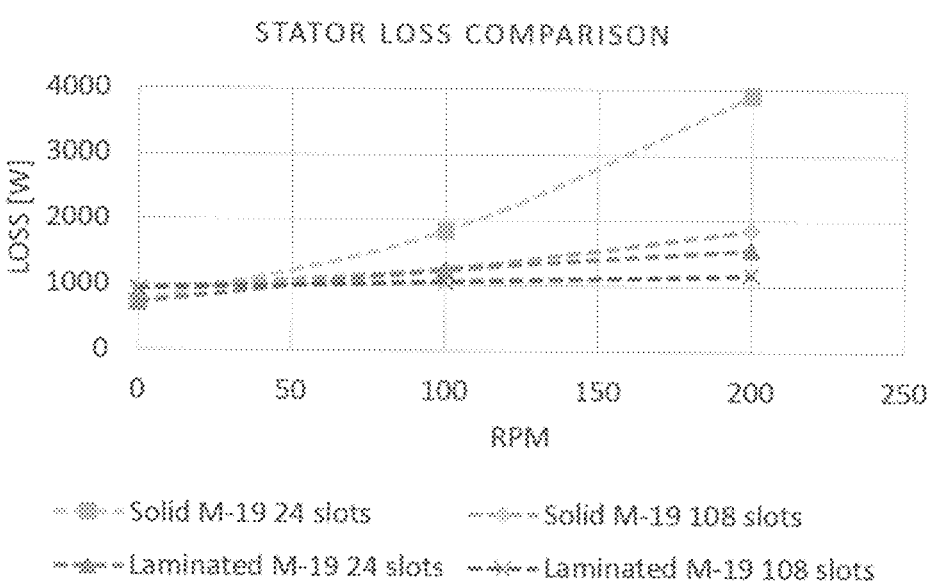

FIG. 190 is a graph showing a stator loss comparison for various motors.

Figure 191:
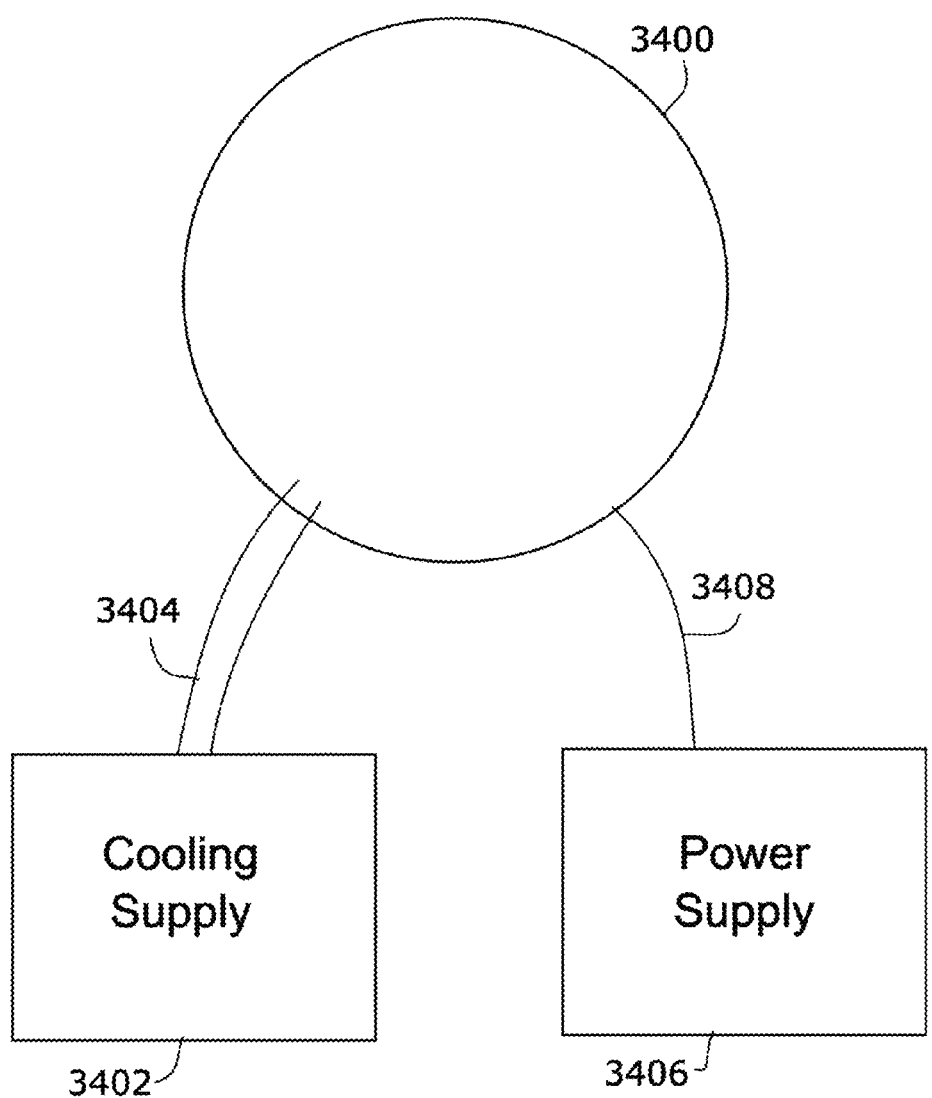

FIG. 191 shows a method of cooling an actuator via a flow channel.

Figure 192:
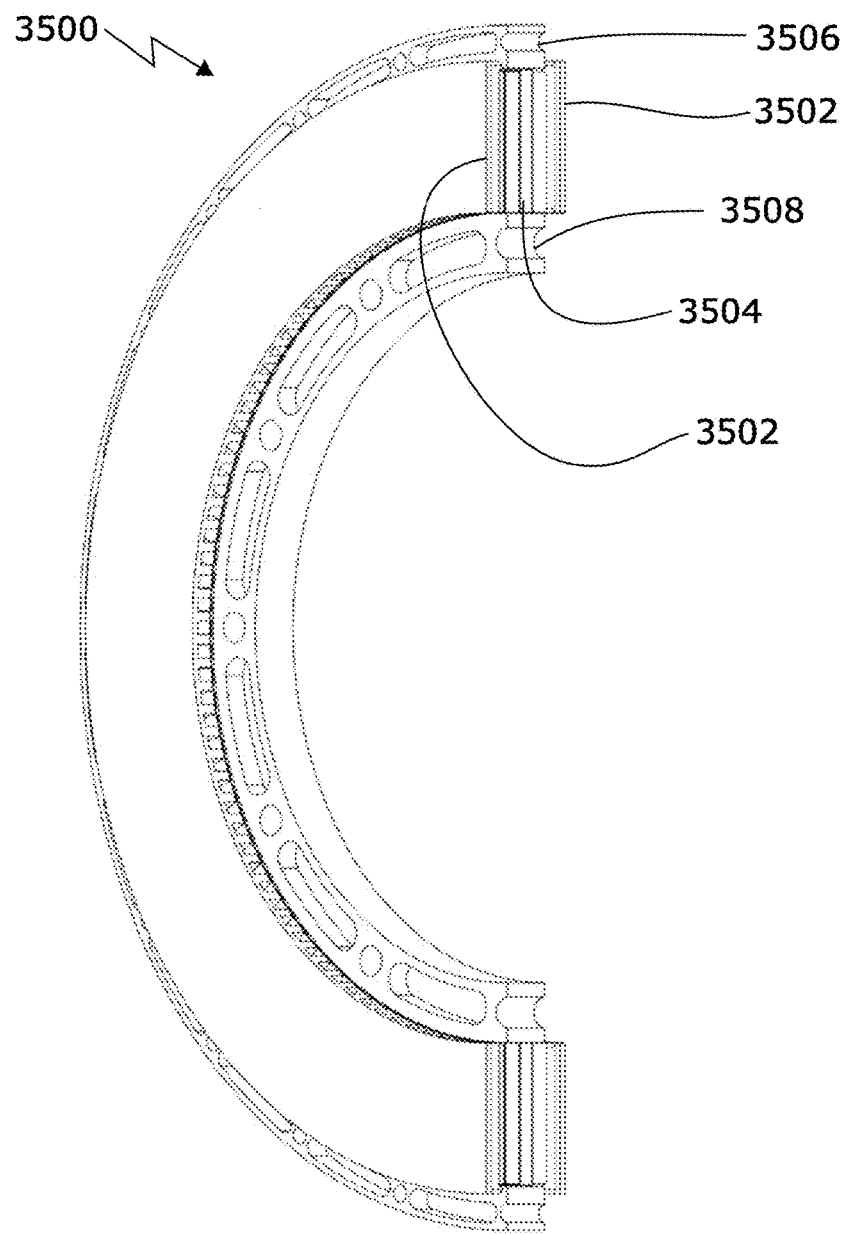

FIG. 192 is a section view of an embodiment of an actuator assembly.

Figure 193:
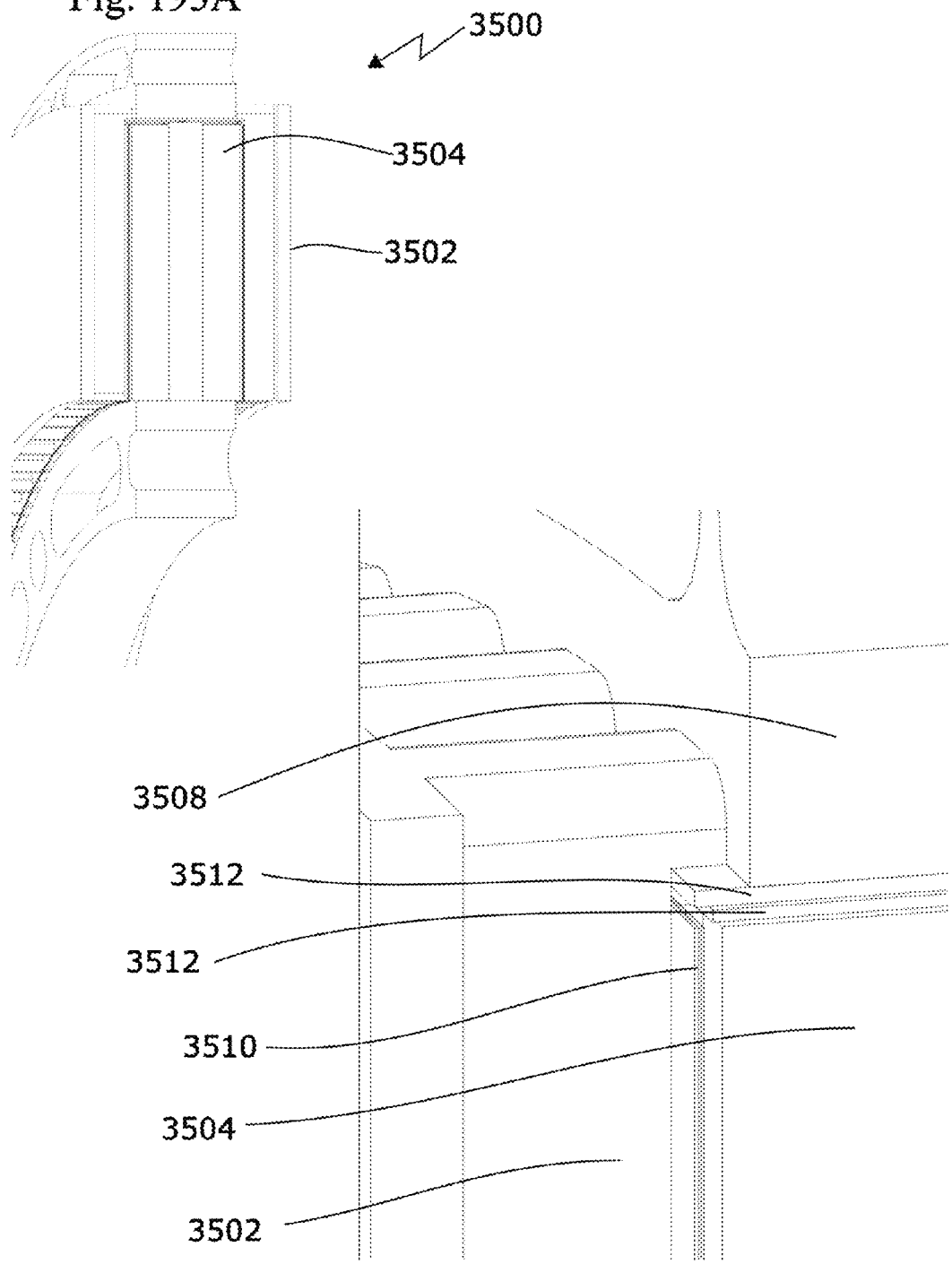

FIG. 193A is a closeup section view of the actuator assembly of FIG. 192.

FIG. 193B is a further closeup of bushings or low friction coating in the section view of the actuator assembly of FIG. 193A.

Figure 194:
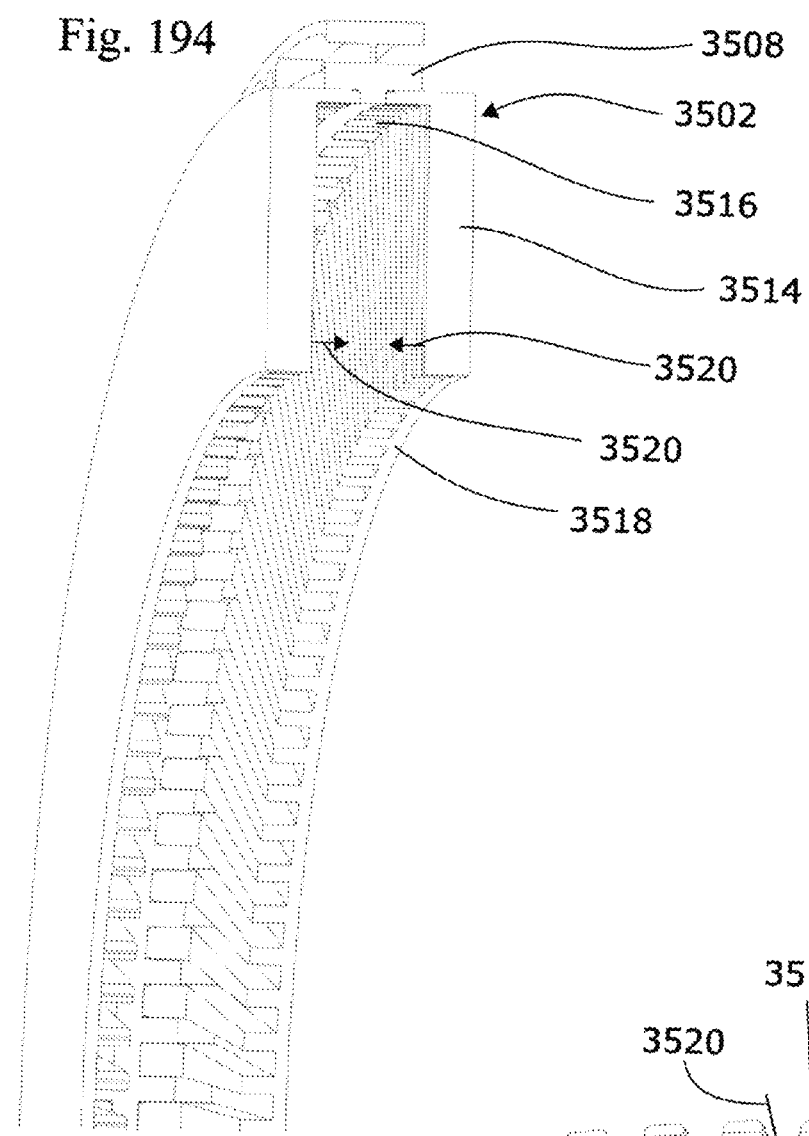

FIG. 194 is a section view of a stator and fixed ring of the actuator assembly of FIG. 192.

Figure 195:
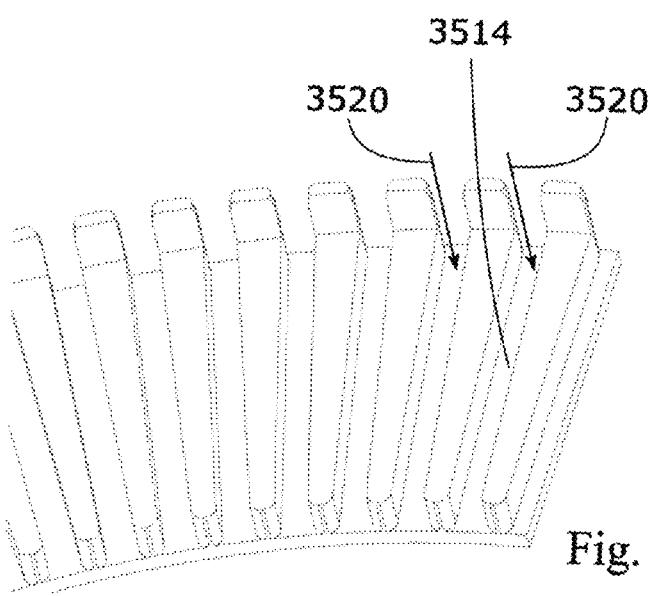

FIG. 195 is a closeup view of an embodiment of a stator for the actuator assembly of FIG. 192, the arrows indicate how the conductors can be place onto the posts over top of the extensions.

Figure 196:
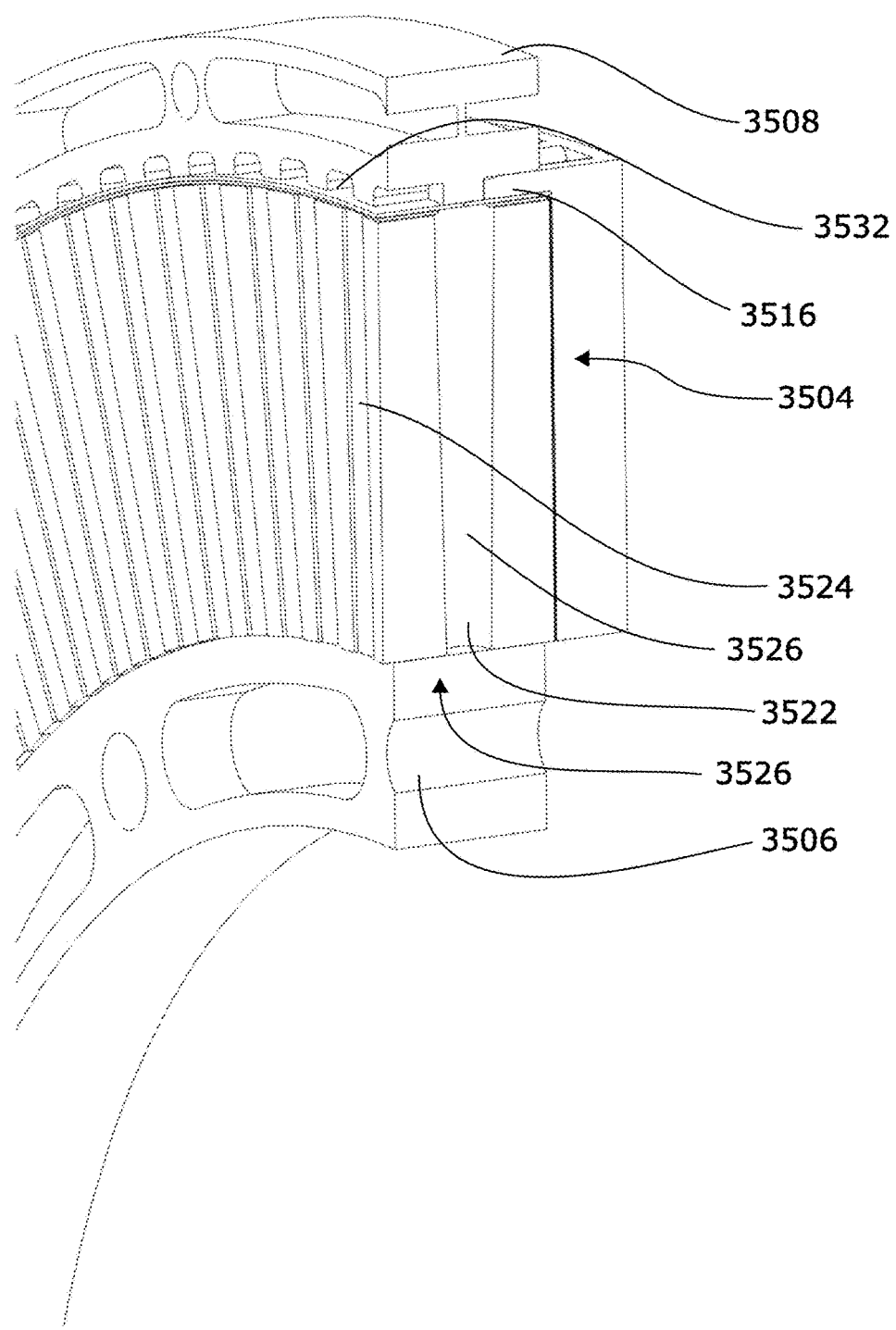

FIG. 196 is a closeup section view of the actuator assembly of FIG. 192 with one stator and the corresponding bushings or low friction coating removed.

Figure 197:
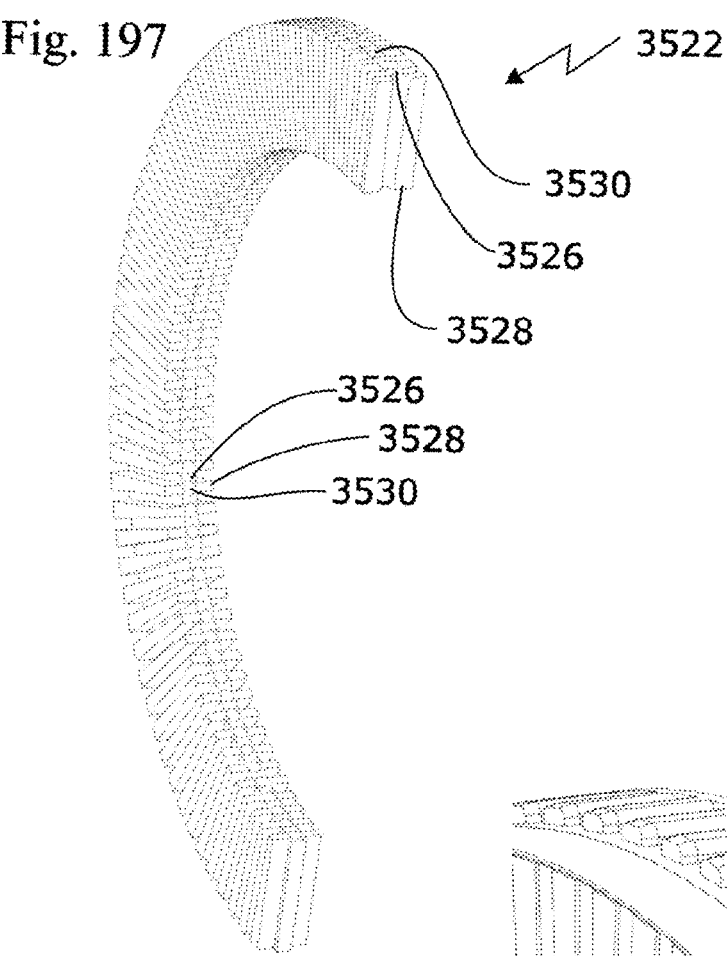

FIG. 197 is a section view of a permanent magnet carrier for the actuator assembly of FIG. 192.

Figure 198:
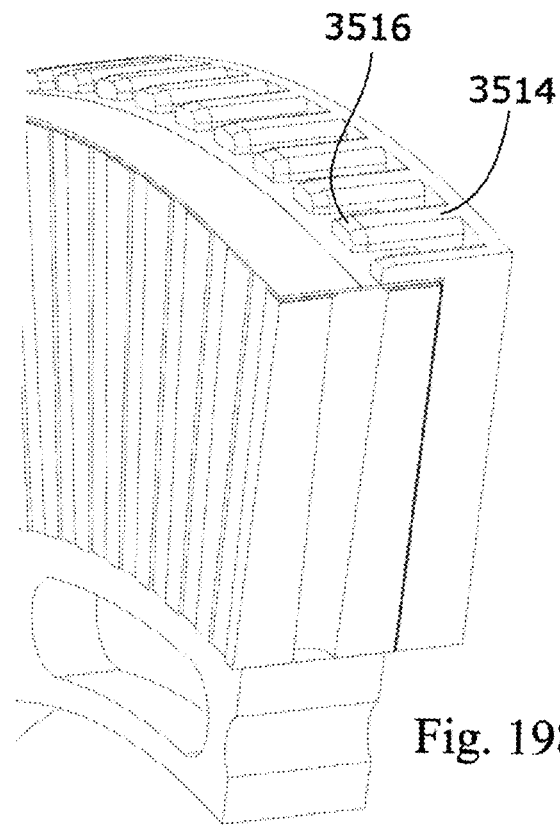

FIG. 198 is a closeup section view of a rotor and stator of the actuator assembly of FIG. 192.

Figures 199A, 199B:
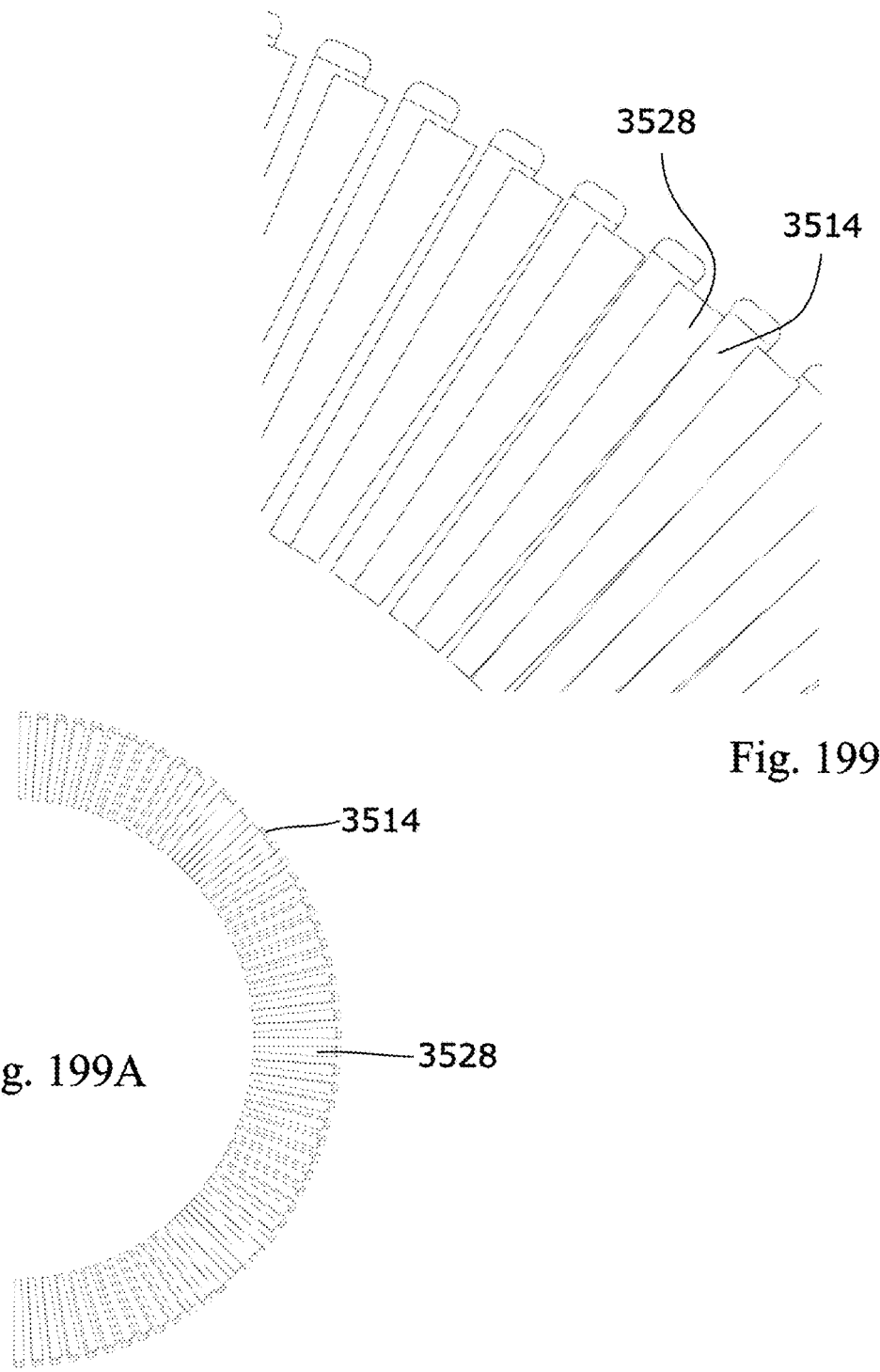

FIG. 199A is an axial isometric view of stator and rotor posts of the actuator assembly of FIG. 192.

FIG. 199B is a further closeup of stator and rotor posts of the actuator assembly of FIG. 199A.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Definitions

Several terms to be used throughout the text will first be defined.

A carrier, as used here in the context of electric machines, may comprise a stator or a rotor when referring to rotary machines.

A rotor as used herein may be circular. A rotor may also refer the armature or reaction rail of a linear motor. A stator may be circular. It may also refer to the armature or reaction rail of a linear motor.

Teeth may be referred to as posts.

In an electric motor, either a stator or rotor may have a commutated electromagnet array defined by coils wrapped around posts, while the other of the stator or rotor may have magnetic poles defined by permanent magnets or coils or both coils and permanent magnets.

Permanent magnets may be used in combinations with electromagnets on the rotor and/or stator to add flux to the system. PM means permanent magnet. EM means electromagnet.

Electromagnetic elements may comprise permanent magnets, posts (teeth), slots defined by magnetic posts, which may be soft magnetic posts, and electrical conductors. In any embodiment where one carrier has slots and posts, the other may have permanent magnets for the electromagnetic elements, and for any such embodiment, the term electromagnetic element may be replaced by the term permanent magnet. Magnetic poles in some cases, for example in a concentrated flux rotor embodiment, may be defined by permanent magnets in conjunction with adjacent posts in which a magnetic field is established by the permanent magnets.

Unless otherwise specified, "flux" refers to magnetic flux.

A fractional slot motor is a motor with a fractional number of slots per pole per phase. If the number of slots is divided by the number of magnets, and divided again by the number of phases and the result is not an integer, then the motor is a fractional slot motor.

A carrier may be supported for motion relative to another carrier by a frame or bearings, and the bearings may be sliding, roller, fluid, air or magnetic bearings. An axial electric machine is an electric machine in which magnetic flux linkage occurs across an axial airgap, and the carriers are in the form of discs mounted coaxially side by side. A first carrier can be arranged to move relative to another carrier by either carrier being supported by a frame, housing or other element, while the other carrier moves relative the first carrier.

A radial electric machine is an electric machine where the airgap is oriented such magnetic flux is radially oriented, and the carriers are mounted concentrically, one outside the other. A linear actuator is comparable in construction to a section of an axial flux or radial flux rotary motor where the direction of motion is a straight line rather than a curved path.

A trapezoidal electric machine is an electric machine that is a combination of both an axial and radial flux machines, where the plane of the airgap lies at an angle partway between the planes formed by the airgaps in the axial and radial configurations.

The airgap diameter for a rotary machine is defined as the diameter perpendicular to the axis of rotation at the centre of the airgap surface. In radial flux motors, all of the airgap resides at the same diameter. If the airgap surface is a disc-shaped slice as in axial flux motors, the average airgap diameter is the average of the inner and outer diameter. For other airgap surfaces such as a diagonal or curved surfaces, the average airgap diameter can be found as the average airgap diameter of the cross-sectional airgap view.

For a radial flux motor, the airgap diameter refers to the average of the rotor inner diameter and stator outer diameter (for an outer rotor radial flux motor) or the average of the rotor airgap outer diameter and stator airgap inner diameter (for an inner rotor radial flux motor). Analogues of the airgap diameter of a radial flux motor may be used for other types of rotary motors. For an axial flux machine, the airgap diameter is defined as the average of the PM inner diameter and PM outer diameter and EM inner diameter and EM outer diameter.

Size of an electric machine means the airgap diameter of an axial flux machine or radial flux machine as defined herein or the length in the direction of translation of the carriers of a linear machine. For linear machines where one carrier is longer than another, then the length is the length of the shorter carrier. For use with reference to the boundary inequalities, the size of a rotary machine is given in terms of diameter, but for a linear machine it is the length that corresponds to a circumference of a rotary machine. Therefore, the size X of a linear motor that corresponds in the equations to a rotary motor of size Y is related to Y as X=pi*Y. This size of any rotary electric machine for the purpose of the disclosed range, as a general principle and including transverse flux machines, is defined as the average of the largest and smallest diameters defined by the magnetically active airgap when it is projected onto the plane that is perpendicular to the axis of rotation The back surface of the stator is defined as the surface on the opposite side of the stator to the surface which is at the magnetically active airgap. In a radial flux motor, this would correspond to either the inner surface of the stator for an outer rotor configuration, or the outer diameter surface of the stator for an inner rotor configuration. In an axial flux motor, the back surface of the stator is the axially outer surface of the stator.

$K_m$ is defined as the stall torque divided by the square root of the electrical resistive losses of a motor. In this patent document, it is proposed to assess motor performance using $K_m$ divided by the active magnetic mass of the motor, referred to in this disclosure as KR or $K_R$. The active magnetic mass consists of the rotor and stator mass including magnets, coils, teeth, and backiron as is commonly reported by the manufacturers of frameless motors. The $K_R$ metric may be useful in assessing motor performance for applications where a low motor mass is beneficial to overall power consumption, such as robotics. In some cases, size-independent analogues of $K_m$ and $K_R$, namely $K_m"$ and $K_R"$ are used throughout the text. The conversion between the size-dependent and size-independent metrics is:

$$K_m = \frac{K_m'' \sqrt{\pi L}\, D^{3/2}}{2}$$

and $$K_R = \frac{K_R'' \sqrt{D/\pi L}}{2},$$

where D is the average airgap diameter and L is the radial tooth length. For a given size of motor, D and L are taken to be fixed in the analysis, therefore $K_R$ or $K_m$ will be proportional to $K_R"$ or $K_m"$. Consequently, statements relating to trends in $K_R$ will, in general, implicitly be held to apply to $K_R"$ as well.

Slot density is the number of slots divided by the circumferential length of machine at the average airgap diameter. If the pitch of the slots varies, the average slot density of a device will be used. Slot density can also be represented by the inverse of the slot pitch. It is a measure of how many slots occur per mm of circumferential length along the airgap at the airgap diameter (or its analogue). For rotary motors, it has the following equation:

$$\text{Slot density} = \frac{N_s}{\pi D_{AG}}$$

where $N_S$ is the number of slots, and $D_{AG}$ is the diameter of the airgap. For the case of a linear motor, the denominator of this function would be replaced by the length of the carrier along the direction of translation.

Pole density is the number of poles divided by the circumferential length of machine at the average airgap diameter. If the pitch of the poles varies, the average pole density of a device will be used. Pole density can also be represented by the inverse of the pole pitch. The pole pitch is defined as the average distance at the average airgap between the center of a PM pole of one polarity to the center of the next PM pole on the same carrier having the opposite polarity, measured along the direction of motion. In rotary motors this distance is a circumferential pitch measured at the average airgap diameter, DAG. It is a measure of how many poles occur per mm of circumferential length along the airgap at the airgap diameter (or its analogue). For rotary motors, it has the following equation:

$$\text{Pole density} = \frac{N_p}{\pi D_{AG}}$$

where Np is the number of poles, and $D_{AG}$ is the diameter of the airgap. For the case of a linear motor, the denominator of this function would be replaced by the length of the carrier along the direction of translation.

For distributed windings, the number of slots will be N×the number of poles where N is a multiple of the number of phases. So for a 3 phase machine N could be 3, 6, 9, 12, etc. For concentrated windings, the number of slots can vary but must be a multiple of the number of phases. It does not depend on the number of poles, except that certain combinations of slots and poles will yield higher torque and better noise-reduction or cogging-reduction characteristics. The minimum number of slots for a given number of poles should not be below 50% to obtain adequate torque.

Conductor volume may be used to refer to the slot area per length of a single stator. The slot area is the area of a cross-section of a slot in the plane which is orthogonal to the teeth but not parallel to the plane of relative motion of the carriers. In an axial motor, this plane would be perpendicular to a radius passing through the slot. The slot area effectively defines the maximum conductor volume that can be incorporated into a stator design, and it is usually a goal of motor designers to have as high a fill factor as possible to utilize all the available space for conductors.

Since maximum conductor volume in a stator is defined in terms of slot area, any stator referred to as having a maximum conductor volume or slot area must have slots and teeth to define the slots. This parameter is defined for rotary motors as:

$$\text{Slot area per length} = \frac{N_s A_s}{\pi D_{AG}} = \text{slot density} \cdot A_s$$

where $A_S$ is the cross-sectional area of a single slot, or the average area of a single slot for stator designs that have varying slot areas.

As a relatively accurate approximation, $A_S$ may be calculated as the height of the tooth, $h_t$, multiplied by the average width of the slot, $w_s$, such that the equation above becomes:

$$\text{Slot area per length} = \frac{N_s h_t w_s}{\pi D_{AG}} = \text{slot density} \cdot h_t w_s$$

These definitions are size-independent. They can be used to characterize any motor.

Pole pitch and tooth height may be used to define a specific stator or rotor geometry. Since the parameters are size-independent, measures of benefit disclosed herein are likewise size-independent, being written in terms of force per area and force per mass, where mass refers to the mass of the stator and rotor including any magnets and coils, such that the torque and torque per mass for any size rotary motor can be found by an appropriate multiplication factor containing the radius at the airgap. For any two motors of the same airgap diameter, the graphs will have the same contours for torque as for force/area, and for torque density as for force/mass.

A cooling channel is any structure that defines a flow path for cooling fluid, including gas flow or liquid flow, such as passages defined by fins, or unoccupied spaces in slots, or conduits through or around a structure.

Slot depth or post height may also be used as a proxy for the conductor volume. The post height, also known as the tooth height or slot depth, is a proxy for the amount of cross-sectional area in a slot available for conductors to occupy. Although the slots may have a variety of shapes such as curved or tapered profiles, the slot height is based upon the closest rectangular approximation which best represents the total area of the slot which may be occupied by conductors. This dimension does not include features such as pole shoes which add to the height of the tooth without adding substantially to the slot area. For transverse flux motors, the post height is defined as the portion of the post which is directly adjacent to the conductor coil, perpendicular to the direction of the coil windings.

A motor series is a set of motor geometries represented by analysis that have the same construction and winding but with one or two differences such as, a range of pole pitches, or a range of post heights.

Number of rotor poles is equal to the number of regions of alternating polarity magnetic flux across the airgap. For example, in a surface permanent magnet rotor, the number of poles is determined by the number of alternating polarity permanent magnets. However, poles may also be created by groups of magnets such as in a Halbach array, by electromagnets, or by combinations of electromagnets and permanent magnets. A conductor layer is an electrical conductor formed as a unit that establishes a conductive path that does not intersect itself when the conductor is viewed in plan view. The conductor layer may thus be placed directly around posts with minimal or no plastic deformation of the layer. Each conductor layer occupies a different part of slots at different levels of the slots, for example corresponding to different axial positions in an axial flux machine or different radial positions in a radial flux machine. In some embodiments, a conductor layer may be made of a material with sufficient rigidity that it can be placed over posts and into slots as a unit, without being individually helically wound on to the posts.

A continuous stall torque of a direct drive motor is the continuous torque output at zero speed where the produced heat and dissipated heat reach equilibrium for a given cooling means that is at the maximum allowable electrical conductor temperature.

A concentrated winding comprises individually wound posts or any winding configuration that results in the alternating polarity of adjacent posts when energized. It is understood that not all posts will be the opposite polarity of both adjacent posts at all times. However, a concentrated winding configuration will result in the majority of the posts being the opposite polarity to one or both adjacent posts for the majority of the time when the motor is energized. A concentrated winding is a form of fractional slot winding where the ratio of slots per poles per phase is less than one.

The term 'solid stator' refers to a homogenous magnetically susceptible support structure functioning as a stator of an electric machine.

Exemplary Radial Flux Electric Machine

Figure 1:
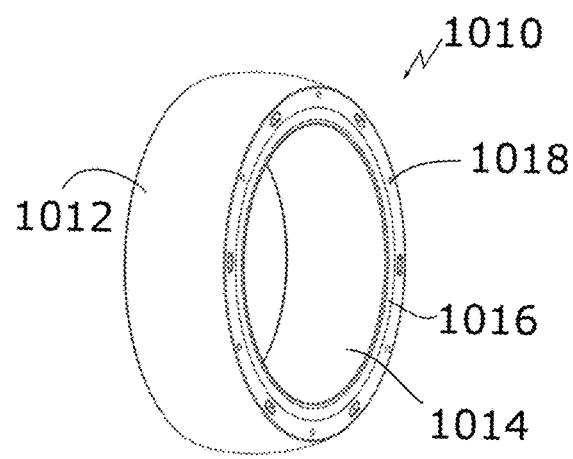
FIG. 1 is a CAD model of a complete exemplary actuator prototype.

FIG. 1 shows a CAD model of a complete exemplary actuator 1010 prototype with an outer housing 1012 and an inner housing 1014. The inner housing 1014 is the fixed (or reference) member, and the outer housing 1012 is the rotating member. Housings can be made of any rigid material such as, but not limited to aluminum, steel or plastic. The exemplary actuator 1010 comprises a bearing/seal 1016 and output mounting holes 1018. The prototype shown in FIG. 1 has produced a high torque to weight ratio. This is important for applications such as, but not limited to, robotics. The design shown in FIG. 1 has slot density and post height that comes within the definition of slot density and post height that is believed to provide a benefit in terms of KR, thus being especially suitable for use in robotics applications.

Figure 2:
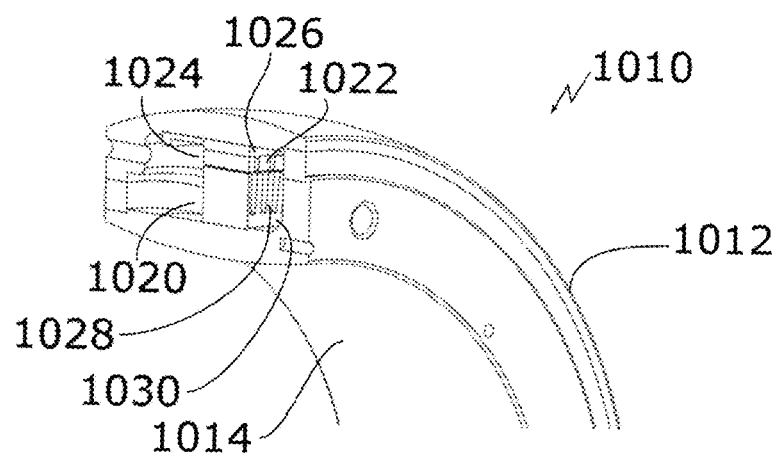
FIG. 2 is a section view of the exemplary actuator in FIG. 1.

FIG. 2 shows a section view of the same exemplary actuator 1010 with an internal stator 1020 attached to the inner housing 1014 and an external rotor 1022 attached to the outer housing 1012. The rotor 1022 comprises permanent magnets 1024 attached to a rotor yoke 1026. The stator 1020 comprises stator teeth 1028 attached to a stator yoke 1030. The stator 1020 is made of a soft magnetic material such as but not limited to laminated electrical steel. Solid material can be used for the stator 1020 such as but not limited to powdered soft magnetic materials that exhibit reduced eddy currents and/or reduced hysteresis. Due to the unusually thin flux path cross section of this device which will reduce eddy current losses, solid steel or iron may be used for the stator 1020 with acceptable performance in certain lower speed applications. The section view in FIG. 2 shows simplified bearings 1016 and no coils on the stator 1020.

Figure 3:
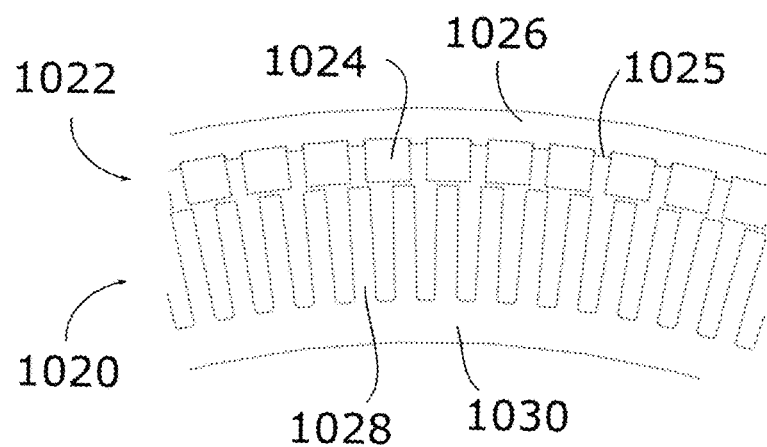
FIG. 3 shows a side view detail of the stator and rotor of the exemplary actuator in FIG. 1.
Figure 4:
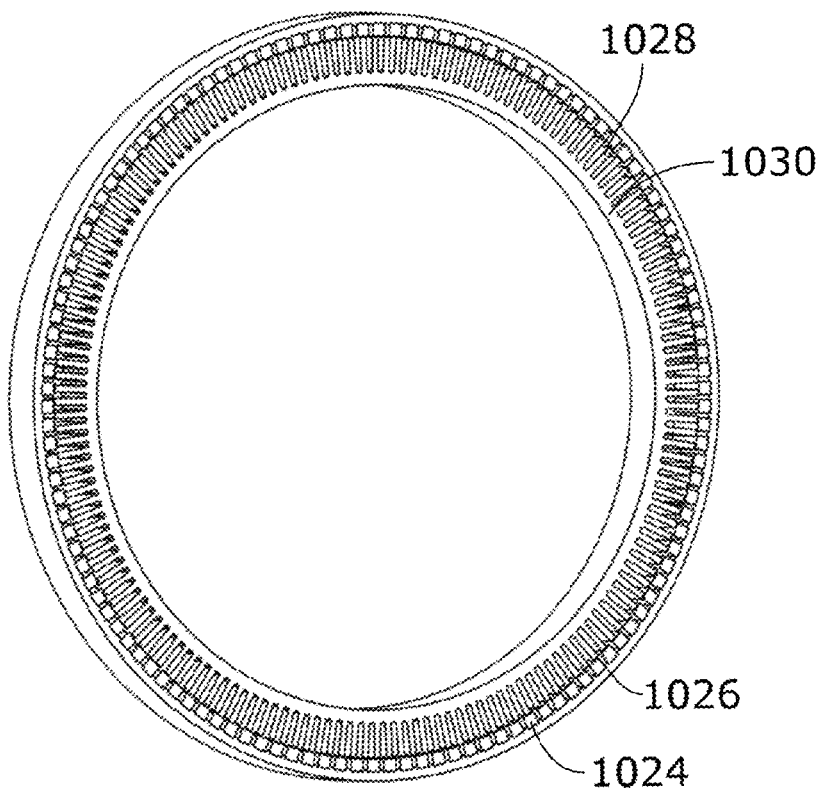
FIG. 4 shows a schematic of the entire stator and rotor of the exemplary actuator in FIG. 1.

FIG. 3 shows a side view detail of the stator 1020 and rotor 1022 (no coils shown in this figure for clarity of illustration). FIG. 4 shows a schematic of the entire stator 1020 and rotor 1022 with permanent magnets 1024 on the rotor 1022 but no coils on the stator 2010.

With a slot density in the range of 0.16 to 0.5 and higher, for example, and considering that it is not unusual for a slot to be about as wide as a tooth, tooth width can be in the order of 2 mm for a 200 mm wide machine. Wider or narrower teeth can be used. An advantage of thinner teeth is that solid materials may be used with minimal eddy currents due to the teeth being closer to the thickness of normal motor laminations. A common motor lamination can be in the range of 0.015" to 0.025". This prototype has performed satisfactorily with a hot rolled steel core. This has advantages for low cost manufacturing. Other advantages of using a solid core include the possibility of higher flux densities in materials like iron. Permanent magnets 1024 may be adhered to a soft magnetic material rotor 1022. Spacers 1025, shown in FIG. 3, in the rotor 1022 are not necessary but may be used to ensure the magnets 1024 are assembled at the correct spacing.

FIG. 1 to FIG. 5 show a non-limiting example of a 4:3 post 1028 to PM 1024 ratio according to the principles disclosed here for a four phase configuration. In general, for n phases, there may be a ratio of posts to poles of n:n−1, where the number of poles may be the number of permanent magnets. A 3:2 ratio may be used (with three phases), or possibly a 2:1 (with two phases) ratio or a 5:4 ratio (with five phases) or a 6:5 ratio (with six phases) or a 7:6 ratio (with seven phases) and so on. 4:3 has shown to be a ratio which produces high torque and is used as a non-limiting example here. Or there may be n phases, with a ratio of posts to poles of n:n+1. Many other post-to-PM ratios and combinations are possible and can be used according to the principles of this device.

Figure 5:
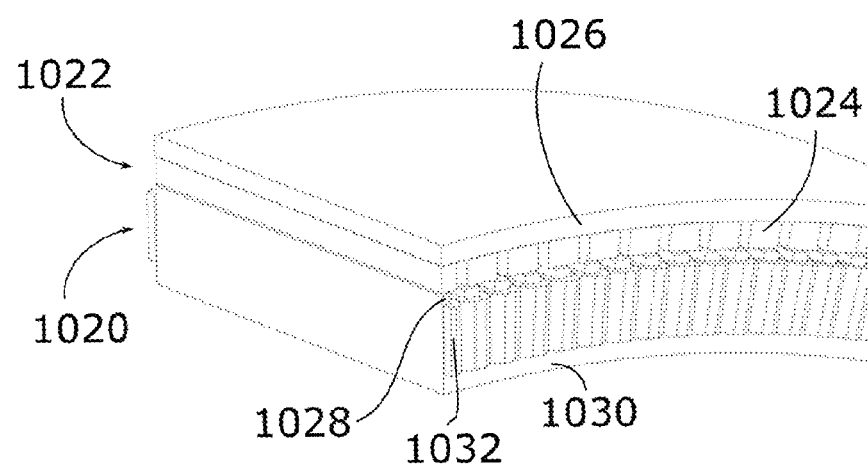
FIG. 5 shows a simplified schematic section view of the stator and rotor of the exemplary actuator in FIG. 1, with schematic CAD model coils on the posts.

The embodiment of FIG. 1 to FIG. 5 has 172 posts, but an electric machine with the proposed slot density may have greater or smaller number of posts. A minimum number of posts may be 100 posts to obtain sufficient torque density for some robotic applications. FIG. 5 shows a simplified schematic section view of the stator 1020 and rotor 1022 with schematic CAD model coils 1032 on the posts.

For a 4 phase configuration of an electric machine as disclosed, the number of posts may be divisible by 8, with a ratio of 4 posts to 3 permanent magnets. The permanent magnets may be arranged with an alternating radial polarity.

A high number of posts allows fewer windings per post. In a non-limiting exemplary embodiment, the windings on each posts are only one layer thick (measured circumferentially, outward from the post). This reduces the number of airgaps and/or potting compound gaps and/or wire insulation layers that heat from the conductors must conduct through for the conductors to dissipate heat conductively to the stator posts. This has benefits for heat capacity (for momentary high current events) and for continuous operation cooling. When direct cooling of the coils by means of gas or liquid coolant in direct contact with the conductors, a low number of circumferential layers, and for example a single circumferential layer of wire on a post, combined with high slot density, results in a very high surface area of the conductors (relative to the volume of the conductors) exposed to the cooling fluid. This is beneficial for cooling the conductors and is one of many exemplary ways to take advantage of low conductor volume of an embodiment of an electric machine. A single row (or low number of rows) of coils per posts also reduces manufacturing complexity allowing for lower cost production. In another embodiment, the windings of each post are two layers thick.

Exemplary Linear Electric Machine

Figure 6:
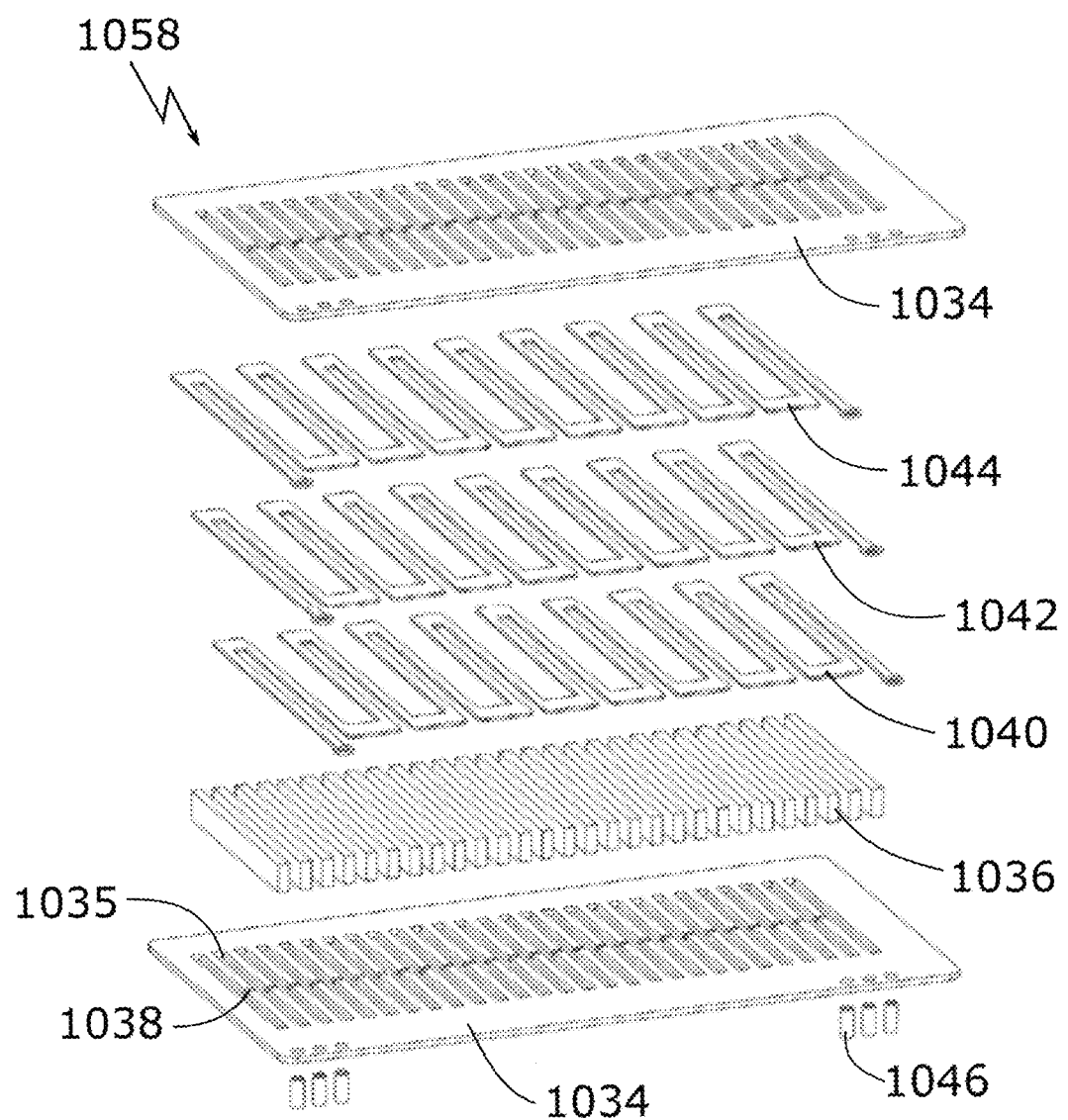
FIG. 6 shows a non-limiting simplified exemplary embodiment of a stator of a linear electric machine.

In an embodiment, such as shown in FIG. 6, an electric machine may be built with a stratified construction which allows main components to be fabricated from, for example, sheet stock of conductor material such as, but not limited to, copper, and insulator materials such as, but not limited to, hard anodized aluminum, with high speed and low cost manufacturing processes such as, but not limited to, stamping or fine blanking. Instead of winding conductor wires around posts, the conductor circuits may be stamped and then assembled in layers. If insulator layers are used alternately with each conductor layer, the conductor layers may, in some configurations, be assembled without insulation coating. Alternately, conductor circuit layers can be coated with insulation before assembly for additional insulation effectiveness, or to eliminate the need for separate insulating layers.

Insulating layers can be of many different types of material. Aluminum is a material which can be stamped or fine blanked and then hard anodized. Hard anodized aluminum provides high voltage insulation and excellent heat conduction away from conductors. It also provides excellent structural integrity. Conductor and insulating layers can be fixed together with a number of possible adherents including but not limited to, epoxy, potting compounds, thermally activated adhesives, and thermoplastic adhesives.

Non-electrically conductive (or insulated electrically conductive) materials may be used on the same strata as the conductive layers to provide structural integrity and heat sink/dissipation qualities. These non-filled layers in the slots between conductor layers can also be used to provide a flow path for a cooling gas or liquid so that the open slots form conduits. Cooling fluid may also be used as an air or liquid bearing medium. Many different materials may be used for spacer layers including, but not limited to anodized aluminum, Torlon™ (a reaction product of trimellitic anhydride and aromatic diamines), phenolic, or a composite material such as, but not limited to a metal matrix composite.

Each conductor may be a layer. Layers may be made up of one or more sections. A section can be, for example, an entire length of a linear motor, or a complete circumference of a rotary motor, or it can be two or more lengthwise sections of a linear motor or two or more angular sections of a rotary motor. Each layer in each section may be a conductor circuit for only one phase. In a common electrical machine with wire windings, the conductor wire is helically wound and overlaps other wire in that phase and/or wire from other phases. This type of 3-dimensional wire winding configuration cannot be fabricated with a single layer per phase because a simple layered assembly does not allow the interwoven or helically overlapping construction that typical post winding requires.

A wiring may be used to create a poly-phase motor with each adjacent slot comprising conductors from a different phase or different combination of phases than an adjacent slot. This has a number of advantages which include simplified manufacturing for reduced cost and the ability to provide very effective cooling as described below.

The conductor manufacturing methods disclosed are especially effective in constructing devices with high slot density, as they may replace high precision wire winding.

A single layer per phase winding in an embodiment may provide a conductor in two adjacent slots and then skipping one or more slots (depending on the number of phases, for example) such that a layer exists in two adjacent slots followed by one or more slots with no conductors on that layer from that phase. Thus, in an electric machine where electromagnetic elements of a carrier comprise posts, with slots between the posts, one or more slots are without an electric conductor at a level in the one or more slots corresponding to a location of an electric conductor in an adjacent slot.

Conductor Layers with Openings

In some embodiments, the disclosed electric machine not only provides a high cross sectional area for fluid flow, it provides a consistently distributed airflow channel pattern which ensures that every conductor is in contact with the cooling fluid for close to half of its length. In other words, in an embodiment, there are never more than two layers of conductor layers contacting at a time. The sequence vertically in a slot may be for example conductor-conductor-space-conductor-conductor-space-conductor-conductor-space. This means that one side of all conductors is always in contact with the fluid in the cooling channels that is created by the missing conductor. This evenly distributed cooling channel array assists in achieving sufficient heat dissipation to compensate for the higher heat production that results from a reduced conductor volume.

Some embodiments of an effective cooling channel spacing pattern include overlap of the end turns of a conductor combined with offset of the phases combined with a gap at the end of each of the posts to allow tangential airflow at the end of each post. With these details, the airgaps are consistent, fewer (larger) channels are avoided, the conductor surface area is increased and are no stagnant airgaps due to no post-end tangential conduit.

In an embodiment, there may be two slots in a row with a conductor from a phase followed by p minus 2 slots with no conductor from any phase on that layer (with p being the number of phases). For three phases that would be two slots with a conductor from a phase followed by one slot with no conductor from that, or any other, phase. With four phases it would be two slots in a row with a conductor from a phase followed by two slots with no conductor from that, or any other phase on that layer, and so on. No conductor from that or any other phase means there is an air space or a space that can be filled with potting compound and/or a filler material such as a heat extracting insert.

With a three phase configuration, as a non-limiting example, two adjacent slots will have a single layer with a conductor from a first phase in a first and second slot followed by a third slot which will not have a conductor on that layer. This pattern repeats to provide a single layer of winding to provide a conductor on both circumferential sides for every first of three posts. On another layer, a second phase circuit exists on a single layer and has a conductor from this second phase in the second and third slot followed by a slot that will not have a conductor from any phase on that layer. A third phase is on another separate layer with conductors in every third and first slot but no conductor from any layer in every second slot.

A layered construction permits scalable construction from micro/MEMS motors all the way up to motors that are 10 meters or more in diameter. Layered construction allows components to be deposited with additive manufacturing processes, or to be assembled with each conductor and/or insulator component and/or spacer layer being pre-fabricated from a single or multiple parts.

This winding configuration may be done with a bendable wire conductor on each layer (which is only helically wound on two posts to connect to the next layer, for a non-limiting example). Or this conductor configuration can be assembled from pre-fabricated conductor layers so that little or no bending of the conductors is required during construction and assembly.

Skipping slots has the perceived detriment of reduced slot fill percentage. However, this missing conductor in periodic slots can be used as a cooling channel to allow direct cooling of a high percentage of the surface area of the conductors and/or insulating layers and/or EM posts. The cooling channel or conduit may be provided with a flow of coolant. The missing conductor in periodic slots can be used as an air channel so as to reduce the weight of the device.

The ability to form the conductors before assembly and to not require bending of the conductors, is also suited to the use of super conductors which are typically less malleable than copper wire. The high surface area that is available for coolant contact is also suited to the use of superconductors to keep the conductors below the necessary temperature for super conductivity, if using DC currents and superconductors. The use of low temperature coolant can also make conventional conductors like copper and aluminum more efficient by reducing their electrical resistance. Embodiments of the layered conductors are also suited to maintaining copper or other conductor materials at an artificially low temperature for increased efficiency in certain applications.

Stator of Linear Electric Machine

A non-limiting simplified exemplary embodiment of a stator 1058 of a linear electric machine is shown in FIG. 6. The design shown in FIG. 6 may comprise an upper insulating layer 1034, a lower insulating layer 1034, and a stack of conductor layers 1040, 1042 and 1044. Various numbers of conductor layers may be used. Posts 1036 may extend through openings 1035 in the insulating layers 1034. Connections 1046 may be provided to a source of electrical excitation. For each layer 1040, 1042, 1044, a separate layer may be provided.

The simple construction of the stator 1058 is evident from the low number of easily manufactured components. An insulating layer 1034 can be made of a non-electrically conductive material or insulated electrically conductive material and may be for example made of hard anodized aluminum. It may be punched or fine blanked, and then chemical etched to remove sharp edges (important to achieve high insulating values at edges when hard anodized) and then hard anodized. The layer 1034 is, in this non-limiting exemplary embodiment, 0.5 mm thick, but the electric machine of FIG. 6 can have a range of dimensions. The insulating layer 1034 has rectangular cut-outs 1035 for the EM posts 1036 (although other shapes for posts 1036 and post cut-outs 1035 can be used with various effects, and serves to precisely position the posts 1036 during assembly). If the insulating layers 1034 are electrically conductive (even if they have an insulated coating) it is important, for some applications, that there be no electrical connection around any single post within the either layer 1034. For this reason, a cut 1038 is provided between each slot to break potential eddy current circuit. This slot can be punched or blanked or cut at different points in the process, such as with a laser before, during, or after assembly. The minimum thickness of an electric conductor may be >75% of the maximum thickness of the conductor layer. The minimum thickness of the electric conductor may be >50% of the maximum thickness of the conductor layer. This allows for punching and minimal thinning of the conductors at crossover points. The >50% provides for the gaps to still be necessary. The method of manufacture may comprise punching or stamping a conductor layer from a constant thickness material and placing the conductor layer into the slots. The resulting conductor layer may have a variable thickness.

The EM posts 1036 may be made of a soft magnetic material such as but not limited to, steel or powdered iron or other type of soft magnetic material. The conductors 1040, 1042, and 1044 may be made of copper (or possibly aluminum or super conductors for some applications) and can be formed or punched or fine-blanked and then coated with an insulating layer (not shown) such as, but not limited to, coatings that are common to wire conductors. Surface connection vias 1046 are assembled with the rest of the layers or are drilled and added afterward, if needed.

The stator 1058 is assembled by hand or machine, and then may be clamped between two flat surfaces and potted with a potting compound. During the potting process, the top and bottom mold plates can be retracted enough to allow wetting of all surfaces before being brought axially together again into contact or close proximity. The lengths of the posts 1036 may be used to position the upper and lower potting mold parts (not shown).

If internal cooling is desired, the potting compound is removed from the open slot sections such as by allowing gravity to remove potting compound from the large gaps, or by pushing air through the device to push the potting compound out of the cavities.

Figure 7:
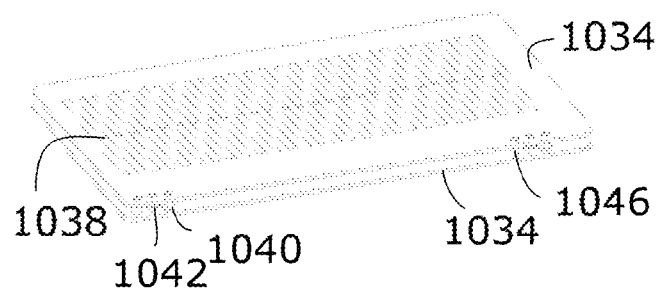
FIG. 7 shows an isometric view of the stator in FIG. 6.

FIG. 7 shows an isometric view of the stator 1058 in FIG. 6 (with no potting compound or insulating layer shown on the conductors). This non-limiting exemplary embodiment has one conductor per phase per section (which is the complete linear actuator stator 1058, in this example.) Multiple conductor layers of the same phase can be used in a stator section.

Figure 8:
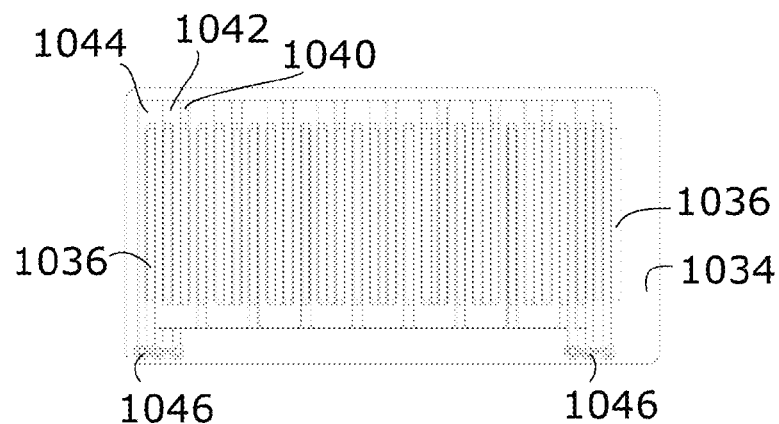
FIG. 8 shows a top view of the stator in FIG. 6 and FIG. 7 with the upper insulator layer removed.

FIG. 8 shows a top view of the stator 1058 in the non-limiting exemplary embodiment of FIG. 6 and FIG. 7 with the upper insulator layer 1034 removed, revealing how each of the phase circuits 1040, 1042, and 1044 is a single component (and in this case, having identical geometry) that nearly encircles every first, second, or third of three consecutive posts 1036. Phase circuits 1040, 1042, and 1044 correspond to phases one, two, and three, respectively.

Figure 9:
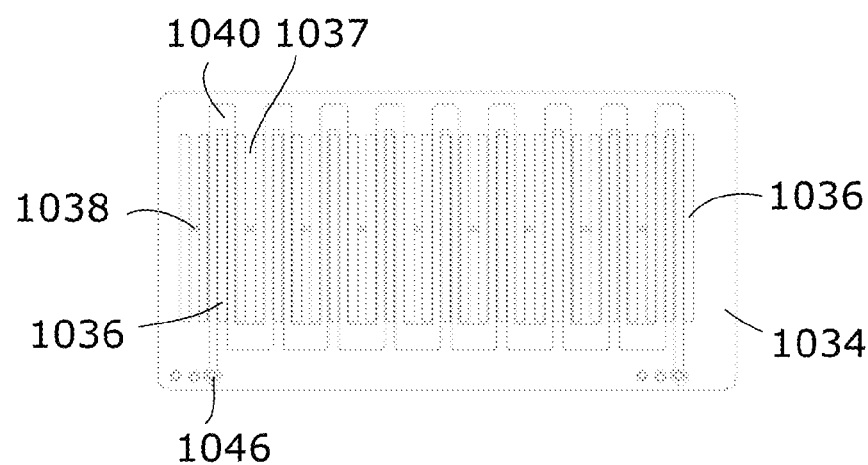
FIG. 9 shows top view of the stator in FIG. 8 with the two upper phase circuits removed.

FIG. 9 shows phase circuits 1042, and 1044 removed so the circuit shape of phase 1040 can be clearly seen to nearly encircle every third of three consecutive posts 1036 by filling the slot 1037 on either side of every third post 1036, and to skip every first slot 1037. The other two phase circuits skip a different slot 1037 and nearly encircle a different post 1036.

Figure 10:
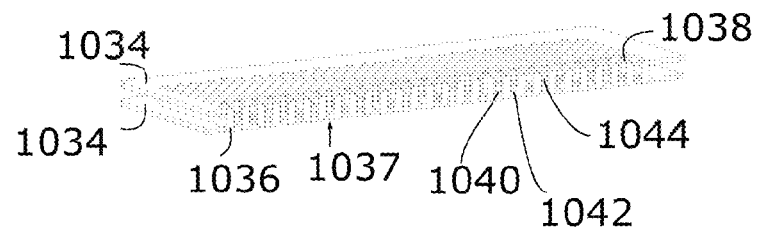
FIG. 10 is a sectional view of the stator of FIG. 6 to FIG. 9.
Figure 11:
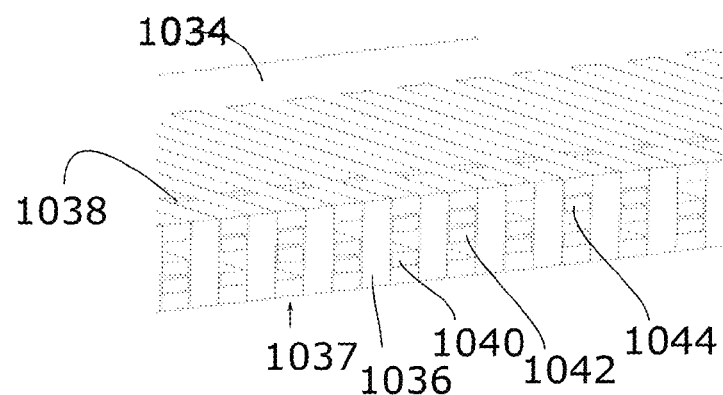
FIG. 11 is a detail view of the cross section shown in FIG. 10.

FIG. 10 is a sectional view of the non-limiting exemplary stator 1058 of FIG. 6 to FIG. 9. It shows how a conductor is missing from one out of every three consecutive slots 1037 in each conductor layer 1040, 1042, and 1044 FIG. 11 is a detail view of the cross section shown in FIG. 10.

Layers can be bonded together or fused together or soldered together. If some internal layers, such as but not limited to the copper layers and spacer layers between the anodized aluminum or other separator layers, are tinned, and if all components or their coatings are bondable by a given solder compound, the parts can be assembled and then heated under pressure in an oven to fuse everything together. It is important, if pre-tinning with solder is used, that the separation layers are not coated so there is no conductor layer-to-layer conductivity. Alternatively, a thermoplastic resin can be used to coat the parts and they can then be assembled and heated in an oven under enough pressure to ensure the correct axial and other dimensions. An epoxy or other hardening adhesive can be used during or after assembly to adhere and pot the components. If airflow channels are included in the design, potting can be followed by blowing the adhesive out of the large chambers before the epoxy hardens. An advantage of a pre-preg or solder tinning process which provides a thin and consistent coat of adhesive or solder, is that the airflow channels may not need to be purged. Only the close fitting surfaces will adhere to each other. Any number of posts or permanent magnets may be used.

Figure 12:
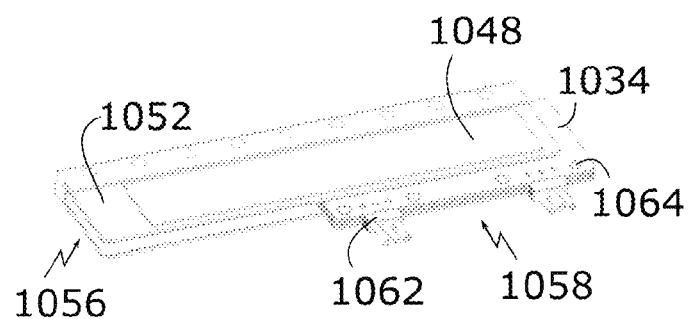
FIG. 12 shows an isometric view of a non-limiting exemplary linear electric machine.
Figure 13:
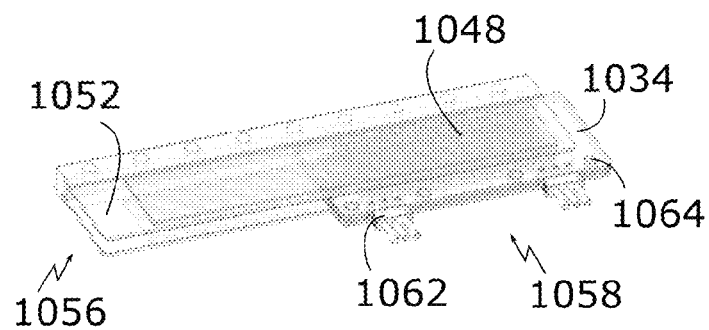
FIG. 13 shows the electric machine of FIG. 12 with internal lines.
Figure 14:
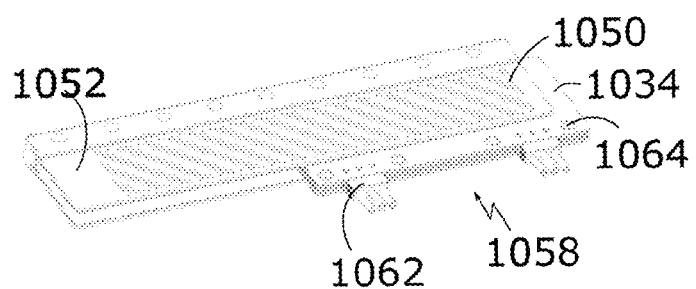
FIG. 14 shows the electric machine of FIG. 12 with the upper permanent magnet carrier backiron removed.

FIG. 12 to FIG. 21 show a non-limiting linear motor embodiment with a permanent magnet (PM) carrier 1056 and encoders, showing in sequence the removal of the top layers and revealing underlying layers. There are many options for encoders that are well known to a skilled person. In this example a mini-coil at the end of the posts is used as an eddy current sensor, though care must be taken to ensure necessary precision. It is energized with a high frequency signal that generates eddy currents in the PM magnet coating and/or material between the magnets. The change in eddy currents is used to read position changes. FIG. 12 shows an isometric view of a non-limiting exemplary linear actuator embodiment of an electric machine. FIG. 13 is the actuator of FIG. 12 with internal lines shown. FIG. 14 shows the upper permanent magnet carrier backiron 1048 removed.

Figure 15:
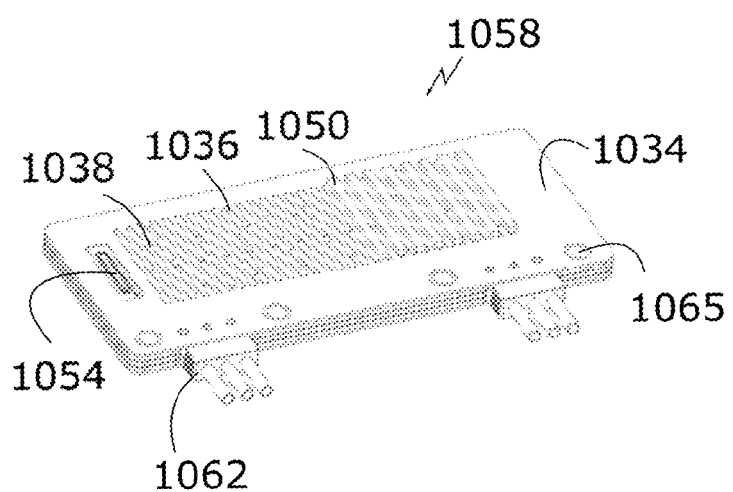
FIG. 15 shows the electric machine of FIG. 14 with upper permanent magnet carrier plate and most of the upper permanent magnets removed.
Figure 16:
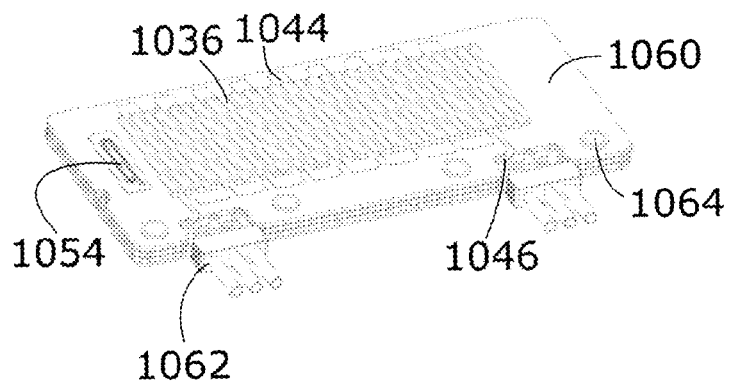
FIG. 16 shows the electric machine of FIG. 15 with all permanent magnets removed and the top insulator plate removed.
Figure 17:
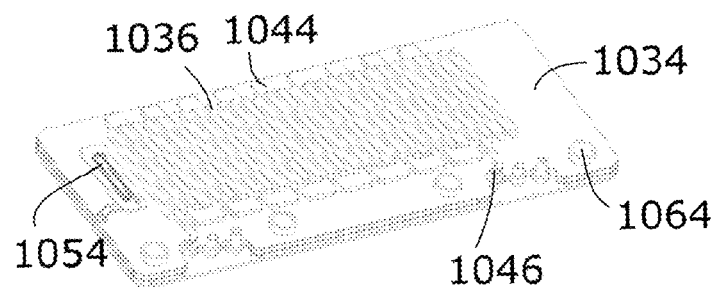
FIG. 17 shows the electric machine of FIG. 16 with the electrical connectors removed and the top spacer layer removed.
Figure 18:
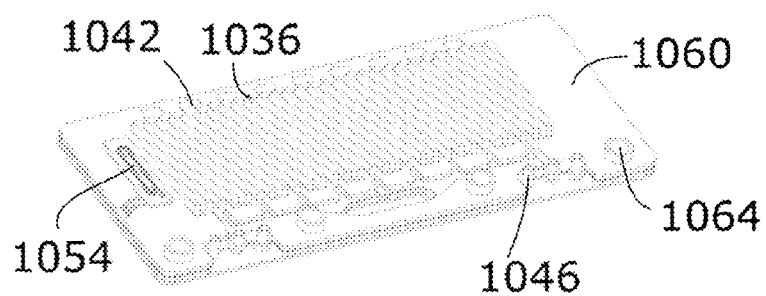
FIG. 18 shows the electric machine of FIG. 17 with the top phase circuit conductor removed and the second insulator layer removed.
Figure 19:
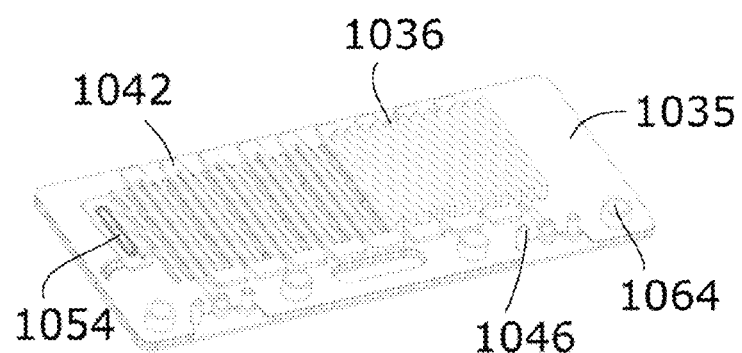
FIG. 19 shows the electric machine of FIG. 18 with the second spacer layer removed and most of the posts removed.
Figure 20:
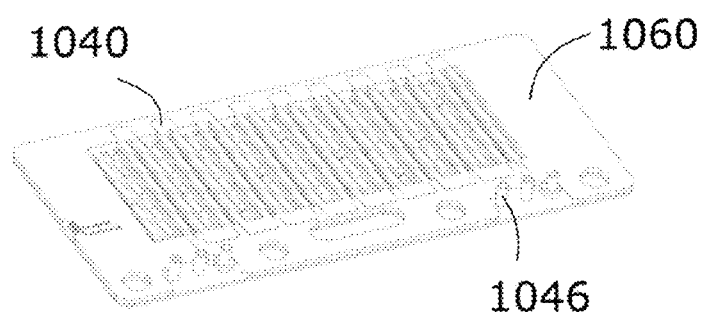
FIG. 20 shows the electric machine of FIG. 19 with the upper air core sensor, the second phase circuit, the structural cylindrical spacers, and the rest of the posts removed.
Figure 21:
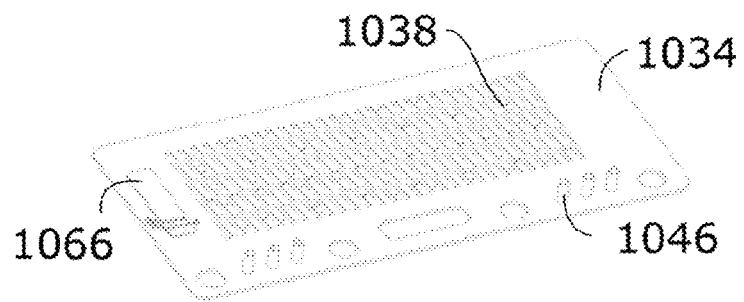
FIG. 21 shows the electric machine of FIG. 20 with the third phase circuit and the bottom spacer layer removed.

FIG. 15 shows an upper permanent magnet carrier plate 1052 and most of the upper PMs 1050 removed revealing air cooling discharge holes in the insulator layer between the PMs and the slot in the spacer between the PMs to prevent eddy currents from circling the posts 1036. Also revealed is the air-core inductive sensor 1054 which can be manufactured on a PCB and added to the rest of the components during assembly. The inductive sensor 1054 can be used to sense the position of anything electrically conductive on the PM carrier 1056 such as the aluminum between the PMs 1050 and/or the electrically conductive coating on the PMs 1050. This sensor can be used to determine relative linear and/or axial positon of the stator 1058 and PM carrier 1056. FIG. 16 shows all PMs 1050 removed and top insulator plate 1034 removed. FIG. 17 shows the electrical connectors 1062 removed and the top spacer layer 1060 removed. FIG. 18 shows the top phase circuit conductor 1044 removed and the second insulator layer 1034 removed revealing the air inlet for the internal cooling channels. FIG. 19 shows the second spacer layer 1060 removed and most of the posts 1036 removed. FIG. 20 shows the upper air core sensor 1054 removed and the second phase circuit 1042 removed and the structural cylindrical spacers 1064 and the rest of the posts 1036 removed. FIG. 21 shows the third phase circuit 1040 and the bottom spacer layer 1060 removed, revealing the lower air core PCB insert 1066 and the lower insulator layer 1034.

The exemplary embodiment in FIG. 12 to FIG. 21 can be configured with multiple layers of stators 1058 and/or PM carriers 1056 with PM carriers 1056 on both axial ends of one or more stators 1058 or two or more stators 1058 on the axial ends of one or more PM carriers 1056. Only the stator 1058 and/or PM carrier 1056 at the axial ends require a backiron.

Conductor Layers for Exemplary Axial Flux Motor

Figure 22:
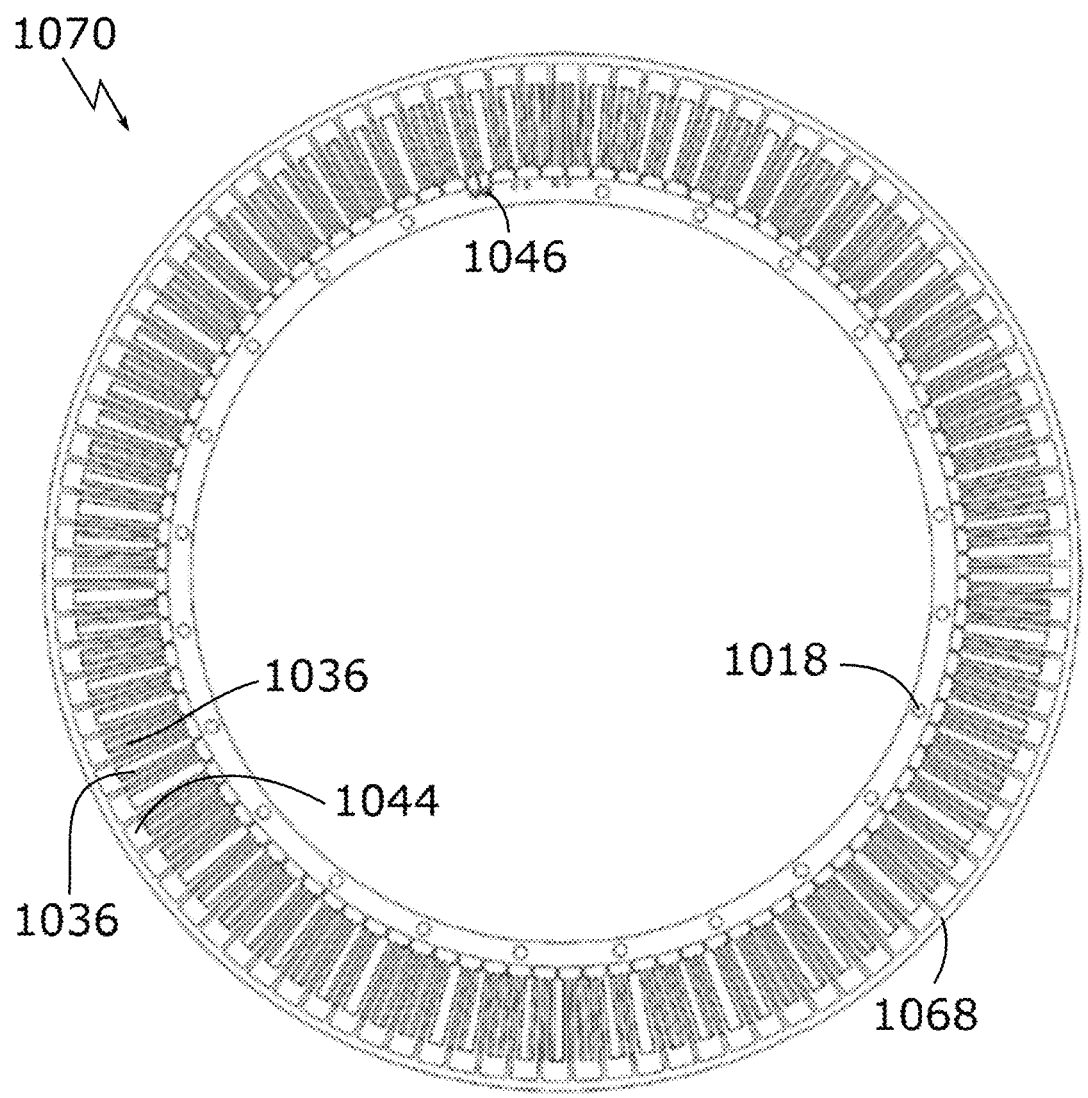
FIG. 22 shows the conductor circuits, posts, and potting compound ring for a non-limiting exemplary embodiment of an axial flux, rotary stator electric machine.
Figure 23:
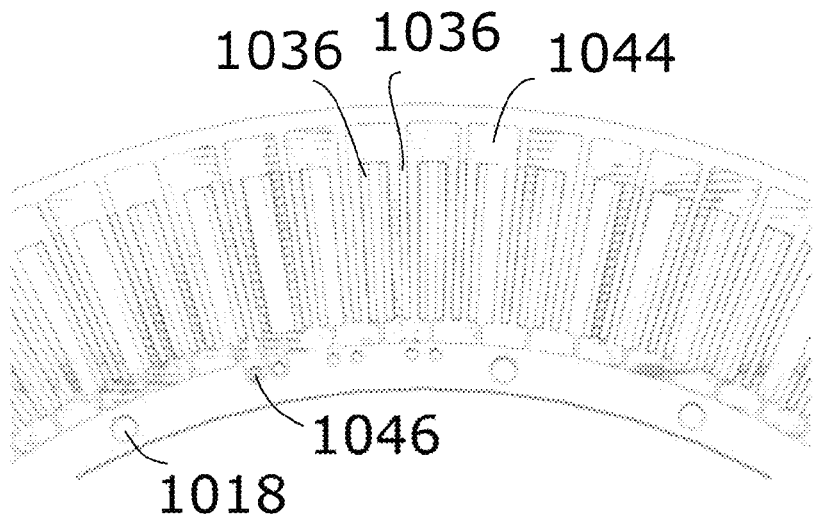
FIG. 23 shows a detail view of the stator in FIG. 22.

FIG. 22 shows the conductor circuits 1044 (only one layer is shown in this figure) and posts 1036 and potting compound ring 1068 for a non-limiting exemplary embodiment of an axial flux, rotary stator 1070 according to an embodiment of an electric machine. FIG. 23 shows a detail view of the stator 1070 in FIG. 22 with mounting holes for the stator to attach to another stator disk and/or a fixed or moving member to be actuated or to actuate from.

Figure 24:
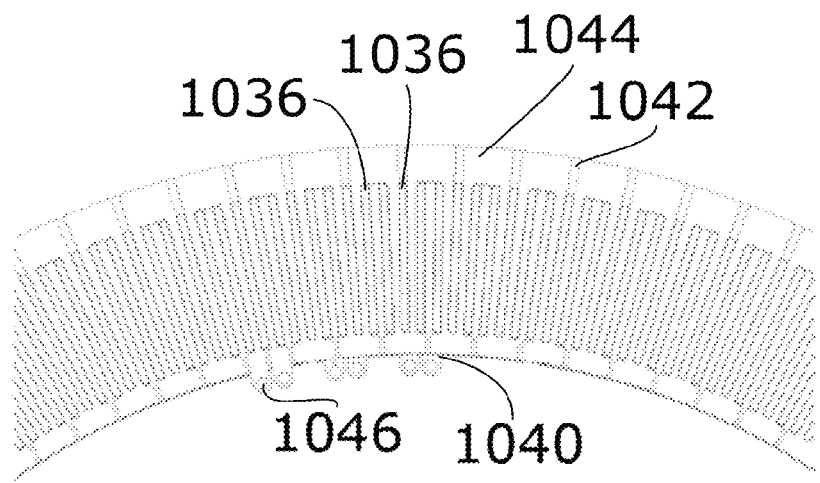
FIG. 24 an axial flux, rotary stator with three phases and one conductor circuit per phase, with the potting compound ring removed.

FIG. 24 shows the potting compound ring 1068 removed from an axial flux, rotary stator 1070 with three phases and one conductor circuit per phase. In this embodiment, the conductor members 1040, 1042, and 1044 are each a single circuit for a complete 360° with an IN and OUT connection 1046 for each of three phases. The conductors 1040, 1042, and 1044 may be for example made of hard anodized aluminum which may eliminate the need for separate insulator layers between the conductors 1040, 1042, and 1044, or the rotor (not shown).

Figure 25:
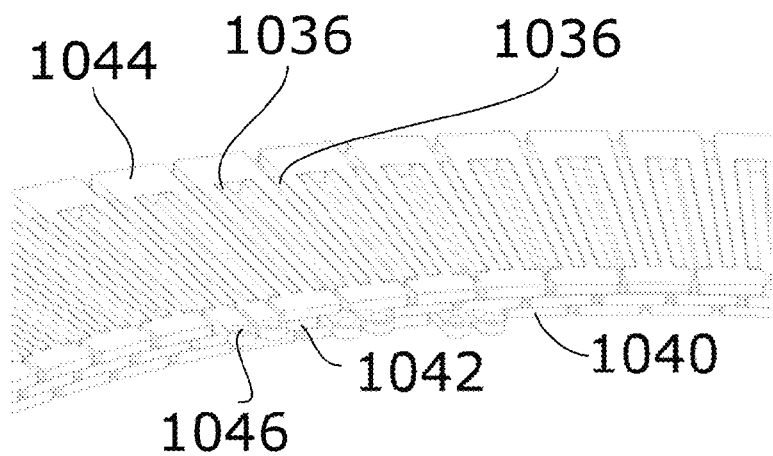
FIG. 25 is an isometric view of three phase circuits with soft magnetic material posts positioned by the aluminum circuits during assembly.

FIG. 25 is an isometric view of the three phase circuits 1040, 1042, and 1044 with soft magnetic material posts 1036 positioned by the aluminum circuits 1040, 1042, and 1044 (and/or an assembly fixture) during assembly. There is enough overlapping aluminum that for certain applications, the aluminum circuit 1040, 1042, and 1044 and post 1036 cross matrix construction may be strong enough to reduce or eliminate the need for other structural components like end plate disks. With this configuration, the extra volume of aluminum that can be fit into the same space as the FIG. 15 stator may allow the aluminum to provide similar resistance to copper that must be insulated between thicker layers. Copper can also be used in this way with fewer or no insulating layers, but copper insulation tends not to be a tough as aluminum anodizing.

Figure 26:
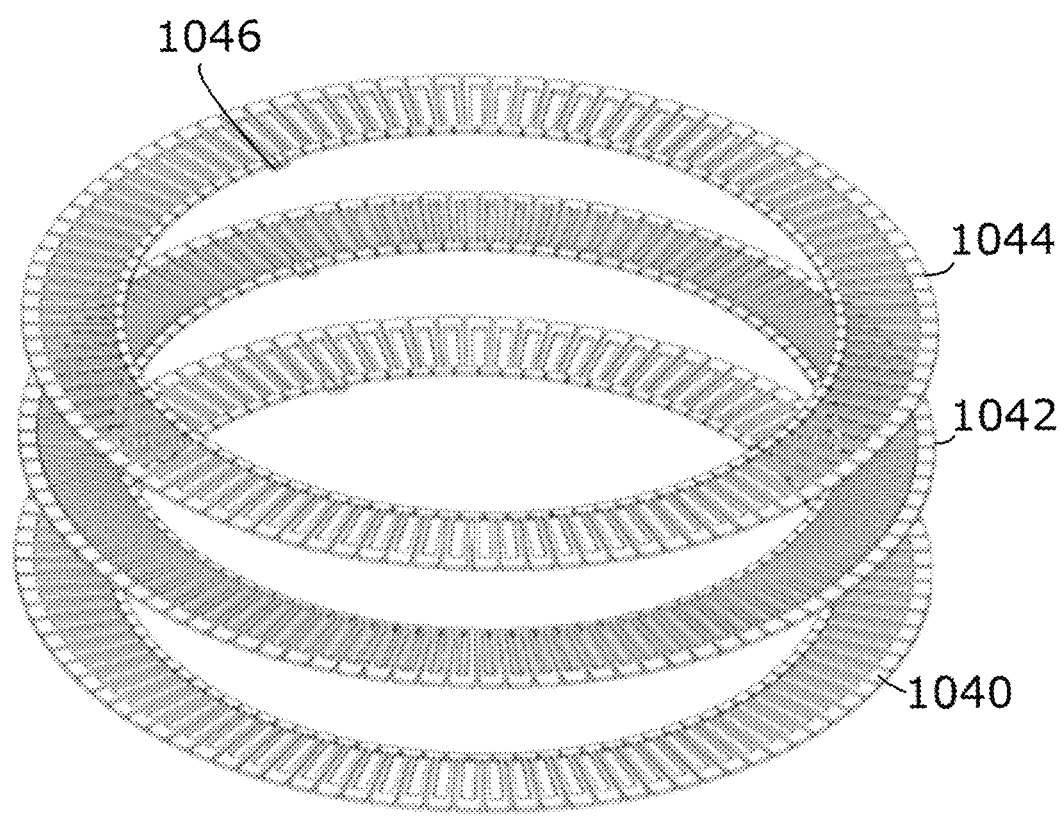
FIG. 26 is an exploded view of FIG. 25.

FIG. 26 is an exploded view of FIG. 25 showing the simplicity of the circuit 1040, 1042, and 1044 shapes, all of which can be symmetrical and simply rotated relative to each other by one or more posts 1036 as long as other layers do not nearly encircle the same post 1036 as another circuit.

Figure 27:
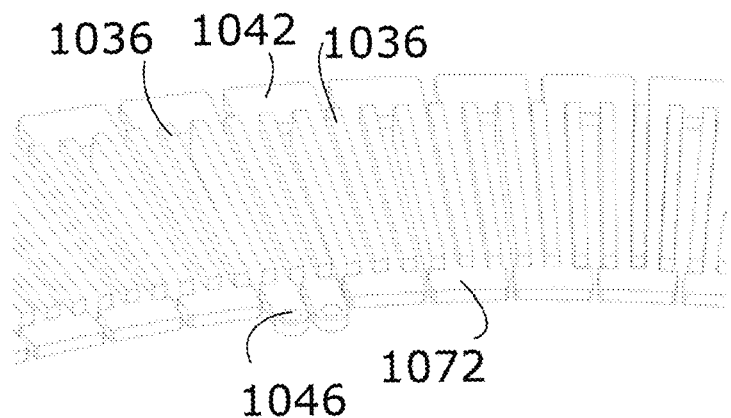
FIG. 27 is a closeup of an individual layer of the embodiment of FIG. 25 and FIG. 26.
Figure 28:
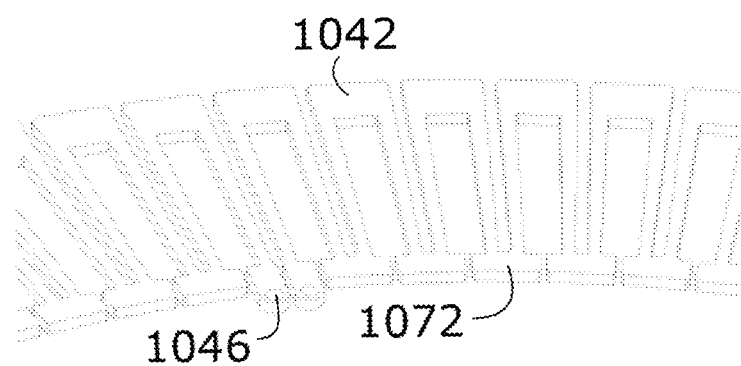
FIG. 28 is a closeup of an individual layer of the embodiment of FIG. 25 and FIG. 26.
Figure 29:
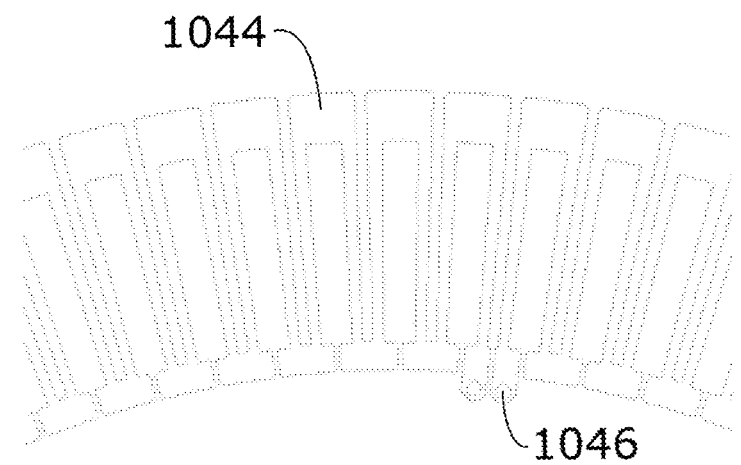
FIG. 29 is a top view detail of a single stator circuit.

FIG. 27 shows a close up view of just the second conductor layer 1042 with the posts 1036. FIG. 28 shows a detailed view of just the above conductor layer 1042 to show the overlapping sections along the ID, which are for structural integrity to increase the bond area between the conductor layers. FIG. 29 is a top view detail of a single stator circuit 1044.

As is made possible by embodiments of this stratified conductor construction, the cross sectional area of the end turns may be for example greater than the average or max cross sectional area of the conductors in the slots. This reduces the resistance in the end turns allowing them to run cooler than the slot portion of the conductors and to therefore act as heat sinks to increase the heat capacity of the conductors to increase the ability to operate at very high current densities for short periods of times such as during emergency stops or even during normal operation during high accelerations. Furthermore, the greater surface area of the end turns as compared to the slot portions (slot turns) of the conductors provides a cooling fin effect that is highly effective due to the low heat flow resistance from the slot turns to the end turns as a result of them being of the same component and of a high conductivity material such as copper or aluminum. Cooling these end turn "cooling fins" can be done with any number of liquid or gas cooling means.

Exemplary Axial Flux Electric Machine

Figure 30:
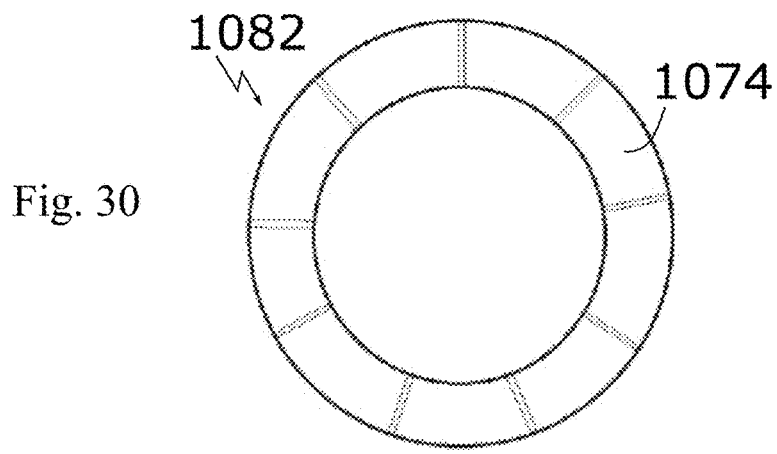
FIG. 30 shows sections of an axial flux electric machine.
Figure 31:
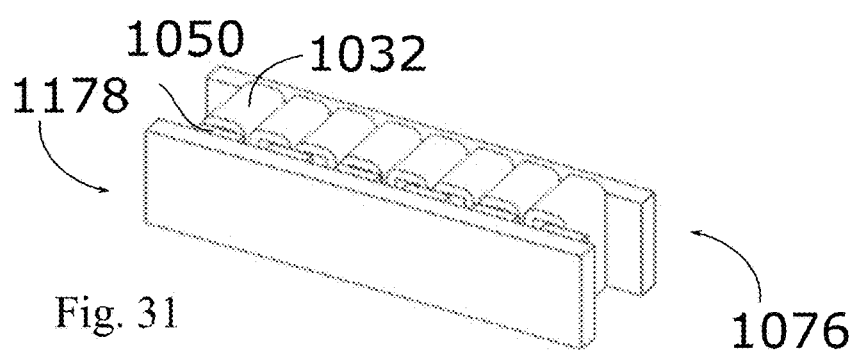
FIG. 31 shows an array of electromagnetic elements (here, coils) in a linear electric machine facing electromagnetic elements (here, permanent magnets) across an airgap.

An embodiment may comprise individually controlled stator sectors, where apart from producing torque a secondary purpose of the controllers for the said stator sectors will be to keep the rotor alignment with the said sectors, and to possibly eliminate the need for rolling and/or sliding contact bearings altogether. Each section may comprise an individual multiphase BLDC motor driver. Considering an embodiment with a hollow disk shape like the multi-sectional actuator 1082 shown in FIG. 30 one can argue that to some degree every arc sector 1074 must act more or less like a linear actuator (illustrated in FIG. 31), and so long as every linear actuator is maintaining its linear (in this case circumferential) motion or position, each corresponding section of the rotor at a given moment will be positioned circumferentially, such that the stator and rotor will be held coaxially. It is clear from the drawing that every stator sector 1076 is only responsible for a primarily tangential force that can make the corresponding sector 78 of the rotor move back and forth tangentially. Even if the stator and the rotor are not mechanically coupled with a bearing, the possibility of maintaining axial alignment by properly commutating individual sectors 1074 is real. One could say that the proposed idea is in a way a combination of torque producing device, and a self-aligned dynamic magnetic bearing.

Figure 32:
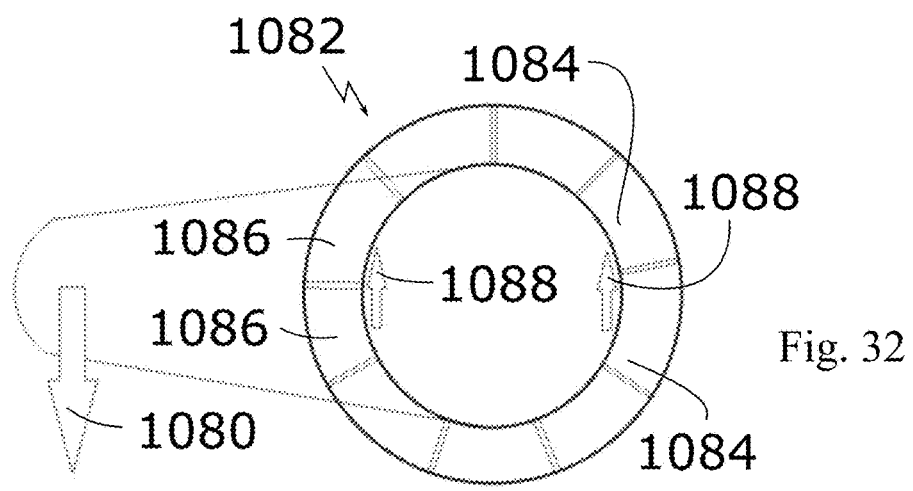
FIG. 32 illustrates a sectioned axial flux electric machine with a load arm.

An embodiment of an electric machine may be used with a long lever, such as a robotic arm, with a weight at the end, mounted horizontally on the rotational part of the actuator 1082 as shown in FIG. 32. If the actuator is mounted vertically, that is with a horizontal axis, the rotor assembly will experience a downward force 1080 and the individual sectors 1084 and 1086 that are diametrically opposed on the horizontal axes will experience a slight vertically downward displacement. An encoder at each of the stator sectors will register this displacement and the motor driver and controller will shift the power input to those sectors to maintain the correct stator—to-rotor tangential alignment of those sectors. This will create a vertical lifting force 1088 to counter the vertically downward force on the arm, and the rotor will, therefore, be maintained coaxially within a predetermined tolerance by the active control of the individual sectors. This is demonstrated in FIG. 32. All other sections are creating torque as they would normally do. To the controller that is simply an increase in force (torque) in one of two possible directions, and because it is only one of two it won't be a complicated addition to the driving algorithm to any existing motor drive.

Winding Construction for Exemplary Stator

Figure 33:
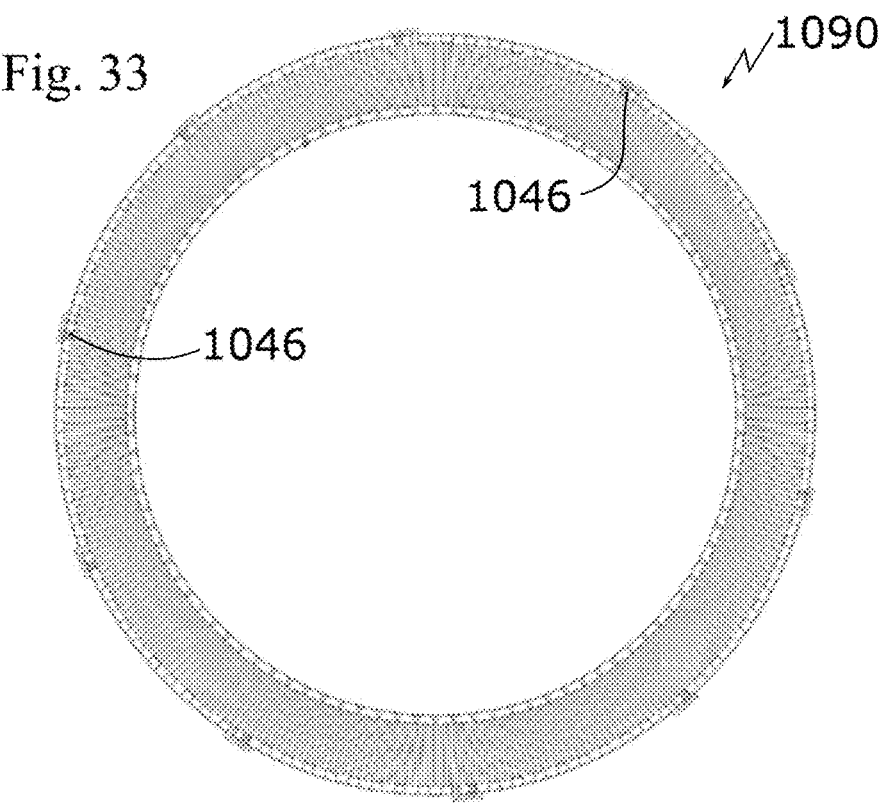
FIG. 33 shows a stator of an axial flux electric machine.
Figure 34:
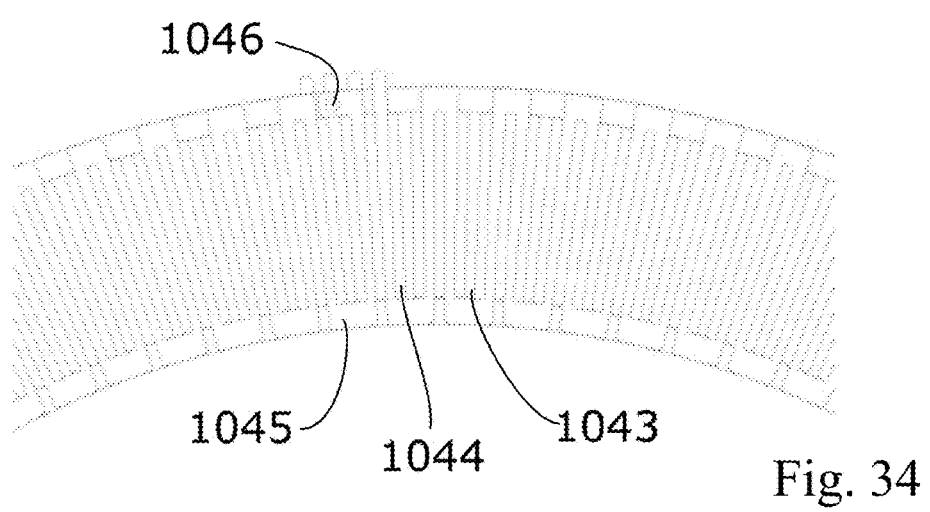
FIG. 34 is a detail of the stator of FIG. 33.
Figure 35:
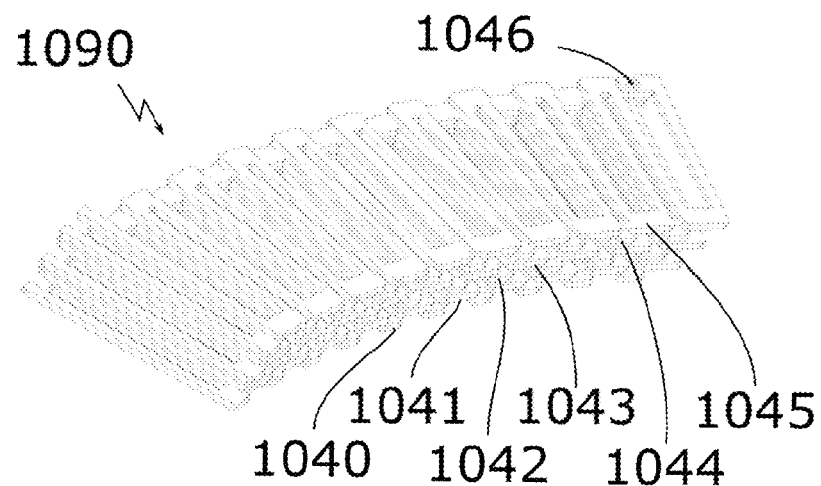
FIG. 35 is detail of electric conductor layers for use in the stator of FIG. 33.
Figure 36:
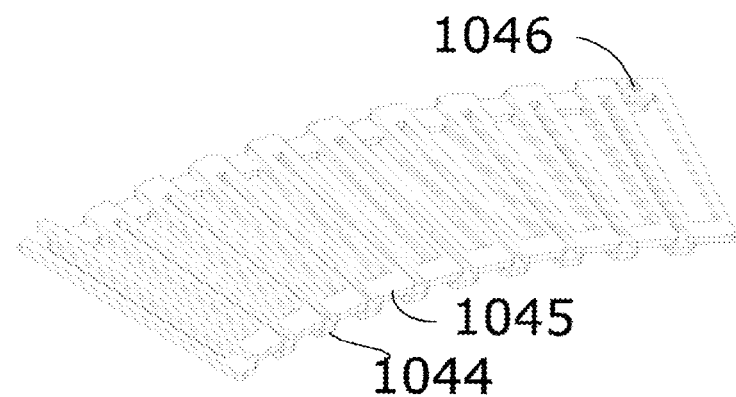
FIG. 36 is further detail of electric conductor layers for use in the stator of FIG. 33.
Figure 37:
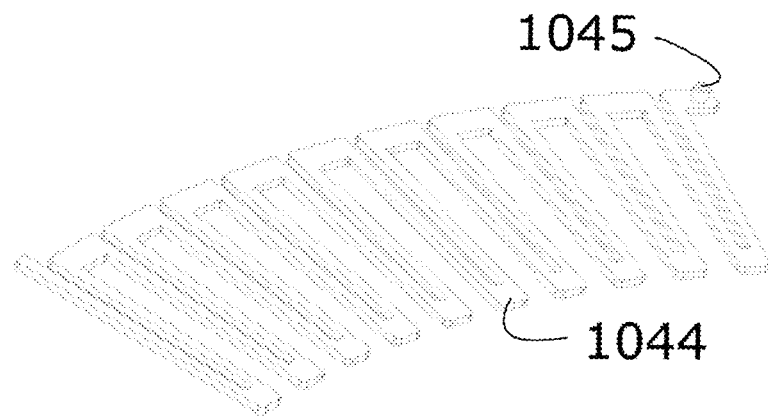
FIG. 37 is further detail of an electric conductor layer for use in the stator of FIG. 33.

FIG. 33 to FIG. 37 show a schematic of a three phase non-limiting exemplary stator winding construction with six layers 1040, 1041, 1042, 1043, 1044, and 1045 making up a stator for which a top view if shown in FIG. 33. The stator is divided into 1010 sectors, each of which contains a stator winding construction section 1090. Each sector may be for example controlled by a separate motor controller (not shown) based on the encoder feedback at each sector which reads the circumferential position of the PMs 1050 on a PM carrier 1056 relative to each sector. Controlling each sector separately allows the radial forces to be controlled by the CPU such that the rotor and stator can be actively held concentric by magnetic forces. The effect will be that of an active magnetic bearing in the radial direction. A detail of the windings is shown in FIG. 34. FIG. 35 shows an isometric view of a single section 1090 of the stator winding in FIG. 33. FIG. 36 shows just the topmost two layers 1044 and 1045 which are both in the same phase and connected with a through-layer via; just the lower layer 1044 of the two conductor layers is shown in FIG. 37.

Exemplary Axial Flux Electric Machines

Many embodiments are possible. One exemplary embodiment is shown in FIG. 38, as an internal stator stack of four stator disks 1092 that allows the external rotor stack of five rotor disks 1094 to spin a full rotation. Another exemplary embodiment is show in FIG. 39, with an external rotor with 5 disks stacked together around four stator disks. The stator disks 1092 are fixed together with an ID ring member 1096 and the fixed tabs 1098 and output tabs 1100 on the stator disks 1092 and rotor disks 1094, respectively, allow in-line actuation with very thin axial dimension. For additional torque, more stator and rotor disks can be added.

A single or double or other phase array of posts can be constructed according to the principles of this device with one or more layers of conductors. This configuration of an embodiment of an electric machine can allow simplified control of a linear or rotary or other motor configuration, such as, but not limited to a linear motor to control a robotic finger joint.

Exemplary Robotic Joint with Electric Machine

Figure 40:
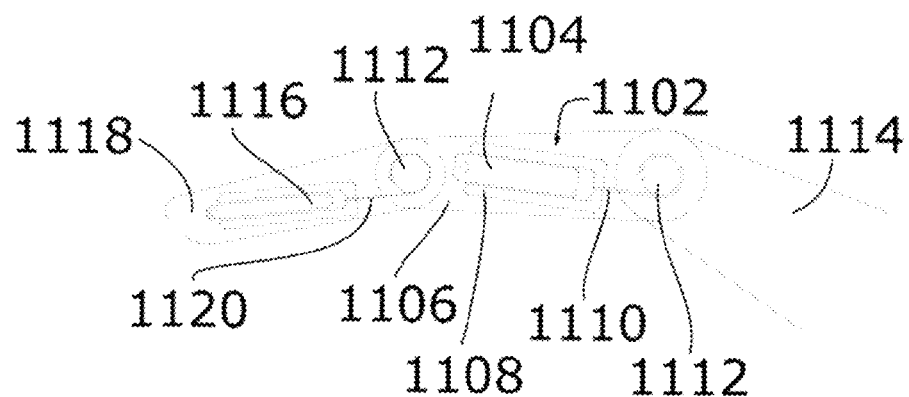
FIG. 40 shows an embodiment of robotic arms that may be equipped at the joints with an embodiment of the disclosed electric machine.

FIG. 40 shows a schematic section of a non-limiting exemplary embodiment of a two-joint robotic finger 1122 using embodiments of an actuator or electric machine 1102 formed of a first carrier 1104, and a similar actuator 1116. This actuator can be, but is not limited to, a single phase linear actuator which has multiple poles but only one phase and is therefore not commutated and generates adequate force that a suitably low mechanical advantage of the actuator (acting through a cable or strap or linkage etc.) can produce adequate torque and rotation of the joint to which it is attached. In FIG. 40, an actuator 1102 has a stator 1104 that is fixed to the phalanx 1106 and a PM carrier 1108 that is fixed to a cable or strap 1110. The cable 1110 is fixed at the other end, to a pulley or other member 1112. The pulley 1112 is fixed to the hand member 1114. When the stator 1104 is energized, in one polarity, it allows the phalanx 1102 to rotate in the clockwise direction as a result of a CW spring (not shown) acting between the hand member 1114 and the phalanx 1102 which pulls the finger straight, relative to the hand member 1114, when the actuator 1102 is extended. When the opposite polarity is applied to the stator 1104, the cable 1110 is drawn toward the stator 1104, and so the phalanx 1102 will rotate in the CCW direction.

A second stator 1116, is fixed to the second phalanx 1118 and actuates a cable 1120 that is fixed to the pulley 1112 that is fixed to the phalanx 1102. Stators 1104 and 1116 can be driven by the same and/or different motor controllers.

Stator 1104 could also be located in the hand member 1114, or an additional actuator 1104 could be located in the hand member and could act on the phalanx member 1102 to cause rotation. An actuator fixed to phalanx 1102 can also produce torque and/or rotation of phalanx 1118 instead of or in addition to stator 1116.

Two views of a non-limiting example of a robot gripper with three fingers 1122 using an actuation of each joint as described above is shown in FIG. 41. Many different configurations of a gripper using these or other actuation configurations of an embodiment of an electric machine are possible.

Exemplary Magnet Configuration for Electric Machine

Figure 42:
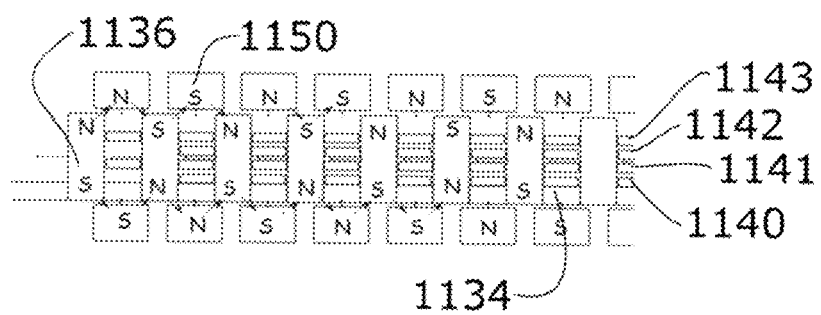
FIG. 42 shows a magnet configuration for an embodiment of the disclosed electric machine.

FIG. 42 illustrates an embodiment of alternating polarity magnets 1050 on either side of a layered arrangement of electrical conductor layers 1140 to 1143 with posts 1136 seated in insulating layers 1134. This illustration shows an axial flux embodiment, which may be either rotary or linear.

The layered actuator of FIG. 42 may be manufactured by any of the methods in this disclosure, such as, but not limited to using PCB manufacturing techniques, or an assembly of pre-fabricated components. To reduce the current required to produce a given linear force, more than a single layer of electrical conductors may be used. Each layer 1140 to 1143 may have a separate insulator layer between it and the next layer, or each conductor layer can be insulated individually (similar to conventional wire insulation) before or during the assembly process so a separate insulation layer is not needed between the conductor layers.

With a single phase device, for a non-limiting example, as shown in FIG. 42, the EM posts are not commutated. A positive or negative current is applied to the single phase to create a force and/or movement of the PM carrier in one direction or the other. The approximate total travel of the output will therefore be the post pitch. An advantage of this device is the reduced complexity of the motor controller which only needs to provide a variable positive and/or negative current to produce movement or force of the PM carrier relative to the stator.

Exemplary Linear Electric Machine for Example for Robotic Finger Joint

Figure 41:
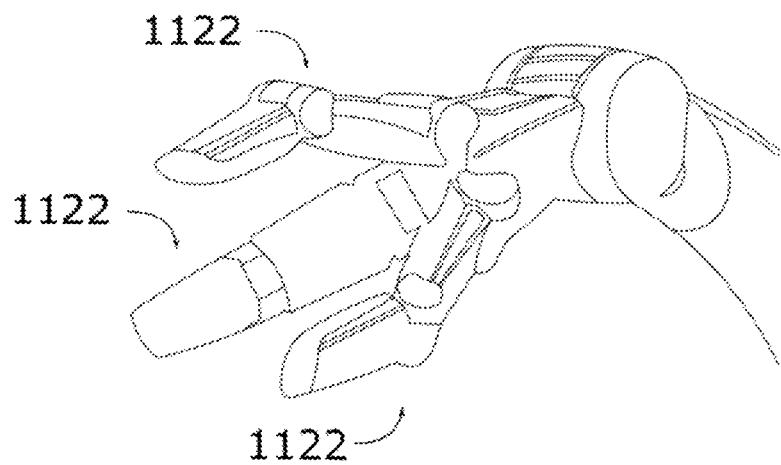
FIG. 41 shows an embodiment of robotic arms that may be equipped at the joints with an embodiment of the disclosed electric machine.

For many motion control applications, such as finger joints or other devices in robotics or motion control, a small amount of movement can be mechanically amplified to accomplish the required task, such as with a cable and pulley pulling on a cable "tendon" such as in a human finger as illustrated in FIG. 40 and FIG. 41. An adult human index finger, for example, requires approximately 18 mm of linear tendon movement for the full range of motion of all three joints. If each joint on a robotic finger is controlled by a separate linear motor and tendon, the total travel of each actuator, to replicate a human finger joint motion, would be ~6 mm. If the mechanical advantage of the robotic tendon was reduced to ½ of the human finger, it would only require 3 mm of total actuator movement at each individual actuator at each joint to achieve the range of motion of a human finger joint.

FIG. 42 shows a simplified cross section of a non-limiting exemplary embodiment of a four layer single phase actuator with a linear array of PMs on both axial ends of the array of EM posts. The arrows in FIG. 42 indicate the forces on the PMs (which are fixed to a moveable PM carrier—not shown in FIG. 42). The force on the PMs will be to the right at the shown EM polarity and to the left at the opposite EM polarity. By using a variable current, such as with a PWM signal, this force will be proportional to the current. If the post spacing is ~3 mm, then finger actuation of a generally human-sized finger joint can be achieved.

The compactness of this construction may even allow an actuator for each joint to be located in the next upstream or downstream arm or finger phalanx. This eliminates the need for a flexible cable sheath and allows direct acting of the cable/tendon on the joint in line with the actuator plane of movement. For more powerful finger or other component actuation, a cable with a flexible housing can be used to situate the actuator for one or more joints remotely, such as in the forearm of a robot, where more room is available.

An advantage of this actuator system is that a force can easily be applied to a joint (as compared to a commutated magnet array in a multi-phase and linear or rotary motor which must have a feedback system to achieve controlled force application). The force generated by the actuator will be proportional to the current, so a force feedback sensor may not be necessary for many applications. An encoder may not be needed for many applications. This configuration may be suitable for many other robotic or motion control requirements where a limited travel linear motion will provide the required force and/or movement.

Applying the same variable current to all actuators in a finger, with each actuator controlling a different joint, a highly compliant finger assembly can be achieved where the finger will conform to a given payload at each joint with the option of only a single current control for the whole finger. Separate current control of individual actuators will allow individual joint control.

Layered Construction of Exemplary Electric Machine

The above magnet configuration in FIG. 42 is shown in the assembly in FIG. 43 through FIG. 52 with a layer removed in each subsequent figure to show the layered construction.

Insulator layers 1134 may be made of any non-electrically conductive material, or with an insulating coating on a conductive material such as aluminum Anodized aluminum may be used because of its high heat conductivity. For low frequency applications such as a finger actuator, eddy currents are not a concern so an electrically conductive stator layer does not need any breaks around the posts.

Figure 43:
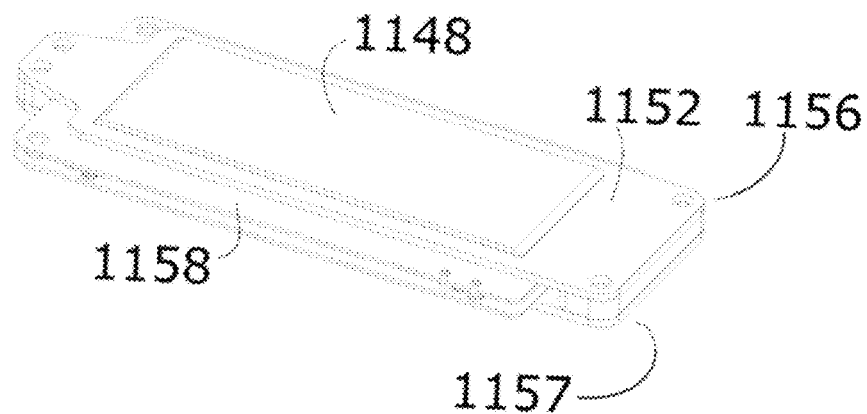
FIG. 43 is a first figure of detail showing successive layers of a linear electric machine.
Figure 44:
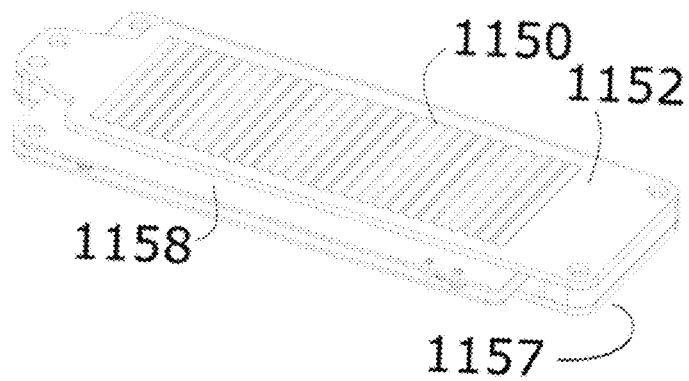
FIG. 44 is a second figure of detail showing successive layers of a linear electric machine.
Figure 45:
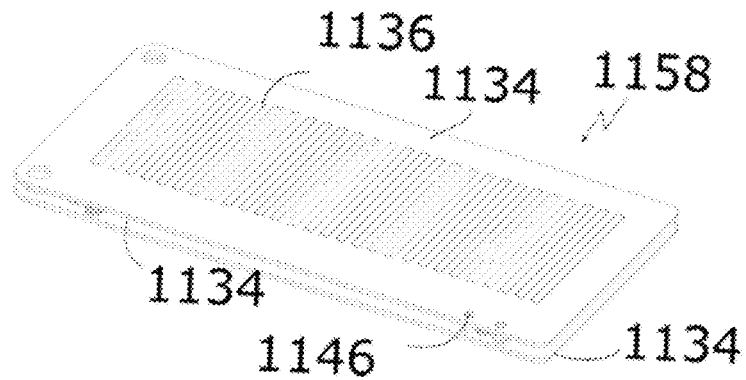
FIG. 45 is a third figure of detail showing successive layers of a linear electric machine.

FIG. 43 shows the complete actuator 1156 of FIG. 42 with PM carrier backiron 1148, upper PM carrier 1152, lower PM carrier 1157 and stator 1158. FIG. 44 shows the actuator 1156 with PM carrier back-iron 1148 removed. FIG. 45 shows stator 1158 with PM carriers 1152, 1157 and PMs removed. FIG. 46 shows the actuator 1156 with top insulator layer 1134 of stator 1158 removed showing four layer single phase single circuit conductor, with connectors 1124, 1126 for connecting to a single phase current source (not shown).

FIG. 47 is a detail view of via connector 1146 between conductor layers 1141 and 1142 and IN and OUT connectors 1124 and 1126 formed of posts that connect to the electric conductors of the conductor layers 1140 to 1143 FIG. 48 is a detail view of via connectors 1146 between layers 1140 to 1143 at opposite end of the stator 1158 to IN and OUT connectors 1124 and 1126 shown in FIG. 47.

Figure 49:
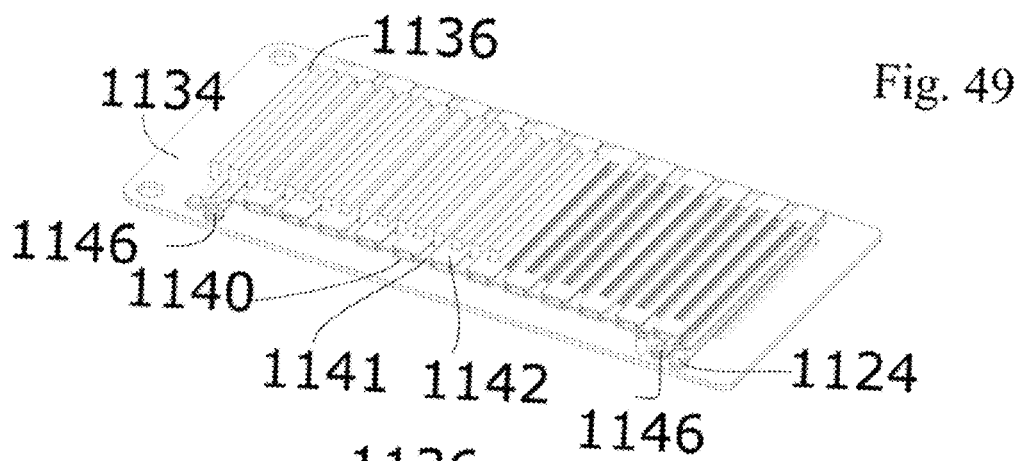
FIG. 49 is a first figure showing successive layers of an embodiment of a liner electric machine.
Figure 50:
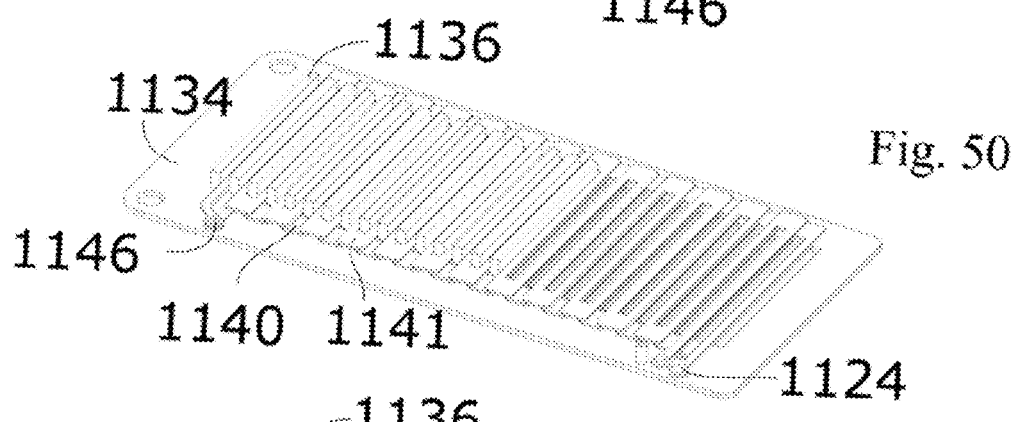
FIG. 50 is a second figure showing successive layers of an embodiment of a liner electric machine.
Figure 51:
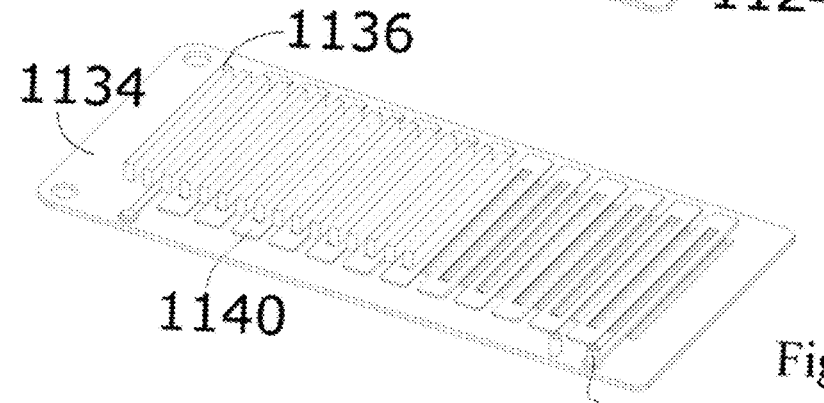
FIG. 51 is a third figure showing successive layers of an embodiment of a linear electric machine.
Figure 52:
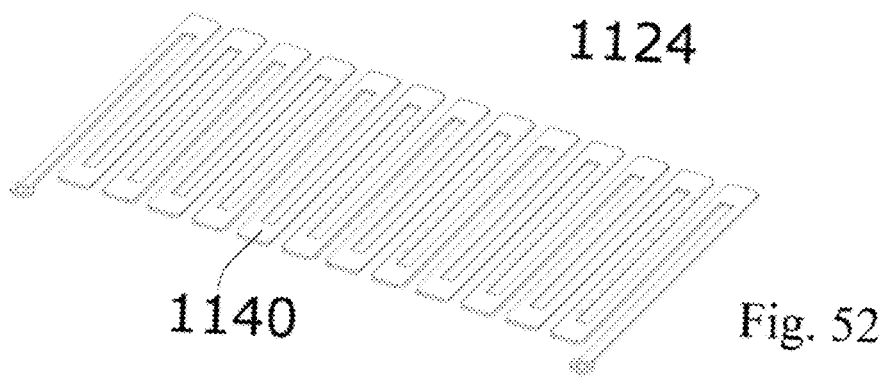
FIG. 52 is a fourth figure showing successive layers of an embodiment of a liner electric machine.

FIG. 49 shows a top conductor layer 1143 and a dozen EM posts 1136 removed. FIG. 50, FIG. 51, and FIG. 52 show, respectively, the actuator 1158 with electric conductor layers 1143 removed, layer 1142 removed, and showing only layer 1140.

There need not be separate insulator layers between adjacent conductor layers in the non-limiting exemplary embodiment in FIG. 42 to FIG. 52. This is possible if the conductor layers are coated with an insulator before or during assembly/construction. The use of insulating layers between conductor layers would eliminate the need for insulating the conductors.

The above can be configured with two or more stators on either axial end of one or more PM carriers. PM carrier can have any type of PM magnet and can be configured with a Halbach array or pseudo Halbach array (with PMs polarized in the direction of carrier motion with steel between them to provide flux linkage). The stator and "rotor" may both be energized to reduce or eliminate the need for permanent magnets. Any number or geometry or size of posts and PMs or other components may be used. Manufacturing techniques include PCB manufacturing techniques with conductive traces used for coils and posts assembled with pick-and-place equipment. Mems machines can be built with these techniques in very small sizes, subject to a lower limit where electrostatic forces dominate electromagnetic forces. Larger motors or actuators or generators can use a prefabricated conductor process as described for other embodiments in this disclosure.

Exemplary Electric Machine with Coils on Both Carriers

Figure 53:
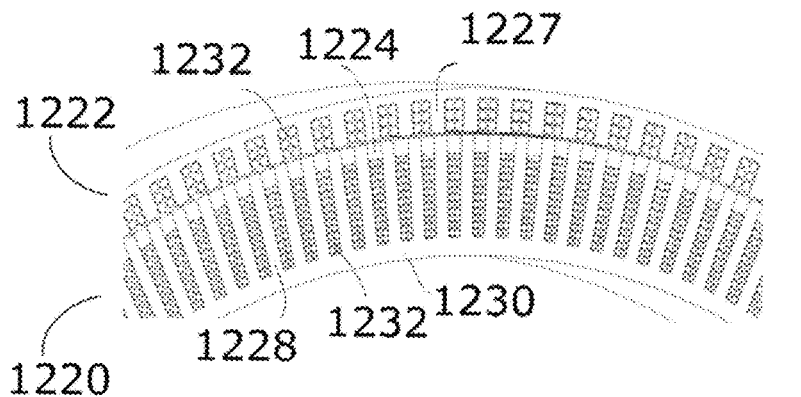
FIG. 53 shows an embodiment of an electric machine with coils in both rotor and stator.
Figure 54:
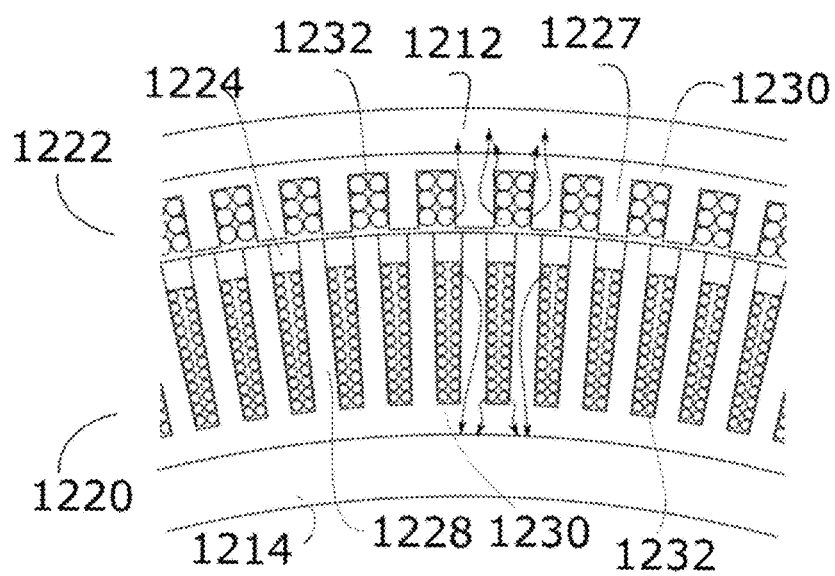
FIG. 54 shows an embodiment of an electric machine with coils in both rotor and stator.
Figure 55:
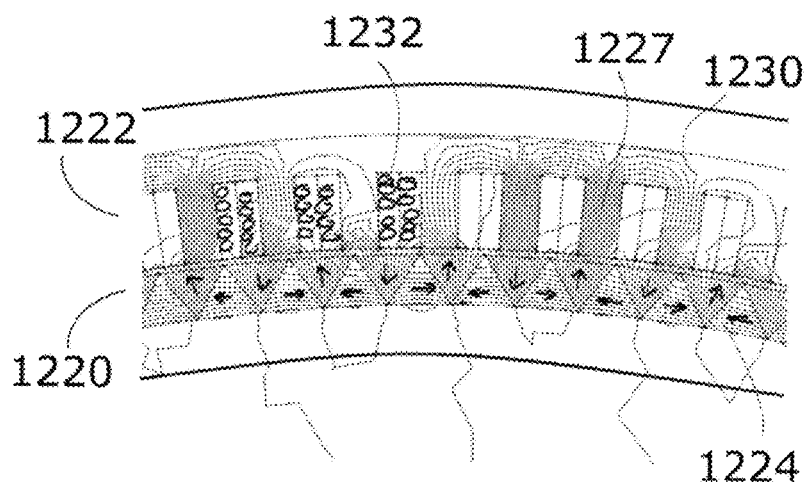
FIG. 55 shows an embodiment of an electric machine with a Hallbach array of magnets.

An example of an electric machine is shown in FIG. 53, FIG. 54, and FIG. 55, with coils on both carriers. Like the other electric machines disclosed here, the electric machine of FIG. 53 may have the disclosed slot density and post height or conductor volume. The example given is for radial flux, but the design principle could be used for axial flux and linear electric machines. Either the inner carrier 1220 or outer carrier 1222 may be fixed. The stator 1220 is wound with wire, such as, but not limited to copper wire. It can be commutated to vary the current to individual posts or phases, or it can be energized with variable DC current so the DC electromagnetic posts may be wound and energized to steer flux from all the PMs 1224 at the same time. This flux steering redirects the flux from the PMs 1224 from short circuiting through the stator 1220, and causes it to find a lower reluctance path across the airgap to the rotor 1222. The rotor 1222 can be passive (but only if the stator coils are commutated) or it can be commutated with coils 1232 around the posts 1227 (if the stator is commuted or energized with DC current). The result is an embodiment that has reduced or no flux across the airgap when the coils on the stator 1220 and rotor 1222 are not energized. This reduces or eliminates cogging and back EMF (also referred to as damping force) when the rotor is backdriven when the coils are not energized. Backdriveability is a benefit for many applications including robotics and wheel motors. This embodiment can still act as a generator but requires energizing of the stator coils.

In FIG. 53, FIG. 54, and FIG. 55, there are 168 posts on the stator 1220 and 140 posts on the rotor 1222 (although many different combinations of stator posts and rotor posts can be used). The outer diameter (OD) of this nonlimiting example is approximately 8.4" and the axial length is 1". The stator may be made of a soft magnetic steel and can be made from a solid piece of ferrous material or laminated material. The rotor 1222 may be made of a soft magnetic steel and can be made from laminated material or from a solid piece of ferrous material. The wires may be copper or aluminum but can be made of any kind of conductor including foil or square wire or superconducting material. This size of actuator is considered, by the inventor, to be well suited to a shoulder or elbow joint of a human sized robotic arm. The housing is not shown here but can be of any geometry which serves to keep the stator 1220 and rotor 1222 concentric and aligned. FIG. 53 is an isometric section view showing the stator with 168 posts with coils 1232 comprising a single layer of wire per post 1227, 1228, and a permanent magnet 1224 contacting each post near the OD of the stator 1220. It also shows the array of 140 rotor posts and coils 1232 may comprise a single layer of winding on each, and backiron 1230 of the stator 1220.

When no power is supplied to the stator coils 1232, the flux from the PMs can "short circuit" through the stator so there is reduced or no flux that jumps across the airgap. This reduces or eliminates the cogging torque when the coils are not energized. When the inner coils are energized, for example with a DC current, a portion of the flux from the PMs 1224 is steered toward and across the airgap to the rotor posts (along with the stator post flux). The greater the current in the stator coils, the higher the flux density in the airgap.

The stator posts 1228 can be wired together into a single circuit that is all energized at the same time. The rotor posts may be wired and energized in phases (5 phases in this example, but other numbers of phases can also be used) and then commuted by moving the pattern of polarities along sequentially. In this example, the rotor post polarity is S N S N S S N S N S S N S N S S N S N S etc. Other polarity configurations may be used for example a repeating pattern of NS. The first or second set of adjacent S poles can also be turned off. Sinusoidal or other current profiles can also be applied to each post for commutation. In this example, the rotor and stator are wound with 24 gauge wire and energized with 20 amps. The stator and rotor are 0.5: wide. The whole assembly weighs approximately two lbs and has a torque at 20 amps of approx. 50 Nm. Higher current is believed possible for short periods of time to achieve higher torque. Wider stators will produce higher torque.

When provided with housings 1212, 1214 as shown in FIG. 54, heat dissipation from coil to housing may be shared between the inner housing 1214 and outer housing 1212.

Exemplary Electric Machine with Halbach Array of Magnets

FIG. 55 shows an embodiment of an electric machine using a Halbach array of permanent magnets on an inner stator. Halbach arrays are known for use as permanent magnets in an electric motor. This is an effective way to use permanent magnets and analysis shows that it has a similar toque to weight ratio of the flux steering stator described in FIG. 53 and FIG. 54. Permanent magnets, have a lower flux density than steel so the maximum torque possible for a Halbach array embodiment is expected to be lower for a given diameter (and possible stator/rotor mass) than with a flux steering embodiment as described earlier in this disclosure. Advantages of using a Halbach array include a low profile form factor which is a significant value for many applications. The short heat flow path for the conductors which results from high slot density is expected to provide improved torque density. The Halbach array may be provided on the stator or rotor, and either may be the inner. In another embodiment, triangular magnets may be used with alternating radial polarity but soft magnetic material triangular flux path connectors between each magnet having a similar shape and size to the Hallbach magnets. The advantages of this configuration include lower cost due to half the number of magnets, lower tolerance stackup due to being able to connect all of the steel triangle parts into a single backiron component, and better securing of the permanent magnets due to them being magnetically attracted to the soft magnetic material rotor backiron.

Exemplary Axial Flux Electric Machine with Inner Bearing and Outer Output

FIG. 56 shows a cross-section of an exemplary actuator 2100. An outer housing 2102 is fastened to an outer housing 2104. A stator in two parts or equivalently a first stator 2106 and a second stator 2108 is fixed to each of the inward facing surface of housings 2102, 2104 by mechanical means such as threaded fasteners, and or with an adhesive or other fixing method. Rotor 2110 is fixed for rotation with a bearing 2112 which holds it concentric and at a fixed axial position relative to the housings 2102 and 2104.

FIG. 57 shows a detailed cross section view of the embodiment from FIG. 56. Permanent magnets (not shown) are mounted in the rotor 2110. The section plane goes through a post 2114 on the stator 2106, but the section plane does not go through a post on the stator 2108. This is because in this exemplary embodiment the stator 2108 is rotated by one quarter of a post pitch to reduce the cogging force of the permanent magnets in the rotor 2110 interacting with the posts on the stators 2102 and 2104. Rotating one stator relative to the other serves to cancel out the somewhat sinusoidal cogging torque produced between the rotor 2110 and the stators 2106 and 2108. This effect is demonstrated in FIG. 58, where the first fundamental harmonic of torque 2300 produced by the electrical wave and the first harmonic of cogging torque 2302 are plotted on line 1$b$ as functions of rotor position, indicated by the numbers 0 through 6, with 0 and 6 corresponding to the start and end, respectively, of an electrical cycle. The posts 1$b$ of stator 2106 and posts 2$b$ of stator 2108 exert attractive forces 2306 on the rotor permanent magnets 2124. In this non-limiting exemplary embodiment, there is a 3:2 ratio of posts to magnets resulting in 2 cogging steps 2308, 2310 per stator post. Rotationally offsetting one stator relative to the other by one quarter of a pitch, therefore aligns the somewhat sinusoidal cogging torque 2302 of one stator at 180° out of phase from the cogging torque 2304 of the other stator to achieve a beneficial level of cogging torque cancellation. Other ratios of stator posts 2114 to rotor magnets 2124 will have other numbers of cogging steps and will require different offset angles to achieve maximum cogging cancellation according to the following calculation.

The number of cogging steps is given by the LCM—Least Common Multiple between P the number of posts and M the number of magnets, so for 3:2 ratio the number of cogging steps is 1 cm(3,2)=6

EXAMPLES

3:2 ratio—1 cm(3,2)=6 cogging steps
24:16 ratio—1 cm(24,16)=48
144:96 ratio—1 cm(144,96)=288
144:142 ratio—1 cm(144,142)=10224
144:146 ratio—1 cm(144,146)=10512

The offset angle is found based on the number of cogging steps, so if for one electromagnetic cycle of 360 electric degrees there are 6 cycles of cogging which means that the cogging cycle completes at each 360 degrees/6=60 electrical degrees.

The 60 electrical degrees correspond to 360 degrees of the cogging mechanical wave. To cancel a wave you need a wave of the same frequency with the phase shifted by 180 degrees. So 180 degrees of mechanical phase shift corresponds to 15 degrees of electrical wave, which means that the second stator should be shifted its electric phase by 15 degrees. If not the total torque instead of 2×TQ, would be 2×TQ×cos(15 deg)=2*TQ*0.966=1.932*TQ of one stator.

If the stator shifts by half of the stator pitch, the cogging steps wave shifts its phase by 360 mechanical degrees, which means a full cogging step that adds the two waves instead of cancelling them. To cancel the waves the shift has to be done by ¼ of the pitch which corresponds to 180 mechanical wave degrees.

As shown in FIG. 58, the ¼ pitch offset comes from the 3:2 ratio, if there are 6 cogging steps there should be 6 neutral positions where the torque is zero.

Positions 0, 2, 4 and 6 corresponds geometrically to half pitch and full pitch.

0 and 4 corresponds to zero or full pitch.

2 and 6 corresponds to half pitch.

Positions 1,3,5 corresponds to ¼, ¾ and ⁵⁄₄ of pitch.

Figure 59:
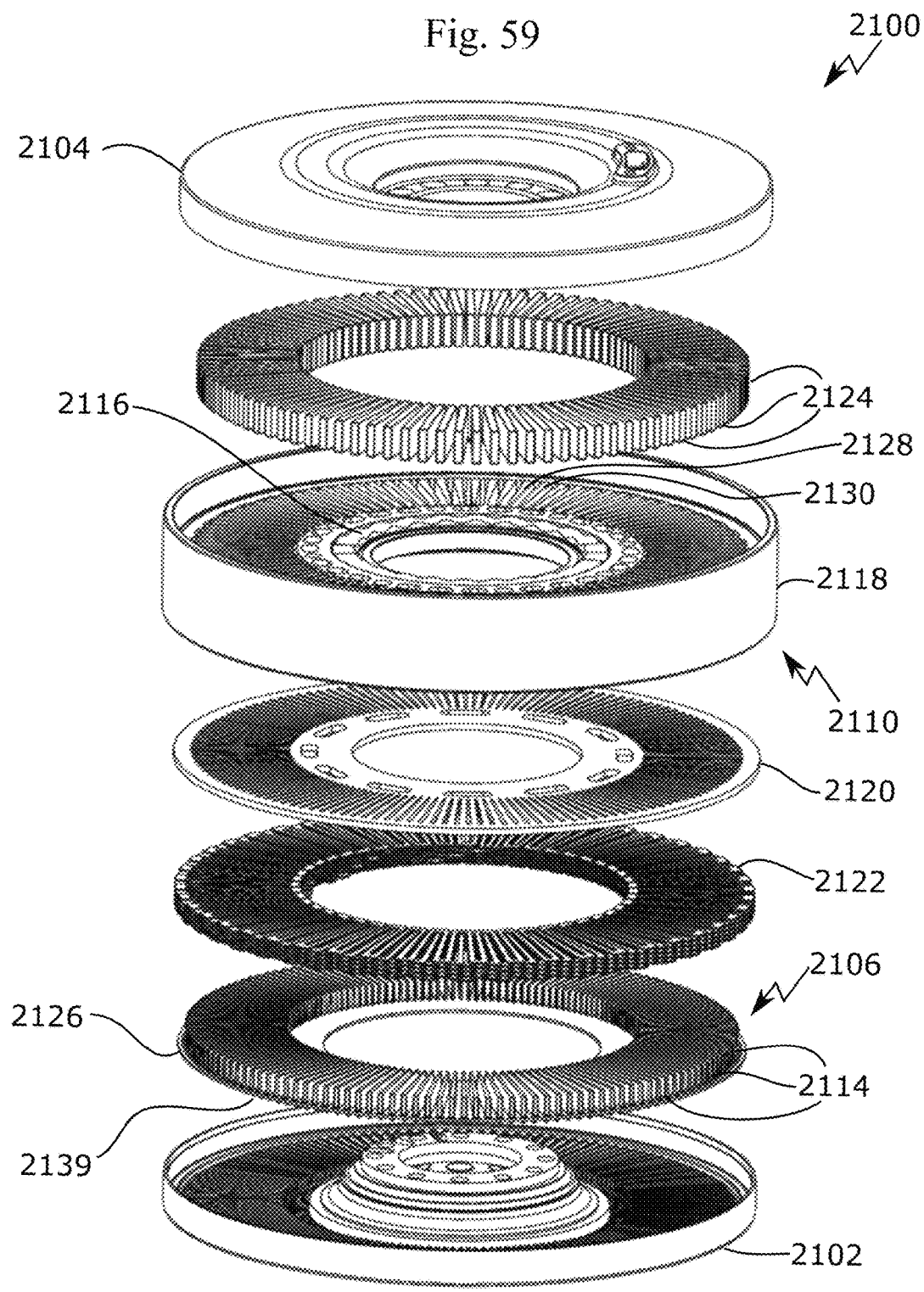
FIG. 59 shows an exploded view of the exemplary embodiment in FIG. 56.

FIG. 59 shows an exploded view of the device in FIG. 56. This non-limiting exemplary embodiment 2100 has stators 2106, 2108 (not shown) on either axial end of a rotor 2110. The stators have a backiron 2126 with an array of fins 2139 projecting from the back surface, and 2144 radially aligned, axially extending posts 2114 corresponding with 2144 slots. There are 96 magnets 2124 and the stators 2106, 2108 are powered by a three phase sinusoidal power from a motor controller. A range of slots can be used and a range of magnet numbers can be used within the disclosed range. Various numbers of phases can be used; many different wiring configurations can be used.

An exemplary embodiment uses a fractional slot winding with N52 permanent magnets Many different permanent magnets can be used and many different magnetic materials can be used.

Exemplary Axial Flux Electric Machine with Layered Construction

Figure 60:
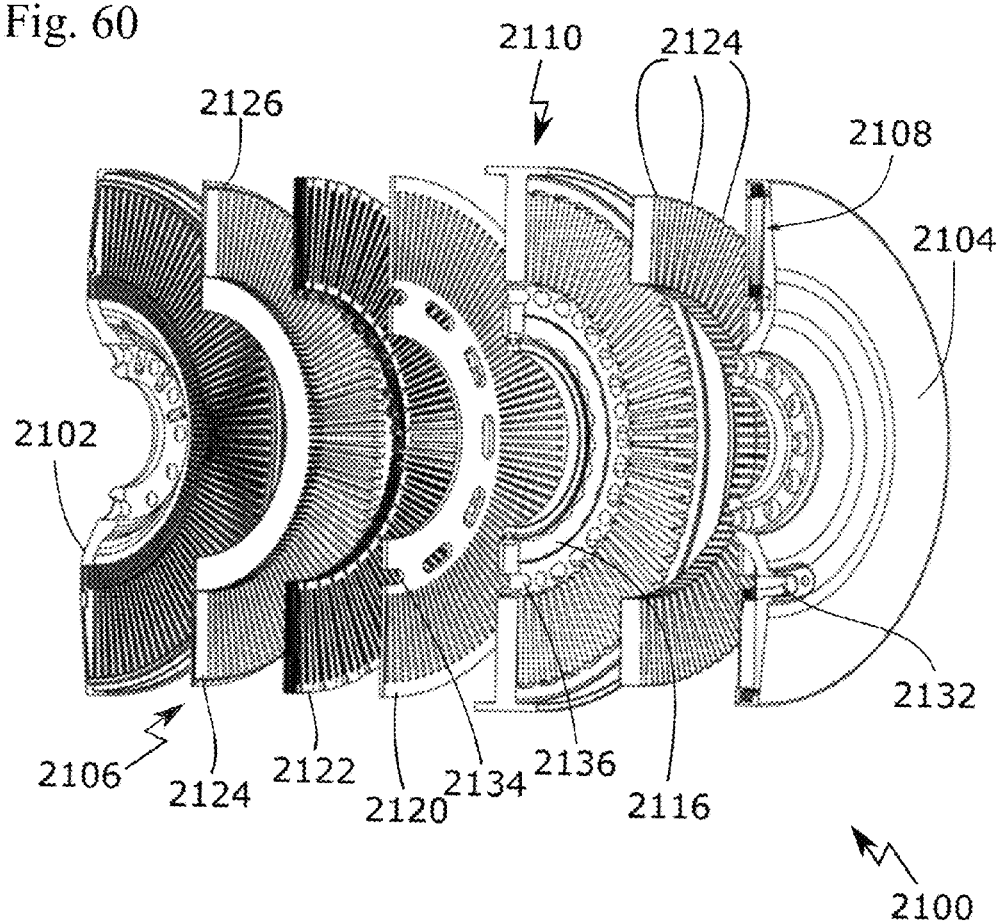
FIG. 60 shows a cross section of a partially exploded view of the exemplary embodiment in FIG. 56.

In an embodiment shown in FIG. 59 and FIG. 60, an array of tangentially magnetized permanent magnets 2124 are magnetized tangentially in the sequence NSSNNSSNNSSNNS . . . . Such that every first radial flux path member 2128 on the rotor 2110 is N polarity at both axial ends and every second flux path member 2130 is S polarity at both axial ends. The rotor 2110 includes a sinusoidal surface 2116 which can be used in conjunction with an encoder such as, but not limited to an eddy current sensor, an optical sensor, or other sensor to provide radial position of the rotor 2110 for the motor controller. Many other types of encoders can be used with embodiments of this device. The cylindrical section 2118 of the rotor 2110, serves to provide an attachment surface from the rotor 2110 to an output, such as a robotic arm, and to provide stiffness to the rotor 2110. This cylindrical member 2118 can be one piece with the rotor 2110, or it can be a separate component such as, but not limited to an aluminum ring which is assembled to the disk by thermal expansion and/or otherwise attached to the disc section of the rotor 2110. Separator discs 2120 may be used to seal and contain the conductors 2122 in the slots between the stator posts 2114. If separator discs 2120 are used, they may be of a non-electrically conductive material such as Torlon™ (a polyamide-imide) or other non-metallic material to prevent eddy currents. The conductors 2122 may be of any construction, including wires, but may be a layered construction, as shown here. Conductors may be of any material but may be of copper, or aluminum.

FIG. 60 shows a section view of the device from FIG. 56 with the housing 2102 and stator 2106 assembly exploded, the rotor 2110 and magnets 2124 exploded, and the housing 2104 and stator 2108 are assembled. An airflow inlet 2132 is shown on the housing 2104 with cross-flow openings 2134, 2136 in the separator disk 2120 and the rotor 2110 to allow cooling fluid flow from one side of the actuator 2100 to the opposite stator.

Figure 61:
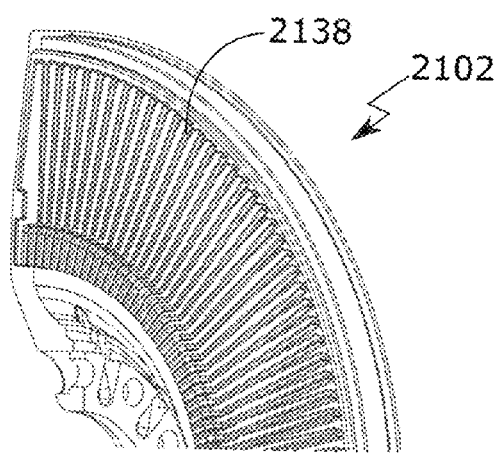
FIG. 61 show a section detail view of a housing of the exemplary embodiment in FIG. 56.

FIG. 61 is a section detail view of housing 2102. The inside surface of the housing 2102 has an array of receiving slots 2138 for the array of fins 2139 on the back surface of the stator 2106. These receiving slots 2138 serve to secure the back surface of the stator 2106 to the housing 2102, and also to transmit heat conductively from the back surface of the stator 2106 to the housing 2102. The volume between the stator 2106 and the housing 2102, and between the receiving slots 2138 may be used as a fluid flow chamber to draw heat away from the back surface of the stator 2106 and the internal surfaces of the housing. Gas or liquid can be circulated through this chamber by means of a pump or compressor (not shown). The cooling effectiveness of the disclosed slot geometry allows for high performance to be achieved with air as a cooling fluid in many applications. The use of air instead of liquid has many potential advantages including lower cost and weight and the elimination of concerns about leakage in many applications.

Figure 62:
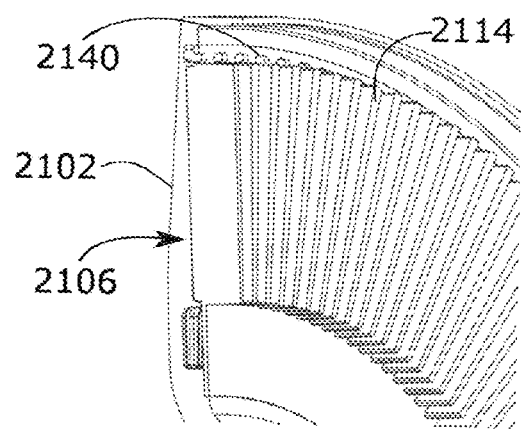
FIG. 62 shows a section of an assembled housing and stator of the exemplary embodiment in FIG. 56.

FIG. 62 shows the stator 2106 assembled to the housing 2102. In this exemplary embodiment the stator 2106 comprises an array of axially extending radially aligned posts 2114 with a slot density and conductor volume within the disclosed ranges. An array of fluid ports 2140 is shown on the stator 2106 to provide an inlet or outlet for fluid in the chambers between the stator 2106 and the housings 2102 and 2104.

Figure 63:
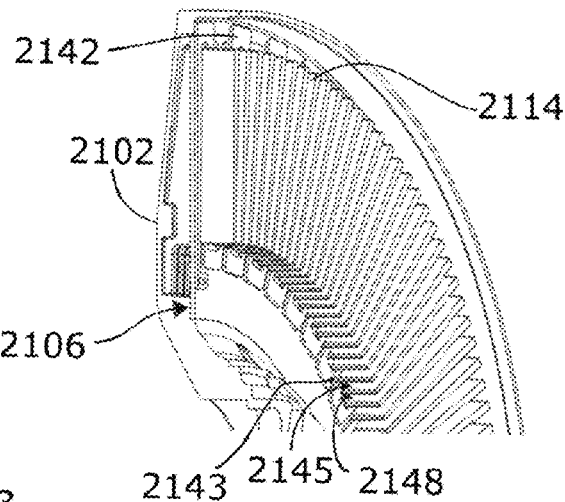
FIG. 63 shows a section of an assembled housing and stator of the exemplary embodiment in FIG. 56 with the first conductor layer on the stator.
Figure 64:
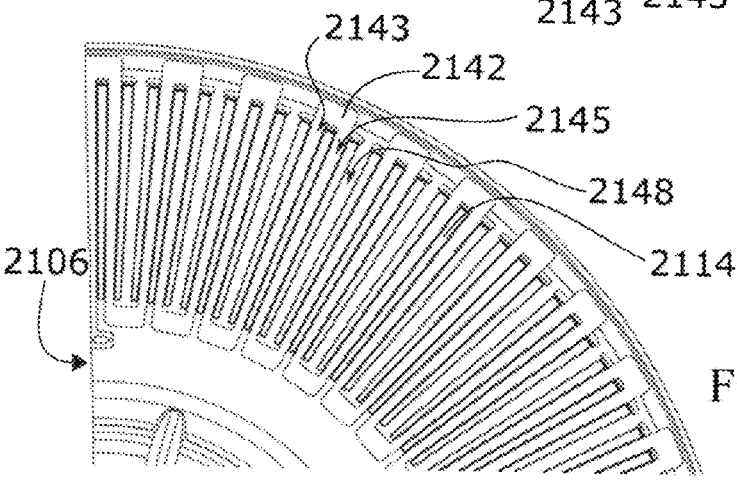
FIG. 64 shows a plan view of the section in FIG. 63.

FIG. 63 shows the stator 2106 assembled to the housing 2102 with the first conductor layer 2142 of phase A of the 3:2 stratified conductor configuration of an embodiment of an electric machine. Each layer of a phase of this embodiment of the conductors occupies a single axial layer on the stator 2106 with no other conductors from other phases on that same layer. A conductor 2142 on a layer occupies two slots 2143, 2145 in sequence and then skips a slot 2147 so that a first slot 2143 on a layer has a conductor 2142 from a phase providing current flow in one radial direction, a second slot 2145 on that layer has a conductor 2142 from that phase providing current flow in the opposite radial direction, and a third slot 2147 on that layer has no conductor. This conductor shape and sequence of one conductor layer 2142 in one phase is shown in FIG. 64.

Figure 65:
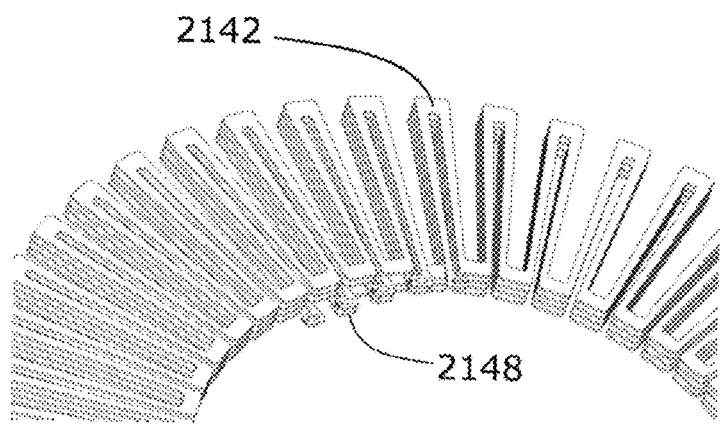
FIG. 65 shows four conductor layers of the same phase from the exemplary embodiment in FIG. 56.

FIG. 65 shows four layers of conductors 2142 of the same phase with the stator 2106 and conductors from other phases removed for clarity. Axial inserts 2148 connect the end of each conductor 2142 from a phase on a layer with the start of another conductor 2142 from the same phase on a different layer.

Figure 66:
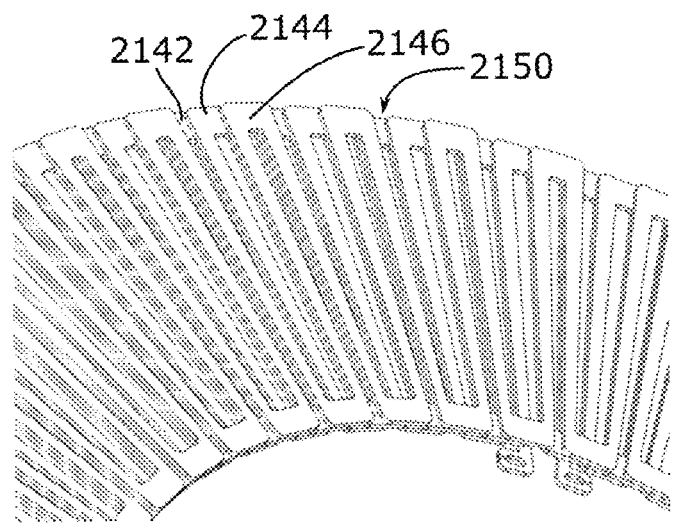
FIG. 66 shows the arrangement of three adjacent conductor layers from different phases from the exemplary embodiment in FIG. 56.
Figure 67:
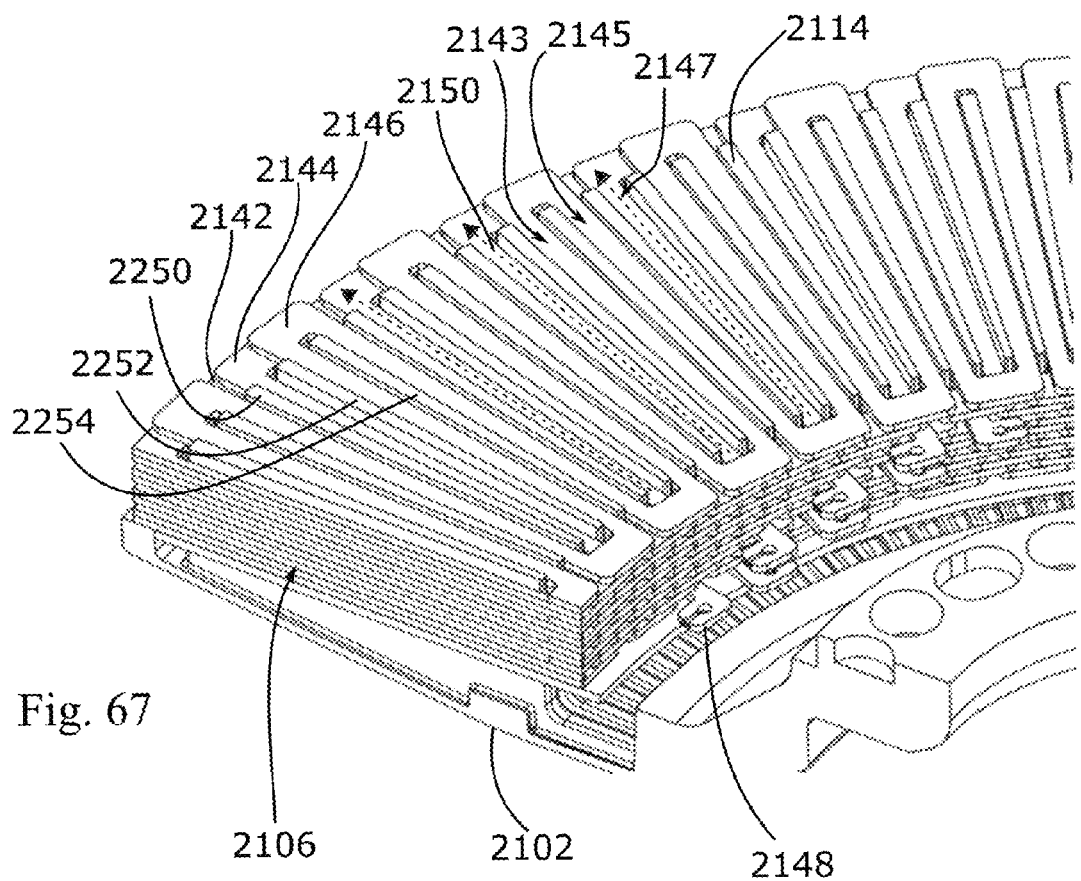
FIG. 67 shows a section of an assembled housing and stator from the exemplary embodiment in FIG. 56 with radial fluid flow channels between conductors indicated.

FIG. 66 shows the conductor arrangement in the exemplary embodiment 2100 with one conductor layer 2142 from each phase. The end-turns of one conductor layer 2142 overlap the end-turns of the next conductor layer 144 in such a way as to provide a fluid flow passage 2150 radially (outward in this example but fluid can flow in either direction) between layers in a slot. Stator posts are not shown in this FIG. 66. In FIG. 67, the fluid flow channel in every third slot 2147 on the same layer is shown by the dashed arrow lines in three exemplary slots. Every first post 2250 on the stator 2106 has a conductor 2142 from phase A on either tangential side. Every second post 2252 on the stator 2106 has a conductor 2144 from phase B on either tangential side. And every third post 2254 on the stator 2106 has a conductor 2146 from phase C on either tangential side.

Figure 68:
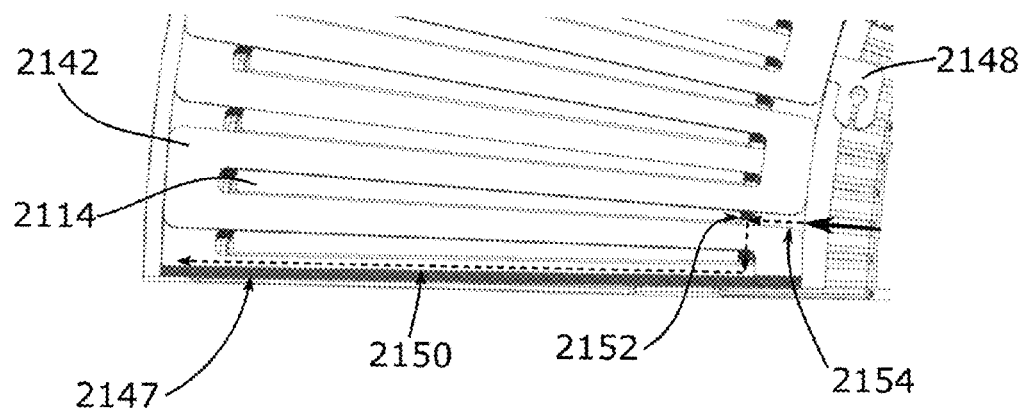
FIG. 68 shows a plan view of the radial, axial and circumferential fluid flow paths for cooling fluid between the conductors of the exemplary embodiment in FIG. 56.

This stratified winding configuration allows radial cooling fluid flow in the spaces between the conductors between the posts, but the end-turns seal the slots from radial access to the channels in the slots. To provide flow to the radial channels 2150, the conductors 2142 are pre-formed with an axial flow path 2152 at the end of each of the posts 2114 as shown in FIG. 68. This axial flow path 2152 allows for the radial fluid flow in a channel 2150 in a slot 2147 to flow circumferentially at the end of a post 2114 and then axially in the axial fluid path 2152, and then radially outward (or inward depending on coolant flow direction) in the radial flow channel 2150 on a different layer.

This flow path is shown in FIG. 68 where the thick arrow shows the airflow up to the inlet channel 2154 which is radially aligned with a post 2114. The thick dashed arrow shows the radial flow in the inlet channel 2154. The fine dashed line indicates the tangential flow across the end of the post 2114, and then axial flow in the space 2152 at the end of the post 2114. The long dashed line indicates the flow radially outward in the channel 2150 between the conductors 2142. By creating an axial flow path 2152 at the end of the posts 2114 in this way, the cooling fluid has multiple routes where it can flow tangentially and axially to connect inlet and discharge air to the radial flow channels 2150.

Figure 69:
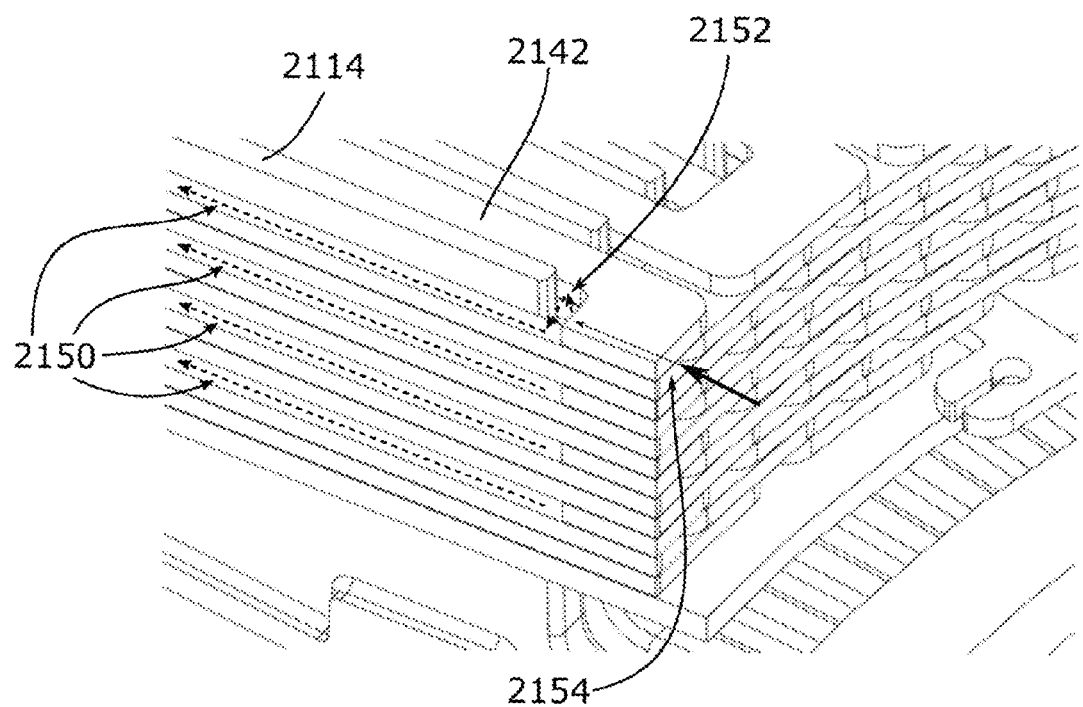
FIG. 69 shows a section view through the stator of FIG. 68 showing the cooling fluid flow path.

FIG. 69 shows the same flow path with similar arrows. It is important to note that the post end spaces 2152 allows cooling fluid to enter on one layer and to flows radially in a channel 2150 on a different layer.

Embodiments of a stratified conductor system may include, radially tapered conductor in a radially tapered slot to achieve a higher slot fill percentage, the ability to stamp conductors for ease of manufacturing, layered construction to simplify and increase the precision of assembly, the ability to achieve greater consistency of manufacturing, the ability to achieve consistent fluid flow channels for even cooling, and the ability to create a large surface area of coolant contact with conductors relative to the volume of the conductors for more effective cooling though active cooling means.

Embodiments of a stratified conductor system as shown in FIG. 63 and others, are characterized by the same thickness of conductor for the majority of a layer and with a variable width that includes a wider section at the end turns with greater cross section perpendicular to the direction of current flow. The wider cross section at the end turn is beneficial because it reduces the resistance and heat production of the end turns by a squared effect allowing the end turn to operate at a lower temperature than the narrower conductors in the slots. The very low heat flow resistance between the slot turns and the end turns, along with the larger cross sectional area of the end turns, provides a very effective heat sink for heat generated in the slots. The larger surface area of the end turn (as compared to if the end turns were the same width or smaller width as compared to the maximum width of a conductor in a slot) provides increased surface area for cooling fluid interaction if the end turns are actively cooled and/or for conductive heat transfer through successive layers of electrical conductor end turns axially to the housing.

Any number of layers may be used with this stratified conductor system. Any number of phases may be used with this conductor system. With all numbers of phases, the conductor may, for example, fill two adjacent slots with current flow in opposite directions in these slots, and then skip X-2 slots with "X" being the number of phases. With four phases, for example, each conductor on a layer would skip two slots rather than skipping one slot as with three phases. With five phases each conductor would skip three slots and so-on.

Exemplary Axial Flux Electric Machine

Figure 70:
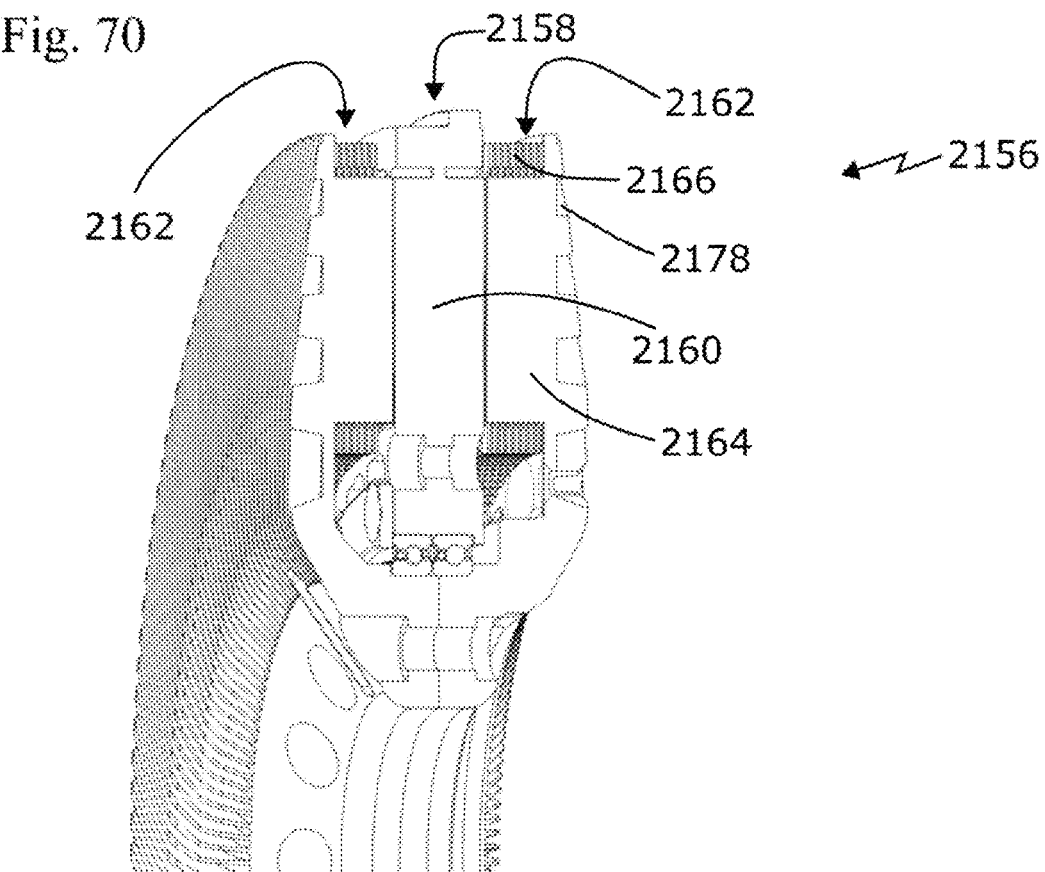
FIG. 70 shows a cross-sectional view of an exemplary embodiment with two stators and a rotor.
Figure 71:
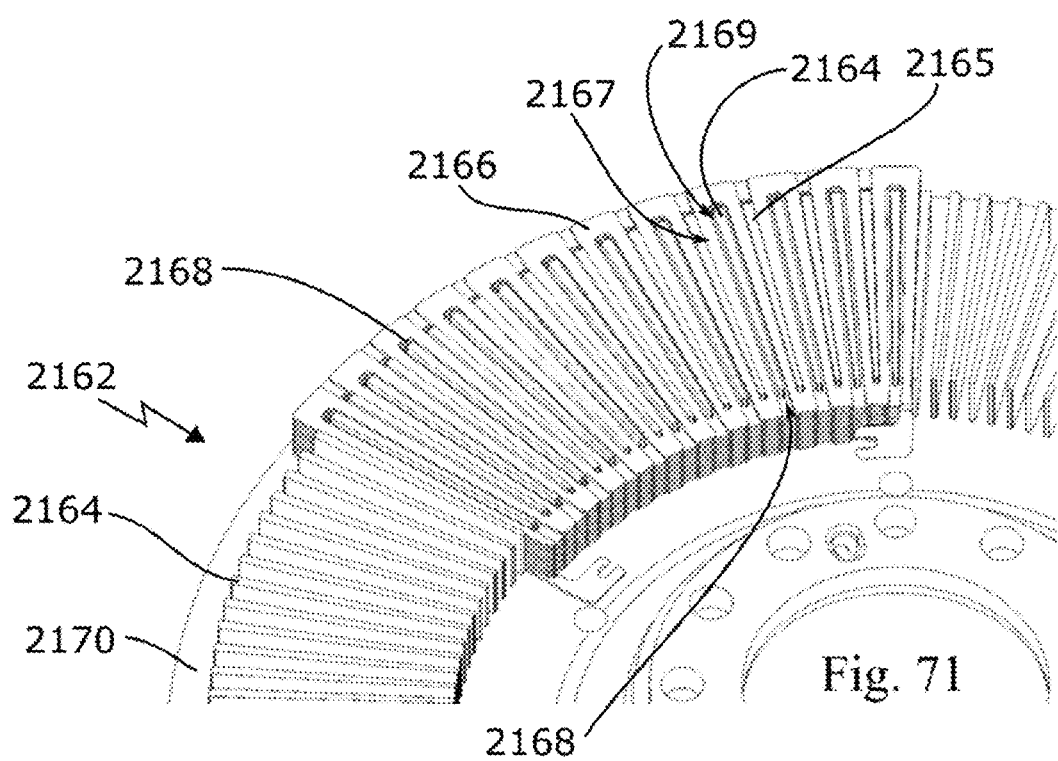
FIG. 71 shows a stator from the exemplary embodiment in FIG. 70 with conductors shown in one section.

A cross sectional view of a non-limiting exemplary embodiment 2156 of the device is shown in FIG. 70, with an average airgap diameter of 175 mm. A rotor 2158 with 2146 permanent magnets (not shown) corresponding with 2146 radial flux path members 2160 is rotationally fixed on a bearing between two stators 2162 which each have 144 posts 2164 and 144 slots. Three phase control is used, although other numbers of phases are possible. As is shown in FIG. 71 the conductors 2166 from each of the three phases are located in two equally and diametrically opposite arrayed sections of 24 slots each. The second section in each of the three phases is wired in reverse current flow direction to the first section and each section of a phase is wired in reverse to the phase rotationally adjacent to it. The conductors 2166 can be of conventional wire but may be a stratified conductor system such as is shown in FIG. 70 to FIG. 78. In this embodiment, the conductors 2166 in a phase in each section alternate radial direction in each adjacent slot in one circumferential direction; reverse circumferential direction at the end of a section; and alternate radial directions in the opposite circumferential direction such that the current is always flowing the same radial direction in all the conductors in a slot, and each slot has the opposite current flow direction at a given moment compared to an adjacent slot in that section such that the posts in a section are magnetized with alternating polarity at a moment energized.

The pattern of the wire for 6 sections of 24 slots each is as shown here where "A" indicates the circuit is wired in one direction and "a" indicates that the same circuit is wired in the opposite direction, with different letters designating different phases. Only the first 6 slots are shown.

|  | Slots | | | | | | |
| --- | --- | --- | --- | --- | --- | --- | --- |
| Sections | 1 | 2 | 3 | 4 | 5 | 6 | ... |
| 1 | A | a | A | a | A | a | ... |
| 2 | b | B | b | B | b | B | ... |
| 3 | C | c | C | c | C | c | ... |
| 4 | a | A | a | A | a | A | ... |
| 5 | B | b | B | b | B | b | ... |
| 6 | c | C | c | C | c | C | ... |

Above is the phase and polarity pattern for one stator. For an embodiment with two stators, and which uses a rotor for example as disclosed in this document, with the same polarity on both axial ends of a radial flux path member, the physical structure of the second stator wiring should be mirrored about a plane through the center of the rotor. The current flow, however, should be in the opposite (clockwise/counter-clockwise) direction in axially aligned posts on one of the stators compared to the other.

The 144:146 size is by no means limiting; a wide range of slot numbers and magnet number is possible.

Figure 72:
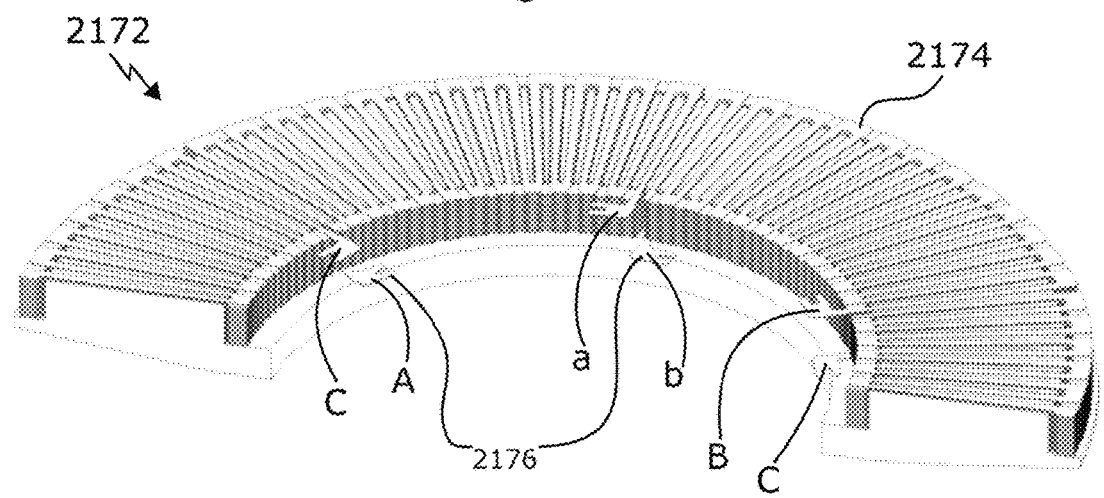
FIG. 72 shows a section view of a simplified stator with conductors.

FIG. 72 shows a section view of a simplified stator 2172 with the start and end connection 2176 phase and polarity for conductors 2174 from the visible phases using the convention described above.

Due to the very high number of cogging steps of this device, the cogging amplitude is expected to be very low. It is therefore expected to be unnecessary to position the stators at angles to each other as shown in FIG. 56.

Exemplary Cooling Structures for an Axial Flux Electric Machine

Passive cooling may be used for example through conductive heat transfer from the electrical conductors to the back surface of the stator back-iron of each stator. In the embodiment of FIG. 70 and FIG. 71, the backiron 2170 may be made of a one-piece material such as solid iron or steel and may be a low electrical conductivity but high magnetic saturation material such as, but not limited to, a powdered Permendur™ 49Fe-49Co-2V or another soft magnetic material that can be a non-flat shape. Solid in this context means that the magnetic material of the stator is continuous and free of non-magnetic laminations.

The stator 2162 has an array of cooling fins 2178 on the back face of the stators 2162 that increases surface area and provide increased cooling rates for passive cooling such as by radiative effects and convective fluid flow. The cooling fins 2178 will also increase the effectiveness of active cooling such as forcing gas or liquid over the cooling fins 2178. The cooling fins 2178 can also be sealed inside a chamber such as a housing (not shown). The cooling fins 2178 shown here are not radially aligned. This is to create a structural matrix with the radially aligned posts 2164 for increased circumferential rigidity. The axial construction and short axial features of this stator configuration make it suited for construction from powdered magnetic materials. The posts 2164 and fins 2178 can be tapered in the axial direction to facilitate press forming or other production methods. The conductors 2166 can also be of different widths from the bottom of the slot to the top of the slot to achieve the desired slot fill at each slot depth.

Figure 73:
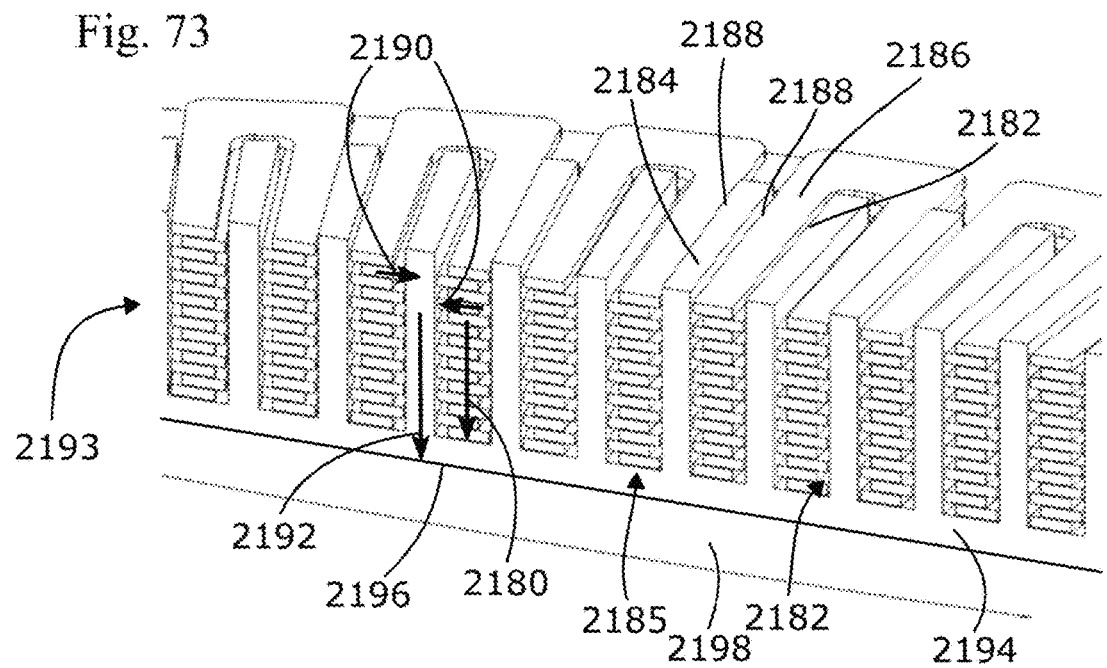
FIG. 73 shows an exemplary configuration of conductors on a stator in which the conductors do not skip slots.

In the embodiment shown in FIG. 73, the conductor system provides a combination of uninterrupted axial conductive heat flow path 2180 as a result of greater than 50% width of conductors in slots 2185 and no missing layers of conductors 2186, and the possibility of radial cooling fluid flow chambers if desired though channels 2182. This can be accomplished a number of ways according to the principles disclosed here. In the exemplary embodiment shown in FIG. 73, the conductor 2186 on either side of a post 2184 is close enough to post 2184 on both sides of post 2184 to allow the post 2184 to precisely position the conductor 2186 in both circumferential directions and to create a bond 2188 between conductor 2186 and the side of the post 2184. This precision positioning helps ensure that the gap 2182 is created on the opposite side of a conductor 2186. This pre-formed narrowing of the conductor 2186 and shape which ensures it is off-center and contacting one wall of slot 2185, helps provide structural rigidity and fluid flow function on the non-contacting circumferentially facing side.

Another feature of this construction is the gap 2182 on only one circumferentially facing side of a conductor 2186 in a slot 2185. This is to help ensure that potting compound or varnish does not fill the channels 2182 as would be more likely with two small channels compared to one large channel. This construction also helps ensure that each conductor 2186 has a circumferential conductive heat flow path 2190 to the side of a post 2184.

As a result of the construction shown in FIG. 73, the heat from conductors 2186 in a slot 2185 have an uninterrupted axial heat conduction path 2180 through the conductors 2186 to the back-iron 2194 of the stator 2193, a circumferential heat conduction path to a post 2190 to allow a short heat flow path through the post to the back iron 2192. From the back surface of the backiron 2196, heat from the stator 2193 can be transferred to the housing 2198 conductively as shown in this figure, or to a cooling fluid, or radiated to another body (as shown in other embodiments).

Figure 74:
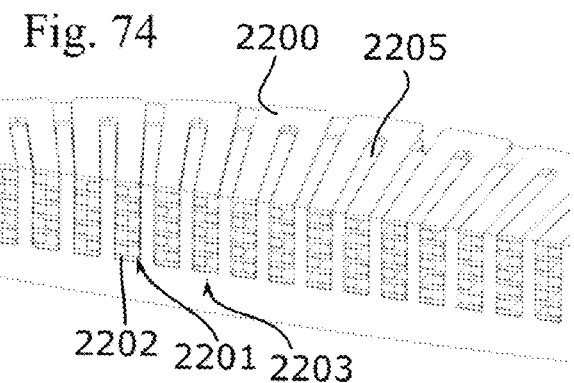
FIG. 74 shows an exemplary configuration of conductors on a stator in which some conductors with variable conductor widths.

An embodiment in FIG. 74 has periodic layers 2200 that are the full width of the slot 2203, and periodic layers 2202 that are narrower than a slot 2203. The layers 2202 may be prefabricated to locate on both sides of every second post 2205. This provides a consistent and repeatable fluid flow channel 2201 with a minimized possibility of obstructing the channel with potting compound as would be the increased risk if the narrower conductor 2202 was centered. The narrower conductors 2202 may be axially thicker to match the cross sectional area of the wider conductors 2200. Conductors 2202, in this configuration can be narrower than 50% while still providing structural rigidity of the conductors in the slots 2203. The option to use narrower than 50% width for a layer allows a larger cross sectional area for a channel 2201 than the single thickness construction shown in FIG. 73.

Figure 75:
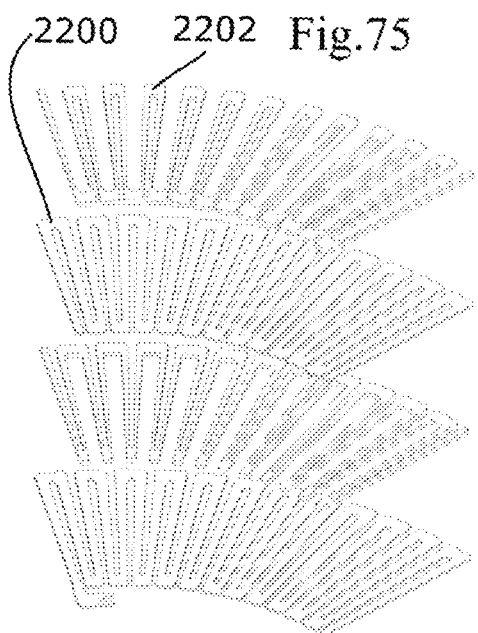
FIG. 75 shows an exploded view of four layers of conductors from FIG. 74.

FIG. 75 shows an exploded view of four layers of the embodiment in FIG. 74. The wider but axially thinner section of the conductors 2200 are shown clearly here in contrast to the narrower but axially thicker conductors 2202.

Figure 76:
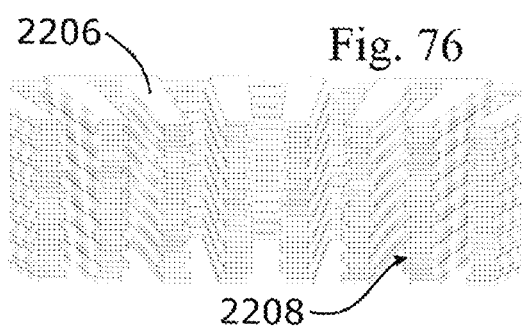
FIG. 76 shows an exemplary configuration of conductors with multi-layer thickness fluid flow gaps.

If a higher number of turns per post is desirable for an application, multiple layers of thinner conductors 2206 can have the same axial profile as shown in FIG. 76. This allows a multi-layer thickness fluid flow gap 2208 with the advantage of preventing obstruction of the gap with the potting compound, or allowing a thicker potting compound to be used without permanently filling the fluid flow gaps.

Multiple thinner layers 2206 can be used in parallel or in series with various effects. In an embodiment, thicker layers (not shown) may be connected in series with adjacent layers at the bottom of a slot, and thinner layers may be connected in parallel at the top of a slot. The thinner layers in parallel are believed to have the advantage of reducing eddy currents in the conductors closest to the permanent magnets during rotor rotation.

All of these embodiments benefit from an axial cooling fluid flow path at one or both radial ends of a post which result from the radial conductor slot being longer than the stator post which it partially encircles, which allows fluid flow in the slots to enter or exit the conductor section on a different layer than the radial flow in a slot. The radial ends of posts define radial end portions.

Variations of these conductor constructions can be combined with other variations of other embodiments of the present conductor system.

The conductors in FIG. 71 are pre-formed to provide a gap 2169 on one side of the slot 2167 between the side of the conductor 2166 and the side of the post 2164. This gap 2169 is combined with an axial flow path 2168 at the end of post 2164 which allows cooling fluid to flow circumferentially at the end of post 2164 and then axially along the end of post 2164 through gap 2168, and then radially outward (or inward if flow is reversed) in the gap 2169 between conductors from two slots 2167 on a different layer. The conductor 2166 has a clearance on both sides of every first post 2164, and is close fitting on both sides of every second post 2165.

The electrical connections between axially adjacent conductor layers can be done a number of ways. Electrical connections may be between axially adjacent conductor elements to serially connect the electrical flow paths of the axially adjacent conductor elements. An embodiment uses the overlapping surface area of two conductors in a slot at the end of a section to provide a large surface area for soldering (or other electrical connection method). The use of two conductors from two layers in a slot allows up to the entire slot length of two layers to be used as a single conductor. This reduces the electrical resistance enough to reduce the cooling requirement in that slot. This is important because maintaining a precision flow channel will be more difficult at a soldered connection so fluid flow may be more difficult to guarantee in high production.

Figure 77:
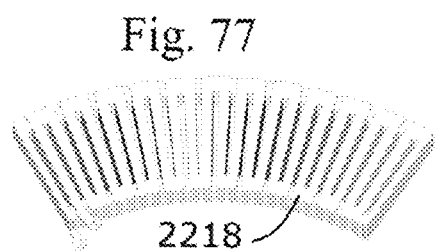
FIG. 77 shows a configuration of conductor layers in an exemplary method of assembly.

A construction that allows double overlapping surface layer connected conductors in a slot is shown in FIG. 77. The conductors 2218 will be coated or otherwise insulated, such as with paper between layers or anodizing, except for the area in an end slot where two mating surfaces 2220 and 2222 from conductors 2218 on adjacent surfaces will be un-insulated and connected together with an electrical conductor. Methods of construction include manual or automated soldering of a connection at alternating ends of a section as each layer is placed on top of another layer. Pre-tinning these surfaces will allow this process to be done precisely. Spot welding of these surfaces may allow electrical connection without adding thickness to the joint and would eliminate the risk of excess solder making unwanted contact with other surfaces. If aluminum conductors are used, they can be hard anodized and then prepared for tinning (such as by masking during anodizing, and then the connection surfaces can be stripped of oxidation in an inert environment). While still in the inert environment, the surface can then be tinned or coated with solder paste. This protects the aluminum connection surface from oxidation during storage and assembly. The same process can be used for the end connections 2224. During assembly of a section of conductors 2218, the layers can then all be stacked inside a separate assembly fixture, or inside the stator (not shown). Applying a high current to the conductors for a short time, can create enough heat to melt the tinned solder together, or a reflow oven can be used to fuse the solder or solder paste. After the layers are connected and the conductors are positioned in the stator slots, a potting compound or varnish, etc may be used to displace all air (or other gas) in the stator slots. To ensure that coolant flow passages are open during use, the potting compound or varnish, etc is removed from the coolant flow passages by some means including, but not limited to, air flow and/or gravity and/or centrifugal force.

Figure 78:
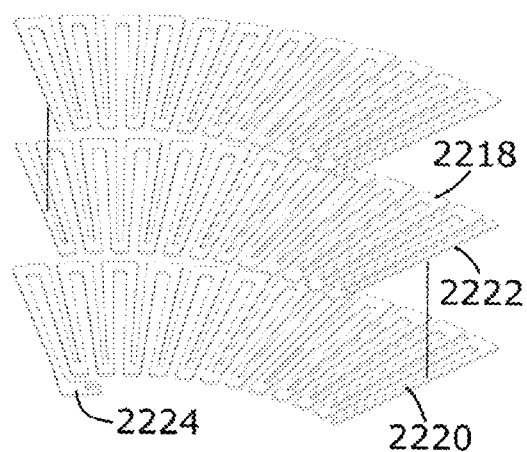
FIG. 78 shows an exemplary configuration of conductors without radial fluid flow gaps.

If radial in-slot cooling flow chambers are not implemented in an embodiment, the device of FIG. 78 will still provide the benefits of larger end-turn circumferential cross sectional area (compared to radial cross sectional area of slot portion) of electrical conductors 2218 to reduce heat production and to increase surface area for cooling and to provide greater uninterrupted cross sectional area of axially stacked end turns to allow heat flow at lower resistance to the back-iron or housings (not shown) that is axially aligned with the end turns. The larger cross sectional area also provides greater volume in the end turns compared to the same or lower cross sectional area (normal to current flow) in the end turns.

Active cooling of this embodiment can also be done with radial fluid flow, but there are no missing conductor layers so an alternate construction may be used to provide consistently sized and spaced radial fluid flow channels Spacing the conductors axially may be possible and would expose a large surface area of the conductors to the fluid, but this would be difficult to achieve a consistent gap and would not be well suited to thin conductor layers with low stiffness One or more conductor layers may be used in a slot with a narrower width than conductors on other layers and-or one or more conductors may be used in a slot that are the same width but offset circumferentially such that the conductors overlap in the axial direction, but are closer to one circumferential side of a slot than the other. By alternating successive or periodic layers from circumferential side of a slot to the other circumferential side of a slot, an uninterrupted heat conduction path can be created from the conductor that is furthest from the stator backiron to the bottom of the slot. At the same time, one or more radial channels can be created between conductor layers to provide coolant flow across conductor surfaces in a slot.

In an embodiment one or more conductors in a slot are the full width of the slot (minus clearance for insulation and assembly), and one or more layers in a slot are narrower than the slot so as to create a gap for fluid flow.

In an embodiment one or more conductors in a slot are the full width of the slot (minus clearance for insulation and assembly), and one or more layers in a slot are narrower than the slot and not centered so as to create a gap for fluid flow on only one circumferential side of the narrower conductor.

In an embodiment one or more conductors in a slot are the full width of the slot (minus clearance for insulation and assembly), and one or more conductors in a slot are narrower than the slot and thicker than the wider conductors such that the cross section of all conductors in a slot is more consistent.

Similar to the embodiment in FIG. 67, this embodiment uses an axial flow channel at the end of a post to provide a radial/circumferential/axial flow path for fluid to enter or exit the radial flow path channels.

All conductor embodiments that provide coolant flow channels may be potted with varnish or a potting compound for rigidity and for heat transfer during assembly into the stator. To maintain the cooling channels after the potting compound or varnish etc has hardened, the stator should be spun to centrifuge the potting compound or varnish etc from the large flow channels. Gravity drip draining may work for low enough viscosity compound or pressurized gas flow through the channels during the setting/curing/drying process may also be used to ensure that flow passages are opened and stay open until the potting compound, varnish etc. sets. The viscosity of the compound and the liquid compound removal method and the near-contacting gaps between the conductors and posts should be sized such that the liquid removal process clears the compound from the channels but allows compound or varnish etc to remain in the near contacting gaps.

Exemplary Flux Control Structures in an Electric Machine

Figure 79:
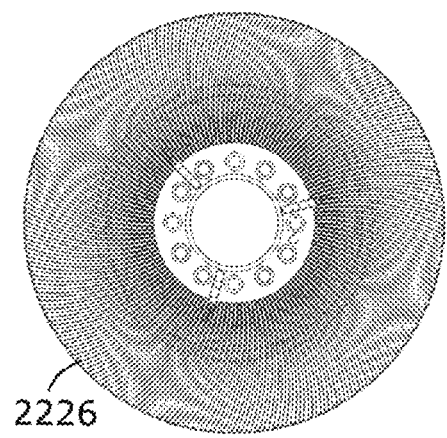
FIG. 79 shows an exemplary embodiment of a stator with curved, variable-width posts.
Figure 80:
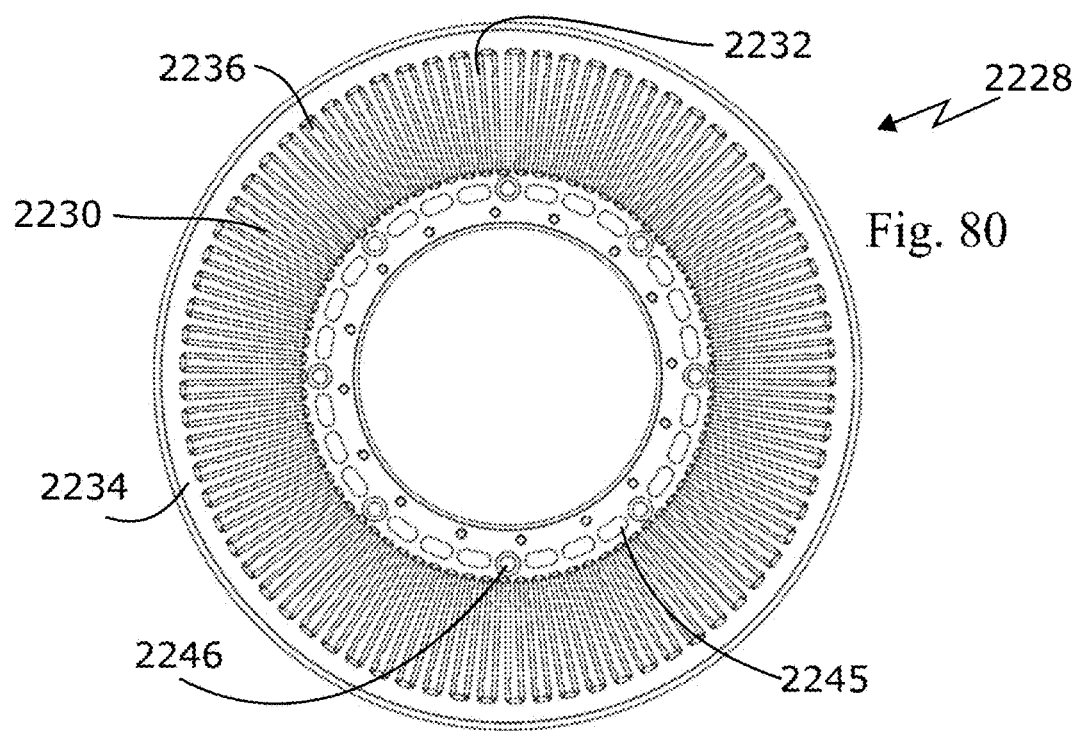
FIG. 80 shows an exemplary embodiment of a rotor with tangentially oriented permanent magnets and radially extending flux path members.
Figure 81:
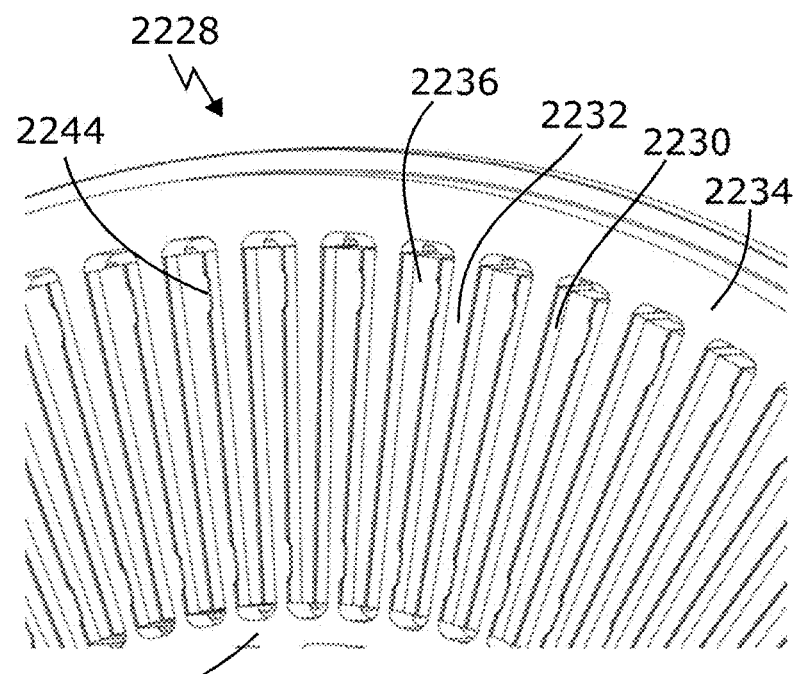
FIG. 81 shows a detail view of the rotor in FIG. 80.

A winding shown in FIG. 79 allows non-straight post shapes such as curved or variable width posts 2226.

Figure 102:
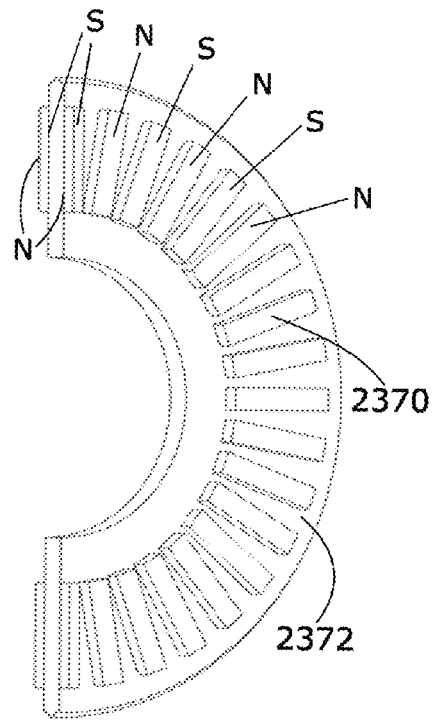
FIG. 102 shows an embodiment of a rotor configuration.

To increase the flux from the permanent magnets across the airgap between the rotor and stator the flux linkage path from the N side of a permanent magnet to the S side of a permanent magnet may be reduced. In an axially aligned permanent magnet rotor, this can be done with a solid back-iron made of a soft magnetic material such as, but not limited to, steel, as shown in FIG. 102. In this case, the flux from a permanent magnet 2370 will link to an adjacent permanent magnet 2370 through the back-iron 2372 and/or to the opposite polarity face of an opposing permanent magnet 2370 on the opposite axial face of the backiron 2372.

The torque generated by an Axial Flux Permanent Magnet (AFPM) machine is affected by, amongst other things, the density of the flux interacting between the rotor and the stator. In order to maximize the flux density at the rotor/stator interface, and thereby maximize the torque that can be generated, a rotor may use soft magnetic material fitting closely between the tangentially orientated pole faces of the permanent magnets (PM's) to channel the flux to the stator interfaces on both ends of the rotor. Because the axial dimension of the PM's can be much greater than the available tangential space available for them, and the soft magnetic material has a higher saturation value than the PM's, the flux density interacting with the stator is increased. The PM's are arranged tangentially NSSNNSSNNS etc. such that two of the same polarity poles are facing each other tangentially. The alternating orientation of the PM's means that the soft magnetic material inward and outward extensions between them become polarized alternately SNSN etc. with each radially extending flux path member is the same polarity at both axial ends. The extent of the axial dimension of the PM's can be changed to suit their strength, so that relatively high torques can be generated using lower strength magnets. The axial dimensions are such that the PM's never protrude beyond the alternating polarity axial faces.

To accommodate relative angular movement and deflection due to external loading there will normally be an axial gap between the axial faces of the rotor and the stators, referred to as the airgap. The flux from the PMs generates alternating poles in the soft magnetic radial members material between them, and the poles of the electromagnets of the stator provide a flux path to connect these alternating poles, even with no power supplied to the EMs. This results in an attraction force between the rotor and the stators. The attraction force between the rotor and stator is higher if the airgap is smaller, so although with an identical airgap on both ends of the rotor the attraction forces toward the stators would be equal and opposite, any variation in the airgaps at any angular position will result in a net force that will augment the displacement. This tendency requires a bearing and adequate rotor stiffness to avoid contact between a stator and rotor during operation.

The design described below incorporates a one-piece rotor structure where a soft magnetic material such as steel or iron or a cobalt or other soft magnetic material or alloy, which is used to carry the flux, also provides structural stiffness. Bearings, such as, but not limited to a pre-loaded a pair of angular contact bearings, provides moment stiffness between the rotor and the static structure necessary to control deflection and avoid resonances.

In an embodiment, the rotor 2228 as shown in FIG. 80 to FIG. 86 has tangentially polarized permanent magnets 2230 that are arranged NSSNNSSNNS etc. such that two of the same polarity poles are facing each other tangentially. The outer region 2234 of the rotor 2228 comprises an array of inwardly projecting regularly or equally spaced radial flux path members 2232 which are interdigitated with an equal number of regularly or equally spaced outwardly projecting radial flux path members 2236 on the inner region 2238 of the rotor and provide a flux path for permanent magnets 2230. Interdigitation of the radial members 2232, 2236 helps make the rotor 2228 very rigid. Interdigitation overcomes the challenge of providing a one-piece (or two-piece) ferritic structure without creating a flux linkage path that would short-circuit the magnets 2230. The rotor 2228 should be sufficiently rigid that flexing during operation of the rotor 2228 is a fraction of the airgap length.

Figure 82:
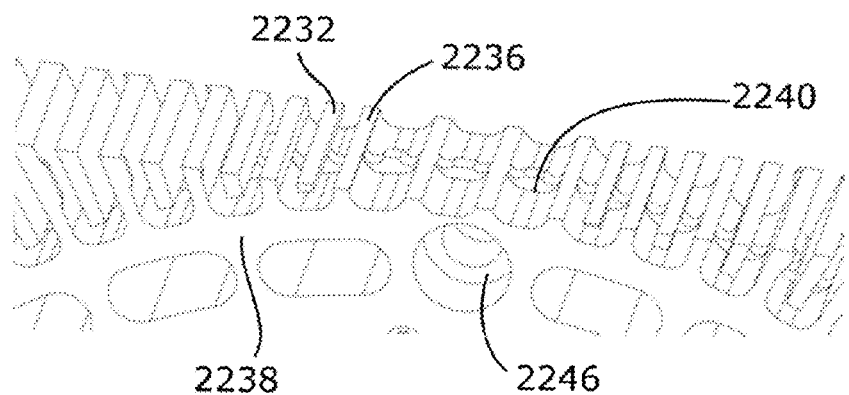
FIG. 82 shows the structural connection between the inward members and inner part of the rotor in FIG. 80.
Figure 83:
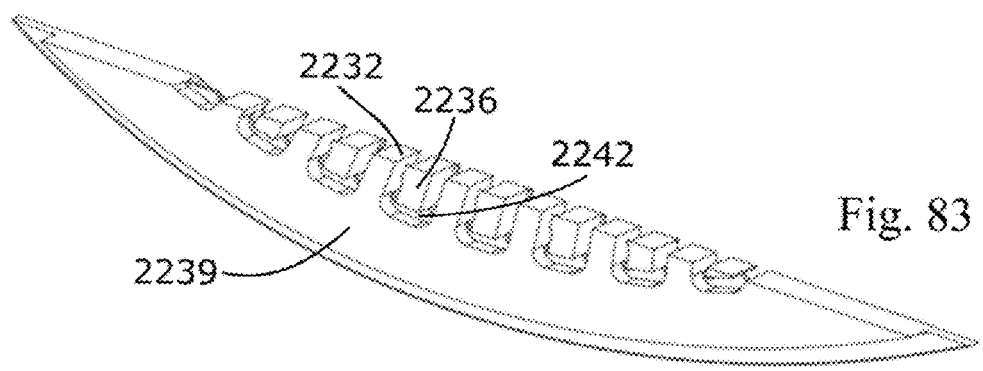
FIG. 83 shows the structural connection between the outward members and outer part of the rotor in FIG. 80.

As a result of the tangentially alternating orientation of the permanent magnets 2230, all of its inwardly projecting radial flux path members 2232 which are one piece with the outer region of the rotor 2234, will be of one polarity, and the outwardly projecting radial flux path members 2236 which are one piece with the inner region 2238 of the rotor, will be of the opposite polarity. In this exemplary embodiment, only the inner region 2238 of the rotor 2228 is supported, such as by bearings (not shown), to the stator housing (not shown), although additional bearings may be used. The use of bearings on the ID of the rotor, only, can reduce manufacturing cost, and motor/actuator weight, and is made possible by the high strength and stiffness of the rotor. In an embodiment, the inner and outer regions of the rotor 2228 are integrally connected by small tabs 2240, 2242 shown in FIG. 82 and FIG. 83. FIG. 82 shows that the structural connection between the inward members 2232 and the inner part of the rotor 2238 and the outward members can be through reduced axial width tabs 2240 and/or through the permanent magnets (not shown). FIG. 83 shows the structural connection between the outermost end of the outward members 2236 and the outer part 2234 of the rotor 2228 through reduced axial width tabs 2242. These tabs will create a flux return path from N magnet faces on one of the inner or outer rotor rings 2238, 2234, to S faces of magnets on the other of the inner or outer rotor rings 2238, 2234. This flux return path will reduce the airgap flux density in the airgap between the rotor 2228 and the stator (not shown), but it has been shown by FEA and FEMM analyses, as well as prototype testing, that the connection strength and stiffness between inner and outer rotor members 2238, 2234 is adequately achieved by an array of tabs 2240, 2242 with a small enough cross section to allow only a small percentage of permanent magnet PM flux to be lost.

Figure 84:
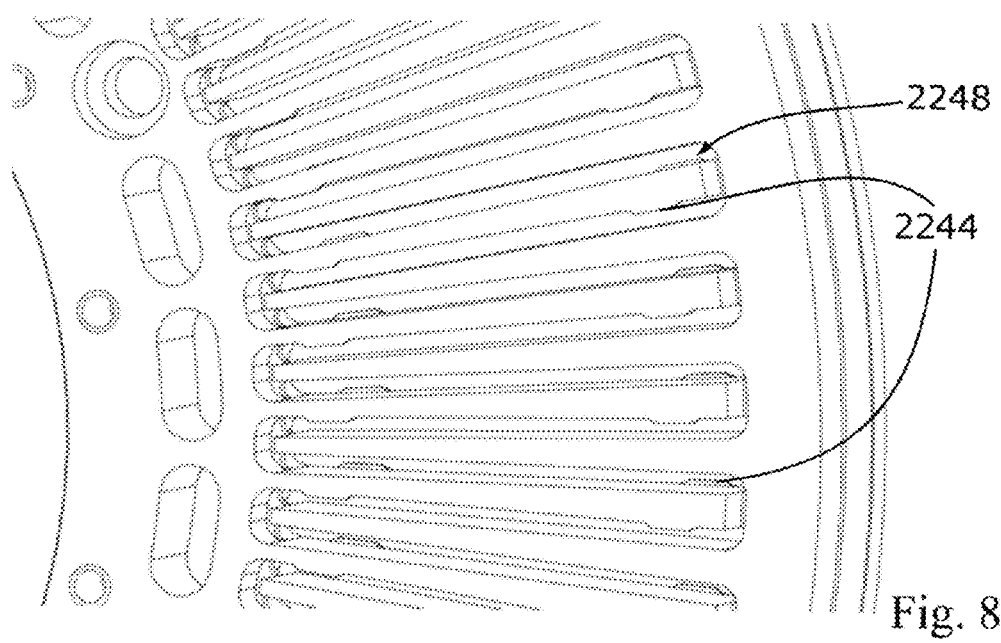
FIG. 84 shows a detail view of the rotor in FIG. 80 with the magnets removed.
Figure 85:
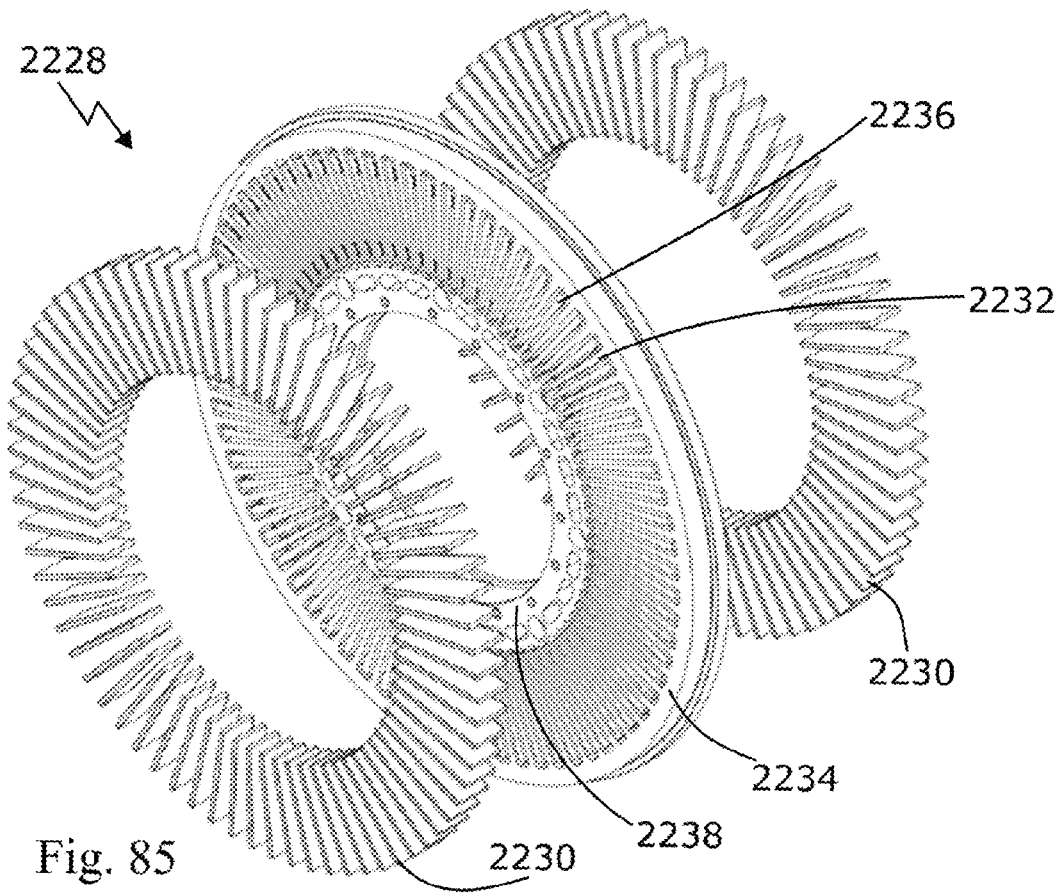
FIG. 85 shows an expanded view of the rotor in FIG. 80 reflecting an exemplary method of assembly.
Figure 86:
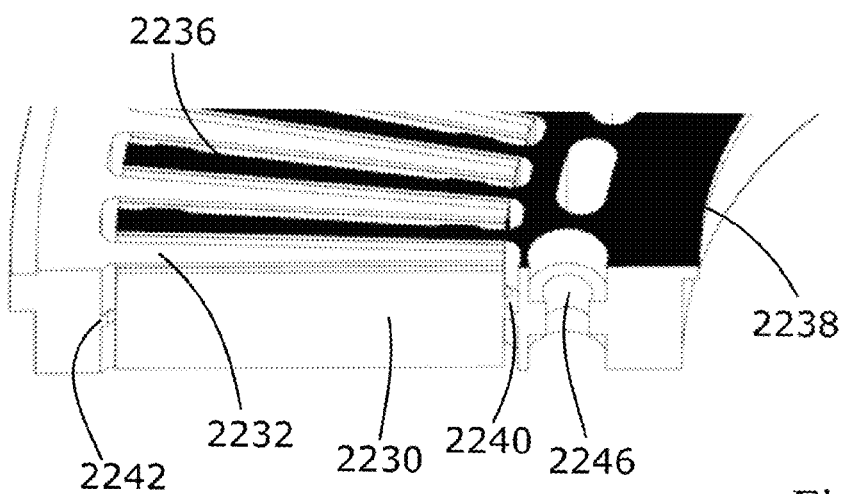
FIG. 86 shows a view of the rotor in FIG. 60 with the inner rotor ring and outwardly projecting flux members shown in black.
Figure 87:
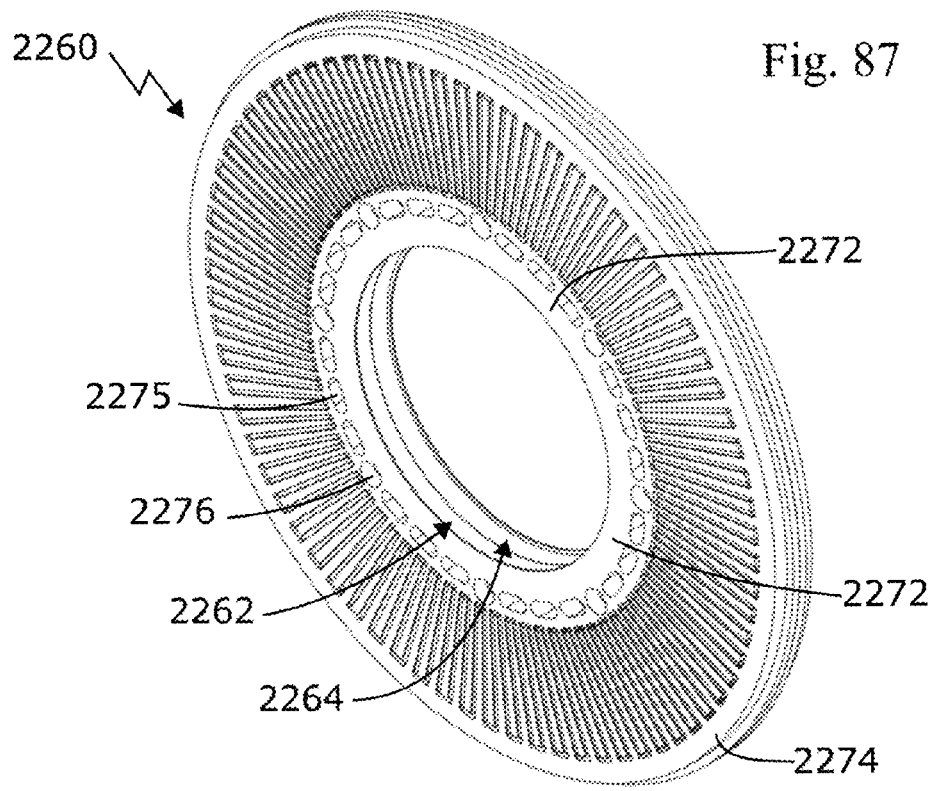
FIG. 87 shows an exemplary embodiment of a rotor comprising two axial halves and tapered magnets.
Figure 88:
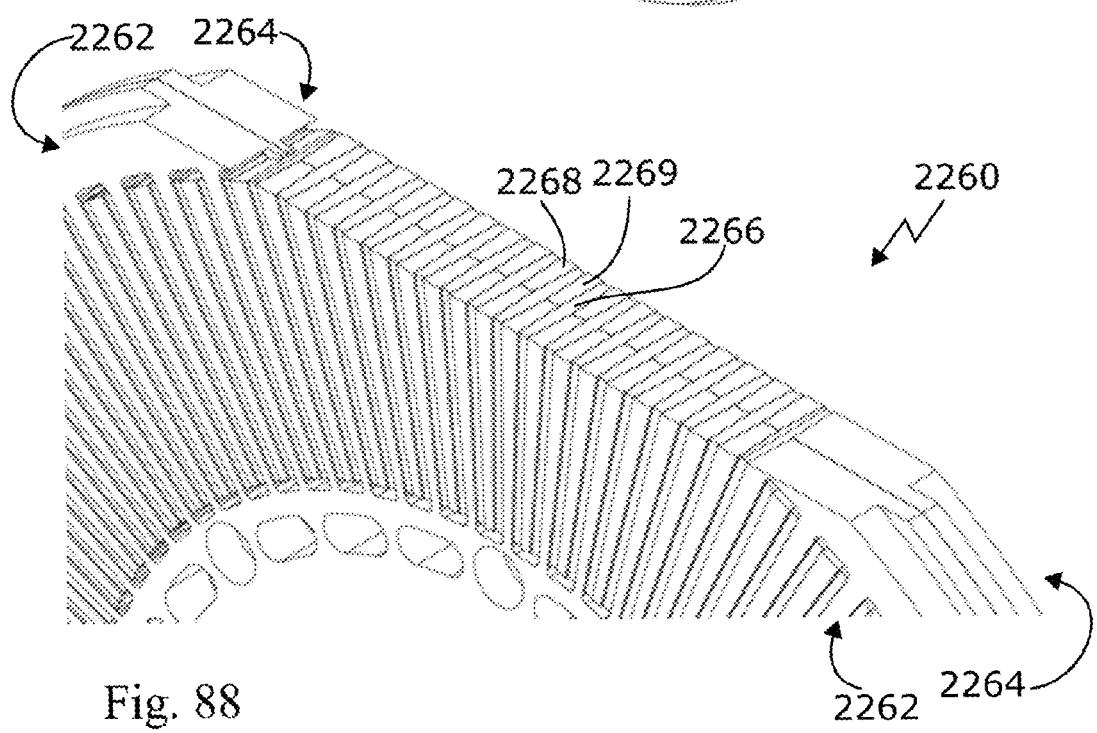
FIG. 88 shows a section view of the rotor in FIG. 87.
Figure 89:
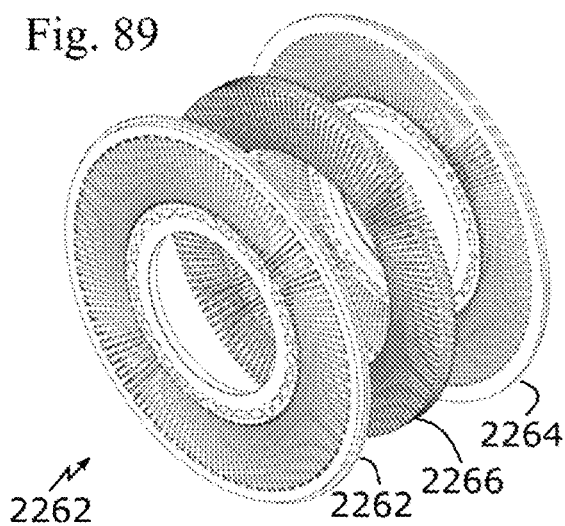
FIG. 89 shows an exploded view of the rotor in FIG. 87.

FIG. 84 shows an exemplary embodiment of the rotor 2228 without the magnets 2230 in order to show the magnet retainers 2244. These are used to axially position the magnets 2230 and are located at alternating ends of the slots 2248, requiring that half of the magnets 2230 are inserted from one side of the rotor 2228 and the other half of the magnets 2230 are inserted from the other side of the rotor 2228 during assembly, as shown in FIG. 85. Each half set of magnets 2230 will have their polarities in the same tangential orientation which improves stability for assembly. The magnets 2230 can be secured in position using an adhesive and can be further secured by peening of the open slot ends, such as at two positions of similar radial positions to the retaining tabs 2244 to reduce the local slot width to less than the thickness of the magnets 2230. Holes 2245 through the rotor 2228 may allow air to flow such that cooling of the stator electromagnets (not shown) on both sides of the rotor 2228 can be achieved by flowing air or other fluid through only one side of the housing structure (not shown). The counter-bored holes 2246 through the rotor 2228 are for clamping during manufacture. FIG. 86 has the axial surface of the inner rotor ring 2238 and of the outwardly projecting flux members 2236 shown in black to illustrate more clearly that the inward and outward extending flux path members 2232, 2236, may be all made of one piece construction, but that the inward and outward extending members 2232, 2236 are magnetically isolated from each other apart from the reduced cross section tabs 2240, 2242. The tabs 2240, 2242 may be small enough in cross section compared to the radially extending flux path members 2232, 2236 that they will be saturated from the PM flux and will therefore not allow significant additional flux linkage beyond that flux level.

Other variations include inserts of other, non-magnetic material for the tabs, inner and outer members with radially extending flux path members as shown here with no connection tabs. In this case the body with the magnets will be the main structural connection between the inner and outer rotor rings.

The magnetic forces generated by rare earth magnets, for example, combined with the flux focusing effect of the flux path members can produce immense axial forces. In the example shown here at an outer diameter of approximately 9" can generate an axial attraction force to the stator of as high as 1500 lbs. A suitably strong and rigid structure may be used to prevent damage and problematic vibration during use. A rotor with interdigitating members provides both structural rigidity and flux focusing functions into the same radially extending members. The interdigitation of these inward and outward members provides a high surface area contact between the member tangential surfaces and the magnets for effective flux usage and high strength and stiffness.

Exemplary Rotor for an Axial Flux Electric Machine.

The rotor can be made of single piece construction as shown here, or in two or more pieces that sandwich together. Magnets can be of any shape including tapered in any direction for flux path effects and structural effects. Any type of magnets can be used. Any number of magnets can be used. Any width of magnets can be used. One or both axial faces of the rotor can be used in combination with a stator. Multiple rotors can be used. Multiple circular arrays of magnets can be used with different numbers of magnets in two or more arrays. This rotor can be used with actuators or motors or any magnetic machine or device with any number of phases or poles.

The design described below incorporates a two-piece rotor structure where a soft magnetic material such as steel or iron or a cobalt or other soft magnetic material or alloy, which is used to carry the flux, also provides structural stiffness to position the rotor against magnetic forces which can be very high with this device, and to support the output load on the actuator. Bearings, such as, but not limited to a pre-loaded pair of angular contact bearings, provide moment stiffness between the rotor and the static structure necessary to control deflection and avoid resonances.

Figure 90:
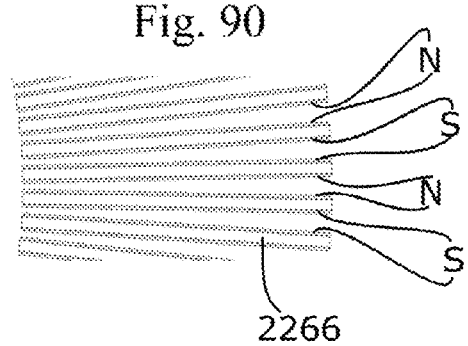
FIG. 90 shows the plane view of the magnets in the rotor in FIG. 87, showing the polarity of the magnets.

FIG. 87 to FIG. 92 show an embodiment of the rotor 2260 which is constructed in two somewhat mirror image halves 2262 and 2264 which are then bolted or otherwise fastened or connected together. In this embodiment, tapered magnets 2266 can be combined with tapered rotor members 2268, 2269 to provide mechanical security for the magnets 2266, and also to allow a wider tangential magnet section closer to the center plane of the rotor 2260 where the flux density of the flux path members 2268, 2269 is lower. This makes better use of the space available for the permanent magnets 2266 and for the space available for the soft magnetic material. FIG. 90 shows the permanent magnets 2266 in the same relative positions as when they are installed in the rotor 2260. This shows how the permanent magnets 2266 are arranged with alternating tangential polarity, NSSNNSSNNS etc, such that two of the same polarity poles are facing each other tangentially.

Both halves of the rotor 2262, 2264 comprise inwardly projecting and outwardly projecting radial flux path members 2268, 2269, analogously to the embodiment of the rotor 2228 discussed previously. In the exemplary embodiment 2260 shown in FIG. 87, only the inner region 2272 of the rotor 2260 is supported, such as by bearings (not shown), to the stator housing (not shown), although additional bearings may be used, for example on the ID or OD of the rotor. The use of bearings on the ID of the rotor only can reduce manufacturing cost, and motor/actuator weight, and is made possible by the high strength and stiffness of the rotor which makes additional bearings unnecessary for many applications.

In an embodiment, the inner and outer regions of the rotor 2260 are integrally connected by small tabs analogous to tabs 2240 and 2242 in FIG. 86.

Figure 91:
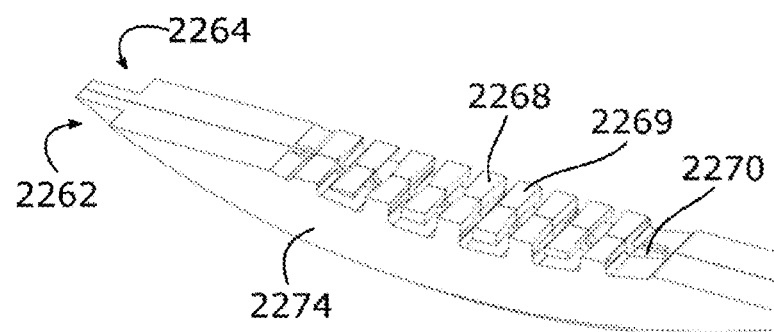
FIG. 91 shows the structural connection between the outward members and outer part of the rotor in FIG. 87.

FIG. 91 is a section taken tangentially through both rotor halves 2262, 2264 showing the axial extent of the connecting tabs 2270 between the outwardly projecting radial flux members 2269 and the outer part of the rotor 2274. These tabs 2270 will create a flux return path from magnet faces on inwardly projecting radial flux path members 2268 to the opposite pole outwardly projecting radial flux path members 2269. This flux return path will reduce the flux density in the airgap between the rotor 2260 and the stator (not shown), but it has been shown by FEA and FEMM analyses, as well as prototype testing, that the connection strength and stiffness between inner and outer rotor members 2272, 2274 is adequately achieved by an array of tabs 2270 with a small enough cross section to allow only a small percentage of permanent magnet flux to be lost. The magnets 2266 are positively retained by their tapered geometry and can be further secured in position using an adhesive. Holes 2275 through the rotor 2260 may allow air to flow such that cooling of the stator electromagnets (not shown) on both sides of the rotor 2260 can be achieved by flowing air or other fluid through only one side of the housing structure (not shown). The counter-bored holes 2276 through the rotor 2260 are for clamping during manufacture.

The inward and outward extending flux path members 2268, 2269 may be all made of one piece construction, but that the inward and outward extending members 2268, 2269 are magnetically isolated from each other apart from the reduced cross section tabs 2270 and analogous tabs on the inner part of rotor 2260; these tabs may be small enough cross section compared to the radially extending flux path members 2268, 2269 that they will be saturated from the PM flux and will therefore not allow significant additional flux linkage beyond that flux level.

Figure 92:
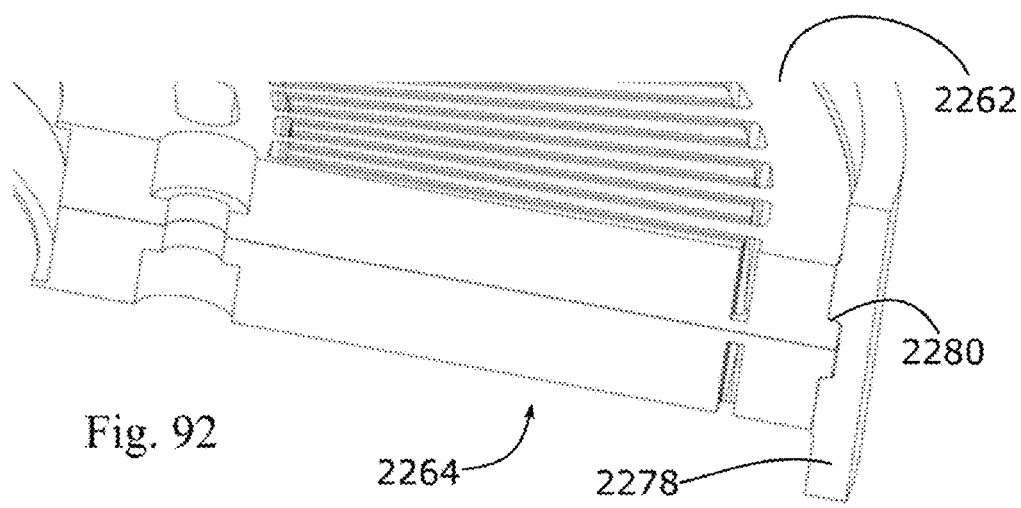
FIG. 92 shows the rotor in FIG. 87 with an external ring holding the rotor halves together.

Although, as described elsewhere, bolts, rivets, or similar may be used to hold the two halves 2262, 2264 of the rotor 2260 together, an additional or alternative retention method is to use an external ring 2278 with one or two internal tapered faces 2280 as shown in FIG. 92. The inside diameter of the external ring can be used to ensure concentricity between the two halves 2262, 2264 of the rotor. This external ring 2278 could be installed by generating a thermal differential between it and the two halves 2262, 2264 of the rotor. The use of a high expansion material for the ring 2278 such as, but not limited to, an aluminum alloy, would reduce the temperature difference necessary to install the ring 2278.

Various embodiments may include: one rotor adjacent to one stator, a rotor is on each side of one stator, a rotor is on each side of a pair of back-to-back stators, or combinations of these configurations.

Exemplary Axial Flux Electric Machine with Two Piece Stator Between Rotors

Figure 96:
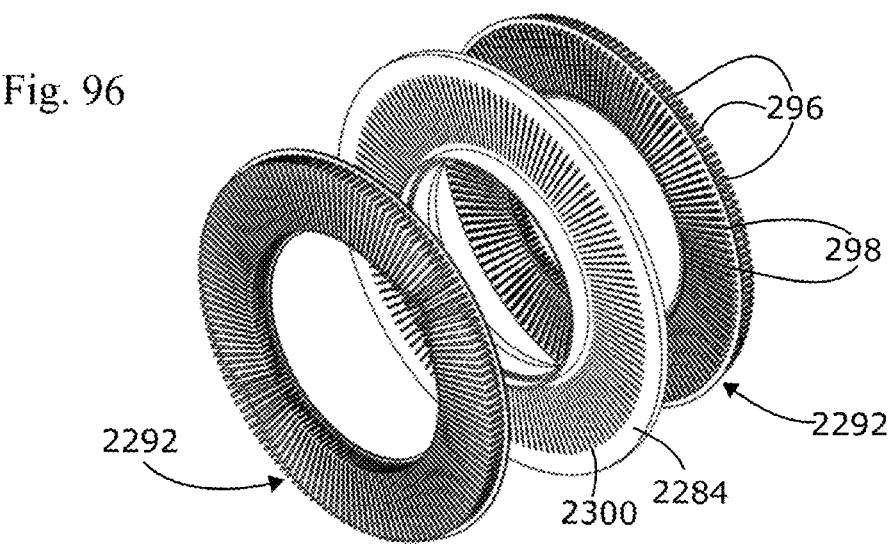
FIG. 96 shows an exploded view of the stators and baseplate of the embodiment in FIG. 93.
Figure 97:
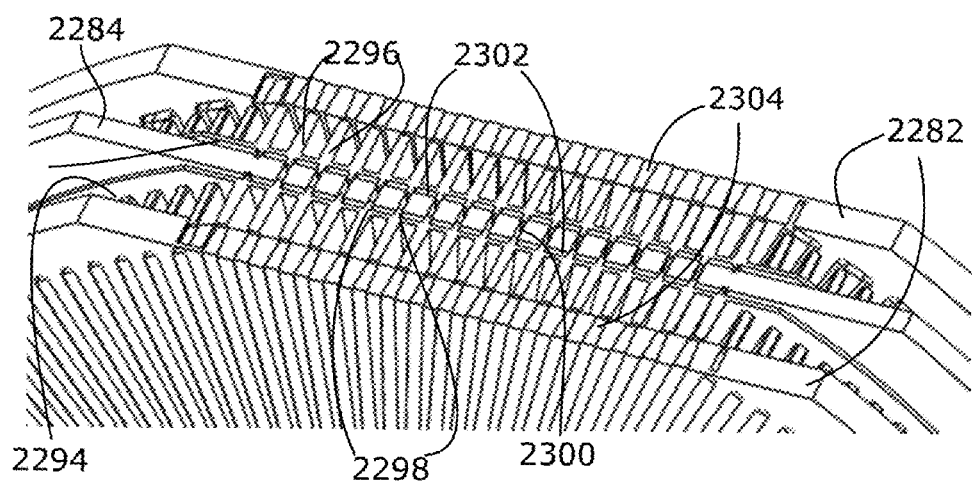
FIG. 97 shows a section view of the embodiment in FIG. 93.

FIG. 93 to FIG. 97 show an electric machine 2281 in which a rotor is located on each side of a pair of back-to-back stators. FIG. 94 shows that the rotor 2282 comprises two somewhat mirrored halves 2283 supported from the stator baseplate 2284 by, in this example, two angular contact bearings 2286. As with the previously described designs having the rotor between the stators, the outer region of each half 2283 of the rotor comprises an array of inwardly projecting equally spaced radial flux path members 2288 which are interdigitated with an equal number of equally spaced outwardly projecting radial flux path members 2290 on the two halves 2283 of the inner region of the rotor 2282, as shown in the expanded view of the present embodiment in FIG. 93. The stator baseplate 2284 may be of a high thermal conductivity material such as aluminum. The construction of a stator 2292 of this embodiment is shown in FIG. 95. The stator 2292 comprises a backiron 2294, posts 2296, and axial protrusions 2298 from the back of the backiron. The axial protrusions 2298 on the back surface of the stators are secured in slots 2300 on the stator baseplate 2284 by mechanical means or an adhesive bond, as shown in FIG. 96. A cross section of the device 2281 is shown in FIG. 97. Radial channels 2302 are formed between the stator posts 2296, the stator back iron 2294, and the stator baseplate 2284 for the flow of fluid such as air or liquid or a phase change fluid that may be used to cool the device 2281. Each stator post 2296 is supported through the thickness of the back iron 2294 and engages in a slot 2300 in the stator baseplate 2284. The stator assembly used here shows the stator posts 2296 fused to the back iron 2294, so no interface lines are therefore visible. Tapered magnets 2304 are used in this example as the attraction force towards the stator 2292 secures them into the body of the rotor 2282. The conductors that are positioned around the stator posts are not shown in these figures, but would be similar to those described in configurations with the stators located outside of the rotor.

Exemplary Axial Flux Electric Machine with Stator Between Rotors

Figure 98:
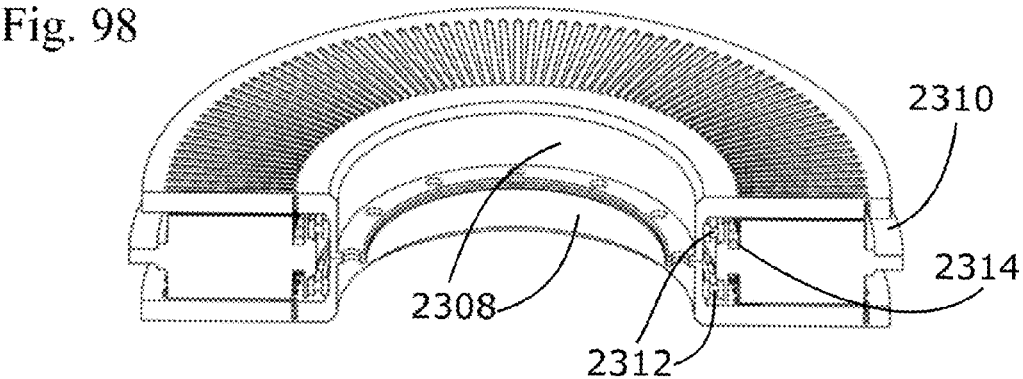
FIG. 98 shows a cross-section view of an exemplary embodiment with two rotor halves and one stator.
Figure 99:
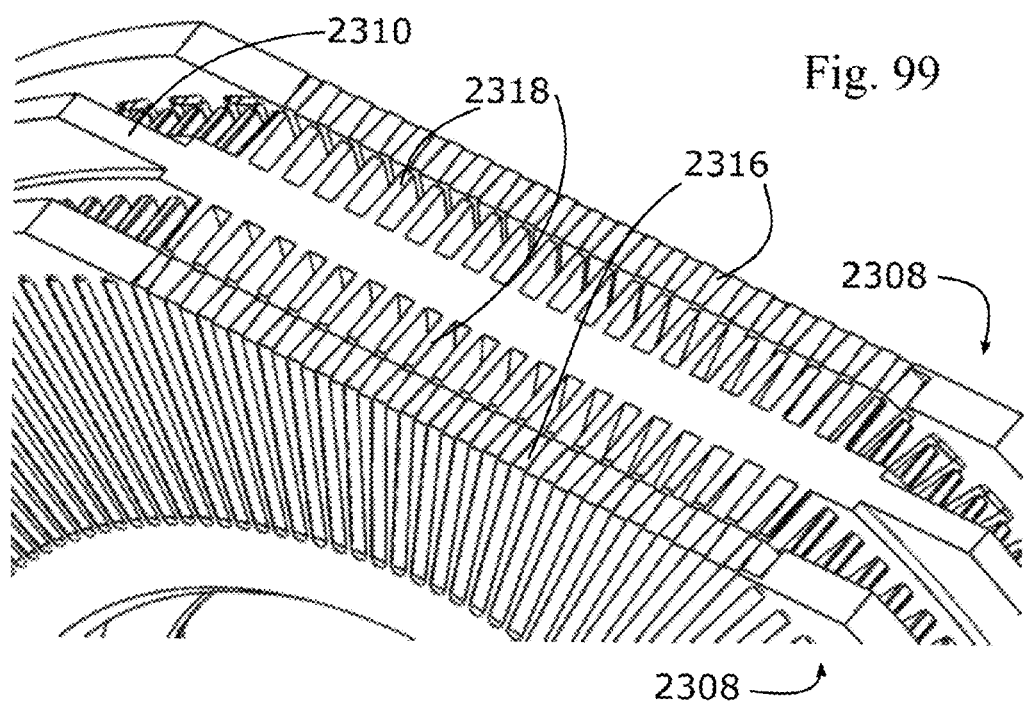
FIG. 99 shows a section view of the exemplary embodiment in FIG. 98.

Another embodiment comprises one rotor on each side of a one-piece stator. FIG. 98 show a cross-section of such an embodiment of electric machine 2306. The rotor comprises two somewhat mirrored halves 2308 supported from the stator 2310 by, in this example, two angular contact bearings 2312. As with the previously described designs having the stator between the rotors, the outer part of each half 2308 of the rotor is analogous to the rotor in FIG. 81, comprising an array of inwardly projecting equally spaced radial flux path members which are interdigitated with an equal number of equally spaced outwardly projecting radial flux path members on the inner part of the rotor. To prevent flux flow between the two halves 2308 of the rotor they both have the same polarity. Because the inner part of each rotor half 2308 becomes polarized according to the orientation of the poles of its magnets, the same magnet pole is to be placed against the outwardly projecting radial flux path members on each rotor half Holes 2314 are shown through the center part of the stator 2310 that can be used to carry any fluid that may be used to cool the device 2306. A cross section of the device 2306 is shown in FIG. 99. Tapered magnets 2316 are used in this example as the attraction force towards the stator 2310 secures them into the body of each rotor half 2308. The stator 2310 comprises two somewhat mirrored sets of stator posts 2318. The conductors that are positioned around the stator posts 2318 are not shown in these figures, but would be similar to those described in configurations with the stators located outside of the rotor.

Conductive heat transfer of this embodiment is similar to the other embodiments with regard to the low heat flow resistance from the conductors to the heat dissipation surface, except that in this case, the top of the conductors at the airgap is a heat dissipation surface. For cooling, active circulation of a cooling fluid through the airgap may be provided. Direct cooling of the coils will also benefit from this geometry in this configuration compared to geometry outside of the disclosed range. A similar configuration could be done with one stator and one rotor.

Exemplary Robotic Structure

Figure 100:
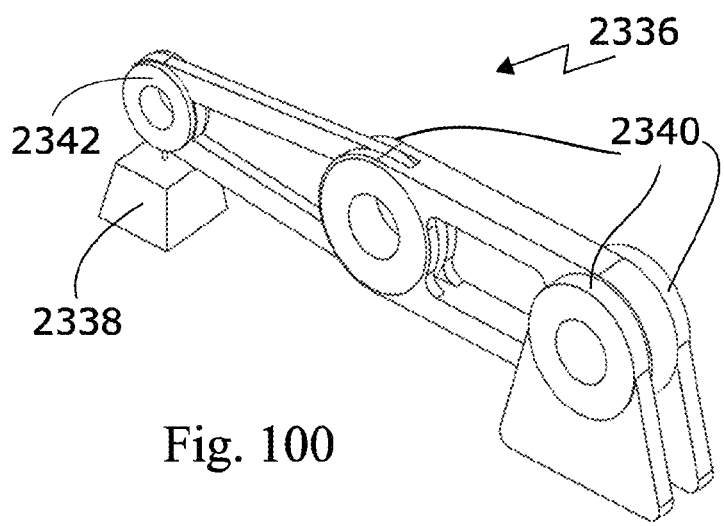
FIG. 100 shows an exemplary configuration of a robotic arm having a series of electric machines acting as actuators and being spaced along the arm.

The following is given as a non-limiting example of how an actuator (motor having one of the disclosed configurations of slot density and conductor volume, or other disclosed features) may be used in a robotic application. A schematic of this example system is shown in FIG. 100. An example system consists of a static robotic arm 2336 supporting a nominal payload 2338 of 10 kg, and having four actuators 2340, 2342 spaced along the arm. Thus, at least one actuator 2340, 2342 on the robotic arm 2336 is supported by another actuator. Three of the actuators 2340 may be identical in size and torque-production capability with two being located at the shoulder joint and one at the elbow joint. The remaining actuator 2342, located at the wrist, is half the size and weight of the previous actuators. The wrist actuator 2342 is inactive in this example and will be considered only for the weight that it adds to the system. The active actuators have an average airgap diameter of 200 mm and a radial tooth length of 32 mm. The housing and peripherals associated with each actuator 2340, 2342 are estimated to equal the active weight of the actuator, such that the total weight is estimated at twice the active weight. The distance between actuators 2340 from center to center is 0.5 m. The weight of each arm 2336 is estimated at 20% of the total mass of any downstream system components including the nominal payload 2338. The simulation in this example applies a forced liquid cooling rate of 700 $W/m^2K$ to the back of each stator in each actuator 2340. The system is analyzed in a stationary position where the arm 2336 is horizontal and supplying sufficient torque to hold the payload 2338. The power consumption of the system is equal to the total power consumed by the elbow and two shoulder actuators 2340. In this example, it is found that the system power consumption drops significantly inside the disclosed range. This is due to the compounding effect of the weight of the device on the required torque. As the weight of each individual actuator drops, the torque required from any upstream actuators is reduced. For any particular system with a specified structure and payload, there exists a geometry where the system power consumption is minimized. The calculation required to come to this conclusion assumed a 70° C. temperature limit for continuous torque. Any geometries in which one actuator in the system must surpass this temperature limit in order to support the payload are classified as overheating and excluded. Geometries with very large slot pitch and conductor volume overheat because upstream actuators are not able to produce sufficient continuous torque to support downstream actuators. They are limited by the actuator weight. Geometries with very small slot pitch and conductor volume overheat because upstream actuators are not able to produce sufficient continuous torque to support the payload. They are limited by the payload weight. The optimum geometry for any particular system will be a balance between generating sufficient torque to satisfy the system requirements and minimizing the actuator weight to reduce the overall power consumption.

Figure 101:
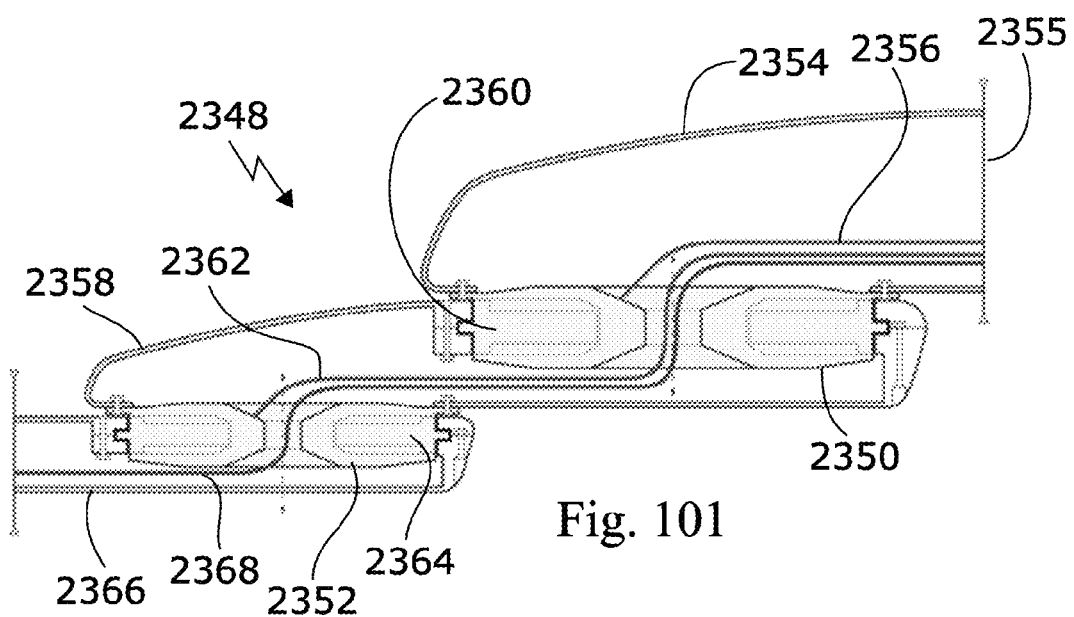
FIG. 101 shows a mounting configuration for an electric machine on a robotic arm.

FIG. 101 shows a mounting configuration for an electric machine on a robotic arm 2348. The set up may be as schematically illustrated in FIG. 101, with three or more actuators. Electric machines 2350 and 2352 may be designed as disclosed with any one or more of the novel features disclosed, for example as shown in FIG. 56. The electric machines 2350 and 2352 operate as actuators in this example and will be referred to as such. Actuator 2350 is supported by a first housing or structural part 2354 of the robotic arm 2348 by any suitable means. Electric power may be provided to actuator 2350 by a cable 2356 from a suitable power source (not shown). The housing part 2354 may attach to a supporting structure, for example another part of a robot or a wall 2355 (illustrated schematically).

A second housing part 2358 is secured to rotor 2360 of actuator 2350. Actuator 2352 is secured to housing part 2358 by any suitable means so that actuator 2352 is supported by actuator 2350. Power may be supplied to actuator 2352 by cable 2362. Rotor 2364 of actuator 2352 is secured to a third housing part 2366 of robotic arm 2348 by any suitable means. A further actuator, illustrated in FIG. 100, may be incorporated in the housing part 2366, and this actuator may be made in accordance with FIG. 56 and supplied with power from cable 2368. The actuators 2350, 2352 and other actuators on the arm may be made smaller with increasing distance from support 2355. Any of the actuators on the robotic arm 2348 may be sufficiently spaced along the arm to have 360-degree rotation, for example actuator 2352.

Solid and Laminated Stator or Rotor Constructions

Figure 103:
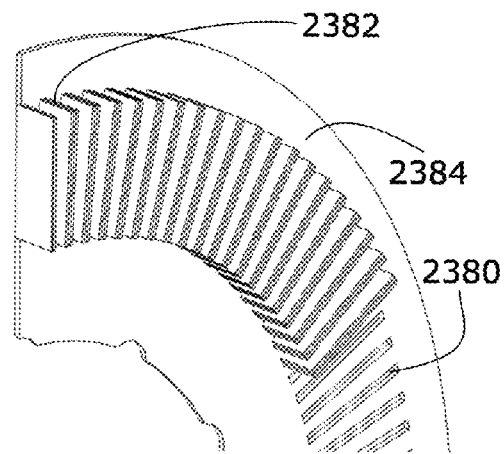
FIG. 103 shows an exemplary configuration of a laminated post stator.

In some embodiments, a laminated stator or rotor may be used. In FIG. 103 a laminated post stator configuration is shown. This exemplary embodiment has an array of slots 2380 to receive the array of laminated posts 2382. The backiron disk 2384 can be a laminated construction or a sintered construction or a solid construction as shown here. The lines of flux travel generally tangentially in an axial flux motor so an effective laminate structure will need to have the laminates for each post and backiron aligned tangentially. One method of achieving this alignment is to coil a strip of laminate in a tight spiral, like a roll of tape, with an adhesive layer between each laminate layer. After the coil is cured, material is removed by a machining process to form radial posts and slots.

Figure 104:
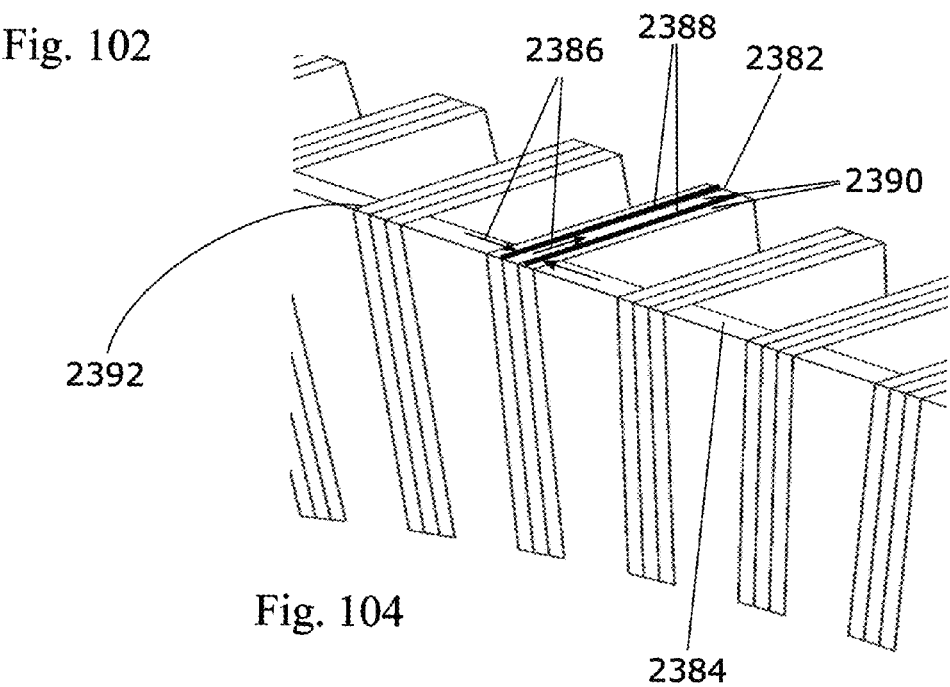
FIG. 104 shows a section view of an exemplary embodiment of a stator with radially aligned post laminations.

The high number of relatively small posts of an embodiment of an electric machine with features in the disclosed range makes it desirable to use as few parts as possible in the construction of the stator. If laminates are used, the number of laminated parts can be reduced by the use of radially aligned laminates as shown in FIG. 104. A drawback of this embodiment construction is shown schematically in FIG. 104 at the junction of the backiron 2384 and a laminated post 2382 where the flux 2386 that links from post to post though the backiron 2384 must pass through one or more insulation layers 2388 between the lamination layers 2390. The insulation layers (shown schematically at post 2382 as heavy lines) are useful and possibly necessary for the reduction of eddy currents, but they act as airgaps which increase the reluctance of the flux path with a resulting loss of torque and efficiency. Another drawback of this construction geometry is the minimal glue line 2392 that results from the very thin backiron 2384 of an electric machine having features in the disclosed range. Considering the very high axial loading on the posts 2382 of an embodiment of an electric machine, it may be structurally unsound to rely on this glue line 2392 for some applications.

Figure 105:
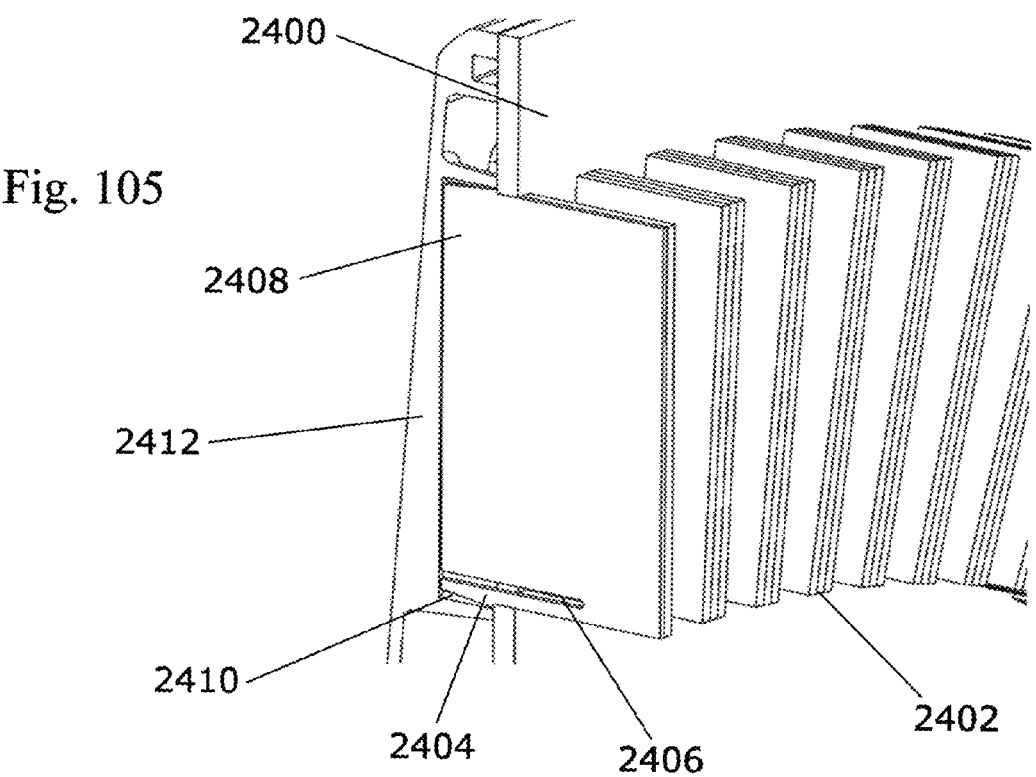
FIG. 105 shows an exemplary embodiment of a laminated post construction with posts extending through the backiron, with tapered barbs as mechanical pull-out stops.
Figure 106:
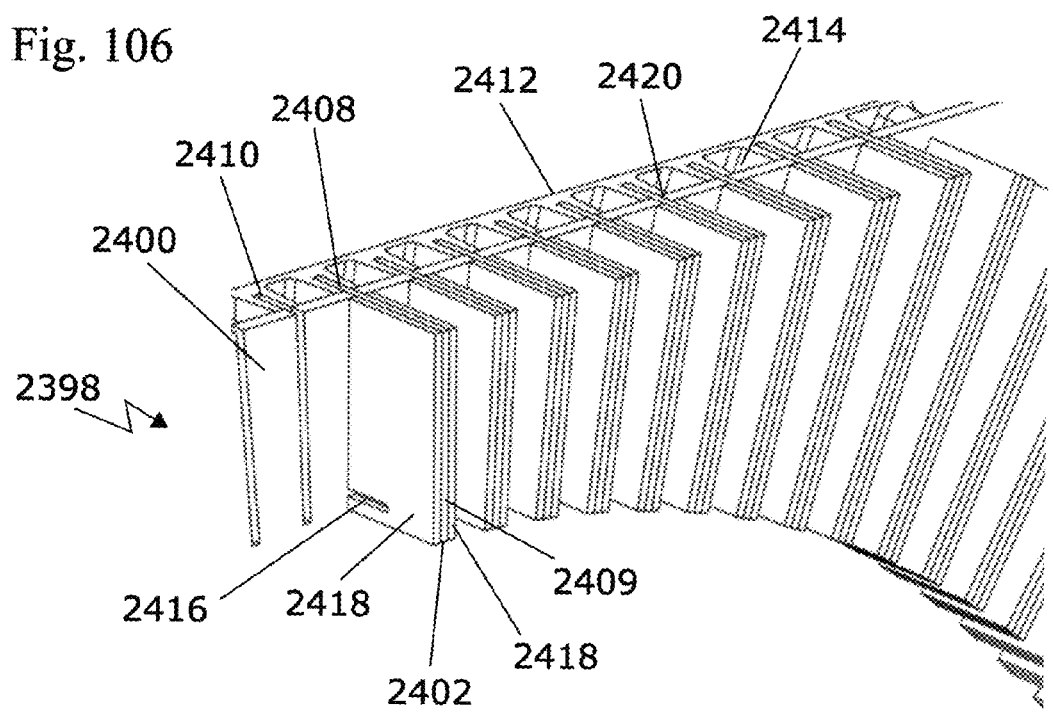
FIG. 106 is a section view of the embodiment shown in FIG. 105.

A construction is proposed to help prevent stator posts from being pulled out of their slots while at the same time providing metal to metal contact between the posts and backiron so the flux is not forced to cross through any insulation layers. FIG. 105 and FIG. 106 show a non-limiting exemplary embodiment of a laminated post construction of a stator 2398 and housing or cover member 2412 that provides adequate pull-out strength as well as metal-to-metal contact for the majority of the flux linkage connection between the back iron 2400 and the posts 2402. To accomplish the necessary structural integrity, the posts 2402 extend through the backiron 2400 enough to provide multiple functions. The extended material allows the use of a tapered barb 2404 to allow ease of assembly and provide a mechanical pull-out stop. In this non-limiting exemplary embodiment, a barb 2404 is proximal to a slit 2406 which is long enough to allow elastic deformation of a post 2402 during assembly. Other mechanical means may be used to act as mechanical pull-out stops, allowing insertion of the posts from one side and subsequently providing resistance to extraction of the posts from that side. For instance, a ratchet-like design may be used, with contacting surfaces of the posts and the backiron shaped in a manner that prevents them from sliding past each other in the direction of extraction under the application of pressure to the surfaces, either by a spring configured to do so, or by other mechanical means, activated after insertion of the posts into the stator.

The protruding section 2408 of a post 2402 beyond the back surface of the backiron 2400 is inserted into a slot 2410 of similar width in the cover member 2412. In an embodiment, this cover 2412 is made of a lightweight material such as aluminum or a composite such as carbon fiber. The surface area of the protruding section 2408 of a post 2402 is adequate to allow the bond with the cover slots 2410 to add the necessary rigidity to the assembly to withstand the high magnetic forces of an embodiment of an electric machine having features in the disclosed range. The embodiment shown comprises one central laminate 2409, with a protruding section 2408, per post; however, more than one laminate with a protruding section can be used per post.

Radial spaces 2414 between the slots 2410 on the inner surface of the cover member 2412 can be used for weight reduction and for flow of cooling fluid. Also shown in FIG. 106 is the use of a slit 2416 in the post 2402, passing through the protruding centre laminate 2409 as well as through the axially shorter laminates 2418 on a post 2402, even though the shorter laminates 2418 do not comprise a barb 2404. This is to allow the barb 2404 on the protruding laminate(s) to flex during assembly.

Each post 2402 in this exemplary embodiment is glued together in sub-assemblies before insertion into stator slots 2420. Conductors (not shown) are then wound or placed around the posts 2402 and conductors are then potted with a potting compound. In addition to the stabilizing effect of the cover member slots 2410, the potting compound will serve to provide circumferential strength and rigidity to the laminated posts 2402.

Note that powdered metal or solid material can be used with similar retaining features as shown here for the laminated posts. If solid or powdered metal is used for the posts, it is believed to be less complex and expensive as well as mechanically stronger to make the posts and backiron of unitary construction.

Figure 107:
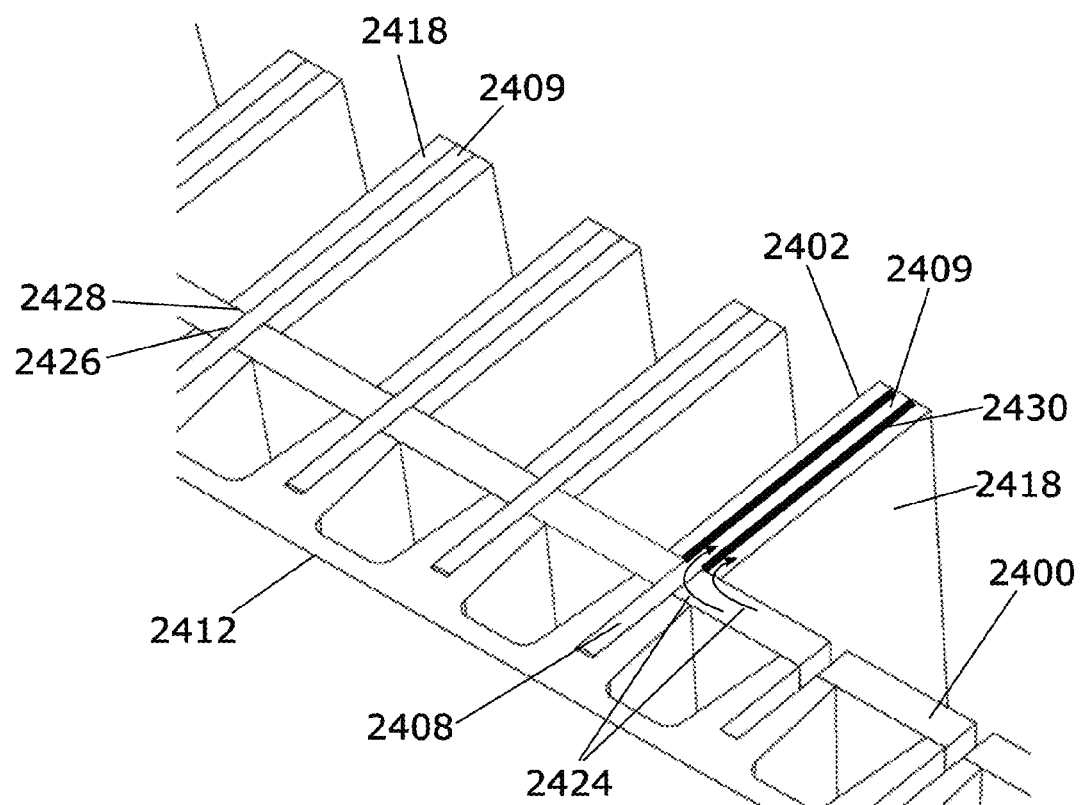
FIG. 107 is a section view of the embodiment shown in FIG. 105, showing the pattern of insulation between laminations and a portion of the resulting magnetic flux path.

Magnetic flux path integrity is achieved in this exemplary embodiment by the use of axially shorter laminates 2418 on the side of a longer laminate 2409, of which a part 2408 protrudes through the backiron 2400, as demonstrated in FIG. 107. To achieve adequate metal-to-metal contact between the stator backiron 2400 and posts 2402 for low reluctance flux linkage 2424, all insulation at the junctions 2426 between the backiron 2400 and the laminates 2409 and the junctions 2428 between the backiron 2400 and the laminates 2418 have been removed, as shown in FIG. 107. The remaining insulation 2430 is shown schematically at one of the posts 2402 as a heavy line. Unlike the removal of insulation from the flux path of the exemplary embodiments in FIG. 104 at 2388, the removal of insulation in FIG. 107 at 2426 and 2428 results in metal-to-metal contact both between laminates 2409 and the backiron 2400 and between laminates 2418 and the backiron 2400 for low reluctance flux linkage 2424.

In the exemplary embodiment shown in FIG. 107, the use of a solid back iron disk 2400 is believed to reduce eddy currents substantially compared to a 100% solid stator and posts due to the backiron being a relatively small part of the flux path (not shown) and because the backiron disk 2400 can be axially thick enough to reduce the flux density compared to the flux density in the posts 2402. Eddy current and hysteresis losses increase with flux density, so for certain applications where the benefit of laminated posts is deemed to be worthwhile, the use of a backiron disk made of a solid metal such as iron or a cobalt or nickel alloy may offer adequate efficiency and the necessary structural integrity. With solid material used for the backiron an alloy with low electrical conductivity (and high heat conductivity) and high flux density may be used.

Adhering the protruding post sections to the slots of the cover can be done with epoxy or other adhesives or solder or brazing or ultrasonic welding, etc A high strength solder has the advantage of providing good heat transfer which is helpful for cooling.

Aluminum Conductor Coating Construction and Method

Some embodiments of the electric machines disclosed comprise coated aluminum conductors. A process of manufacturing and coating of aluminum conductors for electrical machines is disclosed which includes creating an anodized surface finish on the conductors for electrical insulation in such a way that high heat dissipation and low cost manufacturing of the conductors is possible. The procedures described may also utilize various construction and assembly steps to achieve high current density, especially when used in combination with motor/actuators in the disclosed range. This process may be used in the manufacture of electrical machines such as, but not limited to, an embodiment of an electric machine.

It is beneficial to embodiment of the disclosed electric machines, and to electrical machines in general, to create a conductor construction that has light weight, good heat transfer and low cost. Electric motor conductors are commonly made from copper wire that is pre-insulated with a polymer coating or aluminum wire or foil. Advantages of aluminum include much lower weight per volume and lower cost as compared to copper. A downside of aluminum is that it has higher electrical resistance than copper and produces more heat for the same current density. One method of pre-insulating aluminum conductors is to use an anodized surface finish. Advantages of anodizing are a very hard surface that protects the wires during assembly, high dielectric strength, and 2 to 4 times better thermal conductivity as compared to an exemplary polymer film as used on common wire conductors.

Anodized aluminum conductors provide the potential for low cost, high surface strength and light weight, but they are typically limited in several respects.

Figure 108:
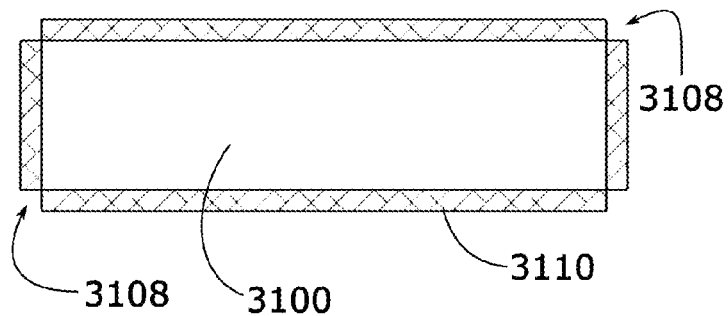
FIG. 108 is a schematic drawing showing the effect of anodizing a sharp edge.

One problem relates to sharp edges. As shown in FIG. 108, anodizing, such as oxalic or sulphiric acid anodizing, "grows" a layer of aluminum oxide 3110 outward and inward perpendicular to the original aluminum surface. This leaves a less or non-insulated area at any sharp edge, referred to as a corner gap 3108; corner gaps may also be referred to as edge gaps. As a result, anodized aluminum conductors require rounded edges to prevent these un-insulated sections from forming. Rounding these edges is expensive because it requires additional mechanical or chemical processing. A radius of 0.015" is known to be required for good edge coverage with hard anodizing, so a minimum conductor thickness of 0.030" is required. This is a very thick conductor and would require unacceptably high current due to the low number of turns in a slot in many applications.

When flat, conical, etc. conductors 3100 are formed, such as with a laser, die, knife, punching or fine blanking process, rounding these edges, such as with a chemical or mechanical process, will also result in reduced conductor cross section area. This results in higher current density and higher heat production for a given current, as well as the loss of surface area between conductor layers to transmit this heat to the top or bottom of a slot. The combination of these three effects is enough to produce significantly higher temperatures in an electrical machine as compared to the use of sharp cornered conductors of the same thickness and width.

These principles are also true of a polymer coating insulator on copper or aluminum (or other conducive material) conductors but for different reasons. The surface tension of polymer coating systems tends to pull the coating away from sharp edges, for this reason, it will produce a more even coating if the edges of a wire or conductor are rounded.

Figure 109:
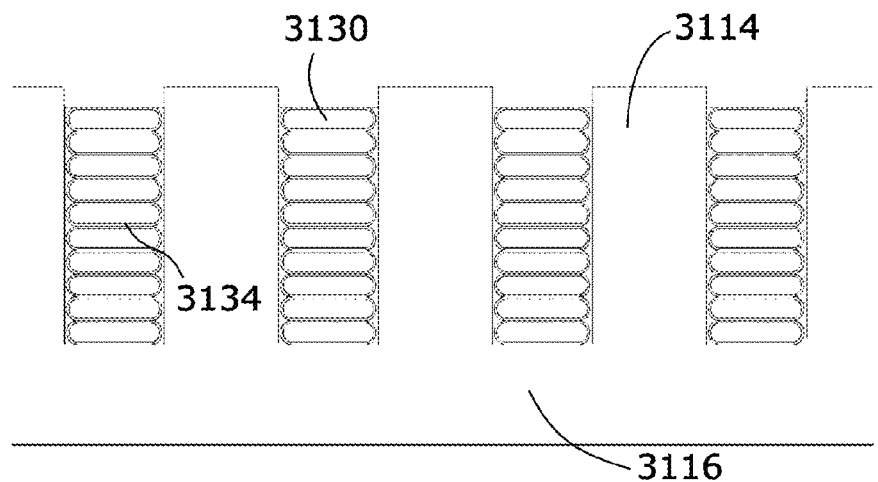
FIG. 109 is a schematic drawing of a stator section comprising conductors with rounded edges.
Figure 110:
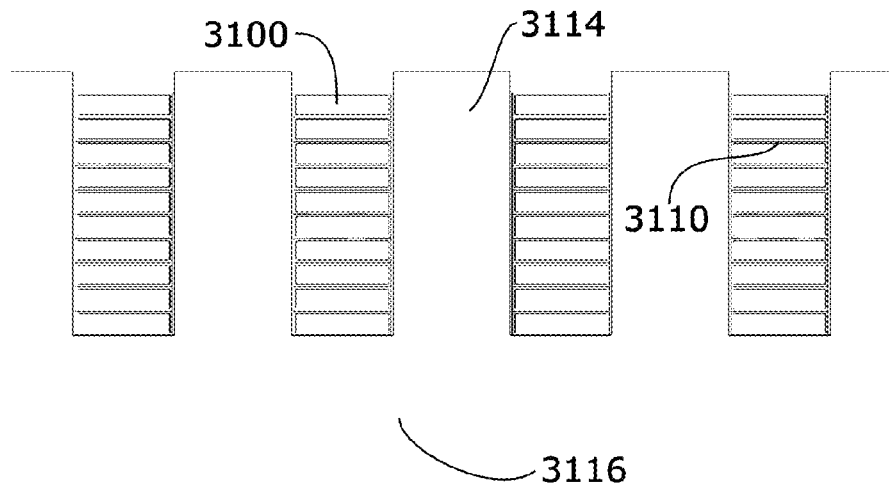
FIG. 110 is a schematic drawing of a stator section comprising conductors with sharp edges.

A comparison of the schematic stator sections of two exemplary embodiments is shown in FIG. 109 and FIG. 110. One stator comprises conductors with sharp edges and the other stator comprises conductors with rounded edges. Both stators are within the disclosed range, but the principles will apply to stators outside of the disclosed range with a percentage of the benefit. The conductors are 0.100" wide with a thickness of 0.020". The stator in FIG. 109 comprises copper conductors 3130 with a thermal conductivity of 390 W/(m*K), rounded edges and a polymer coating 3134 with a heat thermal conductivity of 0.17 W/(m*K), whereas the embodiment shown in FIG. 110 comprises aluminum conductors 3110 with a thermal conductivity of 220 W/(m*K), sharp edges, and a hard anodized coating of 0.001" thickness and a thermal conductivity of 0.75 W/(m*K). For the same thickness and width, the square conductor has ~5% greater cross sectional area, ~20% higher heat transfer contact area with adjacent layers and nearly twice the potential heat transfer contact area with the posts. Due to the $i^2$ loss associated with current density, the 5% loss of cross section in the rounded conductors results in a reduction of the permissible current density of approximately 10%, while the reduction of heat transfer surface area between the rounded conductors of 20% to 30% results in a reduction of the current density for a given stator temperature of up to 30% or more, this is a substantial reduction of the possible motor performance. For these reasons, combined with the cost benefit of being able to form aluminum conductors with a high speed process, such as fine blanking, and then anodize them without rounding the edges, this conductor method and construction offers significant cost and performance benefits. It has been shown, by FEA analysis, that the conductor configuration disclosed has significant enough benefits that when the use of square/sharp edged aluminum conductors is combined with a high heat transfer electrical insulator such as anodizing, the higher electrical resistance of aluminum, as compared to copper, can be partially or more than offset, in some cases, by the increased cross-sectional area of the aluminum and the increased heat conduction of the anodized layer as compared to polymer insulation coating on copper conductors.

Based on an FEA heat transfer analysis, it has been found that the effect of the higher conductivity and heat transfer surface area of the aluminum conductors is, in this example, adequate to maintain a similar maximum conductor temperature as copper conductor example, even though the aluminum conductors are higher resistance and are producing approximately 50% more heat. There is thus a benefit of anodized aluminum conductors compared to polymer coated copper conductors with a similar maximum conductor temperature. The aluminum conductors require more power, but they are ⅓rd of the weight of the copper conductors so this increased power is offset to a certain degree by the reduction of the actuator mass and increased KR. The challenge with anodized aluminum conductors is that is to achieve good edge coverage with an edge radius of 0.010" or less for many processes. This requires that conductors be thicker than 0.020" and preferably a minimum of 0.030". This is not preferred for many motor applications where thinner conductors will reduce the required current by allowing more turns. This results in the situation where conductors of 0.020" or less will benefit from a surface finish coating system that protects the sharp edges.

In an embodiment of, an electric machine may take advantage of low cost manufacturing processes which leave a sharp edge to provide increased cross sectional area while providing methods of protecting the un-anodized sharp edges. In an embodiment, the edge protecting system also serves to provide a method of securing the conductors in the slot. The embodiment also uses the sharp edge insulating method to secure the conductors in the slot and to provide a high percentage of conductor surface area exposed to a cooling fluid.

Figure 111:
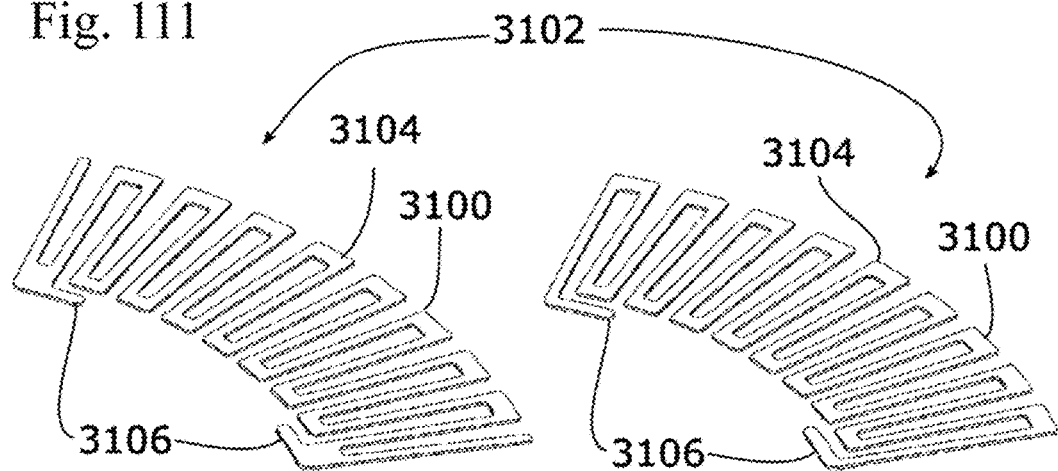
FIG. 111 is a perspective view of two adjacent layers of stackable flat conductors shown side by side before assembly.

A non-limiting example of the process of insulating the sharp-edged aluminum conductors is as follows. The aluminum conductors 3100 may be punched or stamped or fine blanked or laser cut, etc. from sheets of aluminum in a specified pattern intended for stacking between stator posts. The aluminum conductors should be made by a method that leaves a reasonably square edge. This prevents the anodized surface from forming outward form the sharp edges so the surface tension will be prone to hold a liquid dielectric material, or the increased static charge at the edges will tend to attract a dielectric powder coating material. Many types of aluminum can be used. 1100 series aluminum is known to have high electrical and heat conductivity which is beneficial for this application. Two adjacent layers 3102 of stackable flat conductors are shown side by side before assembly in FIG. 111. The conductors shown in this figure are designed to be stacked in alternating order. Each conductor layer E3102 serves as a conducting path for the flow of a current. Each conductor layer includes a pair of contact tabs E3106 which may be connected into a circuit to allow the flow of a current through the conductor. Many different flat and non-flat aluminum conductor configurations can be used in combination with aspects of the conductor insulating system disclosed here.

The conductors may then be masked at the contact tabs 3106 to reduce preparation time after anodizing and before connecting layers 3102 together. The parts are then hard anodized on the remainder of the surfaces. The anodizing process ensures coating and protection of the top, bottom and side surfaces. Due to the anodized layer 3110 growing perpendicular to the original aluminum surfaces, any orthogonal surfaces of the anodic coating will form corner gaps 3108 between them (FIG. 108).

When coating a sharp edge with a polymer, it is expected that surface tension will cause a thinning of the coating at the sharp edge. Similarly, but for a different reason, an anodic process applied to aluminum will create an unprotected area at all sharp edges due to the perpendicular growth of the coating. But while both of these coating methods are inadequate on their own, the sequential combination of an anodic coating 3110 followed by a dielectric polymer coating 3112 creates a favorable condition where the gap 3108 produced by the anodizing process results in a surface tension effect that draws the liquid polymer into the gap 3108 in the anodic coating 3110.

Figure 112:
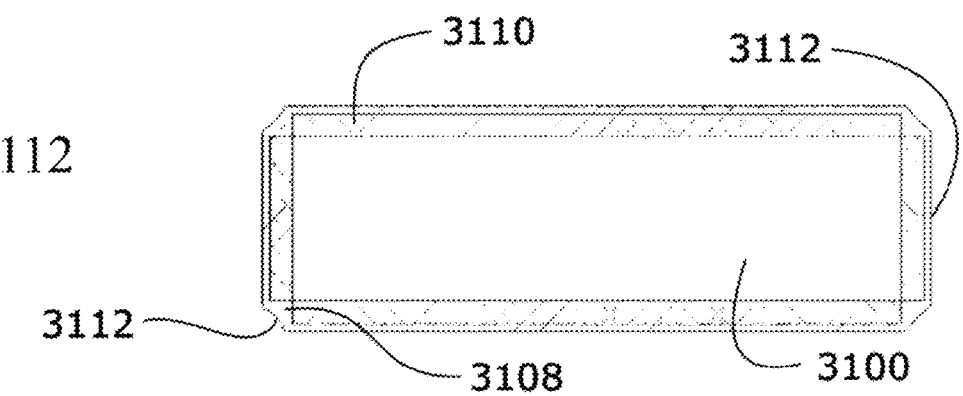
FIG. 112 is a schematic drawing showing an example of a coated conductor, with dielectric coating over the surface of an anodized conductor.
Figure 113:
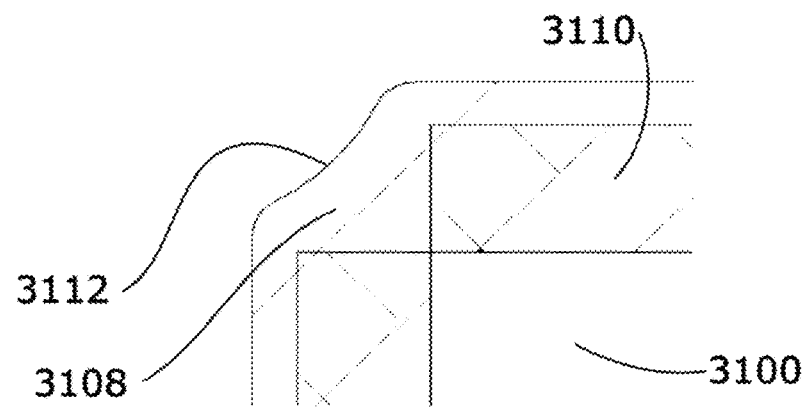
FIG. 113 is a closeup of a corner of the conductor of FIG. 112.

The polymer coating 3112 can be applied by dipping or spraying the conductors. Many different polymer or other liquid coatings such as varnish can be used. If an epoxy coating is used, it can be cured or baked to a B state and then a final cure phase can be applied after final assembly of all conductors into the stator. During all coating and curing processes, it is believed possible with adequate process control, to maintain a favorable condition so the meniscus formed between the perpendicular surfaces of the anodic coating will maintain a thick enough polymer coating for many applications. FIG. 112 shows an example of a coated conductor, with dielectric coating over the surface of an anodized conductor. The thin coating on all surfaces is not necessary in many applications for insulation as the anodic coating is very effective on flat surfaces. With a low viscosity polymer it is believed possible to ensure the flow of polymer into the edge gaps while at the same time providing a thin layer of coating on the rest of the conductor that can be used during final assembly to fix the conductors in the stator by heating or another final adhering process condition. FIG. 113 shows the expected result of a concave meniscus forming by dielectric coating and coating the corners. When curing or baking the conductor layers the conductors layers may be cured or baked together in a stack to create a unified structure.

Figure 114:
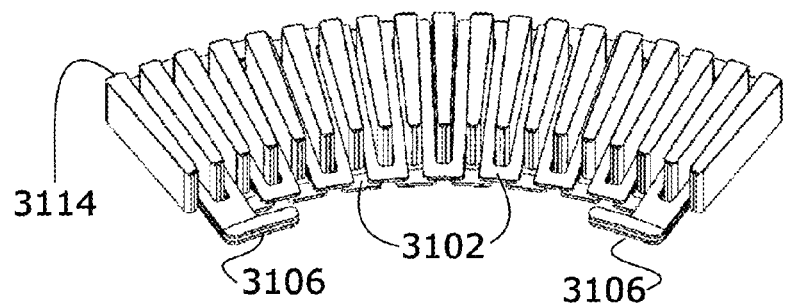
FIG. 114 is a perspective view showing conductors stacked together into layers with the conductor pair stacked between stator posts.

In an embodiment of the disclosed electric machine in an assembled state, the masked tabs 3106 are soldered or welded together after conductors 3100 are stacked together into layers as shown in FIG. 114 with the conductor pair stacked between stator posts 3114 of the stator 3116. Note that these areas can be spot welded, laser welded, or plug welded or joined by mechanical means during or after assembly of all layers. The final step may include, for example, baking the assembled components in order to fuse and cure the dielectric coating as well as adhering the conductors together and to the stator.

This coating system has a number of useful features and benefits. One benefit is the potential for high-speed fabrication of conductor parts, for instance by fine blanking, which method has the advantages of low costs and inherently high precision. There is minimal or no need for finishing edges, which reduces costs and allows greater surface area (with aluminum) to help offset higher resistance of aluminum as compared to copper (which must have rounded edges to achieve even coating). A deburring process may be helpful, but requires minimal processing.

The disclosed coating system allows for the practical use of aluminum conductors, which have a lower cost than copper and a third of the weight. The coating system results in a very hard anodic coating, which is harder than polymer coating, allowing a tighter fit with the stator without damage. A hard anodic coating also typically has higher thermal conductivity than polymer coating, sometimes by a factor of three or four. The coating system allows aluminum conductors to be much thinner than the known 0.020-0.03 minimum thickness to allow a 0.010"-0.015" radius on all edges. Thinner conductors allow lower current by providing a higher number of turns. In some embodiments of the disclosed machine, thinner layers also provide greater surface area per slot for direct cooling of conductors.

The coating system works especially well with embodiments of the disclosed machine when used with conductor layers having the same phase. In an embodiment, there is minimal voltage potential between layers due to all layers in a section being of the same phase. This allows thinner anodic and polymer edge coating. The absence of interweaving of conductors from different phases allows layered construction. Minimal elastic and minimal or no plastic deformation of conductors allows the brittle anodic coating to remain intact during assembly.

Another non-limiting example of a process of insulating the sharp-edged aluminum conductors involves powder coating. Powder coating is typically used to apply an even coat of polymer powder to a part with the opposite static electric charge of the powder. The powder is then fused to the part as a continuous coating by the application of energy, usually in the form of heat, such as by baking the conductor layer. Conductor layers may be backed in a stack to produce a unified structure. An aluminum conductor with sharp edges can be sprayed with an opposite charged dielectric powder or dipped in a fluidized bed of oppositely charged dielectric powder. The anodizing layer is believed to provide an insulator to reduce the static charge from causing adequate attraction between the powder and the flat top and bottom and edge surfaces, while the less insulated gaps at the sharp edges are expected to result in a biasing of the attraction of the powder to the conductor edges. The conductor is then removed from the spray or fluidized bed and semi- or fully fused to the conductor and semi- or fully hardened. If an epoxy dielectric powder is used, the powder may be partially cured after the edges are coated. The conductors and then assembled into the stator (or around a core, or into some other aspect of an electrical machine). After final assembly the edge-coating is then fully cured and in the process bound to the stator and other conductors.

Figure 115:
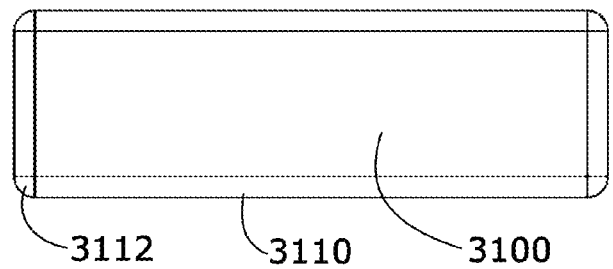
FIG. 115 is a schematic drawing showing an example of a coated conductor, with complete coverage of the gaps at the sharp edges.
Figure 116:
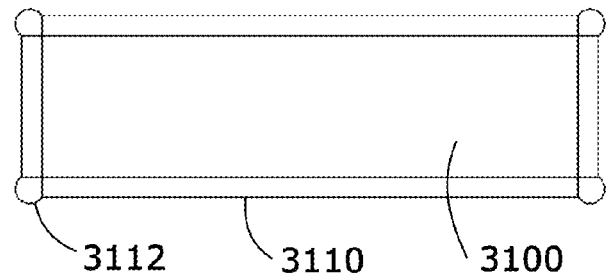
FIG. 116 is a schematic drawing showing an example of a coated conductor, with more than complete coverage of the gaps at the sharp edges.
Figure 117:
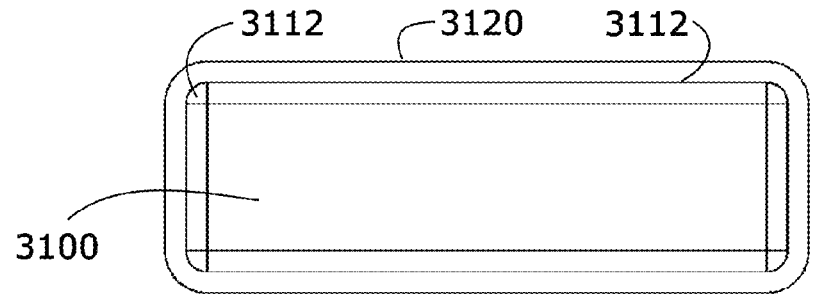
FIG. 117 is a schematic drawing showing an example of a coated conductor of FIG. 115, coated with a further polymer layer.

Depending on the process conditions it is expected that the powder coating of the edge can provide partial or complete or more than complete coverage of the edge gap in the anodic coating. FIG. 115 shows an exemplary embodiment with complete coverage of the gaps at the sharp edges. FIG. 116 shows an exemplary embodiment with more than complete coverage. Another exemplary embodiment may comprise the embodiment shown in FIG. 115 or FIG. 116 with a second polymer coating 3120 such as a thermoplastic or epoxy or varnish, as shown in FIG. 117, applied to the conductor layer to provide an adhesive layer for allowing the conductors to be adhered together in the final assembly.

Whether an additional adherent 3120 is used or if the edge powder coating is used as the adherent, embodiments can be assembled with a thin layer of a removable material such as, but not limited to PEEK or UHMW between the conductors. The parts may then be cured, for instance with heat, and then the spacer layers are removed by pulling them out.

Figure 118:
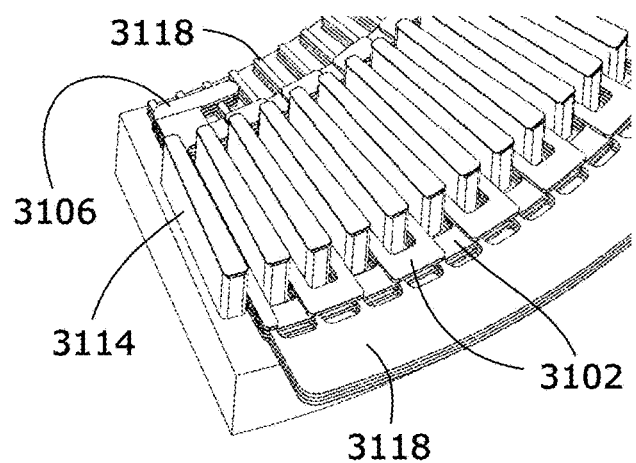
FIG. 118 shows a section view of an assembled stator and conductors with a spacer between one or more conductor layers in one or more slots.
Figure 119:
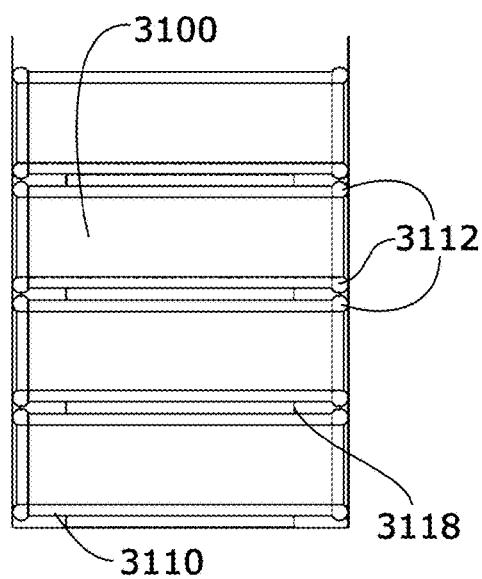

FIG. 118 shows a section view of an assembled stator 3116 and conductors 3100 with a spacer 3118 between one or more conductor layers 3102 in one or more slots. FIG. 119 shows a section view of the conductors and spacers before spacer removal with the powder edge coating contacting and adhering the conductors to each and/or to the post sidewalls. Having these minimal adhesion points reduces the conductive heat dissipation from the conductors to the stator, but it allows greater surface area to be exposed to a cooling fluid such as air or liquid or a multi-phase fluid that can be used to draw heat away from the conductors.

A material like PEEK or UHMW will stretch to a second material condition where the molecules are more aligned and the plastic retains a high percentage of its strength, but it becomes significantly thinner so as to allow removal from between the conductor layers when used as a spacer. PEEK has been found to be very strong when stretched and is also very heat resistant to allow it to withstand a typical heat curing process, but PEEK must be used with a mold release coating or with adhesives which do not adhere to it. UHMW is less strong but has excellent release properties which allow for removal without release agents.

Figure 120:
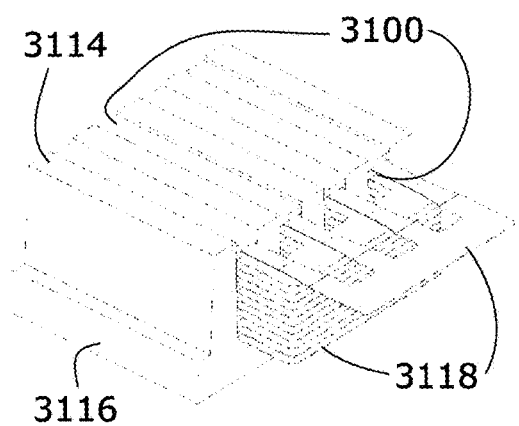
Figure 121:
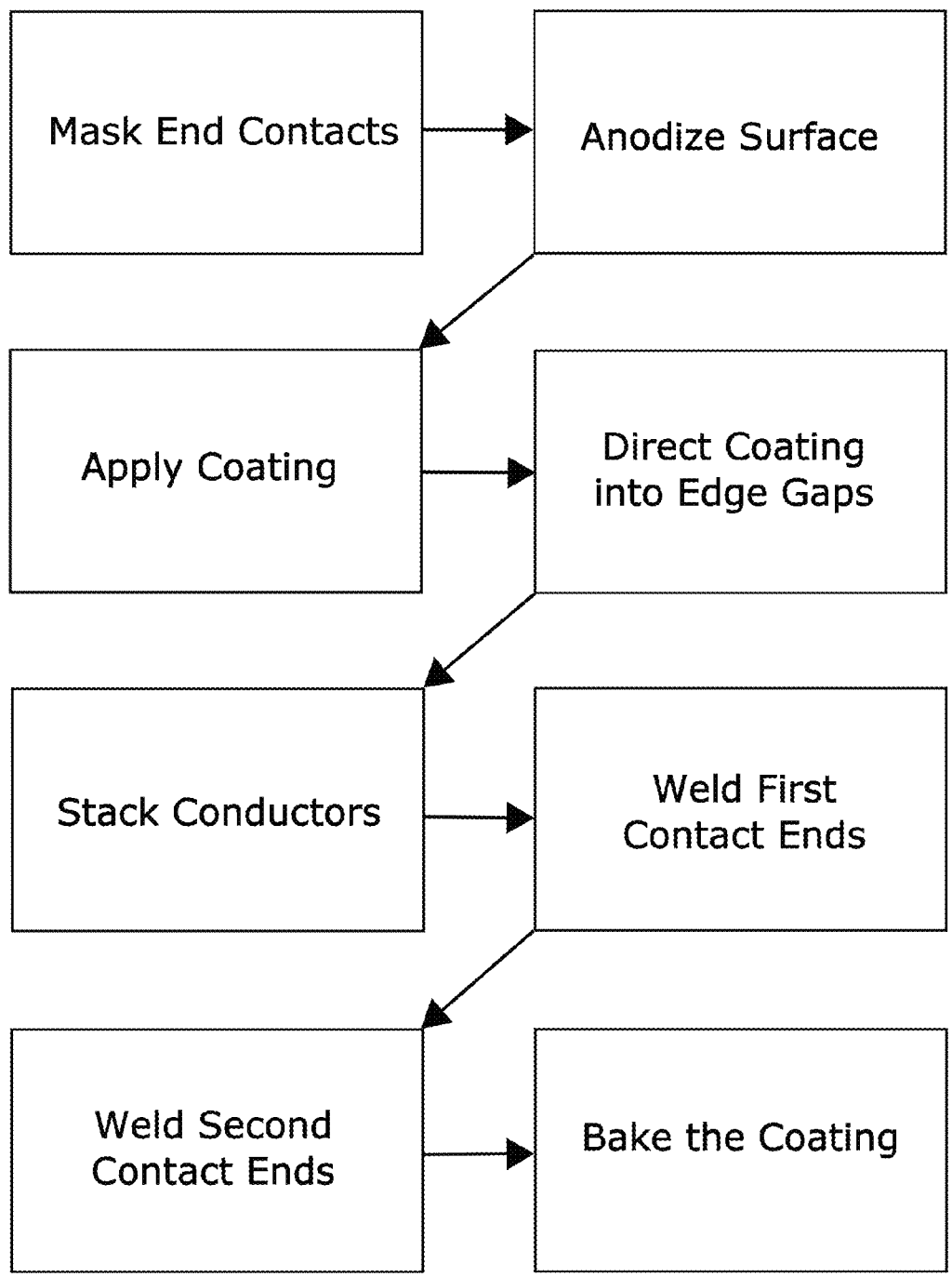
Figure 122:
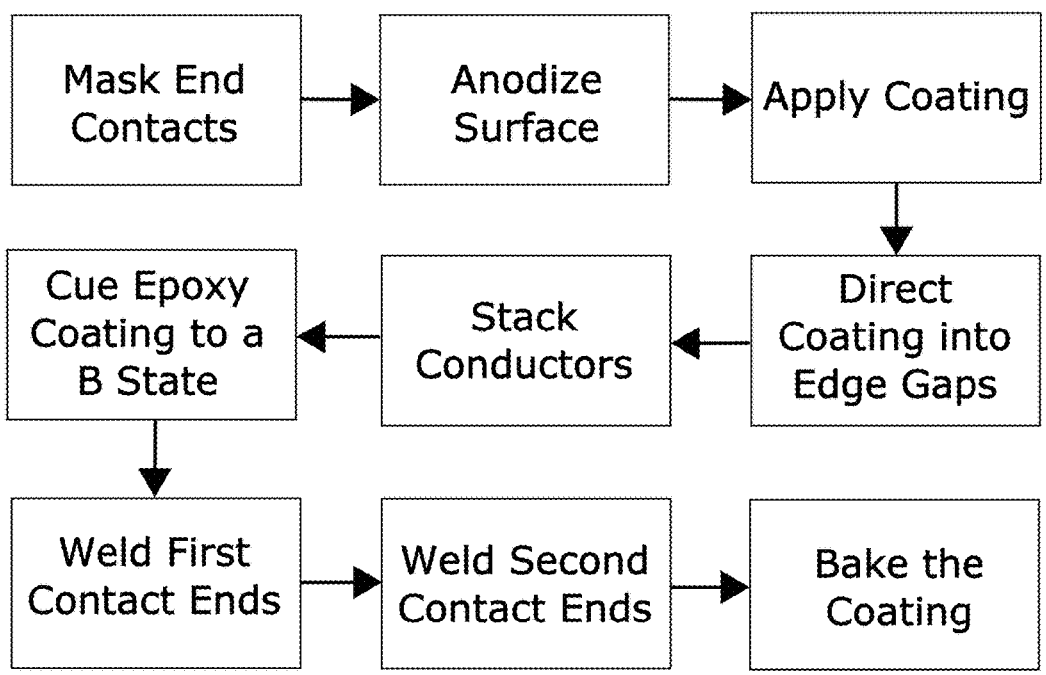

A simplified section of a stator 3116 with a spacer 3118 component being removed is shown in FIG. 120, with the thinning of a section of the spacer as a result of stretching the material. A material such as PEEK with a thickness of 0.004", for example, will stretch to a new plastically deformed mode where the thickness is only 0.003". This provides 0.001" of clearance for the removal of the spacer. The stretching and consequently thinning of the spacer happens as a result of the friction or bond with the conductors along the length of the spacer and the tension applied to the externally located end of the spacer. As the spacer stretches and thins, the leading edge of the friction or adhesion contact surface travels in the opposite direction of the external end which is being tensioned until enough of the spacer is stretched/thinned to allow complete removal of the spacer.

Instead of a polymer or other adhesive, if a high enough temperature powder coat is used, a metallic solder is believed possible to be used to adhere the conductors together and to the stator. This has the advantage of very high heat transfer as compared to a polymer.

Anodized conductors of the described construction can be used on a variety of electric machines, including, but not limited to, axial flux machines, radial flux machines and linear actuators.

Exemplary Electric Machine with Non-Planar Rotor and Stator

Some embodiments of an electric machine comprise a rotor comprising an annular disk, with holes extending through the plane of the disk. In some embodiments, the holes extend between the inner edge and the outer edge; in other embodiments, holes may extend only partway through the disk. Holes that are circular in cross section, with the plane of cross section being orthogonal to the plane of the disk, may provide the rotor with roman arch support, conferring rigidity to the rotor. The use of holes in the rotor decreases the amount of material in the rotor, resulting in a lower mass. The holes may extend radially, though not perfectly radially; however, other arrangements are also possible, such as a spiral arrangement. The holes may be parallel to the slots; the holes may align with the slots on a projection onto the axial plane. The holes and slots may be connected by openings. The rotor may be manufactured of a unitary piece of a material such as steel or iron, and the rotor posts may be formed of the unitary piece. Posts may extend between the inner edge and the outer edge of the rotor. The rotor posts may define straight lines between the inner edge and the outer edge, and may be substantially parallel to each other. Such a configuration can facilitate magnet insertion. Posts may have an inverse taper (narrowing) of circumferential thickness with axial height, for improved magnet retention. On a double-sided rotor, there may be posts on each side of the rotor, and posts on one side of the disk may be aligned with respective posts on the opposite side of the axis as projected onto a plane perpendicular to the axis. The rotor may be stiffened with low density magnesium or aluminum rings. The axial cross-section of the rotor may have different thickness at different radial distance from the centre. In particular, the rotor may have a smaller axial height at a radial distance from the centre of the rotor greater than the inner radius and smaller than the outer radius.

Embodiments described above, comprising a rotor with holes, have a number of advantages. The mass of the rotor is decreased, as it comprises less material. The small cross section of the rotor in the tangential direction aligned with the flux path, compared to the cross section of the magnets, results in low flux leakage and high possible flux density, further increased by the use of tapered magnets. Roman arch support confers rigidity. The absence of extended thin sections results in shear load rather than bending load in all stressed areas. There are no thin sections of appreciable length to cause flex. Since the stress is comparatively low, low cost materials, such as Durabar™ may be used to attain sufficient stiffness. The rotor may be constructed with only an inner bearing, which is advantageous in terms of cost and manufacturing complexity, and allows force sensing. An integrated encoder may be used. The possibility of magnet insertion after assembly of the rotor is also beneficial, as the forces between permanent magnets may normally make assembly difficult with permanent magnets present during the process. A tapered interface allows full contact of the permanent magnets with the rotor material, allowing for lower manufacturing tolerances, and resulting in a slight increase in torque. Tapered slots may be manufactured using a large disk cutter instead of a small endmill with enough shank at an angle to provide shaft clearance.

Some embodiments of an electric machine comprise a rotor exhibiting one axial height or thickness at the inner edge and a second axial height or thickness different from the first axial height at the second edge, and a stator of complementary shape. For example, the second axial height may be greater than the first axial height. An exemplary embodiment comprises a conical rotor and stator. A conical rotor or stator is found to possess a much higher stiffness than an analogous planar rotor or stator, respectively. High stiffness allows a very consistent and small airgap to be maintained.

FIG. 123 shows a cross-section of an exemplary embodiment of a conical rotor 3200, stiffened with low density magnesium or aluminum rings 3212, 3214 on the inside and outside of the rotor; the rotor may be manufactured of steel or iron. Conical rotor can be instead any non-planar surface of revolution, for example having a hyperbolic or parabolic shape. The rotor has an axis, and may have circumferentially spaced carrier posts extending axially from the each side of the annular disk. In such a conical device, the rotor has a variable axial thickness, and on the inside, nearer to the axis, is thinner in the axial direction than on the outside, although this difference may be reversed so that the rotor is thinner in the axial direction on the outside.

FIG. 124 gives a close-up cross-sectional view of the embodiment in FIG. 123 with the magnesium or aluminum rings removed Even without the magnesium rings, the rotor is incredibly stiff, even though the largest cross section is only 0.015" thick. The stator slots may be tapered. The hyperbolic shape of the axial cross section, while not essential, allows the construction of a rotor with lower mass, and is well-suited for high speed machining. Conical or round holes 3222 are drilled through the back-iron 3220 of the rotor, and slots 3224 may be cut with a disk cutter. Both operations are very fast. Such a construction allows the mass to be minimized, while providing a roman arch support for all thin section, and results in a balance of strength and rigidity. Importantly, there are no extended thin sections. Consequently, although there are many bottlenecks for flux, there are no thin sections of appreciable length to flex. All stressed areas therefore experience shear stress rather than bending stress. The cross-sectional area between the posts 3226 is minimal, yet the stiffness is high.

The output of a computational analysis on 20% of the rotor; with half of 500 N of force, shows that the deflection is less than 0.0005", and the maximum stress is only 2000 psi.

The exemplary embodiment of the rotor shown in FIG. 123 to FIG. 127 has a number of advantages. The conical shape and roman arches confer considerable rigidity, which is important in the maintenance of a necessary minimal airgap. The embodiment exhibits minimal flux leakage due to the very small cross section compared to magnet cross section (in tangential direction aligned with flux path), and highest possible flux density due to the minimal leakage path and the tapered magnets. The construction is light-weight, and can be built with an inner bearing alone. This provides cost benefits and allows force sensing. An integrated encoder may be used.

The tapered interface permits full contact of the permanent magnets with the material of the rotor, allowing for lower manufacturing tolerances. Moreover, the construction allows permanent magnets to be inserted after assembly of the rotor. Since assembly can be very difficult with the permanent magnets in place due to immense forces between the magnets, post-assembly insertion is a considerable safety and cost benefit. The mechanical magnetic retention is especially important for configurations involving strong magnetic repulsion between nearby magnets. The minimal leakage path and tapered magnets provide high flux density. Since the stress is low, low cost materials are possible.

Due to the high number of small features, machining could be very time consuming, but tapered slots allow: the use of large disk cutter instead of small endmill with large enough shank at an angle to provide shaft clearance; mechanical retention of PM's; and ~5% higher torque. The geometry provides ability to achieve the majority of the benefit with low cost materials such as Durabar™.

Particular Embodiment Having Cooling Fins

The device geometry of the disclosed range will provide torque-to-weight and $K_R$ benefits over a range of air gaps between the stator and rotor such as, for example, from as low as 0.001" or lower, and up to 0.010" or higher. The high pole density in the disclosed range results in an unusually short magnetic field which will tend to benefit from smaller air gaps as compared to motors of a given diameter which are outside of the disclosed range. It has been shown by analysis and experimentation that an airgap of 0.005" for a 175 mm average airgap diameter actuator is beneficial and achievable with reasonable manufacturing tolerances by implementing the principles shown here.

Figure 129:
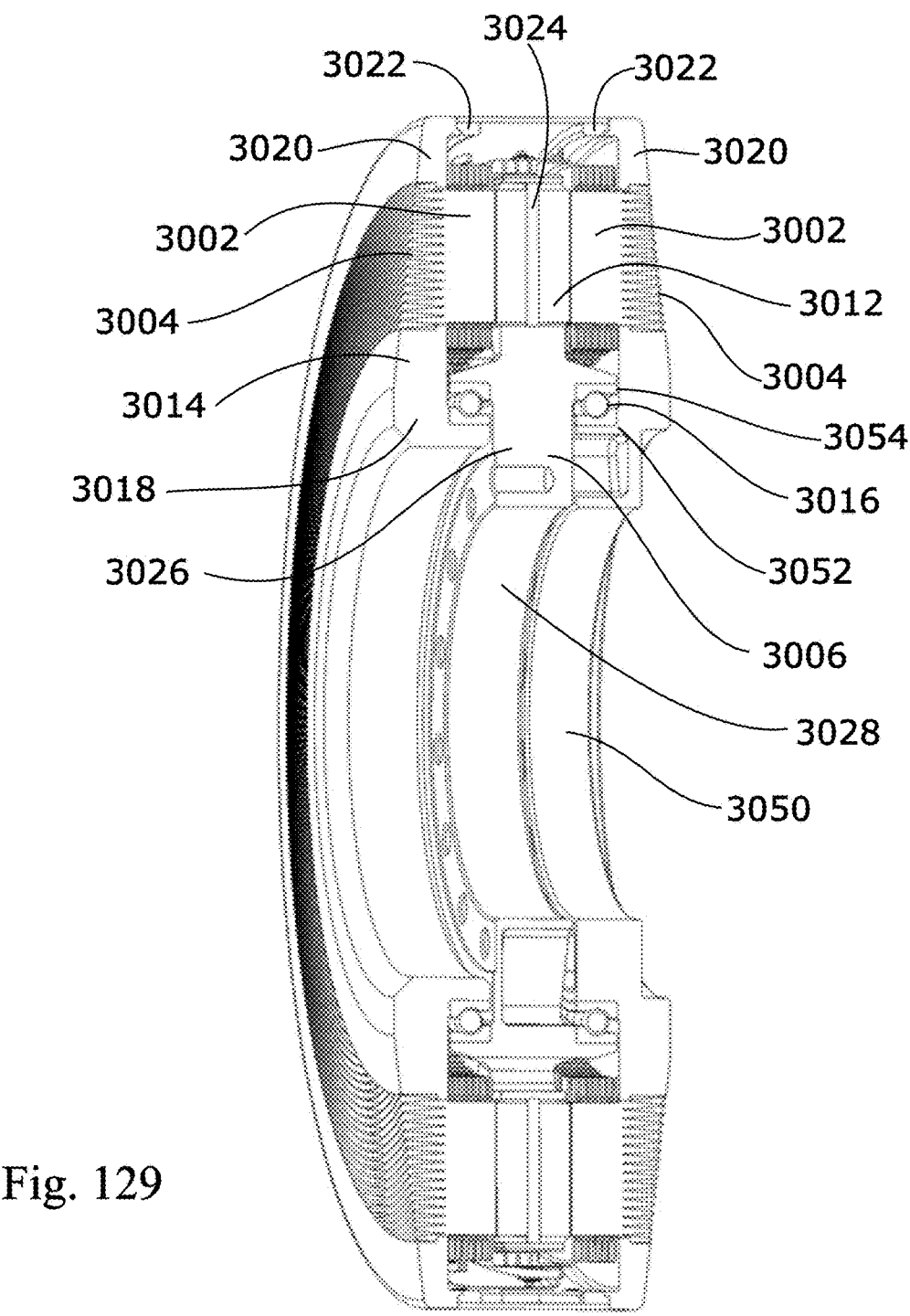

FIG. 128 is an axial view of an embodiment of an assembled actuator including power and encoder connectors. As shown in FIG. 128, an actuator 3000 comprises a stator 3002 having fins 3004 and a rotor 3006. The rotor is the assembly shown in FIG. 132. Power connector 3008 and encoder connector 3010 extend from one side of the actuator. Stator 3002 comprises fins 3004 for cooling, structural stiffness and flux path provision. As shown in FIG. 129, rotor 3006 is arranged along a centre plane between two stators 3002 each one of which has fins. In FIG. 129, the rotor has an output ring located radially inward from the magnets. Stators 3002 are fixed to housing 3014. Bearings 3016 rotatably connect rotor 3006 to housing 3014, separating inner portions 3018 of actuator housing 3014 and a separator ring 3022 separates outer portions 3020 of the housing. The bearings as shown are angular contact bearings preloaded using an approximately constant magnetic force between the rotor and stators, which holds the actuator together. Rotor 3006 comprises a Permanent Magnet (PM) carrier 3024 and PMs 3012 carried by the PM carrier 3024. The rotor also comprises an inner ring 3026 fixed to the PM carrier 3024 and connected to inner housing ring 3026 by bearings 3016. The inner ring 3026 comprises an output ring 3028 to which an element that is to be rotated by the actuator may be connected. The output ring causes such an element to rotate relative to another element connected to fixed ring 3050. The bearings 3016 are mounted between two races, in this embodiment an inner diameter race 3052 connected to inner portion 3018 of housing 3014, and an outer diameter race 3054 connected to the rotor 3006. The PM carrier 3024 is made of a soft magnetic material such as an iron alloy or a steel alloy and is magnetized by an array of permanent magnets in the slots (slots shown in FIG. 132). The stator is made of a soft magnetic material such as an iron alloy or a steel alloy. Soft magnetic materials with high flux saturation density are typically very dense. In order to reduce the weight of the actuator an embodiment of an electric machine uses low density materials for the inner and outer housing rings and separator ring. Materials which can be used include aluminum alloys, magnesium alloys, or composite materials such as carbon fiber composite.

Where a shaft rotates inside a housing the conventional bearing arrangement would have the rotor (rotating shaft) supported by the ID of the bearings and the housing (external static structure) supporting the OD of the bearings. Bearing preload would be provided by mechanical means such as a threaded nut or a bolted clamping ring acting on either the ID or the OD of the bearing, and typically in a way that attempts to move the bearings closer together. If a conventional bearing arrangement were to be applied to the preferred embodiment, it would therefore have the rotor attached to a shaft that connects to the ID of the bearings and the axial magnetic force carried by the housings would act to move the OD of the bearings closer together. With the bearing outer races being pushed axially together the bearing inner races would react against the applied load with outward acting axial forces; the resulting orientation of the lines of action through the bearings is known as a "face-to-face" configuration. When a pair of bearings has a short distance between them, say less than the bearing diameter (as is the case for the embodiment of FIG. 128 to FIG. 135 and FIG. 138 to FIG. 140), a "face-to-face" orientation of the lines of action of the bearing preload results in a shaft assembly with a much lower moment carrying capacity than a "back-to-back" arrangement. By mounting the shaft of the rotor on the bearing OD's and reacting the inward acting forces of the housings at the bearing ID's (in the less obvious arrangement), a Back-to-Back line of action bearing configuration is achieved which, in combination with an adequately axially flexible housing, enables the magnetic attraction of the rotor and stator to apply a preload to the bearings in a way that results in a wide separation between the bearing parallel lines of action, thereby maximizing the shaft stability for a given bearing axial separation distance.

Figure 130:
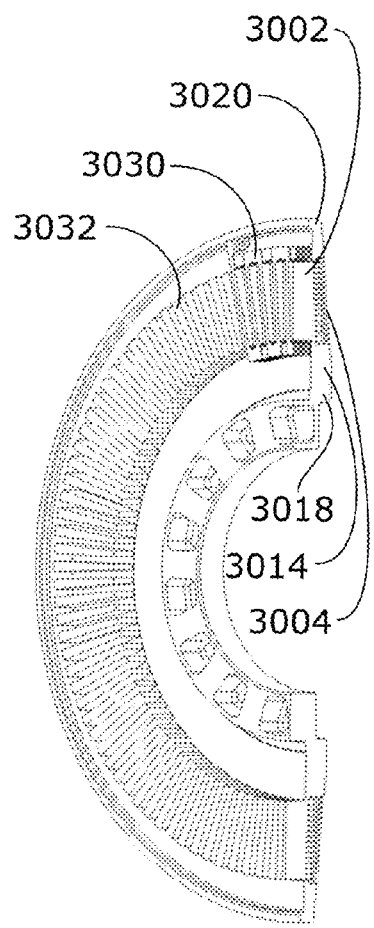

FIG. 130 is an isometric section view of a stator 3002 and housing 3014 assembly of the actuator of FIG. 128 with a partial section of layered conductors 3030. As shown in FIG. 130, the stator has posts 3032 according to an embodiment of an electric machine on the left side and spiral flux path cooling fins 3004 on back surface of stator. The stator may be made from one piece of an isotropic material such as an iron alloy or a steel alloy. Spiral cooling fins 3004 may be at least partly made from the same piece of isotropic material and are primarily circumferential in orientation in order to provide circumferential rigidity and flux linkage functionality in addition to increasing surface area for cooling.

FIG. 131 is an axial view of a stator 3002, inner housing 3018, outer housing 3020, and exemplary layered conductors 3030 of the actuator or FIG. 128. Connections between phases of the conductors are not shown Layered conductors 3030 are arranged around posts 3032.

Figure 132:
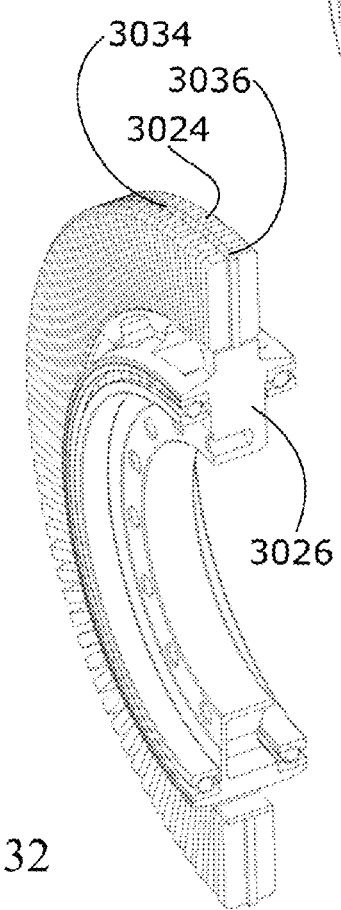

FIG. 132 is an isometric view of a concentrated flux rotor post array 3024 for the actuator of FIG. 128, and a rotor support ring 3026 to which the rotor post array 3024 is fixed. The rotor post array 3024 includes a back iron 3034 defining radial holes 3036 through the back iron.

The axial flux embodiment shown here is well suited to achieving very small air gaps because the rotor which interacts magnetically with the stator does not carry the output load of the actuator. Instead the bearings 3016 are located between the output ring 3028 and the PM carrier 3024, so variations in output load will have a minimal effect on the axial position of the PM carrier relative to the stators. The stators in this embodiment are held at a precise axial spacing by an axial spacer ring on the OD of the actuator that prevents axial movement of the stators relative to each other. This structure enables the device to achieve and maintain an air gap of 0.005" for the smallest average airgap diameter actuator in each boundary. It is believed by the inventor that a 0.005" airgap will be achievable for motors that are larger or equal to than the smallest motor in each of the boundaries. The desired airgap for a particular motor will best be determined with consideration to the application and the given manufacturing tolerances, as well as the loads to be encountered by the structure.

Referring now to FIG. 133, the embodiment has a concentrated flux rotor with parallel sided PM's 3038. It has been shown that tapered magnets are able to provide higher torque, but the simplicity and lower cost of using parallel sided magnets makes this the preferred embodiment for many applications. Pre-magnetized PM's may be inserted individually into the slots, or a magnetic material can be injected, poured, or otherwise inserted while in a non-solid state. It may be possible to then magnetize the PM material by applying very high flux density to the rotor poles.

The back iron of the rotor between the two PM arrays, is preferably configured to magnetically retain the PM's into the slots. This simplifies the assembly process and eliminates the need for a mechanical PM retention feature on the rotor. The rotor can be configured with the PM's on one axial side aligned with PM's of the same tangential polarity on the other side. Alternatively, the PM's on either side of the rotor can be of opposite tangential polarity. In this exemplary embodiment, the axially aligned PM's are of opposite polarity to provide a magnetic retention force toward the rotor centre plane. To prevent more flux than necessary for positive PM retention from linking across the backiron, a radial hole 3036 is provided in the back iron and between posts; to create a flux path restriction between rotor posts through the back iron while still maintaining a rigid post and backiron structure. An array of axial holes (not shown) toward the inside of the rotor posts provides another flux leakage restriction while maintaining a rigid post and end-iron structure.

A set of angular contact bearings 3016 is used to support the rotor in the housing with the housing fixed to the inner races and the rotor fixed to the outer race. With high strength magnets such as NdFeB 52, the total attraction force between a stator and rotor can be over 400 Kg for a 175 mm average airgap actuator with a 0.005" gap. This force is present at all times and the total force will does not change by more than 10% during powered operation due to simultaneous attraction and repelling of the rotor posts resulting from the alternating polarity of the electromagnetic stator poles. This immense attraction force must be supported to create and maintain the desired airgap. The preferentially small airgap of motors inside the disclosed range requires a more rigid structure than motors outside the disclosed range. At the same time, the thinner backiron that is possible with motors in the disclosed range and that is necessary to get the full torque-to-weight benefit of the device, requires that a more rigid structure is achieved with an axially thinner stator even though these are two inherently competing characteristics. To achieve the required rigidity, embodiments of the device use a central rotor with equal magnetic forces pulling on both axial sides, and a set of stators on both sides of the rotor which are rigidly connected at their OD's by a separating ring 3022. The separating ring on the OD prevents the outer regions 3020 of the stators from closing the airgap, while the angular contact bearings 3016 prevent the inner regions of the stators from closing the airgap.

In addition to the rigidity of this structure, this embodiment provides a consistent preload on the bearings by allowing enough flexibility in the stators and/or end plates of the housing, that the axial force of the rotor attraction with the stators provides adequate preload on the bearings to eliminate bearing play and to keep the bearings preloaded up to a pre-determined design limit for a cantilevered load.

In some cases, the magnetic force of the bearings will be adequate for a maximum cantilevered load. In other cases the bearings may require higher preload than is provided by the rotor. In other cases, the forces generated by the rotor may be greater than is necessary or desirable for the bearings. If the rotor forces are well suited to provide preload on the bearings, then the housing is preferably configured so the assembled rotor and housing, minus the PM's in the rotor, results in the housing contacting but not preloading the bearings. The housing is then preferably constructed to allow enough elastic deflection of the housings in the axial direction such that the bearings become preloaded.

If this preload is not adequate to withstand the maximum design requirement for cantilevered loads, the housing can be constructed to provide an initial mechanical preload on the bearings with the magnetic force then increasing this preload when assembled.

If the magnetic force would provide more preload than is necessary or desirable for a given bearing, the housing can be designed to assemble without the PM's installed in the rotor such that the housing must be elastically deflected to apply an axial load on the bearings. In this case, part of the magnetic rotor force will create contact between the deflected housing and the bearings, and the rest of the magnetic force will provide the desired preload of the bearings.

It is desirable to provide a structure which is very light weight and rigid enough to provide a consistent airgap under these immense forces. By using the magnetic force to preload the bearings, the need for fasteners is reduced or eliminated. This simplifies the manufacturing and assembly and reduces the complexity and weight of the actuator. The fins 3004 allow the volume of stator material, which can be made of iron or steel or a steel alloy, to be supported by components comprising a low density material such as magnesium, aluminum or a composite material. The stator and housing material can be fastened together with bolts or adhesive but are preferably positioned by alignment features in the housing and stator and held in relative position to each other at least partially by the magnetic force of the rotor. The housing will include a member between the stator and a bearing that is lower density than the stator (e.g. inner housing 3018), and which includes a feature which prevents the stator from moving in the direction of the rotor to close the airgap. In an embodiment, this housing member does not have a feature to prevent movement of the stator member away from the rotor because it would add weight and cost and it may complicate the assembly process.

If the magnetic force is not sufficient to provide adequate preload on the bearings at all times during operation, a housing member on the OD of a stator member is provided with a feature (not shown) that aligns on the stator and prevents movement of the stator member axially away from the rotor. This member may be secured to a similar member, such as along the center line of the actuator, which is pulling in toward the rotor on the opposite side of the rotor. These two housing members can be secured together with bolts or threads or with an adhesive or a press or snap fit. The stator and/or rotor are preferably constructed with an airgap surface shape, such as a conical surface shape which allows the outer housing members to pull the OD of the stators toward the rotor before the housing members are fixed together, and which results in a consistent airgap along the radial distance of the airgap, or a tapered airgap along the radial distance of the airgap between the stator and rotor to allow a smaller airgap toward the axis of the actuator. The smaller airgap toward the axis allows inner portions of the stator and rotor to be axially closer than outer portions of the rotor and stator without the inner portions contact sooner than outer portions when forces on the rotor and/or stator would act to close the airgap. This taper does not allow more movement of the outer portions of the stator or rotor, but they do allow a smaller airgap for the inner portion without concern for premature contact of these smaller airgap areas.

In order to provide a housing structure that is rigid enough to maintain a consistent airgap yet flexible enough to allow the Rotor PM's to provide the desired bearing preload, it may be beneficial to construct the OD connecting ring 3022 to allow a level of axial movement or flexibility between the two stators in this exemplary embodiment. This could be done with a bellows or other somewhat disk or slightly conical or other similar shape that prevents relative rotation of the two stators while allowing the required magnitude of relative axial movement between the stators. This flexible member or assembly can be axially between the stators, or in line with the stators. Very little axial movement is needed, and is preferably enough to allow the required preload to be applied to the bearings as a result of magnetic attraction in the airgap over the full range of manufacturing tolerances and the changes in relative axial distance between the stators as a result of heat expansion in the actuator.

In the exemplary embodiment in FIG. 128, the force of the magnets has been calculated using FEMM software. This attraction force results in an axial deflection of 0.010" when the bearing is not present in the assembly. This is considered, by the inventor to be adequate flexibility to achieve a consistent preload of the bearings over a reasonable range of manufacturing tolerances and dimensional changes due to heat expansion, both of which can be expected to be less than a maximum of 0.002" per bearing interface for a device of this size and using reasonable machining tolerances.

If the magnetic force pulling the stators inward is more than is desirable for preload on the bearings, a housing member on the OD of a stator member is provided with a feature that aligns on the stator and prevents movement of the stator member axially toward the rotor. This member, e.g. separator ring 3022, may be secured to a similar member, such as along the center line of the actuator, which is also pushing the opposite stator away from the rotor on the opposite side of the rotor. These two housing members can be secured together with bolts or threads or with an adhesive or a press or snap fit or they can be friction fit or simply pressed against each other, or the separating ring. As shown in FIG. 134 they can also be a single component; they can also be an extension of the stators. The stator and/or rotor are preferably constructed with an airgap surface shape, such as a conical surface shape which allows the outer housing members to push outward on the OD of the stators away from the rotor before the inner housing members are fixed together, such that it results in the desired airgap between the rotor and stator after assembly with the PM's in the rotor pulling the stators toward the rotor.

Elements of the above construction can be applied to a single rotor and single stator, or two outer rotors on either axial end of a central two sided stator. Elements of the above construction can also be applied to an external output ring configuration with the axially outer members rigidly fixed together inside the ID of the stator/s.

Heat dissipation benefits of the exemplary embodiment in FIG. 128 to FIG. 135 and FIG. 138 to FIG. 140 is according to the principles of an embodiment of an electric machine. The slot density and conductor volume is within the boundary for the size of this device where the conduction of heat from the conductors to the back surface of the stators is effective enough to allow unusually high current density for a given cooling rate applied to the back surface of the stators. Cooling of the back surface of the stators can be done by a number of methods that include radiant, conductive, and convective. Cooling fins 3004 increase the surface area on the back surface of the stator as well as the surrounding housing. If the cooling fins are one-piece with the stator and angled along a non-radial line or curve, the fins can be used as a flux path 3040 as shown with the series of arrows in FIG. 135.

It is desirable to maximize the flux carrying capacity of the backiron relative to the weight of the backiron. By angling the cooling/fins to the posts such that a fin is axially aligned with two or more posts, and by constructing the fins of a soft magnetic material, such as if they are one piece with the posts and/or backiron, the fins can be used for three separate functions. Specifically, a fin can, in this way, be used for A). Radial and circumferential strength and rigidity
B). To increase surface area for cooling, and
C). As an integrated flux path member. Using the cooling and/or rigidity fins to enhance the flux path makes efficient use of the high density stator backiron material to achieve low overall weight.

FIG. 136 shows a simplified section of cooling/structural fins on the back surface of the stator which are preferably one piece with the stator and are more than 50% aligned radially (that is, they are less than 45 degrees from radial alignment) at an angle of less than 45 degrees to the stator posts. This allows them to perform an additional function of providing a flux linkage path 3040 between posts as shown by arrows. Hatched cross sectional area 3042 indicates a larger distance through which the flux passes in the fins between posts due to the fins being close to axial alignment in this embodiment and the flus linkage path 3040 extending diagonally between posts.

In some configurations, such as the embodiment of FIG. 128 to FIG. 135 and FIG. 138 to FIG. 140, the stator is supported on the ID and OD while the posts provide adequate radial stiffness of the stator itself. In this case embodiments of an electric machine use a series of concentric fins and grooves that can provide similar cross sectional area for flux linkage from post to post through the backiron, as compared to a 50% thick backiron with no fins, but the fins and grooves provide three additional benefits. The first is the potential for dramatically increased cooling surface area on the back surface of the stator. The second is increased rigidity in the circumferential direction. This is a benefit for the configurations where there is a small difference between the number of stator and rotor posts (resulting in a 40-50% force variation over a 90 deg angle) and where the backiron would otherwise be thin enough to allow higher circumferential deflection than is desirable as a result. By integrating a series of concentric cooling fins into the solid stator material, the circumferential stiffness can be increased without increasing the weight of the stator. A third benefit of this construction is a pseudo-laminated effect in the backiron where the multiple thin sections will reduce the eddy current production in the stator back iron between posts. There may be a slight increase in the reluctance across the backiron due to a longer flux path, but the benefit in terms of reduced eddy currents is expected to partially or completely offset this detriment.

In the simplified exemplary section shown in FIG. 137, the maximum backiron thickness (i.e. including the full heights of the fins) is approximately twice that of a hypothetical non-finned backiron with 50% the thickness of the posts). It has approximately the same cross sectional area, however, so it is expected to have similar magnetic reluctance. In this way, the surface area available for heat extraction can be many times more than the non-finned surface area for much more effective cooling, but without compromising the weight or the magnetic properties, and at the same time providing the additional benefit of increased circumferential rigidity. In the embodiment shown in FIG. 137, cooling fins 3454 are integrated into the stator 3450 in a direction which is not aligned with the posts 3458. The fins may be tapered. One or more of the cooling slots 3456 may be deep enough to create an opening in the root of the stator post slots 3452. The back iron including the fins may have a height greater than 50% of the post width. The opening in the stator slot allows the conductor to be cooled directly by a cooling fluid or heat dissipating member (not shown) through conduction. Air or a cooling fluid may pass through the opening around the conductors and through the intersection of the cooling slots and post slots, either into or out of the actuator. Movement of the cooling fluid may be by forced convection or by natural convection as a result of heating of the conductors and stator. In an embodiment, the stator is made of a soft magnetic material such as, but not limited to, steel or steel alloy, or iron or iron alloy, and fused together with a non-magnetic material, such as aluminum or magnesium alloy, along a fused line or a gradual transition, such as by explosion welding, or additive manufacturing, such as 3D printing and sintering. Cooling fins are then cut into the back surface of the stator. This provides increased surface area while the fused-on material forms fused fin tips 3460 which may be of lower density and higher heat conductivity than the remainder of stator 3450. Fastening protrusion 3462. Is provided at edge of stator 3450 perpendicular to the stator posts for securing to the housing (not shown).

Motors inside the disclosed boundary are characterized by unusually low conductor volume and unusually high slot density which results in low heat flow resistance from the conductors to the back surface of the stator.

In addition to the inherent heat dissipation benefits inside the disclosed range, it is possible to increase the heat extraction from the back surface of the stator by the application of one or more of the features described here. It should be noted that a number of the following cooling system features could be applied to any motor in the series including motors outside of the disclosed range. The application of one or more of these cooling system configurations with geometry inside the disclosed range, however, will result in higher performance in terms of continuous torque density, because the heat flow resistance from the conductors to the back surface of the stator is limiting factors in all of these motors, and an inherent benefit of motors inside the disclosed range is low heat flow resistance from the conductors to the back surface of the stator.

If a given cooling rate is applied to the back of the stator, it will enable the extraction of a certain number of watts of heat from the device based on the surface area, cooling rate and the temperature difference between the stator and the cooling fluid. Specifically, there is a proportional relationship between the surface area contacted by the cooling fluid and the number of watts of heat extracted if all other variables are held constant. Therefore, neglecting any changes to temperature gradients within the heated structure, any increase in surface area will result in a roughly proportional increase in the amount of watts of heat dissipated from the structure. If the surface area is increased by 10× by the addition of fins, it would be reasonable to expect that significantly more heat will be extracted for the same cooling rate. Conversely, for a finned surface to dissipate the same amount of heat as a non-finned surface with all other variables held constant, it will only require a fraction of the cooling rate.

Cooling of the embodiment of FIG. 128 to FIG. 135 and FIG. 138 to FIG. 140 (with fins integrated into the stator) is preferably accomplished with a solid stator made from a solid soft magnetic material such as, but not limited to steel or iron or a steel alloy such as a cobalt alloy, or nickel alloy or a sintered soft magnetic powder material such as but not limited to ferrite powder or a cobalt iron powder material or possibly other soft magnetic materials existing or not yet existing. Laminated electrical steel may also be used but is more challenging to achieve a strong and rigid structure due to the mechanical limitations of the adhesives used between the layers combined with the thin sections that are necessary to achieve high torque density. This is especially true at elevated temperatures where adhesives tend to lose part of their strength. The constant loading of the stator as a result of the magnetic forces between the rotor and stator makes creep deformation of these adhesives a significant issue that must be avoided. A stator made of 100% laminated material will have a high stress-concentration on the adhesive between the layers and is, therefore, considered by the inventor to be less structurally sound than a solid metal or sintered metal stator as shown here.

Using the magnetic attraction between the rotor and stators provides constant preload on the bearings and reduces or eliminates the need for fasteners or adhesive to hold the actuator together. In some applications the magnetic force may be greater than necessary to preload the bearings at all times. In other applications the magnetic force between the rotor and state or may not be adequate to preload the bearings at all times. FIG. 138 shows a configuration of the embodiment of FIG. 128 whereby the axial faces of the separator ring will contact the axially facing surfaces of the outer housing before the inner housing axial faces contact and preload the inner races of the bearings. That is, before assembly bearing-housing gap 3044 is larger than separator ring-housing gap 3046. This structure will relieve some of the preload which results from magnetic attraction between the rotor and stators through elastic deformation of the housing and stators.

In FIG. 139 the axially facing surfaces of the inner housing contact the axial surfaces of the inner races of the bearings before the axial surfaces of the separator ring and outer housings contact. That is, before assembly bearing-housing gap 3044 is smaller than separator ring-housing gap 3046. This configuration can increase the preload on the bearings beyond that provided by the magnetic force between the rotor and stators. This configuration will, however, require mechanical or adhesive fastening of the outer housings 3020 and separator ring 3022.

Shown in FIG. 140 is a cross sectional view of an embodiment with sealed fluid passages 3048 on the back surface of the stators 3002 such as could be used for fluid cooling such as gas or liquid cooling.

Referring to FIG. 140A there is shown an embodiment showing the flow of fluid in fluid passages in housing 3472 of machine 3470. Cooling fluid enters an outer semi-circular passage 3474 through cooling fluid input 3476. Cooling fluid flow 3492 is shown by arrows. A fluid passage 3490 allows fluid flow to move from outer semi-circular channel 3474 to inner semi-circular channel 3478. Fluid flow then exits inner semi-circular channel 3478 through cooling fluid output 3480.

Referring to FIG. 140B and FIG. 140C, there is shown an embodiment of actuator 3770 with a rigid connection 3488 between two housing halves 3472 around the inner diameter of the actuator. The outer diameter of the housing 3472 includes attachment features 3486. In operation attractive magnetic forces produced by the stators 3482 and rotor 3484 press the two housing halves together in an axial direction. The rigid connection 3488 maintains the rigidity of the structure at the inner diameter. In the absence of further supporting structures or other points of contact, such as bearings, the air gap between rotor and stators could be closed by these attractive magnetic forces.

Concentrated Flux Rotor with Structural and Assembly Features

Aligned Permanent Magnet Rotor

A known permanent magnet rotor configuration uses magnets that are polarized in the direction of the flux path. This type of rotor uses a soft magnetic back iron by providing a flux linkage path between adjacent opposite polarity magnets. Soft magnetic materials are materials that are easily magnetised and demagnetised. The flux linkage path in the back iron decreases the flux density in the airgap and also results in a magnetic attraction between the permanent magnets and the back iron to reduce or eliminate the need for an adhesive or mechanical fixture to hold the magnets in place during operation.

An embodiment of an electric machine can be used with an aligned permanent magnet rotor in all of its various configurations.

Concentrated Flux Rotor

Concentrated flux rotors use tangentially polarized magnets of alternating polarity, and are known, to someone skilled in the art, as providing the potential for higher flux density in the rotor posts at the airgap than is possible if the same magnets were used in an aligned PM configuration.

A concentrated rotor is comprised of an array of tangentially polarized alternating polarity magnets which are separated by an equally numbered array of soft magnetic material flux concentrating rotor posts. The rotor is preferably made from one piece of isotropic or homogenous steel or iron alloy and is constructed such that there is a rigid connection of material between adjacent posts with the rigid connection being preferably made of the same isotropic or homogenous material such as a cast part or a part that is machined from the same isotropic blank such that it requires minimal or no adhesive between the posts and connecting material. A material is isotropic if it has the same structural properties in all directions. A material is homogenous if it has a uniform composition throughout. If the rotor is double sided (such as with a central rotor axial motor with a stator on both axial ends of the rotor) there may also be a rigid connection between a post on one axial side of the rotor and a post on the other axial side of the rotor, with the rigid connection being preferably made of the same isotropic or homogenous material such as a cast part or a part that is machined from the same isotropic or homogenous blank. Losses from flux leakage path from post to post that is created by this rigid connection may be reduced by an electric machine within the ranges of pole pitch and post height disclosed.

One of the keys to maintaining torque with an embodiment of an electric machine, while providing a sufficiently rigid isotropic structure is to use a combination of permanent magnet magnetic strength and permanent magnet depth that is deeper than is necessary to saturate the rotor post tips. Permanent magnet depth is defined as the axial length of the permanent magnets when in an axial flux configuration, and the radial length of the permanent magnets when in a radial flux configuration. Permanent magnet width is defined as the tangential length of the permanent magnet for both radial and axial flux configurations. Permanent magnet length is defined as the axial length of the magnet in radial flux configurations, and the radial length of the magnet in axial flux configurations. Once the tips of the rotor posts are saturated any additional PM depth will provide diminishing benefit in terms of torque. Embodiments of an electric machine use a magnet depth that is deeper than necessary to saturate the rotor post tips at the airgap so the additional flux which leaks though the back iron has a minimal effect on the torque. In addition to the increased magnet depth, embodiments of the electric machine may use one or more flux path restrictions in the flux leakage path to reduce flux linkage through the back iron.

In addition to the internal stresses produced by the repelling forces of the PMs and saturated posts, the axial forces created by high strength PM's, such as N52 magnets, combined with this structure, can, for a 175 mm average air gap actuator of an embodiment of the present device, exceed 400 kg. Retaining elements, which may variously be back irons, side irons or end irons, provide additional structural rigidity that may allow the use of a smaller air gap.

Embodiments of the disclosed electric machine provide very high flux density at the air gap end of the rotor post as a result of a concentrated flux configuration. Furthermore, some embodiments of an electric machine provide for the permanent magnets to be held in place by their own flux to reduce or eliminate the need to rely on an adhesive to secure the magnets to the rotor posts.

Embodiments of an electric machine take advantage of a solid connection between two or more posts of the stator by the use of a back iron. This back iron has the apparent disadvantage of creating a short circuit for some of the PM flux that would otherwise link across the air gap to provide torque, but it has been shown by analysis and testing that certain geometric considerations disclosed here allow for a minimal loss of torque even though a high percentage of permanent flux is allowed to leak from one magnet post to the next through the back iron.

The use of sufficient back iron is beneficial to provide structural strength and rigidity to withstand the immense forces generated by the flux linking across the air gap. When constructed as one piece with a solid iron or steel alloy connection between rotor posts, analysis has shown that embodiments of the electric machine having the disclosed pole pitch and post height are able to maintain a consistent air gap including down to air gaps of 0.005" or smaller for a 175 mm average air gap device. The following configurations of an electric machine with concentrated flux rotor provide a sufficient percentage of flux in the air gap despite high flux linkage through the back iron from the opposite end of a post to the opposite end of an adjacent post.

Deep Magnets with Back Iron

Referring to FIG. 141, there is shown a rotor 3300 and stator 3330 of an embodiment of the present device. The rotor includes rotor posts 3304 and back iron 3310 form a continuous structure. Rotor posts 3304 and back iron 3310 are formed from a homogenous and isotropic material, in which the rotor posts 3304 are homogenous extensions from the back iron. The spaces between rotor posts 3304 define rotor slots 3306. Rotor slots 3306 are filled by permanent magnets 3302. The stator 3330 includes stator posts 3332 and conductor layers 3334.

Permanent magnets 3302 have a magnetic saturation depth at which the end of the rotor posts 3304 are saturated at the air gap 3308 and additional magnet depth 3336 would not significantly add to the flux density in the air gap 3308. Beyond this permanent magnet depth it has been found that the use of a back iron has a decreasing and then minimal effect on the flux at the airgap. At a 1:1 magnet depth to magnet width ratio, the back iron has a significantly detrimental effect on the flux density at the airgap. At ratios of 2:1 and 4:1 there are successively smaller losses of flux density across the airgap.

FIG. 141 also shows the permanent magnet width 3338, as defined above, rotor post depth 3340, and the stator post depth 3342. The rotor post depth and stator post depth are defined as the length of the rotor or stator post in the axial direction when in an axial flux configuration or the radial direction when in a radial flux configuration.

To provide sufficient structural strength and stiffness, embodiments employ a magnet depth that is longer than would be necessary for maximum air gap flux density. These over-depth magnets require rotor posts that are longer than would be necessary without back-iron, which results in an axially longer rotor structure when in an axial configuration with the effect of increasing the strength and stiffness of the rotor. In addition, embodiments include a soft magnetic back iron which is preferably one piece with the post members. In combination with the extra axial post length, the back-iron feature provides a one-piece rotor post array construction with very high strength and rigidity.

In addition to the increased length of the rotor posts; which increases the strength and stiffness of the rotor, a secondary benefit of the over-depth magnets is the highly saturated rotor posts at the air gap. As a result and in combination with the small air gap, a thick back iron for structural rigidity and strength can be used without dramatically reducing the flux density at the air gap.

Embodiments of the device provide additional depth of the PM's and rotor posts to contribute to the necessary rigidity. At the same time, the additional depth of these PM's enables a rigid connection between rotor posts with a preferably one-piece magnetically soft back iron between rotor posts without dramatically affecting the flux density at the air gap.

One of the reasons a person skilled in the art would expect a back-iron feature to be a detriment on a concentrated flux rotor would be the expectation that a high percentage of flux from the magnets would link from post to post through the low reluctance flux path of the back iron instead of linking across the high reluctance flux path of the air gap. One of the effects of the back iron, however, is to provide high enough strength, rigidity and creep resistance that a very small air gap can be achieved, even with the very high magnetic forces created by this construction. By enabling air gaps down to 0.005" or lower, the reluctance of the air gap can be unusually low, making the flux linkage path through the back-iron less detrimental than would be expected with a larger air gap.

For applications where maximum flux density is desired, and where a concentrated flux rotor requires the high strength and rigidity provided by the use of one-piece construction including a back iron component, increasing the depth of the PMs and the rotor posts increases the flux density in the air gap to equal or exceed the flux density of the air gap with shorter permanent magnets and no back iron.

In this way, this embodiment of the present device provides a high strength, high mechanical rigidity concentrated flux rotor by the use of a unified soft magnetic material post array and back iron and it does this with minimal reduction of the air gap flux density through the use of increased magnet depth and post height.

Magnet Retention with Back Iron Structure

Referring to FIG. 142 to FIG. 143, embodiments of the device use a range of geometric features and parameters that provide a flux linkage path through the back iron to provide a magnetic force working to retain the permanent magnets including in conditions of high current and no current. Magnetic flux passing through the back iron creates a magnetic force that attracts the magnets into the slot therefore helps to retain the magnets. To ensure that permanent magnets are magnetically retained against the bottom of the slots at all times the geometry of some embodiments of the device is such that the total magnetic flux that links through the rotor posts and back iron is higher than the flux that links across the air gap. It is also preferable under a variety of other influencing conditions that the total magnetic flux that links through the rotor posts and back iron is higher than the flux that links across the air gap when the stator is powered at maximum current.

There are a variety of ways to bias the flux linkage through the rotor rather than the air gap. Some non-limiting examples are shown here. Other methods of magnetically retaining the PM's in the slots are possible. Any construction that provides greater flux linkage through the rotor back iron than across the air gap has the potential to provide a magnetic retention effect on the magnets. It may be preferable to use an adhesive to secure the magnets in the slots, but the purpose of the adhesive is, in this case, not to prevent dislodging the magnets, but rather to prevent vibration of the magnets during operation.

Tapered Slots

It is also possible to provide force to retain the magnetics in the rotor slots using a combination of mechanical and magnetic force. Tapered magnets can provide a structure in which a significant percentage of magnetic flux goes through the airgap while retaining the magnets in the rotor slots.

Magnets which taper tangentially such that they are thinner toward the air gap, can provide high performance in a concentrated flux rotor configuration. Referring to FIG. 144 there is shown a rotor 3300 in an axial flux configuration with magnets 3302 having tapered ends 3316 and rotor posts 3304 with tapered ends 3318. The magnets and rotor posts taper in opposite directions to form an interlocking arrangement. Permanent magnets taper in the direction of the stator 3330 while rotor posts 3304 taper away from the stator. In this embodiment two substantially mirrored rotors 3300 can be assembled between a pair of stators, with tapered posts of each rotor meeting back to back and tapered magnets of each rotor meeting back to back. Tapering the magnets 3302 in this way, allows for greater rotor post width at the air gap 3308. It also allows for greater magnet width 3338 at the wide end of the magnet taper to provide more flux to the rotor post 3304 away from the air gap 3308, where if the sides were parallel the posts 3304 would tend to be less saturated. In this way, the active permanent magnet 3302 and soft magnetic materials are used more effectively to provide more flux at the airgap 3308. The two rotors parts can be secured together for example by an adhesive, but in some preferred variations a mechanical feature such as bolts (not shown) or a securing ring (not shown) may be used.

The interlocking arrangement of tapered posts 3304 and magnets 3302 prevents the permanent magnets from dislodging, which reduces the need for magnetic force to retain the magnets in the rotor, and therefore reduces the need for magnetic flux to leak through the end iron 3314.

In some embodiments an array of flux path restrictions 3328 can be formed in the end iron 3312, for example, as holes in the end iron 3314 at the base of each rotor 3304 where they connect with the end iron 3314. These flux path restrictions 3328. These flux path restrictions 3328 reduce the available flux path between rotors 3304 and end iron 3314.

FIG. 144 shows an axial flux configuration of a tapered slot rotor, but the tapered slot rotor can be equivalently constructed in a radial flux configuration. Tapered magnets may narrow towards or away from the opposing carrier.

A second effect of tapering the magnets in this way is to bias a high percentage of the flux from a permanent magnet toward the air gap. This is beneficial in at least two ways. A first is that the tapered permanent magnet will be drawn toward the air gap where they will close the airgap between the permanent and the rotor slot wall for lower reluctance flux linkage and where they will be mechanically prevented from further movement and therefore securely retained by the tapered rotor posts. Secondly, the narrower rotor posts at the back surface results in a greater distance from post to post along the center plane of the rotor. This reduces the amount of leakage through the air from post to post along the center plane of the rotor. By assembling two substantially mirrored rotor halves with tapered posts and tapered magnets back-to-back a large percentage of the flux from the permanent magnets can be forced to link across the air gap.

In this way, very high flux density can be achieved in the air gap while magnetically and mechanically retaining the magnets. A cost effective way to manufacture a tapered rotor post rotor is to use two symmetrical rotors 3300 back to back. This construction does not allow for the use of a back iron 3310 to stiffen the rotor, so a soft magnetic end iron 3314 is used instead. The end iron 3314 has sections that are preferably as thin as possible to create a high reluctance flux path between rotor posts through the end iron, and as thick as necessary to provide the mechanical strength and rigidity to maintain a small and consistent air gap.

To compensate for the loss of flux from post to adjacent post through the end iron connection, an embodiment uses permanent magnets 3302 that are longer than the soft magnetic stator posts 3332 at the air gap 3308. This is shown in FIG. 145 where the permanent magnet 3302 is shown as being longer than rotor posts 3304 which would have the same or nearly the same length as the stator posts 3332. By increasing the permanent magnet depth 3336 compared to the stator radial length, the permanent magnets 3302 will be adequate to saturate the end iron 3314 while still maintaining high flux density in the rotor posts at the airgap.

Manufacturing methods for the rotor can include casting or forming or powdered metal construction, additive manufacturing, machining etc. Manufacturing of the magnets can be done by forming or additive or subtractive manufacturing. Magnets can also be magnetised after insertion into slots. It may be possible with present or future processes to press powdered hard magnetic material into the rotor slots and then magnetizing the PM material after pressing, or a slurry of PM magnet material in an epoxy or other polymer can be used to fill the slots and then magnetized after hardening. Magnetizing of the hard magnetic material can be done by applying very high flux density to two or more posts at a time.

Back irons, side irons and end irons serve as retaining elements and form a rigid connection with the rotor posts. Features of one embodiment may be combined with features of other embodiments.

Exemplary Concentrated Flux Rotor Configurations:

Referring to FIG. 146 and FIG. 147, there is shown an angled section view of an embodiment of a concentrated flux rotor in a radial flux configuration. Rotor posts 3304 include an rotor relief 3320 which prevents the magnet 3302 from moving radially out of the rotor slot 3306. The rotor posts 3304 are connected by side iron 3312 (not shown in FIG. 146, but see FIG. 147). Side iron 3312 creates a flux linkage path that allows magnetic flux to pass through side iron 3312 and create an attractive magnetic force between the permanent magnet 3302 and the side iron 3312. The combination of the side iron 3312 and rotor relief 3320 positively retains permanent magnets 3302 in the rotor 3300. In this embodiment, part of the rotor post 3304 is relieved to help retain the magnets in the bottom of the slot (radially outward in this case) and a magnet securing FIG. 148 shows an angled section view of concentrated flux rotor posts 3304 and side iron 3312 in combination with mills that may be used to form the posts and side iron structure from a single block of material, such as of soft magnetic material. A regular end mill 3370 may be used to cut a wide recess into the block, working in from the outer circumference of the rotor. A smaller diameter end mill 3372 may be used to form a recess into which the permanent magnet 3302 can be inserted. A relieved shaft end mill 3374 can then be used to mill the rotor post 3304 to form the rotor relief 3320. The smaller diameter end mill 3372 and relieved shaft end mill 3374 can work in from the inner circumference of the rotor 3300. One or more walls may be left at axial ends of the block of material to form the side iron 3312.

While FIG. 146 to FIG. 148 show a radial flux configuration, an axial flux configuration variant of this design could be made with equivalent structures and methods.

Referring now to FIG. 149 there is shown a slot geometry in a schematic FEMM analysis of a linear representation of the rotor of the embodiment shown in FIG. 146 to FIG. 148. FIG. 149 shows the flux paths of two slot geometries of rotor. The four permanent magnets 3302 on the left side of the schematic are rectangular. The four permanent magnets 3302 on the right side of the schematic have a tapered end 3316 which increases the magnetic force retaining the permanent magnets 3302 in the slot. This may have the advantage of reducing the need for other methods of securing the permanent magnets in the slot.

FIG. 150 shows an angled section view of embodiment of a rotor 3300 in a radial flux configuration with an end iron 3314. In this embodiment the rotor posts 3304 include rotor relief 3320, and tapered rotor post ends 3318. The tapered rotor post ends 3318 can serve to reduce the weight of the rotor 3300. Rotor reliefs 3320 can help retain permanent magnets 3302 and in some variations can extend full across the slot to form a back iron 3310, with the effect of providing extra rigidity and helping to retain the permanent magnets 3302 in the slot by magnetic force.

Referring to FIG. 151 there is shown a stator-rotor-stator configuration with an end iron 3314. The end iron 3314 and rotor posts 3304 can be formed from a single piece of isometric soft metallic material, with a single array of permanent magnets 3302 fitting between rotor posts 3304. End iron 3314 is formed at both ends of the rotors 3304. In this embodiment, flux path restrictions 3328 can be included as shown in FIG. 152.

FIG. 152 shows an embodiment of a stator-rotor-stator configuration with a back iron 3310, end iron 3314 and flux path restrictions 3328. In this embodiment the two array of permanent magnets 3302 are separated by back iron 3310. Flux path restrictions 3328 are formed as bores at the ends of the permanent magnets 3304 to reduce the flux leakage in the end iron 3314.

FIG. 153 shows an embodiment of a rotor-stator-rotor configuration. Two concentrated flux rotors 3300 engage a central stator 3330. The rotors 3300 each include end iron 3314 and flux path restriction 3328. In many applications end iron only or back iron only will be sufficient to provide adequate rigidity to the concentrated flux rotor 3300.

FIG. 154 shows an embodiment of a rotor-stator-rotor configuration. The embodiment is essentially the same as that shown in FIG. 153 with the addition of a think back iron 3310 on each rotor 3300.

FIG. 155 shows an embodiment of a trapezoidal stator-rotor-stator configuration. Stators 3330 are shown without conductor layers 3334. The rotor 3300 includes a back iron 3310 and end iron 3314 and has a roughly trapezoidal shape in a cross-section along the cylindrical axial direction. The rotor is composed of two rotor halves, and the combination with both a back iron 3310 and end iron 3314 provides high mechanical rigidity to the rotor. FIG. 156 shows a variation of the embodiment of a stator-rotor-stator configuration shown in FIG. 155 with only an end iron 3314 and no back iron 3310.

FIG. 157 shows an embodiment of a trapezoidal rotor-stator-rotor configuration. Stator 3330 are shown without conductor layers 3334. The rotors 3300 include end irons 3314 shown at the inner diameter and outer diameter ends of the permanent magnets 3302. In this embodiment the back surface of the rotors 3300 is interlocked with a low density housing component. FIG. 158 shows an embodiment of the trapezoidal rotor-stator-rotor configuration shown in FIG. 157 with aback iron 3310 and no end iron 3314.

FIG. 159 shows an embodiment of a rotor-stator-rotor configuration of a linear flux machine. The stator 3330 has an array of posts 3332, no conductors 3334 are shown. The rotor surrounds the stator and is made of one or more pieces material, for example, a soft magnetic isotropic material. Receiving slots for the permanent magnets 3302 on the internal structure of the rotor housing 3300 act as rotor posts 3304, rotor back iron 3310 and rotor end iron 3314. Many constructions for a linear motor are conceived by the inventor. The side section of the rotor 3330, for example, may be of a different material than the upper and lower rotor portions. FIG. 160 shows an embodiment of the rotor-stator-rotor configuration of a linear flux machine shown in FIG. 159 without a back iron 3310 on the rotor 3300.

FIG. 161 shows an embodiment of a stator-rotor-stator configuration of a linear flux machine with the rotor 3300 being formed of two arrays of magnets 3302 separated by rotor posts 3304 and back iron 3310. As with other concentrated flux rotors, the permanent magnets are alternating polarity in the linear direction, and may be the same polarity as opposing magnets on the other side of the back iron or may be opposite polarity as opposing magnets on the other side of the back iron. The traveler in this embodiment may be made of an isotropic soft magnetic material. FIG. 162 shows a partially assembled embodiment of a stator-rotor-stator configuration of a linear flux machine in which the rotor 3300 has end iron 3314 and no back iron 3310. In this arrangement the permanent magnets stops are used to position the magnets at precis locations in the slots. Permanent magnets in the top and bottom of the rotor may be of the same polarity or opposite polarity but are preferably of the same polarity to reduce flux linkage from top to bottom magnets through the rotor posts. Rotor posts 3304 and end iron 3314 may be made from a single piece of isotropic soft magnetic material.

It has been shown by FEMM analysis that removing material from part of the side of the rotor posts can result in a positive retention force on the permanent magnets with an additional benefit of reducing the rotor mass.

FIG. 163 and FIG. 164 show an isotropic rotor post array with an interrupted back iron 3310 and a relief 3322 on the rotor post wall toward the center plane of the rotor. In this embodiment, the permanent magnets are circumferentially polarized and opposite polarity to the axially aligned counterpart. The effect of this is to retain the permanent magnets into the bottom of the slots with significant force in the passive state, even though more than 50% of the flux lines from the permanent magnet are linking across the airgap. In order to provide an adequately strong and stiff isotropic post and connector member for an embodiment with an interrupted back iron, as shown here, there will need to be an end-iron connector on at least one end of the rotor posts (not shown). The longer the permanent magnets (in the Z axis of FIG. 163) the less effect the end iron will have on the flux in the airgap and the torque (or force in the case of a linear motor) which can be produced.

Transverse Flux Machine

For application of the disclosed geometry to motor types such as transverse flux motors, there may be other design considerations that will affect the extent to which the heat dissipation and other advantages in the disclosed range are realized. For a transverse flux motor, for example, the width of the posts (in a direction parallel to the axis of the coil) is independent of the pole pitch. This width, however, affects the weight of the system because it is directly related to the necessary thickness of stator backiron. One must also consider the ratio of the axial width of the post to the axial width of the coil. If these quantities are decreased, the total air gap surface area and conductor cross-sectional area can be held constant by arraying the entire assembly axially. Therefore, the optimum torque-to-weight and heat dissipation will also depend on the array pitch and post axial width.

Exemplary Transverse Motor

There are many known variations of transverse flux motors. Shown here are non-limiting exemplary embodiment of a transverse flux motor according to the principles of the present device. Two phases are shown here although fewer or more phases may be used with different effects. In the first embodiment, shown in FIG. 165 to FIG. 166B the flux links from the rotor to the stator in a somewhat radial direction, but variations on the transverse flux principle may have flux linking axially or at an angle to the axis of the device, for examples, as shown in FIG. 167 to FIG. 169.

Referring to FIG. 165 to FIG. 166B, there is shown an exemplary transverse flux motor 3410. The transverse flux motor 3410 may have a housing 3412 and employs two stator halves 3430 and a rotor 3420. The stator 3430 includes conductor 3432 and stator posts 3434. The conductor 3432 as shown comprises circumferential conductor coils but different variations for the conductor may be used. In the two phase design shown there is one conductor coil 3432 per phase, each conductor coil having multiple turns. A concentrated flux rotor 3420 may be used as shown in FIG. 166B. The concentrated flux rotor 3420 employs permanent magnets 3422 with tangentially polarized alternating polarity. The rotor may also include flux restriction holes 3428 and a back iron 3426. The back iron 3426 and rotor posts 3424 may be produced from a single piece of isotropic soft magnetic material. In this configuration the flux flow across the airgap between the rotor and the stator is in the radial direction.

The heat dissipation benefits of the disclosed range are applied to the exemplary transverse flux machine as a result of the low radial distance from the OD of the stator posts, to the OD of the circumferential conductor slot. The high pole density of the rotor corresponds with the same slot density in the stator as a result of the 1:1 stator post-to-rotor magnet ratio which is typical of transverse flux machines.

As with many two phase transverse flux machines, the stator posts on each stator have posts that are offset by half a pitch. The stators are then offset from each other by ¼ pitch so the motor can deliver constant torque in either direction by controlling the current to each of the two coils.

Due to the thin section of the flux path from post to post as a result of the disclosed geometry, it is believed by the inventor that an isotropic soft magnetic stator material will provide increased torque and efficiency as compared to the same material in laminate form at speeds that are suitable for robotics.

Referring to FIG. 167 to FIG. 169, there is shown a transverse flux machine with a generally axial flux linkage path across the airgap between a rotor and stator. In this configuration a concentrated flux rotor 3420 is held between two stator pieces 3430 in a housing 3412. Magnetic flux in this configuration flows across the airgap between the rotor 3420 and each stator 3430 in an axial direction. In this configuration the rotor 3420 comprises two arrays of magnets 3422, the two arrays separated by a back iron 3426 and the magnets in each array set between rotor posts 3424. As in the radially directed transverse flux motor, the back iron 3426 and rotor posts 3424 may be produced from a single piece of isotropic soft magnetic material.

General Principles for Some Embodiments.

Any of the disclosed structures may be used with an electric machine that has electromagnetic elements including posts and slots between the posts, where the posts are wound to create poles, at least on either of a stator or rotor, where the pole density is within a range of pole density defined by the equations specified in this patent document and the post height is within a range of post height defined by the equations specified in this patent document. These equations each define a bounded area. The bounded areas are dependent on the size of the electric machine, where the size is defined by the radius of the machine. The bounded areas together define a bounded surface in a space defined by pole density, post height and size of machine. For each radius of an electric machine, the bounded region is believed by the inventors to be new and unobvious.

Based on modelling studies and FEMM analysis, the inventors believe the following, at least beyond a specific pole density and for a specified conductor volume or post height for a given diameter of motor: 1) an electric machine having pole density and conductor volume or post height as disclosed has increased heat production (and thus lower efficiency) for a given torque or force as compared with an otherwise equivalent machine having lower pole density and/or higher conductor volume but has corresponding effective heat dissipation; and 2) the increased pole density and lower conductor volume or post height also has the effect of decreasing mass as compared with an otherwise equivalent machine having lower pole density and/or higher conductor volume, with an overall increased torque to mass ratio (torque density).

An electric machine with increased torque to mass ratio is particularly useful when several of the electric machines are spaced along an arm, such as a robotic arm, since efficiency is less important relative to the need for one electric machine to lift or accelerate one or more other electric machines. The inventor believes that improved performance of an electric machine having pole density and conductor volume or post height as disclosed results at least in part from 1) a narrower slot having a shorter heat flow path from the hottest conductor to a post and 2) a shorter heat flow path from the top of a post to a heat dissipation surface.

For example, each electric machine embodiment disclosed is shown as having a pole density and post height that is within the definition of pole density and post height that is believed to provide a benefit in terms of $K_R$.

With a pole density in the range of 0.5 and higher, for example, and considering that it is not unusual for a slot to be about as wide as a tooth, tooth width can be in the order of 1 mm for a 25 mm wide machine. Narrower teeth can be used. An advantage of thinner teeth is that solid materials such as, but not limited to steel or iron or a magnetic metal alloy, may can be used with minimal eddy currents due to the teeth being closer to the thickness of normal motor laminations. A common motor lamination for this size of motor can be in the range of 0.015" to 0.025". The proposed pole density and tooth geometry (many short posts) also helps avoid eddy currents in the first carrier (stator). For example, for an electric machine with 144 slots, eddy current loss was found to be only 7% of the total resistive losses in the windings at 200 rpm and 70 A/mm². Use of solid (non-laminated) materials provides advantages in strength, stiffness and reliability.

Embodiments of the disclosed machines may use fractional windings. Some embodiments may use distributed windings; another embodiment uses concentrated windings. Distributed windings are heavier due to more copper in the end turns and lower power (requiring a bigger motor). They also require thicker backiron because the flux has to travel at least three posts, rather than to the next post as with a fractional winding. Distributed windings produce more heat because of the longer conductors (the result of longer distance the end turns have to connect between).

An embodiment of an electric machine with the proposed pole density may have any suitable number of posts. A minimum number of posts may be 100 posts. A high number of posts allows fewer windings per post. In a non-limiting exemplary embodiment, the windings on each posts are only one layer thick (measured circumferentially, outward from the post). This reduces the number of airgaps and/or potting compound gaps and/or wire insulation layers that heat from the conductors conduct through for the conductors to dissipate heat conductively to the stator posts. This has benefits for heat capacity (for momentary high current events) and for continuous operation cooling. When direct cooling of the coils by means of gas or liquid coolant in direct contact with the conductors, a low number of circumferential layers, and for example a single circumferential layer of wire on a post, combined with high pole density, results in a very high surface area of the conductors (relative to the volume of the conductors) exposed to the cooling fluid. This is beneficial for cooling the conductors and is one of many exemplary ways to take advantage of the low conductor volume as disclosed. A single row (or low number of rows) of coils per posts also reduces manufacturing complexity allowing for lower cost production. In another embodiment, the windings of each post are two layers thick.

For a 175 mm or more average airgap electric machine, the number of slots may be 60 or more, or 100 or more for an axial flux electric machine, for example 108 slots in an exemplary 175 mm diameter embodiment. In addition, for such an electric machine, the average radial length-to-circumferential width of the posts may be above 4:1, such as about 8:1 but may go to 10:1 and higher. For the exemplary 108 slot embodiment, the ratio is about 8:1. With such a configuration, the heat dissipation is improved. A lower aspect ratio would be a lot of material for very little torque, so the aspect ratio helps achieve torque useful for high KR and robotics while at the same time taking advantage of the heat dissipation effects.

In an embodiment, an electric machine may be built with a stratified construction which allows main components to be fabricated from, for example, sheet stock of conductor material such as, but not limited to, copper or aluminum, and insulator materials such as, but not limited to, dielectric coatings, Nomex™ or other sheet insulators, or hard anodized surface treatment for aluminum conductors. Conductor layers may be manufactured with high speed and low cost manufacturing processes such as, but not limited to, laser cutting, stamping or fine blanking. Instead of winding conductor wires around posts, the conductor circuits may be stamped and then assembled in layers. If insulator layers are used alternately with each conductor layer, the conductor layers may, in some configurations, be assembled without insulation coating. Alternately, conductor circuit layers can be coated with insulation before assembly for additional insulation effectiveness, or to eliminate the need for separate insulating layers.

Non-electrically conductive (or insulated electrically conductive) materials may be used on the same strata as the conductive layers to provide structural integrity and heat sink/dissipation qualities. Non-filled layers in the slots between conductor layers, or partially filled layers in slots between conductor layers (formed by conductors that are narrow enough to create an unfilled gap for the radial length of a slot) can also be used to provide a flow path for a cooling gas or liquid so that the open or partially open slots on a layer form conduits. Cooling fluid may also be used as an air or liquid bearing medium to prevent contact of rotors and stators. Many different materials may be used for spacer layers including, but not limited to anodized aluminum, Torlon™ (a reaction product of trimellitic anhydride and aromatic diamines), phenolic, or a composite material such as, but not limited to a metal matrix composite.

Each conductor may be a layer. Layers may be made up of one or more sections. A section can be, for example, a complete circumference of a rotary motor, or two or more angular sections of a rotary motor. Each layer in each section may be a conductor circuit for only one phase. In a common electrical machine with wire windings, the conductor wire is helically wound and overlaps other wire in that phase and/or wire from other phases. This type of 3-dimensional wire winding configuration cannot be fabricated with a single layer per phase because a simple layered assembly does not allow the interwoven or helically overlapping construction that typical post winding requires.

A bendable wire may be used to create a poly-phase motor with each adjacent slot comprising conductors from a different phase or different combination of phases than an adjacent slot. This has a number of advantages which include simplified manufacturing for reduced cost and the ability to provide very effective cooling as described below.

The conductor manufacturing methods disclosed are especially effective in constructing devices with high pole density, as they eliminate the high precision wire winding mechanisms that otherwise may be needed at these high slot densities.

A single layer per phase winding in an embodiment may provide a conductor in two adjacent slots and then skipping one or more slots (depending on the number of phases, for example) such that a layer exists in two adjacent slots followed by one or more slots with no conductors on that layer from that phase. Thus, in an electric machine where electromagnetic elements of a carrier comprise posts, with slots between the posts, one or more slots are without an electric conductor at a level in the one or more slots corresponding to a location of an electric conductor in an adjacent slot.

In some embodiments, the disclosed electric machine not only provides a high cross sectional area for fluid flow, it provides a consistently distributed airflow channel pattern from the inward facing end of the slot to the outward facing end of a slot which ensures that a high percentage of conductors are in contact with the cooling fluid including up to every conductor being in contact with the cooling fluid in each slot. In other words, in an embodiment, there are never more than two layers of conductor layers contacting at a time. The sequence vertically in a slot may be for example conductor-conductor-space-conductor-conductor-space-conductor-conductor-space. This means that one side of all conductors is always in contact with the fluid in the cooling channels that is created by the missing conductor. This evenly distributed cooling channel array assists in achieving sufficient heat dissipation to compensate for the higher heat production that results from the reduced conductor volume due to shorter posts.

Some embodiments of a cooling channel spacing pattern include overlap of part but not all of the end turns of a conductor combined with offset of the phases combined with a gap at the end of each of the posts to allow tangential and then radial airflow at the end of each post before exiting a fluid flow passage between and around the conductors. With these details, the airgaps can be consistently spaced, fewer (larger) channels can be avoided, the conductor surface area exposed to the cooling fluid can be increased and there are no stagnant fluid gaps due to no post-end tangential conduit. Testing has shown that variations of this geometry allow effective enough cooling to allow air flow to be sufficient to maintain acceptable conductor temperatures at current densities that would require liquid cooling with common cooling strategies such as water cooling of a common motor housing.

In an embodiment, there may be two slots in a row with a conductor from a phase followed by p minus 2 slots with no conductor from any phase on that layer (with p being the number of phases). For three phases that would be two slots with a conductor from a phase followed by one slot with no conductor from that, or any other, phase. With four phases it would be two slots in a row with a conductor from a phase followed by two slots with no conductor from that, or any other phase on that layer, and so on. No conductor from that or any other phase means there is an air space or a space that can be filled with potting compound and/or a filler material such as a heat extracting insert, or that the space can be used to route a moving cooling fluid such as gas or liquid.

With a three phase configuration, as a non-limiting example, two adjacent slots will have a single layer with a conductor from a first phase in a first and second slot followed by a third slot which will not have a conductor on that layer. This pattern repeats to provide a single layer of winding to provide a conductor from a single phase on both circumferential sides for every first of three posts on that layer. On another layer, a second phase circuit exists on a single layer and has a conductor from this second phase in the second and third slot followed by a slot that will not have a conductor from any phase on that layer. A third phase is on another separate layer with conductors in every third and first slot but no conductor from any layer in every second slot. In this three phase configuration, each phase circuit defines a selection of slots in which, in sets of three slots, two of each set of three slots receive conductors. In other phase configurations different selections of slots may be used. Each conductor layer may then receive a single phase of electrical excitation.

A layered construction permits scalable construction. Layered construction allows components to be deposited with additive manufacturing processes, or to be assembled with each conductor and/or insulator component and/or spacer layer being pre-fabricated from a single or multiple parts.

This conductor configuration may be done with a bendable wire conductor on each layer (which is only helically wound on two posts at the ends of each section to connect to the next layer, for a non-limiting example) Or this conductor configuration can be assembled from pre-fabricated conductor layers so that little or no bending of the conductors is required during construction and assembly.

Skipping a conductor in periodic slots can be used as a cooling channels to allow direct cooling of a high percentage of the surface area of the conductors and/or insulating layers and/or EM posts. The skipping of conductors in slots may occur in plural slots per layer, spaced periodically. The cooling channel or conduit may be provided with a flow of coolant. In some embodiments, the cooling channel or conduit may be connected to a source of cooling fluid. The missing conductor in periodic slots can be used as an air or other gas flow cooling channel so as to reduce the weight of the device as compared to using a higher density fluid such as water or oil at an artificially low temperature for increased efficiency in certain applications. Conduits may communicate axially to orifices for exhausting coolant flow.

Disclosed embodiments with conductor layers may be assembled by hand or machine, and then may be clamped between two flat surfaces and potted with a potting compound During the potting process, the top and bottom mold plates can be retracted enough to allow wetting of all surfaces before being brought axially together again into contact or close proximity. The lengths of the posts may be used to position the upper and lower potting mold parts (not shown).

If internal cooling is desired, the potting compound is removed from the open slot sections such as by allowing gravity to remove potting compound from the large gaps, or by pushing air through the device to push the potting compound out of the cavities, or by spinning the stator to remove potting compound from coolant channels with centrifugal force. Airflow or centrifugal force, in this operation, may be low enough that it does not remove potting compound from between close fitting components.

Layers can be bonded together or fused together or otherwise fastened together. If some internal layers, such as but not limited to the copper layers and spacer layers between the anodized aluminum or other separator layers, are tinned, and if all components or their coatings are bondable by a given solder compound, the parts can be assembled and then heated under pressure in an oven to fuse everything together. It is important, if pre-tinning with solder is used, that the separation layers are coated with a suitable insulator such as hard anodizing so there is no conductor layer-to-layer conductivity. Alternatively, a thermoplastic resin can be used to coat the parts and they can then be assembled and heated and fused in an oven under enough pressure to ensure the correct axial and other dimensions. An epoxy or other hardening adhesive can be used during or after assembly to adhere and pot the components. If airflow channels are included in the design, potting can be followed by blowing or spinning the adhesive out of the large chambers before the epoxy hardens. An advantage of a pre-preg or solder tinning process which provides a thin and consistent coat of adhesive or solder, is that the airflow channels may not need to be purged. Only the close fitting surfaces will adhere to each other. Any number of posts or permanent magnets may be used. Using solder as a bonding agent will also provide excellent heat transfer from the conductors to hard anodized insulating layers and to the cooling fluid in the cooling channels.

An exemplary embodiment may be configured with multiple layers of stators and/or PM carriers with PM carriers on both axial ends of one or more stators or two or more stators on the axial ends of one or more PM carriers. Only the stator and/or PM carrier at the axial ends may have a backiron.

In embodiments of layered conductors, the cross sectional area of the end turns may be greater than the average or maximum cross sectional area of the conductors in the slots. This reduces the resistance in the end turns allowing them to run cooler than the slot portion of the conductors and to therefore act as effective heat sinks for the conductors in the slots and to increase the heat capacity of the conductors to increase the ability to operate at very high current densities for short periods of times such as during emergency stops or even during normal operation during high accelerations. The end turns may be wider than the slot turns. The end turns may also have uniform width. Furthermore, the greater surface area of the end turns as compared to the slot portions of the conductors provides a cooling fin effect that is highly effective due to the low heat flow resistance from the slot turns to the end turns as a result of them being of the same component and of a high thermal conductivity material such as copper or aluminum. Cooling these end turn "cooling fins" can be done with any number of liquid or gas cooling means, with or without the abovementioned slot channel cooling.

The above can be configured with two or more stators on either axial end of one or more PM carriers. PM carrier can have any type of PM magnet and can be configured with a Halbach array or pseudo Halbach array (with PMs polarized in the direction of carrier motion with steel between them to provide flux linkage). The stator and "rotor" may both be energized to reduce or eliminate the need for permanent magnets. Any number or geometry or size of posts and PMs or other components may be used. Manufacturing techniques include PCB manufacturing techniques with conductive traces used for coils and posts assembled with pick-and-place equipment. Larger motors or actuators or generators can use a pre-fabricated conductor process as described for other embodiments in this disclosure.

In some embodiments of an electric machine, windings are provided in single layers, either interdigitated with windings of adjacent posts or side by side. Single layers provide reduced wire length produces less heat for a given current. Direct contact of all wires (through the insulation) provides a lower heat flow resistance path for the heat to dissipate from the wires to the housing or other cooling members. Shorter posts shorten the path for the heat from the wires to the housing. Increased post number can increase the surface area of the stator (or rotor) which can provide greater surface area on the stator to act as radiant or convective cooling fins for the heat produced in the stator (or rotor) and coils. These features contribute to the ability to run higher current through the conductors than would otherwise be the case.

Various design features may be used in any of the embodiments disclosed. Slot fill may be as high as possible, and with short posts relative to diameter the slot walls are more parallel, making slot fill higher. Current density depends on the materials used, but may be increased due to the enhanced cooling effect of the disclosed geometry. The disclosed geometry may be used with any suitable number of phases such as 3 or 5. Concentrated or distributed windings may be used. Various post shapes may be used, for example parallel sides. Stator pole to rotor pole ratio may be 5:4, for example 5 posts for each 4 permanent magnets. However, various ratios may be used. Active cooling may also be used. The airgap may be for example 0.005" to 0.009" but smaller airgaps may be used, at some risk of manufacturing complexity, or larger, at some loss of torque. Magnet dimensions may be 1:1 circumferential width to radial height but other dimensions may be used. In calculating weight of a motor for the analyses presented, the weight is the stator backiron thickness plus post height plus copper volume plus PM volume plus rotor backiron. Various forced cooling methods may be used, although the disclosed analyses assume a fluid cooled housing.

The disclosed pole density and conductor volume (post height) characteristics may be applied to all types of electric machines with slots and teeth including the following electric machines: DC, AC, synchronous, asynchronous, axial, radial, inner stator, outer stator, linear, induction, brushless, PM, switched reluctance, doubly-salient, flux-reversal, flux-switching, hybrid-excited, flux mnemonic, magnetic-geared, vernier, magnetless, doubly-fed Vernier and double rotor.

With increasing output torque, magnetic forces can cause distortion of the stator and/or rotor, resulting a lack of precision, increased noise, vibration, fatigue stress and eventually failure of the components. A more even distribution of magnetic forces may be provided through the disclosed pole density, post-to-PM ratio, and conductor windings that provide that the majority of adjacent stator posts are energized by different phases. In an embodiment, a combination of these features causes magnetic forces to repeat on average every three posts. This, in combination with the very high pole density, results in a very even distribution of forces on the stator and rotor which, in some embodiments, reduces manufacturing cost and complexity and eliminates the need for additional bearings and support structure.

In some embodiments there is a reduced rigidity requirement by coating the airgap with a low friction surface that maintains the airgap. In an embodiment of a linear motor a low friction surface is applied in the airgap which maintains a 0.008" airgap. Coatings, such as DLC (diamond-like coating), can be deposited at 0.0025" on both the rotor and the stator and the gap will be maintained.

Equations Defining Pole Density and Post Height

Ranges of pole pitch (or density) and conductor volume have been found which give a significant benefit either in terms of KR, or in terms of a weighting function combining torque, torque-to-weight, and Km (as described further). The amount of benefit in terms of the weighting function is dependent on the amount of cooling and other factors, but the equations define novel structures of electric machines that provide benefits as indicated. Equations are given which define bounded regions determined by the ranges of pole density and conductor volume which yield these benefits.

In an embodiment, advantages are obtained by operating within a region of a phase space defined by machine size, pole density and post height. A series of graphs shown in FIG. 170A to FIG. 170F, show torque density (z axis) v slot density (x axis) and post height (y axis) for an exemplary series of linear motor section geometries, created and analysed using FEMM software using an automated solver generated in OCTAVE™ (which is a program for solving numerical computations). Slot density was used in this example because it is the same as pole density.

The following rules and assumptions were applied to all of the motors in the series. Each section consisted of 144 electromagnets and 146 permanent magnets. The rotor comprised sections of NdFeB 52 magnets and M-19 silicon steel. Every permanent magnet was placed tangentially to the rotor and oriented so that its magnetic field direction was aligned tangentially to the rotor and are opposite to its adjacent permanent magnets. M-19 silicon steel sections were placed between permanent magnets. The stator was made from M-19 silicon steel. The electromagnets used concentrated winding coils in a 3-phase configuration. A 75% fill factor of the coils was assumed, consisting of 75% of the slot area. The two variables that were investigated were the post height and slot density. The remainder of the geometry variables were scaled according to the following relationships: 1.25 inches constant model thickness across all simulations, Rotor permanent magnet width is set at 50% of permanent magnet pitch, Rotor permanent magnet height is set at 2.3 times of permanent magnet width, Stator slot width is 50% of stator electromagnet pitch (equal width of posts and slots), Stator back iron height is set at 50% of stator post width, Airgap axial height of 0.005 inches.

The bounded region which represents the unique geometry disclosed is modeled for the preferred embodiment, namely the embodiment which will yield the highest torque-to-weight and KR. Certain design choices have been made in this embodiment such as the selection of grade N52 NdFeB magnets in the rotor, a rotor pole to stator post ratio of 146:144, and a flux concentrating rotor with back iron. To the best of the inventor's knowledge, this configuration represents one of the highest practical torque-to-weight configurations for sizes of actuators in the disclosed diameters while still retaining a reasonable level of manufacturability and structural stability. Many other configurations are possible such as different rotor types (surface permanent magnet, buried permanent magnet, etc), different magnet materials and grades including but not limited to ceramic, samarium cobalt, and high-temperature NdFeB, different rotor pole to stator post ratios, different stator winding configurations, different stator materials, etc. In many cases, different design choices for these parameters will not have as great a KR benefit as compared to the preferred embodiment by either resulting in reduced torque or increased weight for the same pole pitch and post height as the preferred embodiment. However, for the majority of designs, there is a benefit to KR by using the pole pitch and post height of inside the disclosed region over geometry outside the disclosed region when all other design variables and geometrical relationships are held constant. This principle holds true for both concentrated and distributed winding designs, for linear motors, axial flux rotary motors, radial flux rotary motors, trapezoidal/toroidal rotary motors, and transverse flux linear and rotary motors.

For each of those motor section geometries, magnetic simulation and heat simulation were performed. For every magnetic simulation, the program yielded values for mass, horizontal force, and power consumption. Geometrical extrapolations of the coil cross sections were used to find the mass and power consumption of the end windings in order to more accurately predict the mass and power consumption of the entire system. For calculating stall torque and torque at low speed, the square root of resistive losses is the dominant part of the power consumption, with a multiplier based on the slot geometry to account for the resistive losses of the end windings. These values were used to calculate the mass force density (force per unit mass) and the area-normalized force (force per unit area of the airgap) of each simulation. For every heat simulation, the program yielded values for coil temperature, rotor temperature and stator temperature. A set cooling rate was applied to the stator inner surface using water as the coolant and a convection coefficient of 700 W/m$^2$K$_m$ The temperature of the water was set at 15° C. and it had a flow rate between 6-20 mm/s. Steady state conditions were assumed.

For constant current density simulations, a fixed current density was applied to the conductor and the resulting force, mass, power consumption, and maximum stator temperature were calculated by the program.

For constant temperature, force per area, or force density simulations, the current density was adjusted at each geometry point until the parameter of interest reached the target value, and the other parameters were recorded at that point. The target error for constant temperature, force per area, and force density simulations are 1 degrees, 0.002 N/mm$^2$, and 1 N/kg respectively. This data can be directly applied to any size of rotary motor by multiplying the area-normalized force by the circumferential area of the airgap in the rotary motor, and multiplying the force by the diameter to yield the resulting torque. There will be some small deviations due to the radius of curvature of the motor, and the errors associated with approximating a curved structure with a linear one, however our simulations have shown the rotary simulated torque typically to be within 10% of that predicted by the linear model.

High torque-to-weight is of benefit in some applications, but a minimum level of torque may be necessary for applications such as robotics where the arm, no matter how light it may be as a result of high torque-to-weight actuators, must still have enough torque to lift and move a payload. Electric machines having a pole density and conductor volume within the ranges disclosed in this patent document provide high torque and torque-to-weight at acceptable power consumption levels.

The force per area at a constant current density 2320 is plotted in FIG. 170A as a function of slot pitch and post height. The same current applied to all motors in the virtual series results in dramatically lower force per area in the disclosed ranges 2322 (indicated schematically by the dashed lines). The dashed lines correspond to the middle boundary from each size (25 mm, 50 m, 100 mm and 200 mm as discussed in relation to the equations below) projected onto the 3D surface. The middle boundaries correspond to the sets of equations A2, B2, C2 and D2. In this graph, the force per area at constant current density 2320 is shown for a series of motors that were analyzed in FEMM using a script in OCTAVE to find the highest torque rotary position for a given 3 phase input power. These motors are identical in every way apart from the conductor volume and slot density, which are varied as shown.

Surprising effect of constant temperature current density. The highest current density possible at a given temperature 2324 is plotted in FIG. 170B as a function of slot pitch and post height. The exponentially higher heat dissipation characteristic in the disclosed ranges 2322 allows much higher current density at a given temperature. Low conductor volume tends to reduce the actuator weight, but low conductor volume also tends to reduce the actuator torque. When the conductor volume and slot density is in the disclosed ranges, however, there is a dramatic reduction in the heat flow resistance from the conductors to the back of the stator or to any other surface where cooling can be applied, thus allowing very high current densities to be applied to the conductors without overheating the actuator.

In FIG. 170B, the same series of motors is used as in FIG. 170A, but instead of constant current density applied to each motor, the current density was varied until the steady state temperature of the conductors was ~70° C. A reasonable representation of a typical water cooling effect was applied to the outer axial surface of the stators at a convection coefficient of 700 W/m²$K_m$ The temperature of the water was set at 15° C. Ambient temperature was set at 15° C. No air convective cooling was applied to the rotor for simplicity because the water cooled surface was highly dominant in terms of cooling and because the rotor was not producing heat of its own. Steady state conditions were assumed. For each point on the 3D graph, the current density of the motor was increased from zero until the temperature of the coils reached ~70 deg C.

FIG. 170C is the same as FIG. 170D except that it has constant current at 6 A/mm2 as apposed to constant temperature of 70 deg C. Thus demonstrating how the heat dissipation benefit of short posts give unexpected benefit disclosed range FIG. 170C was developed using the following weighting convention, Torque—weighting of 1, Torque-to-weight—weighting of 3, Power consumption—weighting of 2. Torque-to-weight was the most highly weighted because the weight of the arm is determined by the weight of the actuator and because the weight of the arm will typically be significantly higher than the weight of the payload. Torque was weighted at 1 to include it as an important consideration but recognizing that the payload may be quite a bit lower than the weight of the arm. Power consumption was given a moderate weighting because it is an important consideration, but power consumption is known to benefit from lower arm weight, as is accomplished by a higher weighting on torque-to-weight, so a higher weighting on power consumption was deemed to be potentially counter-productive.

By applying a constant current density to the series of motors, and combining the results with the above weighting, the surface 2328 in FIG. 170D shows a trend toward lower overall performance toward and continuing through the disclosed ranges 2322 of slot (or pole) density and conductor volume. FIG. 170D shows a benefit in the disclosed range when the constant temperature current density is applied from FIG. 170B.

FIG. 170E KM—An industry standard metric for motor capability is the KM which is basically torque-to-power consumption KM assumes sufficient cooling for a given electrical power. It only considers the amount of power required to produce a certain level of torque. The $K_m$" surface 2330 as a function of slot pitch and post height is plotted in FIG. 170E.

FIG. 170F $K_R$". The torque to weight to power consumption shows the most unexpected and dramatic benefit in the disclosed ranges 2322 as seen from the graph of the $K_R$" surface 2332 as a function of slot pitch and post height in FIG. 170F. High $K_R$ may not be of great benefit in stationary applications, but in applications such as robotics, $K_R$ indicates that power consumption benefits can be achieved by reducing the weight of the entire system.

A method of producing a graph showing how $K_R$" varies with pole density and post height is as follows. Consider a motor section with geometry A having low conductor volume (low post height) and low pole density. The motor section with geometry A is simulated; a set cooling rate is applied to the stator inner surface using water as the coolant and a convection coefficient of 700 W/m²$K_m$ The temperature of the water is set at 15° C. and it has a flow rate between 6-20 mm/s. Steady state conditions are assumed. The current passing through the conductor of geometry A is then increased until the maximum temperature of the conductors reaches 70° C. The torque density of geometry A at this point is then recorded and plotted in the graph for the corresponding values of post height and pole density. The process is repeated for other geometries, obtained, by example, through varying the post height and pole density and scaling the remaining parameters as described above. For instance, a geometry B may be is obtained from geometry A by increasing the post height, with all other parameters scaled as described above. A geometry C may have the same post height as geometry A but greater pole density. A geometry D may have increased post height and increased pole density as compared to geometry A. Plotting the torque densities results in a surface in a graph.

It is found that the torque density increases as pole density increases and post height decreases. No such increase in torque density is shown to occur with geometries having either a low post height or a high pole density; the benefit in torque density is only observed for geometries combining these two factors. Yet, in this region, efficiency is decreasing. While the graph was produced based on the assumptions indicated, the inventor soundly predicts, based on the disclosed cooling effect and reduction of flux losses of increasing pole density and decreasing conductor volume or post height, that the same geometry will have a benefit at other values of the parameters that were used in the simulations. Changes in motor design elements which do not affect post height or pole density are not expected to result in a loss of the benefits. For instance, an electric machine comprising a rotor with tangentially oriented permanent magnets and an analogous electric machine comprising a rotor with surface-mounted permanent magnets may possess somewhat different $K_R''$ surfaces; nonetheless, the principles described above will still apply and a benefit would still be predicted within the region of geometries of low post height and high pole density described previously. As currently understood, the principles apply only to electric machines with posts, such as axial flux and radial flux machines.

In the disclosed equations and graphs, the parameter $K_R''$ is size-independent and has been converted from a conventional $K_R$ to use force instead of torque, and to be independent of both circumferential length and axial length. Therefore, the conventional $K_R$ of any size motor can be found from the $K_R''$ value. And for two motors of identical size (diameter at the airgap and axial length) but different geometry (i.e. pole density and/or post height), the multiplying factor will be the same, so the motor with higher $K_R''$ will have a higher conventional $K_R$.

$K_R''$ as a function of pole density and post height greatly resembles the surface of a graph showing conventional KR. However, this particular surface, corresponding to the torque density, may change considerably when different temperatures are used as the constraint in the analysis $K_R''$, by contrast, does not change substantially (provided the current doesn't get sufficiently high for the motors in the series start to saturate; then the 3D curve shape will change.) It is the $K_R''$ therefore, that is used to define the specific range of pole density and post height which result in the previously-discussed benefits.

The ranges of benefit disclosed depend on the resultant motor diameter at the airgap. Smaller motors are more constrained because the physical size of the motor prevents lower slot densities from being used. We have defined 4 discrete motor diameter ranges corresponding to 200 mm and above, 100 mm and above, 50 mm and above, and 25 mm and above. For each diameter range, we describe three levels of $K_R''$. The first corresponds to where a small benefit to $K_R''$ begins, the second to a moderate $K_R''$ benefit, and the third to a high $K_R''$ benefit for that specific diameter range. Higher $K_R''$ values generally correspond to lower overall torque values for that motor size range.

These motor sizes disclosed (25 mm and up to 200 mm diameter and above) represent small to large motors. The airgap of 0.005 inches used in the simulation is believed to be the smallest reasonable airgap size for this range of motors. Smaller airgaps are not practical for this motor range due to manufacturing tolerances, bearing precision, component deflection, and thermal expansion.

The coefficients in the equations above were chosen in a manner to bound the region of interest and make the resulting relation nearly continuous.

A 50:50 ratio of post:slot width was chosen for these simulations, as analysis had shown that highest benefits are obtained when the ratio is between 40:60 and 60:40. A 50:50 ratio represents a typical best-case scenario; at fixed post height, using a 10:90 slot:post width ratio will have a significantly degraded performance by comparison. Analysis shows that at constant post height, an embodiment exhibits the maximum of torque and torque density at a 50% slot width, and the maximum of Km and Kr at 40% slot width. However, the maximum values of Km and Kr are within 5% of the values given at a 50:50 geometry; consequently a 50:50 ratio was viewed as a reasonable choice of scaling parameter for the simulations. Other ratios of post:slot width would give a portion of the benefits disclosed.

Equations and graphs are discussed below which show the ranges of pole density and conductor volume which give a significant benefit either in terms of KR, or in terms of a weighting function combining torque, torque-to-weight, and Km, for different embodiments. As with the previously-described equations, the region of benefit in terms of the weighting function is dependent on the amount of cooling.

Size of an electric machine means the airgap diameter of an axial flux machine or radial flux machine as defined herein or the length in the direction of translation of the carriers of a linear machine.

The first bounded region corresponds to regions where a significant $K_R$ benefit is found with respect to the rest of the geometries in the domain. For a given device size, $K_R$ has a higher value in the disclosed range of geometry than anywhere outside of the range, indicating potential benefits to overall system efficiency for certain applications using devices of these geometries. The graph of $K_R''$ is used to define the boundary by placing a horizontal plane through at a specified $K_R''$ value. Four values of $K_R''$ are used to define areas of benefit for four different actuator size ranges corresponding to sizes of 200 mm and larger, 100 mm and larger, 50 mm and larger, and 25 mm and larger.

In the following tables, pole pitch is represented by the variable S, in mm. Post height is also represented in millimeters.

In a machine with 25 mm size, the boundary line for $K_R''>3.3$ is defined by the values shown in Table 1 and the corresponding graph is FIG. 180.

TABLE 1

Set A1

| Post Height> | | | Pole Pitch | Post Height |
|---|---|---|---|---|
| −1.070 * S + 2.002 | for | 0.572 < S < 1.189 | 0.572 | 1.390 |
| 1.175 * S + −0.667 | for | 1.189 < S < 2.269 | 1.189 | 0.730 |
| 13.502 * S − 28.637 | for | 2.269 < S < 2.500 | 2.269 | 1.999 |
| Post Height< | | | 2.500 | 5.118 |
| −5.898 * S + 19.863 | for | 1.970 < S < 2.500 | 1.970 | 8.244 |
| 0.229 * S + 7.794 | for | 1.349 < S < 1.970 | 1.349 | 8.102 |
| 7.607 * S − 2.160 | for | 0.723 < S < 1.349 | 0.723 | 3.340 |
| 11.430 * S − 4.924 | for | 0.572 < S < 0.723 | 0.572 | 1.614 |
| | | | 0.572 | 1.390 |

In a machine with 25 mm size, the boundary line for $K_R''>3.4$ is defined by the values shown in Table 2 and the corresponding graph is FIG. 181.

TABLE 2

Set A2

| Post Height> | | | Pole Pitch | Post Height |
|---|---|---|---|---|
| −1.340 * S + 2.305 | for | 0.619 < S < 1.120 | 0.619 | 1.475 |
| 1.100 * S − 0.429 | for | 1.120 < S < 2.074 | 1.120 | 0.803 |
| 3.830 * S − 6.082 | for | 2.074 < S < 2.269 | 2.074 | 1.852 |
| Post Height< | | | 2.269 | 2.598 |
| −69.510 * S + 160.318 | for | 2.222 < S < 2.269 | 2.222 | 5.865 |
| −3.430 * S + 13.492 | for | 1.667 < S < 2.222 | 1.667 | 7.770 |
| 2.830 * S + 3.056 | for | 1.133 < S < 1.667 | 1.133 | 6.260 |
| 8.650 * S − 3.545 | for | 0.619 < S < 1.133 | 0.619 | 1.812 |
| | | | 0.619 | 1.475 |

In a machine with 25 mm size, the boundary line for $K_R''>3.6$ is defined by the values shown in Table 3 and the corresponding graph is FIG. 182.

TABLE 3

Set A3

| Post Height> | | | Points | |
|---|---|---|---|---|
| | | | Pole Pitch | Post Height |
| −4.160 * S + 5.032 | for | 0.723 < S < 0.967 | 0.723 | 2.024 |
| 0.839 * S + 0.198 | for | 0.967 < S < 1.692 | 0.967 | 1.009 |
| 2.713 * S − 2.973 | for | 1.692 < S < 1.939 | 1.692 | 1.617 |
| Post Height< | | | 1.939 | 2.287 |
| −53.233 * S + 105.506 | for | 1.879 < S < 1.939 | 1.879 | 5.481 |
| −1.406 * S + 8.122 | for | 1.465 < S < 1.879 | 1.465 | 6.063 |
| 3.898 * S + 0.353 | for | 1.035 < S < 1.465 | 1.035 | 4.387 |
| 7.535 * S − 3.412 | for | 0.723 < S < 1.035 | 0.723 | 2.036 |
| | | | 0.723 | 2.024 |

In a machine with 50 mm size, the boundary line for $K_R''>2.2$ is defined by the values in Table 4 and the corresponding graph is FIG. 177.

TABLE 4

Set B1

| Post Height> | | | Points | |
|---|---|---|---|---|
| | | | Pole Pitch | Post Height |
| 0.254 * S + 0.462 | for | 0.319 < S < 3.667 | 0.319 | 0.543 |
| 2.665 * S + −8.380 | for | 3.667 < S < 5.000 | 3.667 | 1.394 |
| | | | 5.000 | 4.947 |
| Post Height< | | | 4.500 | 14.088 |
| −18.282 * S + 96.357 | for | 4.500 < S < 5.000 | 2.738 | 22.304 |
| −4.663 * S + 35.071 | for | 2.738 < S < 4.500 | 1.447 | 18.967 |
| 2.585 * S + 15.227 | for | 1.447 < S < 2.738 | 0.319 | 0.904 |
| 16.013 * S − 4.204 | for | 0.319 < S < 1.447 | 0.319 | 0.543 |

In a machine with 50 mm size, the boundary line for $K_R''>2.5$ is defined by the values in Table 5, and the corresponding graph is FIG. 178

TABLE 5

Set B2

| Post Height> | | | Points | |
|---|---|---|---|---|
| | | | Pole Pitch | Post Height |
| 0.269 * S + 0.456 | for | 0.380 < S < 3.016 | 0.380 | 0.558 |
| 3.051 * S − 7.936 | for | 3.016 < S < 4.167 | 3.016 | 1.267 |
| Post Height< | | | 4.167 | 4.779 |
| −14.766 * S + 66.309 | for | 3.667 < S < 4.167 | 3.667 | 12.162 |
| −3.952 * S + 26.654 | for | 2.315 < S < 3.667 | 2.315 | 17.505 |
| 3.108 * S + 10.310 | for | 1.278 < S < 2.315 | 1.278 | 14.282 |
| 14.542 * S − 4.303 | for | 0.389 < S < 1.278 | 0.389 | 1.354 |
| 88.444 * S − 33.051 | for | 0.380 < S < 0.389 | 0.380 | 0.558 |

In a machine with 50 mm size, the boundary line for $K_R''>2.9$ is defined by the values in Table 6, and the corresponding graph is FIG. 179.

TABLE 6

Set B3

| Post Height> | | | Points | |
|---|---|---|---|---|
| | | | Pole Pitch | Post Height |
| 0.191 * S + 0.626 | for | 0.472 < S < 2.181 | 0.472 | 0.716 |
| 2.135 * S − 3.613 | for | 2.181 < S < 3.095 | 2.181 | 1.043 |
| 53.475 * S − 162.511 | for | 3.095 < S < 3.175 | 3.095 | 2.994 |
| Post Height< | | | 3.175 | 7.272 |
| −5.095 * S + 23.450 | for | 2.222 < S < 3.175 | 2.222 | 12.128 |
| 0.805 * S + 10.339 | for | 1.381 < S < 2.222 | 1.381 | 11.451 |
| 10.251 * S − 2.706 | for | 0.572 < S < 1.381 | 0.572 | 3.158 |
| 24.420 * S − 10.810 | for | 0.472 < S < 0.572 | 0.472 | 0.716 |

In a machine with 100 mm size, the boundary line for $K_R''>1.5$ is defined by the values in Table 7, and the corresponding graph is FIG. 174.

TABLE 7

Set C1

| Post Height> | | | Points | |
|---|---|---|---|---|
| | | | Pole Pitch | Post Height |
| 0.322 * S + 0.359 | for | 0.233 < S < 6.667 | 0.233 | 0.434 |
| 2.202 * S − 12.179 | for | 6.667 < S < 8.333 | 6.667 | 2.504 |
| Post Height< | | | 8.333 | 6.173 |
| −25.555 * S + 219.122 | for | 7.778 < S < 8.333 | 7.778 | 20.356 |
| −5.585 * S + 63.794 | for | 4.000 < S < 7.778 | 4.000 | 41.455 |
| 3.214 * S + 28.600 | for | 1.793 < S < 4.000 | 1.793 | 34.362 |
| 21.749 * S − 4.633 | for | 0.233 < S < 1.793 | 0.233 | 0.434 |

In a machine with 100 mm size, the boundary line for $K_R''>1.7$ is defined by the values in Table 8, and the corresponding graph is FIG. 175.

TABLE 8

Set C2

| Post Height> | | | Points | |
|---|---|---|---|---|
| | | | Pole Pitch | Post Height |
| 0.277 * S + 0.593 | for | 0.250 < S < 5.182 | 0.250 | 0.662 |
| 2.342 * S − 10.111 | for | 5.182 < S < 7.222 | 5.182 | 2.026 |
| Post Height< | | | 7.222 | 6.804 |
| −13.149 * S + 101.763 | for | 6.111 < S < 7.222 | 6.111 | 21.412 |
| −4.885 * S + 51.265 | for | 3.333 < S < 6.111 | 3.333 | 34.983 |
| 4.291 * S + 20.680 | for | 1.520 < S < 3.333 | 1.520 | 27.203 |
| 20.788 * S − 4.395 | for | 0.251 < S < 1.520 | 0.251 | 0.823 |
| 161.000 * S − 39.588 | for | 0.250 < S < 0.251 | 0.250 | 0.662 |

In a machine with 100 mm size, the boundary line for $K_R''>1.9$ is defined by the values in Table 9, and the corresponding graph is FIG. 176.

TABLE 9

Set C3

| Post Height> | | | Points | |
|---|---|---|---|---|
| | | | Pole Pitch | Post Height |
| 0.277 * S + 0.591 | for | 0.278 < S < 4.425 | 0.278 | 0.668 |
| 1.916 * S − 6.663 | for | 4.425 < S < 6.111 | 4.425 | 1.817 |

TABLE 9-continued

Set C3

| Post Height> | | Pole Pitch | Post Height |
|---|---|---|---|
| Post Height< | | 6.111 | 5.048 |
| −21.337 * S + 135.438 | for 5.556 < S < 6.111 | 5.556 | 16.890 |
| −4.985 * S + 44.588 | for 3.175 < S < 5.556 | 3.175 | 28.76 |
| 2.749 * S + 20.031 | for 1.560 < S < 3.175 | 1.560 | 24.320 |
| 18.321 * S − 4.260 | for 0.278 < S < 1.560 | 0.278 | 0.833 |
| | | 0.278 | 0.646 |

In a machine with 200 mm size, the boundary line for $K_R">1.3$ is defined by the values in Table 10, and the corresponding graph is FIG. 171.

TABLE 10

Set D1

| Post Height> | | Pole Pitch | Post Height |
|---|---|---|---|
| 0.257 *S + 0.327 | for 0.208 < S < 7.778 | 0.208 | 0.381 |
| 1.977 *S + −13.044 | for 7.778 < S < 9.444 | 7.778 | 2.330 |
| Post Height< | | 9.444 | 5.623 |
| −36.195 *S + 347.445 | for 8.889 < S < 9.444 | 8.889 | 25.711 |
| −5.777 *S + 77.062 | for 4.833 < S < 8.889 | 4.833 | 49.142 |
| 1.950 *S + 39.718 | for 2.222 < S < 4.833 | 2.222 | 44.051 |
| 20.301 *S + −1.058 | for 0.389 < S < 2.222 | 0.389 | 6.839 |
| 34.481 *S + −6.574 | for 0.208 < S < 0.389 | 0.208 | 0.598 |
| | | 0.208 | 0.381 |

In a machine with 200 mm size, the boundary line for $K_R">1.5$ is defined by the values in Table 11, and the corresponding graph is FIG. 172.

TABLE 11

Set D2

| Post Height> | | Pole Pitch | Post Height |
|---|---|---|---|
| 0.322 *S + 0.359 | for 0.233 < S < 6.667 | 0.233 | 0.434 |
| 2.202 *S + −12.179 | for 6.667 < S < 8.333 | 6.667 | 2.504 |
| Post Height< | | 8.333 | 6.173 |
| −25.555 *S + 219.122 | for 7.778 < S < 8.333 | 7.778 | 20.356 |
| −5.585 *S + 63.794 | for 4.000 < S < 7.778 | 4.000 | 41.455 |
| 3.214 *S + 28.600 | for 1.793 < S < 4.000 | 1.793 | 34.362 |
| 21.749 *S + −4.633 | for 0.233 < S < 1.793 | 0.233 | 0.434 |

In a machine with 200 mm size, the boundary line for $K_R">1.8$ is defined by the values in Table 12, and the corresponding graph is FIG. 173.

TABLE 12

Set D3

| Post Height> | | Pole Pitch | Post Height |
|---|---|---|---|
| 0.212 *S + 0.600 | for 0.264 < S < 4.833 | 0.264 | 0.656 |
| 3.017 *S + −12.960 | for 4.833 < S < 6.667 | 4.833 | 1.623 |

TABLE 12-continued

Set D3

| Post Height> | | Pole Pitch | Post Height |
|---|---|---|---|
| Post Height< | | 6.667 | 7.157 |
| −12.356 *S + 89.531 | for 5.556 < S < 6.667 | 5.556 | 20.884 |
| −4.551 *S + 46.170 | for 3.175 < S < 5.556 | 3.175 | 31.72 |
| 3.850 *S + 19.496 | for 1.502 < S < 3.175 | 1.502 | 25.279 |
| 19.751 *S + −4.387 | for 0.264 < S < 1.502 | 0.264 | 0.827 |
| | | 0.264 | 0.656 |

At each machine size, each boundary line is defined for a given K" value, such that for each machine size there is a set of K" values and a corresponding set of boundary lines. Pairs of boundary lines can be chosen, in which one boundary line is chosen from each of two consecutive sizes of device, i.e. 25 mm and 50 mm, 50 mm and 100 mm, or 100 mm and 200 mm. The boundary lines occupy a space or volume defined by size, pole pitch and post height. A boundary surface may be defined as the two-dimensional uninterrupted surface in the space that is the exterior surface of the union of all lines that connect an arbitrary point in the first boundary line and an arbitrary point in the second boundary line. The boundary surface encloses a benefit space. For each pair of boundary lines, the boundary surface defines a benefit space. An electric machine with a size, pole pitch and post height that is within a given benefit space is considered to fall within the embodiment defined by the corresponding boundary lines for that size of machine.

For machine sizes greater than the largest calculated size, the boundary lines calculated for the largest calculated size are used. The benefit space beyond the largest calculated size is thus simply the surface defined by the calculated boundary lines for that size and the volume of points corresponding to greater size but with pole pitch and post height equal to a point on the surface.

The main components of an electric machine comprise a first carrier (rotor, stator, or part of linear machine) having an array of electromagnetic elements and a second carrier having electromagnetic elements defining magnetic poles, the second carrier being arranged to move relative to the first carrier for example by bearings, which could be magnetic bearings. The movement may be caused by interaction of magnetic flux produced by electromagnetic elements of the first carrier and of the second carrier (motor embodiment) or by an external source, in which case the movement causes electromotive force to be produced in windings of the electric machine (generator embodiment). An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height. The region is defined by 1) a union of a) a first surface defined by a first set of inequalities for a first size of electric machine, b) a second surface defined by a second set of inequalities for a second size of electric machine; and c) a set defined as containing all points lying on line segments having a first end point on the first surface and a second end point on the second surface, or 2) a surface defined by a set of inequalities and all points corresponding to greater size but with pole pitch and post height corresponding to points on the surface.

The first set of inequalities and the second set of inequalities are respectively sets of inequalities A and B, or B and C, or C and D where A is selected from the group of sets of inequalities consisting of the equations set forward in Tables 1, 2 and 3 (respectively sets of equalities A1, A2 and A3), B is selected from the group of sets of inequalities consisting of the equations set forward in Tables 4, 5 and 6 (respectively sets of equalities B1, B2 and B3), C is selected from the group of sets of inequalities consisting of the equations set forward in Tables 7, 8 and 9 (respectively sets of inequalities C1, C2, C3) and D is selected from the group of sets of inequalities consisting of the inequalities set forward in Tables 10, 11 and 12 (respectively sets of inequalities D1, D2 and D3).

The space in which the electric machine is characterized may be formed by any pair of inequalities that are defined by sets of inequalities for adjacent sizes, for example: A1 B1, A1 B2, A1 B3, A2 B1, A2 B2, A2 B3, A3 B1, A3 B2, A3 B3, B1 C1, B1 C2, B1 C3, B2 C1, B2 C2, B2 C3, B3 C1, B3 C2, B3 C3, C1 D1, C1 D2, C1 D3, C2 D1, C2 D2, C2 D3, C3 D1, C3 D2, C3 D3. It may also be formed by any set of inequalities and all points corresponding greater size but having post height and pole pitch within the region defined by the set of inequalities.

All of the devices described in this application may have sizes, pole pitches and post heights falling within the regions and spaces defined by these equations.

In a simulation of geometry of the embodiment represented by FIG. 1-FIG. 5, using a 0.005" air gap and using N52 magnets, the simulation yields a KR" of 1.53 Nm/kg/W which is inside of the benefit range for that size. A simulation of the geometry of the embodiment shown in FIG. 128-FIG. 129 yielded a KR" of 2.13 Nm/kg/W which also falls within the benefit range for that size.

Discussion of Geometry

The range of geometry provides unusually high torque-to-weight for a given electrical power input. This efficiency is independent of temperature. For example, at a given torque-to-weight, an actuator inside the disclosed range, may run cooler, for a given method of cooling, than a similar actuator outside of the disclosed range, because device in the disclosed range will use less power.

The low conductor volume, in this case has the benefit of lower thermal resistance due to the shorter conductors. Within the disclosed range, the need to power these conductors at higher current densities is more than compensated for by the heat dissipation benefits of the device to achieve a given torque-to-weight. Within the disclosed $K_R$" range, the reduction in weight (which results, in part, from the low conductor volume) can exceed the extra power required (which results from the higher current densities) such that net benefit can be produced in terms of KR. The stated ranges of geometry in a machine of the given diameter provides a heat dissipation effect associated with feature geometry known for much smaller machines, but used according to the principles of the present device, in a large diameter machine.

For clarity, cooling is still needed to achieve the KR benefit, but it is assumed for the $K_R$ calculation that adequate cooling is used. For some motors and applications, radiative cooling is sufficient. For others a fan and cooling fins is needed. For others at full power, water cooling is needed.

For the disclosed electric machine, the $K_R$ is the same at low to high power output (until the stator saturates at which time the $K_R$ will be reduced) so different levels of cooling will be needed depending on the power output but the torque-to-weight-to-power consumption remains reasonably constant. The disclosed range of pole density and conductor volume provides unusually high torque-to-weight for a given rate of heat dissipation with a given method of cooling. The disclosed range of pole density and conductor volume produces higher torque-to-weight for a given cooling method applied to the back surface of the stator and a given conductor temperature. The primary form of electrical conductor cooling for the disclosed range of pole density and electrical conductor volume is thermal conductive heat transfer from the electrical conductors to the back surface of the stator.

Heat can be extracted from the back surface of the stator though direct contact with a cooling fluid or through conduction to another member such as a housing, or through radiation, for example. Other surfaces of the stator or conductors can also be cooled by various means. Cooling the back surface of the stator is shown to be a cost effective and simple option for many motor types. A sample analysis (not shown here) indicates that geometry in the disclosed range which shows better heat dissipation from the back surface of the stator (as compared to motors outside of the disclosed range) will also generally show improved heat dissipation than motors outside of the disclosed range when other surfaces of the stator or conductors are cooled. The back surface of the stator is, therefore, viewed as a useful cooling surface, as well as an indicator of the effectiveness of each motor in the series to the application of cooling to other surfaces of the stator and conductors. The back surface of the stator has been chosen for the main cooling surface for the motor series analysis which is used to identify the disclosed range. Other methods of cooling may be applied to an electric machine with the disclosed range of pole density and conductor volume, but the heat flow path from conductors to the back of the stator will preferably always be used for cooling the motor regardless of what other types of cooling (EG: direct coil cooling) are used.

Stator Back Iron

Stator back iron may have an axial depth that is 50% of the width (circumferential or tangential width) of the posts. The posts may each have a tangential width and the stator may comprise a backiron portion, the backiron portion having a thickness equal to or less than half of the tangential width of the posts, or may be less than the tangential width of the posts. Thicker back iron adds weight with minimal benefit. Thinner backiron helps with cooling but the effect of back iron thickness on cooling is not very significant. The backiron surface may be in physical contact with the housing to conduct heat physically from the stator to the housing, and/or the back surface of the stator can be exposed to an actively circulated cooling fluid and/or the back surface of the stator can be configured for radiative heat dissipation to the atmosphere or to the housing or other components, and/or the back surface of the stator can be configured for convective or passive cooling through movement of air or liquid over the surface of the stator and or housing. Gas or liquid moving past the back surface of the stator may be contained or not contained. The back surface of the stator may be sealed from the atmosphere or exposed to the atmosphere. The atmosphere may be air or water or other fluid surrounding the actuator. The environment may also be a vacuum, such as is necessary for some manufacturing processes or the vacuum of space. The back surface of the stator may be configured with cooling fins which increase the surface area. These cooling fins may be exposed to a cooling fluid and/or in contact with a heat sink such as the housing or other solid member. The cooling fins on a stator may have a height greater than 50% of the post width in the circumferential direction.

In addition to heat being dissipated from the back surface of the stator, other heat dissipating surfaces may include the surface of a post which may be exposed to a cooling fluid such as air or liquid which is circulated through a slot such as between a conductor and the post.

Other methods of cooling the stator and/or the conductors may include cooling channels on or below the surface of the stator and/or on or below the surface of the conductors. These and other forms of cooling are seen as supplementary to the primary thermally conductive cooling from the conductors to the back surface of the stator. In some cases the supplementary cooling methods may even draw more heat away from the stator than the primary conductive cooling effect, but active cooling methods require energy and additional cost and complexity, so the conductive cooling path from the conductors to the back surface of the stator is disclosed here as the primary mode of cooling.

For a single actuator producing a fixed torque, the power consumption rises in the disclosed range, and becomes exponentially larger towards the smallest post heights and slot pitches inside the disclosed range. From simulations of the power consumption necessary to produce 100 N m of torque with a single 200 mm average airgap diameter actuator with a radial tooth length of 32 mm and rotor and windings, it can be seen that the lowest power consumption occurs outside of the disclosed range, and that the power consumption increases significantly inside the disclosed range. In order to minimize power consumption, a designer would be led toward larger slot pitch and larger conductor volume devices. Any actuators using the geometry of the present device will have higher power consumption than those outside of the disclosed range towards larger slot pitch and conductor volume values for this type of application.

With the disclosed structure, in which a pole carrier of the electric machine includes slots and posts, the slots having a slot or pole pitch s and the posts having a height h, in which s is related to h according to the disclosed equations, electric excitation may be applied to conductors in the slots with a current density of at least 70 A/mm2. Electric excitations in excess of 70 A/mm$^2$ are generally considered suitable for the operation of the disclosed device. The cooling effect of having the disclosed slot and conductor structure provides cooling to offset some or all of the heat generated by the current in the conductors. Any remaining heat generated may be dissipated using one or more of the disclosed cooling structures or channels. Motors inside the disclosed range show a reduction of the average flux density in the magnetic flux path for a given electrical input power. This is due, in part, to the reduced flux path length of the shorter posts and reduced distance from post to adjacent post through the backiron, as well as the reduced flux leakage between posts. The result is the ability to run higher current density in motors in the disclosed range without reaching saturation. The combination of increased cooling capability and lower flux density at a given current density as compared to motors outside of the disclosed range, creates a combination of conditions where higher continuous torque-to-weight can be achieved for a given temperature at a given cooling rate, and where the peak momentary torque-to-weight of motors in the disclosed range can be significantly higher due to operating at a lower flux density for a given torque-to-weight in the disclosed range.

One of the most significant challenges that must be overcome in order to achieve the performance and power consumption benefits of the disclosed geometry, is to provide a structure that can withstand the immense magnetic forces that exists between the rotor and stator. Embodiments of the disclosed rotor can achieve unusually high flux density in the airgap leading to high attraction forces on the stator posts. At the same time, achieving the high torque-to-weight of an embodiment of the disclosed electric machine requires the use of a backiron that has an axial thickness that, in an embodiment, is less than the circumferential thickness of the posts (and, in an embodiment, is about half of the thickness of the posts). Furthermore, the axial flux motor configuration disclosed and the relatively short stator posts of the disclosed range results in an inherently thin stator structure. With a radial flux motor, circular laminates with integrated posts can be used. This has an inherent rigidity and naturally provides a desirable flux path along the circumferential and radial orientation of the laminates. In contrast, the axial flux function of an embodiment of the present device requires an assembly of individual laminated parts. The result is the need to manufacture up to hundreds of post components for each actuator, which increases manufacturing complexity, time and cost. Furthermore, the relatively thin backiron does not provide an adequate surface area for many potting compounds or adhesives to reliably fix the posts to the backiron, especially at the high frequency force variation and elevated temperatures that are common to electrical machines. As an example, a typical aerospace adhesive that might be used to fix a stator post into a receiving slot in the stator, might have a heat deflection temperature of under 80 deg C. for a stress on the epoxy of less than 300 psi.

The back-iron disk of an embodiment can be made of laminates, powdered metal, or solid metal. The use of laminates has certain advantages, including the possibility of stamped material construction; however; if laminates are used, they must be attached through means capable of withstanding the forces and temperatures of operation of the device. Common methods such as glue may not be sufficient for certain regimes of operation where the forces and/or temperatures are high. Nonetheless, laminations may be a good choice for other regimes, and are expected to work well for many high-speed applications.

The use of powdered metal with electrical insulator coating on each particle for the back-iron of an embodiment has the advantage of reducing eddy currents. This coating, however, will typically reduce the magnetic force because it acts like multiple tiny airgaps in the flux path. This material is also typically less strong than solid steel or iron with significantly higher creep rate, especially at elevated temperatures A stator manufactured of solid steel typically has high eddy current losses. However, geometric features of motors in the disclosed range have an eddy current and hysteresis reducing effect that, in some regimes of operation of the an embodiment of the present device, for instance when operating at speeds which are suitable for robotics, the eddy current losses may be sufficiently low to enable the use of a solid stator. Using solid material is advantageous for strength, rigidity, heat resistance, and fatigue strength. Since embodiments of the present device can often generate sufficient torque to be used without a gearbox in certain applications, the resulting operational speeds may be sufficiently low that the eddy current losses be acceptable even with a solid steel stator. Solid cast iron has been found to give sufficiently low eddy current losses to be practical with some configurations and regimes of operation.

Stators may be constructed of either laminated stacks or a sintered powdered metal. An objective of these constructions, as compared to the use of solid materials, is to reduce the cross sectional area of electrically insulated soft magnetic material perpendicular to the flux path and thus reduce the generation of eddy currents. Eddy currents reduce the efficiency by requiring additional input power; they produce extra heat which must be dissipated by the system; and they reduce the output torque by creating a damping effect A single-piece stator fabricated from a solid electrically conductive material may be used with embodiments of the disclosed device within the disclosed ranges of pole density and post height. To avoid eddy current generation, the application should be sufficiently low speed, for example a duty cycle that consists of 50% (60%, 70%, 80%, 90%) of the operation at 200 rpm or less for a 175 mm average airgap diameter motor having the disclosed range of geometry. By combining this relatively low speed range with the relatively small cross sectional geometry of the stator teeth in the disclosed range, the individual stator teeth act somewhat like laminations and reduce the production of eddy currents. Speeds of less than 200 rpm are generally considered suitable for the operation of the device. Speeds of less than 100 rpm, less than 50 rpm and less than 25 rpm are also considered suitable for the operation of the device.

Additionally, the production of eddy currents is reduced by the relatively short tooth height in the disclosed range. Eddy current and hysteresis losses are volumetric, so the low volume of the present device contributes to the reduction of total iron losses for a given flux density and switching frequency.

A solid stator, or unitary stator, has a continuous flux path from post to post as shown for example in FIG. 136 and FIG. 137, although, depending on the embodiment, the cooling fins may or may not be present. Each post is thus a portion of the unitary stator. The continuous flux path may be provided by a unitary piece of magnetically susceptible material.

The continuous flux path may be provided by a stator made of isotropic materials such as ductile iron, steel alloy such as cobalt or silicon steel, pressed or sintered powdered metal, for example. The metal may be isotropic from post to adjacent post and non-isotropic from a post to a bearing race or a post to a member or assembly that connects to a bearing, including variable material alloy from backiron to cooling fins and/or to bearings. This can be done by explosion welding or fused deposition additive manufacturing, or stir welding or other forms of combining dissimilar materials.

The stator may be one piece or unitary from a post to an adjacent post and from a post to a bearing race seat (or bushing seat or contact). The stator may be unitary from a post to a post and from one of these posts to a member or assembly that is in compression so-as to pre-load a bearing or bushing. The stator may be unitary from a post to a post and from one of these posts to a member or assembly that is in compression so-as to pre-load a bearing or bushing and all or part of the compressive load is a result of magnetic attraction between the stator and a rotor. In cases of pre-loaded bearings, the housing assembly may be flexible enough to displace the bearing race seat in the direction of bearing preload past the bearing seat position if the bearing is present, by more than 0.002" if the bearing is not present. In cases of pre-loaded bearings, the housing assembly may be flexible enough to displace the bearing race seat in the direction of bearing preload, past the bearing seat position if the bearing is present, by more than 0.002" if the bearing is not present and the force exerted on the stator to cause this deformation of the housing is provided at least in part, by the magnetic attraction of a stator to a rotor.

Performance Benefits of a Solid Stator for Motors in the Disclosed Range

The use of a solid stator in a motor is known to provide the potential for cost and manufacturing benefits. Solid stators are not commonly used, however, because they are known to result in significant eddy current losses at typical rotary motor speeds. Eddy currents produce heat, and also have the secondary effect of reducing the torque performance of a motor, especially at higher speeds. 50 rpm actuator output is considered high speed for many robotics applications while 200 rpm is considered to be very high speed for many robotics applications. Common motors used in robotics are not high enough torque to be used at the joints as a direct drive actuator, and must be used without a torque-increasing gearbox. The result of using a torque increasing gearbox is the need to operate the motor at much higher speeds than the actuator output. Eddy current losses increase exponentially with speed, so the use of a solid stator for a robotic actuator would be expected to result in very poor performance.

Laminates or electrically insulated powdered material are commonly used in motors to provide low eddy current characteristics at the speeds necessary to drive a torque increasing gearbox at output speeds suitable for robotics. But while the need to use laminates or electrically insulated powdered material has been shown to be beneficial for exemplary motors outside the claimed range, motors inside the claimed range exhibit an unexpected benefit in terms of eddy current and hysteresis reduction to the point where the use of a laminate material would actually be detrimental to performance in motion control applications such as robotics.

Analysis Set-Up

To demonstrate this unexpected benefit, a series of motors was simulated to show eddy current and hysteresis losses at 200 rpm and for a range of motors starting at low pole density and increasing pole density into the disclosed range. Simulations have shown that for an exemplary motor series with a concentrated flux rotor embodiment of the present device, the PM flux from the rotor is responsible for approximately 80% or more of the total eddy current and hysteresis loss in the stator at current levels up to 19.7 Arms/mm$^2$. The non-powered eddy current losses with the rotor spinning at 200 rpm are, therefore, used as a reliable indicator of overall loss over a reasonable range of applied current densities.

Reversing Stator Loss Trend

FIG. 183 shows the eddy current and hysteresis losses of a two solid stator materials compared to the eddy current and hysteresis losses of a laminated stator for a series of exemplary motors having the same aspect ratio of post height to slot pitch, and the same radial post length. The losses are simulated or calculated as described above, at a rotor speed of 200 rpm with no current applied. Note that M19 electrical steel was used in the simulation for one of the solid stator materials for the sake of direct comparison with the M19 laminated stator even though it is not commonly available in plate or block form. Other materials which are available in plate or block form, or which can be cast to near net shape parts are available in industry with similar magnetic performance characteristics to M19.

Referring now to FIG. 183, it can be seen that the higher frequency required for higher pole numbers at a given speed result in the expected exponential increase of losses in the laminated stator series toward and inside of the disclosed range. As would also be expected, much higher losses are shown in a solid stator as compared to a laminated stator for motors with large pole pitch as shown at the far right of the graph. These losses then increase at a much greater rate than the laminated stator, as pole pitch is decreased from the right side toward the middle of the graph as drive frequencies must increase. As the pole pitch approaches the claimed range, however, the eddy current magnitude does not continue to increase like it does in the laminated stator series. This is because the thinner flux path cross section of motors toward the disclosed range, along with the reduced eddy currents and hysteresis losses that result from the reduced stator volume toward the claimed range, become dominant in the overall effect, and the trend toward increasing losses is reversed. This reversal of the expected trend results in a total eddy current and hysteresis loss with a solid stator in the disclosed range that drops below anywhere else in the example series.

Increased Torque-to-Weight

Although the losses shown in this analysis in FIG. 183 are always higher with a solid stator as compared to a laminated stator, for the motors in the disclosed range, the reversing of this trend is significant enough to result in improved torque-to-weight performance up to approximately 200 rpm with a solid stator than with a laminated stator as shown in FIG. 188. This very higher torque-to-weight of motors in the disclosed range is shown to be high enough that they can be used as direct-drive actuators at the robot joints without the need for a torque-increasing gearbox. This creates a situation where the very high torque-to-weight of the present device enables, and at the same time benefits from, the use of a solid stator. It enables the use of a solid stator by allowing it to operate as a direct drive actuator at the robot joints and at operating speeds that are considered high speed for a direct drive actuator but low enough to take advantage of the present device loss reducing geometry. At the same time, motors in the claimed range benefit from the use of a solid stator by increasing the torque-to-weight beyond what is possible with a laminated stator of the same material.

Torque-to-Weight Analysis Set-Up

The reduction in torque-to-weight due to eddy current losses was calculated by simulation at speeds up to 200 rpm. The torque-to-weight of a 24 slot approximation of a device outside the claimed range with applied current densities of and 6 A/mm$^2$ is shown to be below the laminated stator at very low speeds and to continue dropping even further below the laminated stator up to 200 rpm The torque-to-weight for a 108-slot approximation of the present device is shown to start significantly higher than the laminated stator due to rigidity requirements necessitating a thicker backiron to maintain the airgap in the laminated case. The solid stator however is sufficiently rigid at the minimum backiron thickness and needs no extra material added. Additionally, the stall torque of the solid stator is slightly higher due to having increased magnetic material in the same cross-sectional area of the magnetic flux path.

Note that an applied current density of 19.7 A/mm$^2$ was chosen for the 108 slot motor of the present device because it yields a similar power consumption to the 24 slot motor at 6 A/mm$^2$ at stall torque conditions.

It is not surprising that the torque to weight is almost immediately drops below the zero speed torque-to-weight for the exemplary motor with low slot density. For the exemplary motor inside the disclosed range, however, the torque-to-weight is significantly higher at zero speed due to the ability to maintain rigidity with a minimum backiron thickness, combined with the higher material density that results from the 100% magnetic material density compared to the laminations which have a percentage of the flux path occupied by non-magnetic insulation layers and adhesives. As the speed increases, the torque-to-weight still drops off with the present device as it does with the low slot density motor, but it stays above the laminated motor torque-to-weight all the way up to 200 rpm. Considering that 200 rpm is extremely high speed for robotics applications, and considering the other potential benefits of a solid stator in terms of the reduced cost and increased stator strength and rigidity, the present device is able to provide the known benefits of a solid stator without a reduction to torque-to-weight when used in robotics or other applications with similar speed and torque-to-weight requirements.

In Depth Description

An in-depth description of how the above analysis was carried out is as follows. A 3-D simulation was conducted using MagNet™ software by Infolytica™. A linear approximation of an axial flux machine having geometry within the claimed ranges having 108 slots and 110 poles was constructed and simulated using the Transient with Motion™ solver to predict the losses in solid and laminated stators. A similar simulation was done using a geometry outside of the claimed range with an equivalent of 24 slots and 26 poles in the same diameter. The simulation predicts the eddy current and hysteresis loss in laminated structures using an analytical application of the Steinmetz equation. In solid structures the eddy current loss is predicted by the simulation using the average of the ohmic loss in the structure based on the resistivity of the material. One series, namely Durabar 65-45-12, used the software to generate the eddy current magnitude, and the other solid eddy current magnitude was estimated based on a multiplication by the ratio of their respective resistivities. For 24 gauge M-19 electrical steel, the hysteresis loss of the solid was assumed to be equal to that of the laminated equivalent, however the author acknowledges that in reality the hysteresis loss in a solid block of a material will be greater than in a laminated stack. Still, the majority of the losses at speed are due to eddy currents which are the focus of this study therefore this assumption is believed to be adequate for the purposes of this study. For the solid Durabar 65-45-12 the hysteresis loss was analytically calculated using an estimate based on experimental measurements which found the loss to be approximately 5062 J/m$^3$ and the frequency exponent was assumed to be 1.1. The volume of magnetically active material in the stator was estimated to be the volume of the teeth plus a portion of the backiron equal in depth to the width of an individual tooth, based on simulation results. Therefore, for Durabar the hysteresis loss was calculated as follows:

$$P_{hyst\text{-}Dura} = 5062 \cdot V_{active} \cdot f^{1.1}$$

Where $P_{hyst\text{-}Dura}$ is the power loss due to hysteresis in Durabar 65-45-12, $V_{active}$ is the magnetically active volume of the stator, and f is the primary magnetic switching frequency. For any device, the primary magnetic switching frequency is related to the output speed and the number of poles according to the following relationship:

$$f = \frac{RPM}{60} \cdot \frac{N_p}{2}$$

Where RPM is the output speed of the device in revolutions per minute, and N is the number of poles.

The reduction in torque due to hysteresis losses was calculated based on the reduction in torque due to eddy current losses as calculated by the simulation. The resultant torque for a 108-slot approximation of the present device and a 24 slot approximation of a device outside the claimed range with applied current densities of 19.7 Arms/mm² and 6 A/mm² are shown in FIG. 187 and FIG. 184 respectively.

FIG. 183 shows eddy current and hysteresis losses of a solid stator compared to the eddy current and hysteresis losses of a laminated stator for a series of exemplary motors having the same aspect ratio of post height to slot pitch, and the same radial post length. The losses are simulated or calculated as described above, at a rotor speed of 200 rpm with no current applied. It can be seen that while the losses of a laminated stator increase exponentially toward and inside of the claimed range, motors with solid stators initially show increased losses when moving from large slot pitches towards the left to smaller slot pitches as the driving frequency increases. However the combined effect of restricting eddy current flow in narrower teeth and reducing tooth volume offsets the effects of increased frequency and begins to reduce the overall losses as the slot pitch continues to decrease. This reversing trend shows the non-obvious benefit of combining a solid stator with the claimed geometry range for acceptable losses in robotics applications where speeds are relatively low.

Simulations have shown that for an exemplary motor series with a rotor embodiment of the present device, the PM flux from the rotor is responsible for approximately 80% or more of the total eddy current and hysteresis loss in the stator at current levels up to 19.7 Arms/mm². The non-powered eddy current losses with the rotor spinning at 200 rpm can, therefore, be used as an adequate indicator of overall loss over a reasonable range of applied current densities. The data in FIG. 183 shows the sum of the eddy current and hysteresis losses for three motor series across a range of slot pitches at a rotor speed of 200 rpm with no current applied.

Much higher losses are shown in a solid stator as compared to a laminated stator at 200 rpm in FIG. 183 for motors with large slot pitch, with these losses increasing dramatically as slot pitch is decreased. At a certain point, however, the eddy current reducing benefits of thinner cross sections becomes dominant in the overall effect, and the trend toward increasing losses is reversed. This trend reversal shows a total eddy current/hysteresis loss with a solid stator in the claimed range that drops significantly below anywhere else in the example series. The losses are always much higher than a laminated stator, but other factors are also in effect that make these losses acceptable.

As a baseline comparison, a simulation was performed for an exemplary geometry outside of the present device range with much larger wider posts, having 24 slots and 26 poles for the same average airgap diameter, and possessing the same aspect ratio of tooth width to height as the present device example. The radial length of the teeth was kept constant compared to the present device example so that both motors represent the same outer and inner diameters. The results shown in FIG. 184 for a typical applied current density of 6 A/mm², show that even at these relatively low speeds, the torque in the solid stator drops significantly, by a factor of 31%, while the torque in the laminated stator only drops marginally. Similarly, the losses due to eddy currents in the example geometry outside of the claimed range are larger than any of the other system losses as shown in FIG. 185.

To demonstrate the practical use of the present device with a solid stator, an analysis was created and recorded in FIG. 186 and FIG. 187 to simulate a motor with the same OD as in FIG. 184 and FIG. 185 but with geometry in the claimed range as described above. The applied current density was 19.7 A/mm² which yields a similar power consumption to the device in FIG. 185 for stall torque conditions (speed of 0 rpm).

The individual and total stator losses in the solid M-19 stator are shown in FIG. 186. Although the eddy current losses increase dramatically with speed, the resistive losses in the conductors represent the majority of the loss, all the way up to 200 rpm in this example. The geometry of the present device results in eddy current losses that remain below what is considered, by the inventor, to be acceptable for up to what would be considered high speed for an actuator in a robotic application, especially in view of the many other potential benefits of using a solid stator.

At speeds above 200 rpm the eddy current losses continue to increase exponentially and become unacceptably large for many applications even for geometries within the benefit range. Therefore, a solid stator using the present geometry would be impractical for many typical direct-drive motor applications which include operating speeds of greater than 200 rpm for this size of motor. It is the combination of the relatively low speed range (as compared to typical direct drive motor applications) of typical of robotics applications with the present device geometry that allows a solid stator to be usefully implemented.

One of the benefits of a solid stator is the ability to increase the torque-to-weight of the present device as a result of the much higher mechanical strength of a solid material as compared to a laminated or insulated powdered material. Outside of the claimed range, as in the example geometry of FIG. 185, the thickness of the stator backiron necessary for optimum magnetic properties also provides sufficient stiffness such that laminated and solid stators will have the same volume. However in the claimed range, the minimum backiron thickness may need to be increased in the case of a laminated or powdered sintered stator to prevent the attraction of the rotor magnets from deforming the stator and closing the airgap in certain cases when small airgaps and/or strong rotor magnets are used. In the comparison in FIG. 188, very strong NdFeB N52 permanent magnets were used in the rotor, therefore the laminated stator in the present device range was given twice the thickness of that of the solid stator as an estimate, however depending on the method of bonding the laminations this thickness may need to be increased even more. Therefore, a solid stator will typically yield the highest torque-to-weight in the present device range for speeds up to, for example, 200 rpm by either allowing stronger rotor magnets to be used for the same backiron thickness thereby increasing the torque, or by allowing thinner backiron to be used for the same rotor magnets thereby decreasing the weight. Increasing torque-to-weight has power consumption benefits that are described elsewhere in this disclosure which can partially or completely offset the additional eddy current losses up to reasonably high speed for many robotic applications. A solid stator also reduces the cost by reducing processing time and in some cases even allowing lower cost materials and processes such as cast steel parts.

In addition to the structural and manufacturing cost benefits, a solid stator can also provide higher static torque than a laminated stator of the same material. As shown in FIG. 187, the solid M-19 stator provides higher static torque than the laminated M-19 stator due to the absence of insulation between the laminations which comprises approximately 5% of the volume of the laminated stator. As a result of the initially higher static torque, combined with the low cross sectional area of the present device, the solid M-19 stator may provide higher torque than a laminated equivalent potentially up to 50 rpm or more. 50 rpm is low speed for a common electric motor, but it is considered to be reasonably high speed for many robotic applications. If the duty cycle of a robot is an average of 50 rpm with a maximum speed of 100 rpm, for example, the average efficiency and torque of the solid M-19 stator may be similar to that of the laminated M-19 stator in this example. At 200 rpm, which is considered to be very high speed for many robotics applications, the torque of the exemplary embodiment with a solid stator is lower than that using the laminated stator by approximately 9%. This is only ⅓ of the loss of torque at this speed found in the exemplary embodiment in FIG. 184 using the same comparison of a solid vs laminated stator and is considered to be acceptable loss in view of the other benefits of a solid stator, such as lower cost and increased structural integrity which allows for lower weight. A direct comparison of the torque of the two embodiments is shown in FIG. 189 and a direct comparison of the total losses in both embodiments is shown in FIG. 190. It should be noted that M-19 electrical steel is not typically available in solid form, but is used here as a direct comparison for illustrative purposes. Many different alloys can be formulated and used as a solid material with the present device. The addition of increased amounts of silicon can, for example, can be used to further reduce eddy currents in a solid stator material. The addition of extra silicon may reduce the static torque but may reduce the losses at higher speeds as an acceptable compromise. The ideal performance characteristics of a solid stator material will depend on the specific application but can be determined by someone skilled in the art by applying the principles disclosed here.

Durabar 65-45-18 ductile iron is shown as another non-limiting example of a solid material that can be used for the stator. This material is highly machinable and has been used in various prototypes. It has a lower static torque than the same stator made from M-19 but similar losses as speeds increase. At 200 rpm, the torque and efficiency are still considered to be adequate to provide very high torque-to-weight and acceptable power consumption.

The solid stator may be used with machines having sizes within the benefit space, and with airgaps of different sizes but within practical limitations such as having for example a thickness with the range 0.005" to 0.010", depending on the magnetic forces across the airgap and strength of the materials used. Simulations at 0.010" gap showed that for most of the disclosed ranges, greater than 75% of the area of that range shows a KR benefit at 0.01" gap. The only ones which show less benefit are the smallest sizes as the highest KR, namely at or between sets of inequalities A2 and A3. Therefore, a benefit is found for gaps from 0.001" up to 0.01" for all motors. Back iron thickness may be 50% or less of the axial thickness of the circumferential thickness of the posts, for an axial flux machine, but this value is variable. Thicker back iron results in loss of KR, while thinner back iron results in loss of strength The stator may be made from any metal or metal alloy that is heat formed and has a yield strength above 30,000 or 40,000 psi, for example silicon steel, cobalt alloys, ductile iron or other soft magnetic alloy, and no measurable creep below 20,000 psi stress. For a 200 mm Average airgap device rotation speeds should not exceed 100 rpm for the majority of the time or exceed 200 rpm for more than 25% of the time, or be above 50 rpm average speed for best results of using a solid stator. Embodiments with unitary stator benefit from being run at speeds of less than 200 rpm, 100 rpm, 50 rpm or 25 rpm.

Electric machines within the benefit space also provide very high peak torque and very high safety stop capability. Such electric machines show a reduction of the flux density for a given electrical input power. This is due, in part, to the reduced flux path length of the shorter posts and reduced distance from post to post through the backiron, as well as the reduced flux leakage between posts. The result is the ability to run higher current density in motors in the disclosed range without reaching saturation. The combination of increased cooling capability and lower flux density at a given current density as compared to motors outside of the disclosed range, creates a combination of conditions where higher continuous torque can be achieved for a given temperature at a given cooling rate, and where the peak momentary torque-to-weight of motors in the disclosed range can be significantly higher due to operating at a lower flux density for a given torque-to-weight in the benefit space.

Electric machines in the benefit spaced have reduced material volume resulting in reduced manufacturing cost and reduced manufacturing impact. The magnets may be magnetically retained (even though their natural state is to be repelled or partially repelled from slots) by the following, extra deep magnets and cut-outs in opposite end of posts creates inward bias despite majority of flux linking through airgap.

For application of the disclosed geometry to motor types such as transverse flux motors, there may be other design considerations that will affect the extent to which the heat dissipation and other advantages in the disclosed range are realized. For a transverse flux motor, for example, the width of the posts (in a direction parallel to the axis of the coil) is independent of the pole pitch. This width, however, is very important to determine the weight of the system because it is directly related to the necessary thickness of stator backiron. One must also consider the ratio of the axial width of the post to the axial width of the coil. If these quantities are decreased, the total airgap surface area and conductor cross-sectional area can be held constant by arraying the entire assembly axially. Therefore, the optimum torque-to-weight and heat dissipation will also depend on the array pitch and post axial width.

Power and Cooling Figure

As shown in FIG. 191, an actuator 3400 may be cooled using cooling supply 3402. Cooling supply 3402 may provide a fluid flow for cooling actuator 3400 via flow channel 3404. The cooling supply may be connected to any of the flow channels disclosed, including interior of any housing or openings, or on the stator or rotor or any disclosed carrier. Actuator 3400 may also be supplied with power (electrical excitation) by power supply 3406. Power supply 3406 may supply power to actuator 3400 using power connector 3408.

Ultralight Embodiment

The views shown in FIG. 182 to FIG. 199B are of a simplified drawing of self-contained actuator assembly according to the principles disclosed. It uses bushings instead of bearings which has cost and weight benefits and is suitable for many applications where lower speeds and or short service life are typical. Note that conductors are not shown in any of the images and can be of any type including those disclosed here for other embodiments.

Referring to FIG. 192, the embodiment of an actuator 3500 shown here has external stators 3502 on either side of an internal rotor 3504. In another embodiment, there can be an internal stator with external rotors on either side, but this is not considered desired for cooling. The actuator shown moves an output ring 3506 relative to a fixed ring 3508. In the embodiment shown, the output ring 3506 is at the inner diameter (ID) of the actuator and the fixed ring 3508 is at the outer diameter (OD), but in another embodiment, the output ring could be at the outer diameter and the fixed ring at the inner diameter.

Bushings or low friction coatings may be used to minimize friction between the rotor 3504 and stators 3502, as shown in FIG. 193A. As seen more clearly in the closeup of FIG. 193B, the embodiment shown has axial location bushings or low friction coating 3510 in the airgap between each stator 3502 and the rotor 3504, and radial location bushings or low friction coating 3512 between the rotor 3504 and fixed ring 3508.

As shown in FIG. 194, the stators 3502 have posts 3514. The posts 3514 may be oriented radially and may have axial extensions/spacers 3516 from the outer diameter ends of the posts. These extensions 3516 are preferably made of one piece with the stator posts 3514 and back iron 3518. This provides high rigidity in the axial direction as well as to transfer torque to the fixed ring 3508. By using the post tips as axial spacers it allows the insertion of conductor coils onto the posts without interference. As indicated by the arrows labeled with reference numeral 3520, the stators will flex inwards as a result of magnetic attraction between the stators and rotor, particular towards the inner diameter of the stator in the embodiment shown. The shape of the stator and/or rotor can be preformed so as to, when taking into account the magnetic attraction, achieve any desired airgap such as a reasonably consistent airgap from ID to OD of airgap space between stator and rotor. FIG. 195 shows a closeup of stator posts 3514 with more arrows 3520 showing a direction of flexing.

As shown in FIG. 196, rotor 3504 in the embodiment shown comprises a permanent magnet (PM) carrier 3522 holding an array of permanent magnets (PMs) 3524. In the embodiment shown, the PM carrier is a concentrated flux PM rotor carrier with a rotor backiron 3526. Output ring 3506. Rotor output ring is fastened to ID of PM carrier 3522 (or OD in OD output configuration) with for example a press fit, adhesive, or fasteners etc. As can also be seen in this figure, the fixed ring 3508 in this embodiment has slots 3532 for receiving the axial extensions 3516 of the stator posts.

FIG. 197 shows the PM magnet carrier 3522 of this embodiment without PM magnets. The PM carrier has posts 3528 and backiron 3526, all preferably made of a one piece isotropic material such as a steel alloy or iron alloy. Flux restriction bores 3530 are placed in the backiron between posts.

FIG. 198 shows the shape of the OD ends of stator posts 3514 more clearly including the extensions 3516. In an alternative OD output embodiment (not shown), the extensions may be at the ID ends of the posts.

FIG. 199A and FIG. 199B show for illustrative purposes an overlapping pattern of rotor posts 3528 and stator posts 3514. By implementing a rotor post-to-stator post difference of 4, or more, and by ensuring that at least part of the circumferential width of the stator or rotor posts is wider than the gap in the other member, a continuous or nearly continuous overlap of the posts can be achieved. A 4 post difference is shown here, a higher or lower difference such as 2 or 6 or more can be used with various effects.

The active magnetic components of an electric machine in the disclosed range can be inserted into a system as a frameless motor or supported by bearings and other structure in a framed motor or actuator. An unusually thin flux path cross section from post to post is inherent in the disclosed range geometry. This thin section geometry provides for the potential to construct the stator out of an isotropic soft magnetic material such as an iron alloy or steel alloy with the surprising result of increased performance and/or efficiency at speeds which are suitable for many robotic applications. An isotropic soft magnetic material also provides the structural strength, stiffness, and creep resistance to achieve and maintain the unusually small airgap required to achieve a high percentage of the potential torque.

There are many ways to configure the support structure and bearings between the stator and rotor of embodiments of an electric machine disclosed here Some of these will be known to someone skilled in the art. Spacer extensions are preferably fixed in the spacer ring with a press fit or engagement feature (not shown in figures) to add rigidity to the stators. Others are shown here which take advantage of the unusually rigid structure provided by an isotropic rotor and stator assembly. The embodiment shown here provides a self-contained actuator housing and bearing structure with minimal weight cost and complexity.

By using the inherent rigidity of the isotropic stators, it is possible to support the stators with an axial spacer such that they are prevented from pulling together on the ID or the OD of the stators. In an embodiment the spacer is formed or machined as one piece with the stator in the form of extended sections on the OD or ID of the stator posts. These spacer extensions can contact each other or an intermediate spacer ring as shown here. In certain applications the magnetic attraction force between the stators and the rotor may be enough to hold the assembly together without the need for additional fasteners or adhesives. In an exemplary embodiment with a 200 mm outside diameter, the magnetic attraction between the stator and rotor can be up to or greater than 400 kg per stator/rotor airgap. The construction shown here provides enough rigidity to result in an average stator ID displacement towards the rotor of 0.001" to 0.003". The stators and rotor may be preformed such that this displacement will not cause pressure on the bushings or non-slip coating shown. With a four post difference between the stator and rotor, four equally spaced magnetic attraction zones can be realized for a reasonably consistent force on a stator. A low cost and light weight bearing configuration is shown here with low friction bushing material such as Teflon in the air gap between the stator and rotor, and around the OD of the rotor. A low friction coating on the stator and or rotor can be used as well. FIG. 199A and FIG. 199B show a non-limiting example of a stator and rotor post geometry which provides that preferably all or a high percentage (such as 50% or higher although a lower percentage may also provide enough overlap) of the stator posts overlap with a rotor post at all times. This high percentage of overlapping posts provides a consistent support between the stator and rotor allowing a low friction coating or intermediate bushing material to keep the rotor centred between the stators.

A small amount of flexibility in the stator can be useful to minimize or eliminate play between the stator and rotor while still allowing for heat expansion and variations in manufacturing tolerance.

A diamond like coating (DLC) or other low friction, low wear rate coating can be applied to the stator and rotor post tips.

There are many materials that can be used for the stator and rotor. An exemplary material in terms of cost and performance is ductile cast-iron. The small amount of flexibility in the stator that is produced by the magnetic attraction can be used to preload the stator and rotor post faces together. The stator and/or rotor can be pre-formed with a slightly conical shape to achieve a parallel or other air gap geometry.

What is claimed is:

1. An electric machine, comprising:
a first carrier having an array of electromagnetic elements;
a second carrier having electromagnetic elements defining magnetic poles, the second carrier being arranged to move relative to the first carrier;
an airgap between the first carrier and the second carrier;
the electromagnetic elements of the first carrier including posts, with slots between the posts, one or more electric conductors in each slot, the posts of the first carrier having a post height in mm;
the first carrier and the second carrier together defining a size of the electric machine and being arranged so that the electric machine is an axial flux or radial flux machine;
the magnetic poles having a pole pitch S in mm;
the size of the electric machine, pole pitch and post height being selected to fall within a region in a space defined by size, pole pitch and post height, the region being defined by either
1) a first union of:
  a) a first surface defined by a first set of inequalities for a first size of electric machine;
  b) a second surface defined by a second set of inequalities for a second size of electric machine; and
  c) a set defined as containing all points lying on line segments having a first end point on the first surface and a second end point on the second surface;
the first set of inequalities and the second set of inequalities being respectively sets of inequalities A and B, or B and C, or C and D, in which the group of inequalities A is for a size of 25 mm, the group of inequalities B is for a size of 50 mm, the group of inequalities C is for a size of 100 mm, the set of inequalities D is for a size of 200 mm; or
2) a second union of a surface as defined by set of inequalities D and a corresponding set of all points with size greater than the surface but with pole pitch and post height corresponding to points within the surface;
where
A is selected from the group of sets of inequalities consisting of:

Set A1:

| Post Height> | | |
|---|---|---|
| −1.070*S + 2.002 | for | 0.572 < S < 1.189 |
| 1.175*S + −0.667 | for | 1.189 < S < 2.269 |
| 13.502*S − 28.637 | for | 2.269 < S < 2.500 |
| Post Height< | | |
| −5.898*S + 19.863 | for | 1.970 < S < 2.500 |
| 0.229*S + 7.794 | for | 1.349 < S < 1.970 |
| 7.607*S − 2.160 | for | 0.723 < S < 1.349 |
| 11.430*S − 4.924 | for | 0.572 < S < 0.723 |

Set A2:

| Post Height> | | |
|---|---|---|
| −1.340*S + 2.305 | for | 0.619 < S < 1.120 |
| 1.100*S − 0.429 | for | 1.120 < S < 2.074 |
| 3.830*S − 6.082 | for | 2.074 < S < 2.269 |
| Post Height< | | |
| −69.510*S + 160.318 | for | 2.222 < S < 2.269 |
| −3.430*S + 13.492 | for | 1.667 < S < 2.222 |
| 2.830*S + 3.056 | for | 1.133 < S < 1.667 |
| 8.650*S − 3.545 | for | 0.619 < S < 1.133 |

Set A3:

| Post Height> | | |
|---|---|---|
| −4.160*S + 5.032 | for | 0.723 < S < 0.967 |
| 0.839*S + 0.198 | for | 0.967 < S < 1.692 |
| 2.713*S − 2.973 | for | 1.692 < S < 1.939 |
| Post Height< | | |
| −53.233*S + 105.506 | for | 1.879 < S < 1.939 |
| −1.406*S + 8.122 | for | 1.465 < S < 1.879 |
| 3.898*S + 0.353 | for | 1.035 < S < 1.465 |
| 7.535*S − 3.412 | for | 0.723 < S < 1.035 |

B is selected from the group of sets of inequalities consisting of:

Set B1:

| Post Height> | | |
|---|---|---|
| 0.254*S + 0.462 | for | 0.319 < S < 3.667 |
| 2.665*S + −8.380 | for | 3.667 < S < 5.000 |
| Post Height< | | |
| −18.282*S + 96.357 | for | 4.500 < S < 5.000 |
| −4.663*S + 35.071 | for | 2.738 < S < 4.500 |
| 2.585*S + 15.227 | for | 1.447 < S < 2.738 |
| 16.013*S − 4.204 | for | 0.319 < S < 1.447 |

Set B2:

| Post Height> | | |
|---|---|---|
| 0.269*S + 0.456 | for | 0.380 < S < 3.016 |
| 3.051*S − 7.936 | for | 3.016 < S < 4.167 |
| Post Height< | | |
| −14.766*S + 66.309 | for | 3.667 < S < 4.167 |
| −3.952*S + 26.654 | for | 2.315 < S < 3.667 |
| 3.108*S + 10.310 | for | 1.278 < S < 2.315 |
| 14.542*S − 4.303 | for | 0.389 < S < 1.278 |
| 88.444*S − 33.051 | for | 0.380 < S < 0.389 |

Set B3:

| Post Height> | | |
|---|---|---|
| 0.191*S + 0.626 | for | 0.472 < S < 2.181 |
| 2.135*S − 3.613 | for | 2.181 < S < 3.095 |
| 53.475*S − 162.511 | for | 3.095 < S < 3.175 |
| Post Height< | | |
| −5.095*S + 23.450 | for | 2.222 < S < 3.175 |
| 0.805*S + 10.339 | for | 1.381 < S < 2.222 |
| 10.251*S − 2.706 | for | 0.572 < S < 1.381 |
| 24.420*S − 10.810 | for | 0.472 < S < 0.572 |

C is selected from the group of sets of inequalities consisting of:

Set C1:

| Post Height> | | |
|---|---|---|
| 0.322*S + 0.359 | for | 0.233 < S < 6.667 |
| 2.202*S − 12.179 | for | 6.667 < S < 8.333 |

-continued

| Post Height< | | |
|---|---|---|
| −25.555*S + 219.122 | for | 7.778 < S < 8.333 |
| −5.585*S + 63.794 | for | 4.000 < S < 7.778 |
| 3.214*S + 28.600 | for | 1.793 < S < 4.000 |
| 21.749*S − 4.633 | for | 0.233 < S < 1.793 |

Set C2:

| Post Height> | | |
|---|---|---|
| 0.277*S + 0.593 | for | 0.250 < S < 5.182 |
| 2.342*S − 10.111 | for | 5.182 < S < 7.222 |
| Post Height< | | |
| −13.149*S + 101.763 | for | 6.111 < S < 7.222 |
| −4.885*S + 51.265 | for | 3.333 < S < 6.111 |
| 4.291*S + 20.680 | for | 1.520 < S < 3.333 |
| 20.788*S − 4.395 | for | 0.251 < S < 1.520 |
| 161.000*S − 39.588 | for | 0.250 < S < 0.251 |

Set C3:

| Post Height> | | |
|---|---|---|
| 0.277*S + 0.591 | for | 0.278 < S < 4.425 |
| 1.916*S − 6.663 | for | 4.425 < S < 6.111 |
| Post Height< | | |
| −21.337*S + 135.438 | for | 5.556 < S < 6.111 |
| −4.985*S + 44.588 | for | 3.175 < S < 5.556 |
| 2.749*S + 20.031 | for | 1.560 < S < 3.175 |
| 18.321*S − 4.260 | for | 0.278 < S < 1.560 | and

D is selected from the group of sets of inequalities consisting of:

Set D1:

| Post Height> | | |
|---|---|---|
| 0.257*S + 0.327 | for | 0.208 < S < 7.778 |
| 1.977*S − 13.044 | for | 7.778 < S < 9.444 |
| Post Height< | | |
| −36.195 *S + 347.445 | for | 8.889 < S < 9.444 |
| −5.777 *S + 77.062 | for | 4.833 < S < 8.889 |
| 1.950 *S + 39.718 | for | 2.222 < S < 4.833 |
| 20.301 *S + −1.058 | for | 0.389 < S < 2.222 |
| 34.481 *S + −6.574 | for | 0.208 < S < 0.389 |

Set D2:

| Post Height> | | |
|---|---|---|
| 0.322 *S + 0.359 | for | 0.233 < S < 6.667 |
| 2.202 *S + −12.179 | for | 6.667 < S < 8.333 |
| Post Height< | | |
| −25.555 *S + 219.122 | for | 7.778 < S < 8.333 |
| −5.585 *S + 63.794 | for | 4.000 < S < 7.778 |
| 3.214 *S + 28.600 | for | 1.793 < S < 4.000 |
| 21.749 *S + −4.633 | for | 0.233 < S < 1.793 |

Set D3:

| Post Height> | | |
|---|---|---|
| 0.212 *S + 0.600 | for | 0.264 < S < 4.833 |
| 3.017 *S + −12.960 | for | 4.833 < S < 6.667 |
| Post Height< | | |
| −12.356 *S + 89.531 | for | 5.556 < S < 6.667 |
| −4.551 *S + 46.170 | for | 3.175 < S < 5.556 |
| 3.850 *S + 19.496 | for | 1.502 < S < 3.175 |
| 19.751 *S + −4.387 | for | 0.264 < S < 1.502 |

2. The electric machine of claim 1 in which the electric machine is a radial flux machine, having an airgap diameter, and the size of the electric machine is the airgap diameter.

3. The electric machine of claim 2 in which the electric conductors comprise a concentrated winding.

4. The electric machine of claim 2 in which the electric conductors comprise a distributed winding.

5. The electric machine of claim 1 in which the electric machine is a rotary axial flux machine, having an average airgap diameter, and the size of the electric machine is the average airgap diameter.

6. The electric machine of claim 5 in which the electric conductors comprise a concentrated winding.

7. The electric machine of claim 5 in which the electric conductors comprise a distributed winding.

8. The electric machine of claim 1 in which the electric machine is a linear machine having a direction of translation, the first carrier has a first length in the direction of translation, the second carrier has a second length in the direction of translation, and the size of the electric machine is the first length if the first length is shorter or equal to the second length and the second length if the second length is shorter than the first length.

9. The electric machine of claim 8 in which the electric conductors comprise a concentrated winding.

10. The electric machine of claim 8 in which the electric conductors comprise a distributed winding.

11. The electric machine of claim 1 in which the first carrier comprises a stator formed of a unitary piece of magnetically susceptible material, each post comprising a portion of the stator.

12. The electric machine of claim 11 in which the stator comprises a material with no measurable creep below 20,000 psi.

13. The electrical machine of claim 11 in which the posts each have a tangential width and the stator comprises a backiron portion, the backiron portion having a thickness equal to or less than the tangential width of the posts.

14. The electrical machine of claim 11 in which the posts each have a tangential width and the stator comprises a backiron portion, the backiron portion having a thickness equal to or less than half the tangential width of the posts.

15. The electric machine of claim 1 in which the second carrier comprises:
an annular disk formed of a unitary piece of a material and defining an axis, and having an inner edge and an outer edge;
circumferentially spaced second carrier posts extending axially from the annular disk and defining second carrier slots between the second carrier posts; and
the annular disk defining holes extending between the inner edge and the outer edge.

16. The electric machine of claim 1 which electric machine has an axis defining an axial direction, the second carrier has an inner circumference and an outer circumference, the inner circumference has an inner axial length, the outer circumference has an outer axial length, and the inner axial length is not equal to the outer axial length.

17. The electric machine of claim 16 in which the inner axial length is less than the outer axial length.

18. The electric machine of claim 17 in which the second carrier has a conical shape.

19. The electric machine of claim 1 in which the electric conductors comprise anodized aluminum conductors.

20. The electric machine of claim 1 further comprising a coolant supply connected to supply cooling fluid to one or both of the first carrier and the second carrier.

21. The electric machine of claim 1 further comprising a power supply connected to supply electrical energy of at least 70 A/mm2 to the electric conductors.

22. The electric machine of claim 1 in which the second carrier comprises magnet slots and the electromagnetic elements of the second carrier comprise permanent magnets held within the magnet slots by magnetic forces.

23. The electric machine of claim 22 in which the electric conductors form single layers around the posts, measured radially outward from the posts.

24. The electric machine of claim 1 in which the airgap is from 0.001" to 0.010".

25. The electric machine of claim 1 in which the airgap is from 0.005" to 0.010".

26. The electric machine of claim 1 in which the electric machine is mounted on a robotic arm.

27. The electric machine of claim 26 in which components of the robotic arm form a housing for the electric machine that supports the first carrier and the second carrier.

28. The electric machine of claim 1 in which the electric machine is a frameless electric machine.

\* \* \* \* \*